US008315326B2

(12) United States Patent
Agee et al.

(10) Patent No.: US 8,315,326 B2
(45) Date of Patent: *Nov. 20, 2012

(54) APPARATUS FOR GENERATING AT LEAST ONE SIGNAL BASED ON AT LEAST ONE ASPECT OF AT LEAST TWO RECEIVED SIGNALS

(75) Inventors: Brian G. Agee, San Jose, CA (US);
Matthew C. Bromberg, Leominster, MA (US)

(73) Assignee: Aloft Media, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,622

(22) Filed: Feb. 7, 2011

(65) Prior Publication Data
US 2011/0142025 A1  Jun. 16, 2011

Related U.S. Application Data

(63) Continuation of application No. 11/880,825, filed on Jul. 23, 2007, which is a continuation-in-part of application No. 09/878,789, filed on Jun. 10, 2001, now Pat. No. 7,248,841.

(60) Provisional application No. 60/234,831, filed on Sep. 22, 2000, provisional application No. 60/211,462, filed on Jun. 13, 2000.

(51) Int. Cl.
*H04B 7/02* (2006.01)
*H04L 1/02* (2006.01)
(52) U.S. Cl. ........................................ 375/267
(58) Field of Classification Search ............ 375/219, 375/232, 259, 267, 299, 341, 343, 345, 346; 370/206, 208, 210, 252, 329, 334, 343
See application file for complete search history.

(56) References Cited

U.S. PATENT DOCUMENTS
5,093,781 A  3/1992 Castelaz ................. 395/800
(Continued)

FOREIGN PATENT DOCUMENTS
EP  1744575 A2  1/2007
(Continued)

OTHER PUBLICATIONS

L. Delaney, B. Agee, M. Buckner, R. Buehrer, J. Cafarella, P. Dickenson, J. Freebersyser, R. Gonzales, A. Ivers, . Kind, G. Minden, J. Mitola, R. Nowak, G. Roussos, R. Tingley, C. Ford, N. Haller, *Toward a Universal Radio Frequency System for Special Operations Forces*, National Research Council, 2009, Washington, DC: The National Academies Press.

(Continued)

*Primary Examiner* — David C. Payne
*Assistant Examiner* — Syed Haider
(74) *Attorney, Agent, or Firm* — Patrick E. Caldwell, Esq.; The Caldwell Firm, LLC

(57) ABSTRACT

An apparatus for generating at least one signal based on at least one aspect of at least two received signals is provided. The apparatus comprises: an antennae array of M antennae, where M is greater than or equal to two; at least one multiple-input and multiple-output capable transceiver in communication with each antenna in the antennae array of M antennae; and processing circuitry, the processing circuitry in communication with the multiple-input and multiple-output capable transceiver. In operation, the processing circuitry is capable of causing the apparatus to: receive at least two first signals, combine at least two of the at least two first signals, generate at least two second signals based on at least one aspect of the at least two first signals, and simultaneously transmit the at least two second signals; wherein the apparatus is configured such that at least one of the at least two second signals is capable of being received by a multiple-input capable node.

54 Claims, 54 Drawing Sheets

U.S. PATENT DOCUMENTS

| | | | |
|---|---|---|---|
| 5,255,210 A | 10/1993 | Gardner et al. | 364/574 |
| 5,260,968 A | 11/1993 | Gardner et al. | 375/1 |
| 5,299,148 A | 3/1994 | Gardner et al. | 364/574 |
| 5,459,725 A | 10/1995 | Bodner et al. | 370/60 |
| 5,471,647 A | 11/1995 | Gerlach et al. | 455/63.1 |
| 5,515,378 A | 5/1996 | Roy, III et al. | 370/951 |
| 5,539,832 A | 7/1996 | Weinstein et al. | 381/94.1 |
| 5,546,090 A | 8/1996 | Roy, III et al. | |
| 5,550,810 A | 8/1996 | Monogioudis et al. | 370/18 |
| 5,574,979 A | 11/1996 | West | |
| 5,592,490 A | 1/1997 | Barratt et al. | 370/310 |
| 5,625,880 A | 4/1997 | Goldburg et al. | 455/381 |
| 5,634,199 A | 5/1997 | Gerlach et al. | 455/63 |
| 5,642,353 A | 6/1997 | Roy, III et al. | 370/329 |
| 5,771,352 A | 6/1998 | Nakamura et al. | 395/200.57 |
| 5,790,516 A | 8/1998 | Gudmundson et al. | 370/210 |
| 5,809,019 A * | 9/1998 | Ichihara et al. | 370/334 |
| 5,828,658 A | 10/1998 | Ottersten et al. | 370/310 |
| 5,852,633 A | 12/1998 | Levin et al. | 375/260 |
| 5,870,385 A | 2/1999 | Ahmadi et al. | 370/252 |
| 5,875,186 A | 2/1999 | Belanger et al. | 370/331 |
| 5,886,988 A | 3/1999 | Yun et al. | 370/329 |
| 5,890,055 A | 3/1999 | Chu et al. | 455/16 |
| 5,909,470 A | 6/1999 | Barratt et al. | 375/324 |
| 5,909,471 A | 6/1999 | Yun | 375/343 |
| 5,912,921 A | 6/1999 | Warren et al. | 375/220 |
| 5,930,243 A | 7/1999 | Parish et al. | 370/334 |
| 6,006,110 A | 12/1999 | Raleigh | 455/561 |
| 6,016,313 A | 1/2000 | Foster, Jr. et al. | 370/330 |
| 6,023,203 A | 2/2000 | Parish | 333/126 |
| 6,037,898 A | 3/2000 | Parish et al. | 342/174 |
| 6,044,062 A | 3/2000 | Brownrigg et al. | 370/238 |
| 6,047,189 A | 4/2000 | Yun et al. | 455/452 |
| 6,061,389 A | 5/2000 | Ishifuji et al. | |
| 6,067,290 A | 5/2000 | Paulraj et al. | 370/329 |
| 6,069,894 A | 5/2000 | Holender et al. | 370/397 |
| 6,088,327 A | 7/2000 | Muschallik et al. | 370/210 |
| 6,097,703 A | 8/2000 | Larsen et al. | 370/254 |
| 6,097,707 A | 8/2000 | Hodzic et al. | 370/321 |
| 6,101,399 A | 8/2000 | Raleigh | 455/561 |
| 6,104,712 A | 8/2000 | Robert et al. | 370/389 |
| 6,108,565 A * | 8/2000 | Scherzer | 455/562.1 |
| 6,115,580 A | 9/2000 | Chuprun et al. | 455/1 |
| 6,128,276 A | 10/2000 | Agee | 370/208 |
| 6,141,567 A | 10/2000 | Youssefmir et al. | 455/562 |
| 6,144,711 A | 11/2000 | Raleigh et al. | |
| 6,154,661 A | 11/2000 | Goldburg | 455/562 |
| 6,177,906 B1 | 1/2001 | Petrus | 342/378 |
| 6,185,440 B1 | 2/2001 | Barratt et al. | 455/562 |
| 6,219,341 B1 | 4/2001 | Varanasi | 370/252 |
| 6,266,528 B1 | 7/2001 | Farzaneh | 455/423 |
| 6,275,543 B1 | 8/2001 | Petrus et al. | 375/324 |
| 6,300,881 B1 * | 10/2001 | Yee et al. | 340/870.02 |
| 6,317,411 B1 | 11/2001 | Whinnett et al. | 370/204 |
| 6,359,923 B1 | 3/2002 | Agee et al. | 375/130 |
| 6,362,781 B1 | 3/2002 | Thomas et al. | |
| 6,373,432 B1 | 4/2002 | Rabinowitz et al. | |
| 6,377,631 B1 | 4/2002 | Raleigh | |
| 6,377,636 B1 | 4/2002 | Paulraj et al. | |
| 6,411,799 B1 | 6/2002 | Padovani | |
| 6,441,784 B1 | 8/2002 | Flore et al. | 342/377 |
| 6,459,171 B1 | 10/2002 | Leifer | 307/52 |
| 6,463,295 B1 | 10/2002 | Yun | 455/522 |
| 6,493,331 B1 | 12/2002 | Walton et al. | |
| 6,493,335 B1 * | 12/2002 | Darcie et al. | 370/344 |
| 6,504,506 B1 | 1/2003 | Thomas et al. | |
| 6,512,737 B1 | 1/2003 | Agee | 370/208 |
| 6,564,036 B1 | 5/2003 | Kasapi | 455/1 |
| 6,570,527 B1 | 5/2003 | Lindskog et al. | 342/174 |
| 6,600,914 B2 | 7/2003 | Uhlik et al. | 455/404 |
| 6,615,024 B1 | 9/2003 | Boros et al. | 455/674 |
| 6,621,851 B1 | 9/2003 | Agee et al. | 375/130 |
| 6,647,078 B1 | 11/2003 | Thomas et al. | |
| 6,650,714 B2 | 11/2003 | Dogan et al. | 375/343 |
| 6,650,881 B1 | 11/2003 | Dogan | |
| 6,651,210 B1 | 11/2003 | Trott et al. | 714/758 |
| 6,654,590 B2 | 11/2003 | Boros et al. | |
| 6,668,161 B2 | 12/2003 | Boros et al. | |
| 6,683,915 B1 | 1/2004 | Trott et al. | 375/262 |
| 6,684,366 B1 | 1/2004 | Trott et al. | 714/790 |
| 6,687,492 B1 | 2/2004 | Sugar et al. | 455/276.1 |
| 6,690,747 B2 | 2/2004 | Petrus et al. | 375/324 |
| 6,711,412 B1 | 3/2004 | Tellado et al. | |
| 6,731,689 B2 | 5/2004 | Dogan | 375/259 |
| 6,731,705 B2 | 5/2004 | Kasapi et al. | 375/346 |
| 6,735,258 B1 | 5/2004 | Trott et al. | 375/308 |
| 6,738,020 B1 | 5/2004 | Lindskog et al. | 342/377 |
| 6,747,594 B2 | 6/2004 | Lindskog et al. | 342/174 |
| 6,751,187 B2 | 6/2004 | Walton et al. | |
| 6,757,265 B1 | 6/2004 | Sebastian et al. | |
| 6,760,599 B1 | 7/2004 | Uhlik | 455/525 |
| 6,768,747 B1 | 7/2004 | Dogan | 370/509 |
| 6,771,706 B2 | 8/2004 | Ling et al. | |
| 6,778,513 B2 | 8/2004 | Kasapi et al. | 370/330 |
| 6,785,341 B2 | 8/2004 | Walton et al. | |
| 6,788,948 B2 | 9/2004 | Lindskog et al. | 455/504 |
| 6,795,409 B1 | 9/2004 | Youssefmir et al. | 370/328 |
| 6,795,413 B1 | 9/2004 | Uhlik | 370/330 |
| 6,801,589 B1 | 10/2004 | Dogan | 375/343 |
| 6,802,038 B1 | 10/2004 | Yu | 714/758 |
| 6,834,249 B2 | 12/2004 | Orchard | 702/141 |
| 6,836,673 B1 | 12/2004 | Trott | |
| 6,839,573 B1 | 1/2005 | Youssefmir et al. | |
| 6,839,574 B2 | 1/2005 | Petrus et al. | |
| 6,865,377 B1 | 3/2005 | Lindskog et al. | 455/101 |
| 6,888,882 B1 | 5/2005 | Dogan | 375/220 |
| 6,888,899 B2 | 5/2005 | Raleigh et al. | 375/299 |
| 6,894,993 B2 | 5/2005 | Yu et al. | 370/329 |
| 6,915,438 B2 | 7/2005 | Boros | 713/322 |
| 6,928,287 B2 | 8/2005 | Trott et al. | 455/447 |
| 6,931,030 B1 | 8/2005 | Dogan | 370/509 |
| 6,931,262 B2 | 8/2005 | Steele | |
| 6,931,583 B2 | 8/2005 | Trott et al. | 714/780 |
| 6,950,630 B2 | 9/2005 | Chauvin et al. | |
| 6,950,979 B2 | 9/2005 | Zhang et al. | 714/801 |
| 6,954,643 B2 | 10/2005 | Petrus | 455/437 |
| 6,957,042 B2 * | 10/2005 | Williams | 455/7 |
| 6,961,388 B2 | 11/2005 | Ling et al. | |
| 6,963,742 B2 | 11/2005 | Boros et al. | 455/424 |
| 6,965,774 B1 | 11/2005 | Kasapi et al. | 455/450 |
| 6,965,788 B1 | 11/2005 | Barratt et al. | 455/574 |
| 6,970,682 B2 | 11/2005 | Crilly, Jr. et al. | |
| 6,973,314 B2 | 12/2005 | Wilson et al. | |
| 6,982,968 B1 | 1/2006 | Barratt et al. | 370/328 |
| 6,983,127 B1 | 1/2006 | Da Torre et al. | |
| 6,985,466 B1 | 1/2006 | Yun et al. | 370/335 |
| 6,987,819 B2 | 1/2006 | Thomas et al. | |
| 6,996,060 B1 | 2/2006 | Dahlby et al. | 370/230 |
| 6,996,163 B2 | 2/2006 | Bhora et al. | 375/150 |
| 6,999,771 B1 | 2/2006 | Kasapi et al. | 455/450 |
| 6,999,794 B1 | 2/2006 | Lindskog et al. | |
| 7,003,310 B1 | 2/2006 | Youssefmir et al. | 455/522 |
| 7,006,579 B2 | 2/2006 | Kuchi et al. | |
| 7,016,429 B1 | 3/2006 | Dogan et al. | 375/279 |
| 7,020,107 B2 | 3/2006 | Kasapi et al. | 370/329 |
| 7,020,490 B2 | 3/2006 | Khatri | |
| 7,024,163 B1 | 4/2006 | Barratt et al. | 455/69 |
| 7,027,415 B1 | 4/2006 | Dahlby et al. | 370/322 |
| 7,027,523 B2 | 4/2006 | Jalali et al. | |
| 7,027,837 B1 | 4/2006 | Uhlik et al. | |
| 7,031,679 B2 | 4/2006 | Persson et al. | 455/137 |
| 7,035,358 B1 | 4/2006 | Sankaran et al. | 375/344 |
| 7,035,661 B1 | 4/2006 | Yun | 455/522 |
| 7,036,067 B2 | 4/2006 | Roy et al. | 714/758 |
| 7,039,016 B1 | 5/2006 | Lindskog et al. | 370/252 |
| 7,039,363 B1 | 5/2006 | Kasapi et al. | |
| 7,042,856 B2 | 5/2006 | Walton et al. | |
| 7,043,259 B1 | 5/2006 | Trott | 455/458 |
| 7,047,045 B2 | 5/2006 | Steele et al. | |
| 7,050,832 B2 | 5/2006 | Kasapi | |
| 7,054,301 B1 | 5/2006 | Sousa et al. | 370/343 |
| 7,062,294 B1 | 6/2006 | Rogard et al. | |
| 7,068,628 B2 | 6/2006 | Li et al. | |
| 7,072,413 B2 | 7/2006 | Walton et al. | |
| 7,079,480 B2 | 7/2006 | Agee | 370/204 |
| 7,106,781 B2 | 9/2006 | Agee et al. | 375/141 |
| 7,110,349 B2 | 9/2006 | Branlund et al. | 370/203 |

| | | | |
|---|---|---|---|
| 7,110,381 B1 | 9/2006 | O'Sullivan | 370/338 |
| 7,111,223 B2 | 9/2006 | Roy et al. | 714/758 |
| 7,116,722 B2 | 10/2006 | Foschini et al. | |
| 7,133,459 B2 | 11/2006 | Onggosani et al. | |
| 7,139,592 B2 | 11/2006 | Leifer et al. | |
| 7,149,238 B2 | 12/2006 | Agee et al. | 375/141 |
| 7,149,239 B2 | 12/2006 | Hudson | |
| 7,151,795 B1 | 12/2006 | Goldburg | 375/227 |
| 7,158,493 B1 | 1/2007 | Uhlik et al. | 370/329 |
| 7,164,669 B2 | 1/2007 | Li et al. | |
| 7,164,726 B1 | 1/2007 | Trott | 375/267 |
| 7,164,739 B1 | 1/2007 | Trott | 375/347 |
| 7,206,293 B2 | 4/2007 | Kasapi et al. | 370/312 |
| 7,206,554 B1 | 4/2007 | Lindskog | 455/101 |
| 7,221,699 B1 | 5/2007 | Lindskog | 375/147 |
| 7,227,855 B1 | 6/2007 | Barratt et al. | 370/343 |
| 7,242,720 B2 | 7/2007 | Sugiyama et al. | |
| 7,248,841 B2 | 7/2007 | Agee et al. | |
| 7,257,101 B2 | 8/2007 | Petrus et al. | 370/332 |
| 7,263,082 B2 | 8/2007 | Lindskog | 370/335 |
| 7,266,685 B1 | 9/2007 | Meandzija et al. | 713/156 |
| 7,269,389 B2 | 9/2007 | Petrus et al. | 455/69 |
| 7,277,679 B1 | 10/2007 | Barratt et al. | 455/101 |
| 7,299,071 B1 | 11/2007 | Barratt et al. | |
| 7,299,073 B2 | 11/2007 | Wilson et al. | |
| 7,302,565 B2 | 11/2007 | Meandzija et al. | 713/155 |
| 7,310,538 B2 | 12/2007 | Steele et al. | |
| 7,336,626 B1 | 2/2008 | Barratt et al. | 370/281 |
| 7,336,719 B2 | 2/2008 | Gore et al. | 375/267 |
| 7,339,906 B1 | 3/2008 | Dahlby et al. | 370/329 |
| 7,339,908 B2 | 3/2008 | Uhlik et al. | 370/331 |
| 7,339,981 B2 | 3/2008 | Dogan | 375/219 |
| 7,342,912 B1 | 3/2008 | Kerr et al. | 370/347 |
| 7,349,371 B2 | 3/2008 | Schein et al. | 370/329 |
| 7,352,774 B2 | 4/2008 | Uhlik et al. | 370/474 |
| 7,362,799 B1 | 4/2008 | Petrus | 375/224 |
| 7,363,376 B2 | 4/2008 | Uhlik et al. | 709/227 |
| 7,366,223 B1 | 4/2008 | Chen et al. | 375/132 |
| 7,372,911 B1 | 5/2008 | Lindskog et al. | 375/267 |
| 7,386,043 B2 | 6/2008 | Goldburg | 375/227 |
| 7,386,781 B2 | 6/2008 | Persson et al. | 714/822 |
| 7,389,111 B2 | 6/2008 | Petrus | 455/436 |
| 7,397,804 B2 | 7/2008 | Dulin et al. | |
| 7,406,261 B2 | 7/2008 | Shattil et al. | |
| 7,406,315 B2 | 7/2008 | Uhlik et al. | |
| 7,411,977 B1 | 8/2008 | Chen et al. | 370/468 |
| 7,418,043 B2 | 8/2008 | Shattil et al. | |
| 7,420,984 B2 | 9/2008 | Chen et al. | 370/437 |
| 7,424,002 B2 | 9/2008 | Barratt et al. | 370/343 |
| 7,430,197 B1 | 9/2008 | Uhlik et al. | 370/347 |
| 7,430,246 B1 | 9/2008 | Trott | 375/267 |
| 7,430,606 B1 | 9/2008 | Meandzija et al. | 709/229 |
| 7,433,347 B1 | 10/2008 | Trott et al. | 370/347 |
| 7,433,418 B1 | 10/2008 | Dogan et al. | 375/285 |
| 7,460,835 B1 | 12/2008 | Petrus | |
| 7,594,010 B2 | 9/2009 | Dohler et al. | |
| 7,606,204 B2* | 10/2009 | Sebastian et al. | 370/334 |
| 7,688,710 B2* | 3/2010 | Wu et al. | 370/208 |
| 7,760,814 B2 | 7/2010 | Jungnickel et al. | |
| 7,801,247 B2 | 9/2010 | Onggosani et al. | |
| 7,986,742 B2 | 7/2011 | Ketchum et al. | |
| 8,098,568 B2 | 1/2012 | Laroia et al. | |
| 2001/0033622 A1* | 10/2001 | Jongren et al. | 375/267 |
| 2002/0062472 A1 | 5/2002 | Medlock et al. | |
| 2002/0111142 A1 | 8/2002 | Klimovitch | |
| 2002/0111144 A1 | 8/2002 | Schiff | |
| 2002/0122381 A1 | 9/2002 | Wu | |
| 2002/0122465 A1 | 9/2002 | Agee et al. | 375/141 |
| 2002/0150109 A1 | 10/2002 | Agee | 370/400 |
| 2002/0155818 A1 | 10/2002 | Boros et al. | 455/674 |
| 2002/0193146 A1 | 12/2002 | Wallace et al. | |
| 2003/0072382 A1* | 4/2003 | Raleigh et al. | 375/267 |
| 2003/0086366 A1 | 5/2003 | Branlund et al. | 370/208 |
| 2003/0087673 A1 | 5/2003 | Walton et al. | |
| 2003/0123384 A1 | 7/2003 | Agee | 370/208 |
| 2003/0124976 A1 | 7/2003 | Tamaki et al. | 455/15 |
| 2004/0012387 A1* | 1/2004 | Shattil | 324/225 |
| 2004/0095907 A1 | 5/2004 | Agee et al. | 370/334 |
| 2004/0100897 A1 | 5/2004 | Shattil | |
| 2004/0131025 A1 | 7/2004 | Dohler et al. | |
| 2004/0180625 A1 | 9/2004 | Steele et al. | |
| 2004/0193982 A1 | 9/2004 | Bhora et al. | 714/726 |
| 2005/0147076 A1 | 7/2005 | Sadowsky et al. | 370/343 |
| 2005/0197748 A1 | 9/2005 | Holst et al. | |
| 2006/0193373 A1 | 8/2006 | Agee et al. | 375/141 |
| 2007/0009012 A1 | 1/2007 | Carrivan et al. | |
| 2007/0042753 A1 | 2/2007 | Uhlik et al. | 455/406 |
| 2007/0133496 A1 | 6/2007 | Barratt et al. | 370/343 |
| 2007/0140374 A1* | 6/2007 | Raleigh et al. | 375/267 |
| 2007/0165552 A1 | 7/2007 | Kasapi et al. | 370/312 |
| 2007/0268980 A1 | 11/2007 | Brannstorm et al. | 375/265 |
| 2007/0283230 A1 | 12/2007 | Brannstrom et al. | 714/777 |
| 2008/0075033 A1 | 3/2008 | Shattil | |
| 2008/0088517 A1 | 4/2008 | Ansari et al. | 343/745 |
| 2008/0090575 A1 | 4/2008 | Barak et al. | 455/444 |
| 2008/0101502 A1 | 5/2008 | Navidpour et al. | 375/296 |
| 2008/0130611 A1 | 6/2008 | Branlund et al. | 370/342 |
| 2008/0181170 A1 | 7/2008 | Branlund et al. | 370/328 |
| 2008/0232238 A1 | 9/2008 | Agee | 370/208 |
| 2009/0116541 A1 | 5/2009 | Farrokhi et al. | 375/136 |
| 2010/0020907 A1 | 1/2010 | Rezvani et al. | 375/347 |
| 2010/0080317 A1 | 4/2010 | Narasimhan et al. | 375/267 |
| 2010/0111141 A1 | 5/2010 | Currivan et al. | |
| 2010/0162075 A1 | 6/2010 | Brannstrom et al. | 714/752 |
| 2010/0174599 A1 | 7/2010 | Rosenblatt et al. | 705/14.37 |
| 2010/0214145 A1 | 8/2010 | Narasimhan et al. | 341/155 |
| 2010/0246454 A1 | 9/2010 | Ansari et al. | 370/278 |
| 2010/0254325 A1 | 10/2010 | Narasimhan et al. | 370/329 |
| 2010/0303160 A1 | 12/2010 | Rezvani et al. | 375/260 |
| 2011/0019608 A1 | 1/2011 | Dohler et al. | |

FOREIGN PATENT DOCUMENTS

| | | |
|---|---|---|
| EP | 2239990 A1 | 10/2010 |
| EP | 2264965 A2 | 12/2010 |
| EP | 2317664 A2 | 5/2011 |
| WO | 9120135 A1 | 12/1991 |
| WO | 9809395 A1 | 3/1998 |
| WO | WO9827669 A1 | 6/1998 |
| WO | WO9837638 A2 | 8/1998 |
| WO | WO9837638 A3 | 8/1998 |
| WO | WO9908451 A2 | 2/1999 |
| WO | WO9908451 A3 | 2/1999 |
| WO | WO9940689 A1 | 8/1999 |
| WO | WO0011823 A1 | 3/2000 |
| WO | WO0025485 A1 | 5/2000 |

OTHER PUBLICATIONS

Bromberg, M., Agee, B., "Optimization of Spatially Adaptive Reciprocal Multipoint Communication Networks," IEEE Transactions on Communications, vol. 51, No. 8, Aug. 2003.

B. Agee, R. Kleinman, J. Reed, "Soft Synchronization of Direct Sequence Spread Spectrum Signals," *IEEE Trans. Comm.*, vol. COM-44, No. 11, pp. 1527-1536, Nov. 1996.

B. Agee, "Solving the Near-Far Problem: Exploitation of Spatial and Spectral Diversity in Wireless Personal Communication Networks," (1994).

R. Mendoza, J. Reed, T. Hsia, B. Agee, "Interference Rejection Using Time-Dependent Constant Modulus Algorithms and a Hybrid CMA/SCD," *IEEE Trans. ASSP*, Jul. 1991.

B. Agee, S. Schell, W. Gardner, "Spectral Self-Coherence Restoral: A New Approach to Blind Adaptive Signal Extraction Using Antenna Arrays," IEEE Proceedings, vol. 78, No. 4, pp. 753-767, Apr. 1990.

B. Agee, M. Bromberg, "Exploitation of MIMO Network Diversity in Multipoint Communication Networks," presented at the *Thirty-Fifth Asilomar Conference Signals, Systems, and Computers*, Nov. 2001.

M. Bromberg, B. Agee, "The LEGO Approach for Achieving Max-Min Capacity in Reciprocal Multipoint Networks," in *Proc. Thirty Fourth Asilomar Conf. Signals, Systems, and Computers*, Oct. 2000.

B. Agee, "Exploitation of Internode MIMO Channel Diversity in Spatially Distributed Multipoint Networks," in *Proc. Tenth Annual Virginia Tech Symposium on Wireless Personal Comm.*, Jun. 2000.

B. Agee, S. Bruzzone, M. Bromberg, "Exploitation of Signal Structure in Array-Based Blind Copy and Copy-Aided DF Systems," in *Proc. 1998 Intl. Conf. on Acoustics, Speech and Signal Proc.*, pp. 2489-2492, vol. 4, May 1998.

M. Bromberg, B. Agee, "Direction Finding for Unstructured Emitters in the Presence of Structured Interferers," in *Proc. 1998 Intl. Conf. on Acoustics, Speech and Signal Processing*, pp. 2537-2540, vol. 4, May 13, 1998.

E. Krzysiak, D. Branlund, B. Agee, "New Copy-Aided Techniques for Superresolution Direction Finding and Geolocation," in *Proc. Fourth Southwest Institute Conference on Direction Finding*, Nov. 1997.

J. Treichler, B. Agee, "A New Approach to Multipath Correction of Constant Modulus Signals," *IEEE Trans. Acoustics, Speech and Signal Processing*, vol. ASSP-31, No. 2, Apr. 1983.

W. Gardner, B. Agee, "Two-Stage Adaptive Noise Cancellation for Intermittent-Signal Applications," *IEEE Trans. Information Theory*, vol. IT-26, No. 6, Nov. 1980.

B. Agee, "Blind Detection, Separation, and Location of Dense Co-Channel Emitters Using Multiplatform Spatial-Coherence Restoral," in *Proc. 2006 IEEE Workshop on Sensor Array and Multichannel Processing*, Jul. 2006.

J. Fite, S. Bruzzone, B. Agee, "Blind Separation of Voice Modulated Single-Side-Band Using the Multi-Target Variable Modulus Algorithm," in *Proc. 1996 Conf. on Acoustics, Speech and Signal Processing*, pp. 2726-2729, vol. 5, May 1996.

B. Agee, S. Bruzzone, "Exploitation of Signal Structure in Array-Based Blind Copy and Copy-Aided DF Systems," in *Proc. 1994 CRASP Conf. on Co-Channel Demodulation*, Jun. 1994.

B. Agee, "On the Performance Bounds Adhered to by Copy-Aided DF Algorithms," presented at *Twenty-Seventh Asilomar Conference on Signals, Systems and Computers*, Nov. 1993.

B. Agee, K. Cohen, J. Reed, T. Hsia, "Simulation Performance of a Blind Adaptive Array for a Realistic Mobile Channel," in *Proc. 1993 Conf. on Vehicular Technology*, May 18, 1993.

B. Agee, J. Reed, "A Technique for Instantaneous Tracking of Frequency Hopping Signals in the Presence of Spectrally Correlated Interference," in *Proc. Twenty-Sixth Asilomar Conference on Signals, Systems and Computers*, Nov. 1992.

B. Agee, *The Property Restoral Approach to Blind Adaptive Signal Extraction*, Ph.D. Dissertation, Dept. of Electrical Engineering, University of California, Davis, CA, Jun. 1989.

B. Agee, "Maximum-Likelihood Approaches to Blind Adaptive Signal Extraction Using Narrowband Antenna Arrays," in *Proc. Twenty-Fifth Asilomar Conference on Signals, Systems and Computers*, Nov. 1991.

B. Agee, "The Copy/DF Approach to Signal-Specific Emitter Location," in *Proc. Twenty-Fifth Asilomar Conference on Signals, Systems and Computers*, Nov. 1991.

B. Agee, R. Calabretta, "ARMA-Like and ML-Like Copy/DF Approaches for Signal-Specific Emitter Location," in *Proc. Fifth ASSP Workshop on Spectrum Estimation and Modelling*, 1990.

B. Agee, S. Venkataraman, "Adaptive Demodulation of PCM Signals in the Frequency Domain," in *Proc. Twenty-Third Asilomar Conference on Signals, Systems and Computers*, Nov. 1989.

S. Schell, B. Agee, "Application of the SCORE Algorithm and SCORE Extensions to Sorting in the Rank-$L$ Spectral Self-Coherence Environment," in *Proc. Twenty-Second Asilomar Conf. Signals, Systems, Comp.*, Nov. 1988.

B. Agee, "The Baseband Modulus Restoral Approach to Blind Adaptive Signal Demodulation," 1988 Digital Signal Processing Workshop, Sep. 1988.

B. Agee, S. Schell, W. Gardner, "The SCORE Approach to Blind Adaptive Signal Extraction: An Application of the Theory of Spectral Correlation," in *Proc. Fourth ASSP Workshop on Spectrum Estimation and Modelling*, p. 277, Aug. 1988.

B. Agee, "The Least-Squares CMA: A New Approach to Rapid Correction of Constant Modulus Signals," in *Proc. 1986 International Conf. on Acoustics, Speech and Signal Processing*, vol. 2, p. 19.2.1, Apr. 1986, Tokyo, Japan.

M.C. Bromberg, B. Agee, "Transmit Beamforming for Optimizing Network Capacity", Jun. 26, 2001.

B. Agee, "Blind Separation and Capture of Communication Signals Using a Multitarget Constant Modulus Beamformer," Adapted from a paper published in *Proc. 1989 IEEE Military Comm. Conference*, Oct. 1989.

B. Agee, "Fast Acquisition of Burst and Transient Signals Using a Predictive Adaptive Beamformer," Adapted from a paper published in *Proc. 1989 IEEE Military Communications Conference*, Oct. 1989.

B. Agee, "Convergent Behavior of Modulus-Restoring Adaptive Arrays in Gaussian Interference Environments," in *Proc. Twenty-Second Asilomar Conf. Signals, Systems and Computers*, Nov. 1988.

Swales, et. al., IEEE Trans. Veh. Technol. vol. 39 No. 1 Feb. 1990.

Agee, B., Reed, J., Kleinman, R., "Application of Eigenstructure Techniques to Blind Despreading of Direct-Sequence Spread Spectrum Signals," Dec. 3, 1990.

Agee, B., "Array-Based Techniques for Wireless Telephony," 1995 IEEE Communications Theory Workshop, Apr. 25, 1995.

Kelly, P., Agee, B., Radix Technologies, Inc.,"The Backtalk Communications Airlink," Jan. 18, 1998.

B. Agee, C. Clark, Radix Technologies, "Technical Challenges to Network Based Commercial Geolocation, A Defense Technologist's Perspective," 1997 MPRG Symposium on Wireless Personal Communications, Jun. 12, 1997.

Agee, B., "Efficient Allocation of RF Transceiver Resources in Spatially Adaptable Communication Networks," Jun. 4, 2003.

Bromberg, M., "A Quick Primer on the LEGO Algorithm," 2002.

Radix Technologies, "Live Data MT-CMA Test," 1997.

Agee, B., "LMS/Part 15 Internetwork Interference Study Results-to-Date," Feb. 23, 2001.

Agee, B., Kelly, Phillip, Radix Technologies, "The Backtalk™ Airlink for Full Exploitation of Spectral and Spatial Diversity in Wireless Communication Systems," Fourth Workshop on Smart Antennas in Wireless Mobile Communications, Jul. 24, 1997.

Bromberg, M.C., "A Hilbert Space Algebra", Masters Thesis in Mathematics, May 1986.

Bromberg, M.C., Brown, D., "The Use of Programmable DSPs in Antenna Array Processing," May 28, 2008.

Bromberg, M.C., "Reliable, High Capacity, Multipoint, Wireless Information Networks," Date Unknown.

Bromberg, M.C., "Optimizing MIMO Multipoint Wireless Networks Assuming Gaussian Other-User Interference." IEEE Transactions on Information Theory, vol. 49, No. 10, Oct. 2003. (IEEE Proof).

Bromberg, M., Agee, B., "Using Channel Reciprocity to Optimize Network Capacity," Oct. 2, 2000.

Agee, B. "Full-Duplex LPI/AJ Communications Using Blindly-Adapted Retrodirective Antenna Arrays," Project "Backtalk" Final Report (Annotated Briefing), Mar. 31, 1994.

Agee, B., "Technical Evaluation of Wireless Broadband Issues & Equipment Alternatives EPRI," BWA Technical Evaluation Final Report Nov. 19, 1999.

Agee, B., "4G Network Enhancements Using the ETSI Digital Audio Broadcast Standard," DAB Application to 4G GWCom Network Jan. 4, 2001.

Agee, B., "Capacity Analysis of LMS Network Scenarios Operating in a Part 15 Network Environment," Apr. 25, 1999.

Agee, B., "Introduction of Smart Antennas Into the Metricom Wireless Data Network Overview, Players, and Application," Aug. 6, 1999.

Agee, B., "4G Airlink Enhancements to the Metricom Ricochet System," 4G Airlink/Technology Concepts, Dec. 21, 1999.

Stutzman, W., Barts, M., "The Stub Loaded Helix Antenna," 1999.

Agee, B., "Performance of the Multitarget Modulus Restoral Algorithm Against the Keystroke Data Set," Apr. 6, 1990.

Agee, B., Young, D., "Blind Capture and Geolocation of General Spatially Self-Coherent Waveforms Using Multiplatform SCORE," Maple Press, 1990.

Biedka, T., Agee, B., "Subinterval Cyclic MUSIC—Robust DF with Error in Cycle Frequency Knowledge," 1991.

Bromberg, M., Agee, B., "The LEGO Approach for Achieving Max-Min Capacity in Reciprocal Multipoint Networks," 2001.

Mendoza, R., Reed, J., Hsia, T., Agee, B., "Interference Rejection Using Time-Dependent Constant Modulus Algorithms," 1989.

Schell, S., Calabretta, R., Gardner, W., Agee, B., "Cyclic MUSIC Algorithms for Signal-Selective Direction Estimation," 1989.

Agee, B., Protean Radio Networks, "WLAN Reconnaissance," Jan. 13, 2003.

Agee, B., Protean Radio Networks, "The PHY-IASM MIMO Network Capable Transceiver: Concept and IP Overview," May 20, 2004.

Agee, B., "ORION Phase A Algorithms," Final Design Review, Algorithms Overview Jul. 17-18, 1996 (FDR Date), Jul. 19, 1996.

Bromberg, M., Agee, B., "Using Channel Reciprocity to Optimize Network Capacity," May 11, 2000.

Bromberg, M., Agee, B., "An Analysis of the LEGO Algorithm for Optimizing the Performance of Wireless Networks," *Thirty Fourth Asilomar Conf. Signals, Systems, and Computers*, Oct. 2000, and *in Proceedings of the Thirty Fifth Asilomar Conf. Signals, Systems, and Computers*, Nov. 2001.

Bromberg, M. Agee, B., "The LEGO Technique for Optimizing the Performance of Wireless, MultiUser, MIMO Channel, TDD Networks," Dec. 28, 2000.

Bromberg, M. Agee, B., "The LEGO Technique for Locally Enabled Global Optimization of Reciprocal Multinode Communication Networks," Feb. 5, 2001.

Agee, B., "OFDM-Based SSICS Capabilities Demonstration," Aug. 11, 2000.

Agee, B., Young, D., "Blind Capture and Geolocation of General Spatially Coherent Waveforms Using Multiplatform SCORE," Presented in Proc. Twenty-Fourth Asilomar Conf. on Signals, Systems, and Computers, 1990. Maple Press.

Agee, B., Young, D., "Blind Capture and TDOA Estimation of Stationary Waveforms Using Multiplatform Temporal Cross Coherence Restoral," Nov. 4, 1990.

Office Action Summary from U.S. Appl. No. 09/878,789 which was mailed on Apr. 25, 2005.

Office Action Summary from U.S. Appl. No. 09/878,789 which was mailed on Oct. 12, 2005.

Office Action Summary from U.S. Appl. No. 09/878,789 which was mailed on Oct. 19, 2006.

Notice of Allowance from U.S. Appl. No. 09/878,789 which was mailed on Dec. 13, 2007.

IEEE Std 802.16e™-2005 and IEEE Std 802.16™-2004/Cor1-2005 (Amendment and Corrigendum to IEEE Std 802.16-2004), "IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1," Feb. 28, 2006.

IEEE Std 802.11a-1999 (R2003) (Supplement to IEEE Std 802.11-1999) [Adopted by ISO/IEC and redesignated as ISO/IEC 8802-11:1999/Amd 1:2000(E)], "Supplement to IEEE Standard for Information technoloy—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band," Reaffirmed Jun. 12, 2003.

IEEE Std 802.11b-1999 (R2003) (Supplement to ANSI/IEEE Std 802.11, 1999 Edition) "Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, Higher-Speed Physical Layer Extension in the 2.4 GHz Band," Reaffirmation Jun. 12, 2003, Approved Sep. 16, 1999.

IEEE Std 802.11g™-2003, (Amendment to IEEE Std 802.11™, 1999 Edition (Reaff 2003) as amended by IEEE Stds 802.11a™-1999, 802.11b™-1999, 802.11b™-1999/Cor Jan. 2001, and 802.11d™-2001), "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band," Jun. 27, 2003.

IEEE Std 802.11n™-2009, (Amendment to IEEE Std 802.11™-2007, as amended by IEEE Std 802.11k™-2008, IEEE Std 802.11r™-2008, IEEE Std 802.11y™-2008, and IEEE Std 802.11w™-2009), "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput," Oct. 29, 2009.

IEEE Std 802.16™-2009 (Revision of IEEE Std 802.16-2004), "IEEE Standard for Local and metropolitan area networks, Part 16: Air Interface for Broadband Wireless Access Systems," May 29, 2009.

IEEE Std 802.11 e/D4.3, May 2003 (Draft Supplement to IEEE Std 802.11, 1999 Edition), "Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)," Copyright 2003.

3GPP TS 36.101 V8.0.0 (Dec. 2007) *Technical Specification*, "3rd Generation Partnership Project; Technical Specification Group Radio Access Network; Evolved Universal Terrestrial Radio Access (E-UTRA); User Equipment (UE) radio transmission and reception (Release 8)," Copyright 2007.

3GPP TS 36.101 V9.5.0 (Oct. 2010) *Technical Specification*, 3rd Generation Partnership Project; Technical Specification Group Radio Access Network; Evolved Universal Terrestrial Radio Access (E-UTRA); User Equipment (UE) radio transmission and reception (Release 9), Copyright 2010.

Office Action Summary from U.S. Appl. No. 11/880,825 which was mailed on Jul. 16, 2010.

Final Office Action Summary from U.S. Appl. No. 11/880,825 which was mailed on Mar. 31, 2011.

T. Rappaport, B. Woerner, J. Reed, "Wireless Personal Communications: Trends and Challenges," pp. 69-80, 1994.

G. Raleigh et al., "A Blind Adaptive Transmit Antenna Algorithm for Wireless Communication," in *IEEE International Communications Conference on Communications*, Jun. 1995.

D. Gerlach, A. Paulraj, "Spectrum Reuse Using Transmitting Antenna Arrays with Feedback," in *Proc. International Conference on Acoustics, Speech, and Signal Processing*, pp. 97-100, Apr. 1994.

D. Gerlach, A. Paulraj, "Adaptive Transmitting Antenna Arrays with Feedback," in *IEEE Signal Processing Letters*, vol. 1, No. 10, pp. 150-152, Oct. 1994.

D. Gerlach, A. Paulraj, "Adaptive Transmitting Antenna Methods for Multipath Environments," *Global Tele. Conf.*, 1994.

J. Litva, T. Lo, "Digital Beamforming in Wireless Communications," 1996.

F. Rashid-Farrokhi, L. Tassiulas, K. J. Liu, "Joint optimal power control and beamforming in wireless networks using antenna arrays," *IEEE Transactions on Communications*, vol. 46, No. 10, pp. 1313-1324, Oct. 1998.

G. Raleigh, J. Cioffi, "Spatio-Temporal Coding for Wireless Communications," *IEEE Trans. Comm.*, Mar. 1998, vol. 46, No. 3, pp. 357-366.

G. Raleigh, J. Cioffi, "Spatio-Temporal Coding for Wireless Communications," *Proc. 1996 Global Telecommunications Conf.*, pp. 1809-1814, Nov. 1996.

G. Foschini, M. Gans, "On Limits of Wireless Communication in a Fading Environment When Using Multiple Antennas," *Wireless Personal Comm.*, vol. 6, No. 3, pp. 311-355, Mar. 1998.

T. M. Cover, J. A. Thomas, "Elements of Information Theory," 1991.

K. Boulle, G. Femenias, R. Augsti, "An Overview of Trellis Coded Modulation Research in COST 231," in *IEEE PIMRC '94*, pp. 105-109, Sep. 1994.

W. Gardner, "Multiplication of Cellular Radio Capacity by Blind Adaptive Spatial Filtering," Proc. IEEE International Conference on Selected Topics in Wireless Communication, Jun. 1992, pp. 102-106.

R.S. Cheng, S. Verdu, "On Limiting Characterizations of Memoryless Multiuser Capacity Regions," *IEEE Transactions on Information Theory*, vol. 39, No. 3, May 1993.

S. Verdu, "The Capacity Region of the Symbol-Asynchronous Gaussian Multiple-Access Channel," *IEEE Transactions on Information Theory*, vol. 35, No. 4, Jul. 1989.

B. Suard, G. Xu, H. Liu, T. Kailath, "Uplink Channel Capacity of Space-Division-Multiple-Access Schemes," *IEEE Transactions on Information Theory*, vol. 44, No. 4, Jul. 1998.

B. Suard, G. Xu, H. Liu, T. Kailath, "Channel Capacity of Spatial Division Multiple Access Schemes," *1994 Conference Record of the Twenty-Eighth Asilomar Conference on Signals, Systems, and Computers*, vol. 2, pp. 1159-1163, 1994.

G. Raleigh, V. Jones, "Adaptive Antenna Transmission for Frequency Duplex Digital Wireless Communication," *Proc. IEEE ICC*, vol. 2, pp. 641-646, Jun. 1997.

G. Raleigh, V. Jones, "Multivariate Modulation and Coding for Wireless Communication," *IEEE Journal on Selected Areas in Communications*, vol. 17, No. 5, May 1999.

S. Swales, M. Beach, D. Edwards, J. McGeehan, "The performance enhancement of multibeam adaptive base station antennas for cellular land mobile radio systems," *IEEE Trans. Vehic. Tech.*, vol. VT-39, pp. 56-67, Feb. 1990.

P. Chow, J. Tu, J. Cioffi, "Performance Evaluation of a Multichannel Transceiver System for ADSL and VHDSL Services," *IEEE Journal on Selected Areas in Comm.*, vol. 8, No. 4, Aug. 1991.

B. Agee, P. Kelly, D. Gerlach, "The backtalk airlink for full exploitation of spectral and spatial diversity in Wireless Communication Systems," *Proc. Fourth Workshop on Smart Antennas in Wireless Mobile Communications*, Jul. 1997.

R. Cheng, S. Verdu, "Gaussian Multiaccess Channels with ISI: Capacity Region and Muluser Water-Filling," *IEEE Transactions on Information Theory*, vol. 39, No. 3, May 1993.

3rd Generation Partnership Project 2, "Physical Layer Standard for cdma2000 Spread Spectrum Systems," Release 0, 3GPP2 C.S0002-0-2, Version 1.13, Apr. 24, 2001.

3rd Generation Partnership Project 2, "Medium Access Control (MAC) Standard for cdma2000 Spread Spectrum Systems," Release 0—Addendum 2, 3GPP2 C.S0003-0-2, Version 1.0, Apr. 24, 2001.

3rd Generation Partnership Project 2, "Signaling Link Access Control (LAC) Standard for cdma2000 Spread Spectrum Systems—Addendum 2," 3GPP2 C.S0004-0-2, Version 1.0, Apr. 24, 2001.

3rd Generation Partnership Project 2, "Upper Layer (Layer 3) Signaling Standard for cdma2000 Spread Spectrum Systems," Release 0 Addendum 2, 3GPP2 C.S0005-0-2, Version 1.0, Apr. 24, 2001.

3rd Generation Partnership Project, Technical Specification Group GERAN, "Digital cellular telecommunications system (Phase 2+); Physical layer on the radio path; General description," Release 4, 3GPP TS 45.001, V4.0.1, Oct. 2000.

3rd Generation Partnership Project, Technical Specification Group GSM/EDGE "Radio Access Network; Digital cellular telecommunications system (Phase 2+); Multiplexing and multiple access on the radio path," Release 4, 3GPP TS 45.002, V4.3.0, Apr. 2001.

3rd Generation Partnership Project, Technical Specification Group GERAN, "Channel coding," Release 4, 3GPP TS 45.003, V4.0.0, Jan. 2001.

3rd Generation Partnership Project, Technical Specification Group GSM/EDGE Radio Access Network, "Digital cellular telecommunications system (Phase 2+); Modulation," Release 4, 3GPP TS 45.004, V4.0.0, Apr. 2001.

3rd Generation Partnership Project, Technical Specification Group GSM/EDGE Radio Access Network, "Digital cellular telecommunications system (Phase 2+); Radio transmission and reception," Release 4, 3GPP TS 45.005, V4.3.0, Apr. 2001.

3rd Generation Partnership Project, Technical Specification Group GSM/EDGE Radio Access Network, "Digital cellular telecommunications system (Phase 2+); Radio subsystem link control," Release 4, 3GPP TS 45.008, V4.3.0, Apr. 2001.

3rd Generation Partnership Project, Technical Specification Group GERAN, "Link Adaptation," Release 4, 3GPP TS 45.009, V4.0.0, Jan. 2001.

3rd Generation Partnership Project, Technical Specification Group GSM/EDGE Radio Access Network, "Digital cellular telecommunications system (Phase 2+); Radio subsystem synchronization," Release 4, 3GPP TS 45.010, V4.0.0, Apr. 2001.

3rd Generation Partnership Project, Technical Specification Group Radio Access Network, "Physical channels and mapping of transport channels onto physical channels (FDD)," Release 199, 3GPP TS 25.211, V3.6.0, Mar. 2001.

3rd Generation Partnership Project, Technical Specification Group Radio Access Network, "Multiplexing and channel coding (FDD)," Release 1999, 3GPP TS 25.212, V3.5.0, Dec. 2000.

3rd Generation Partnership Project, Technical Specification Group Radio Access Network, "Spreading and modulation (FDD)," Release 1999, 3GPP TS 25.213, V3.5.0, Mar. 2001.

3rd Generation Partnership Project, Technical Specification Group Radio Access Network, "Physical layer procedures (FDD)," Release 1999, 3GPP TS 25.214, V3.6.0, Mar. 2001.

3rd Generation Partnership Project, Technical Specification Group Radio Access Network, "Physical channels and mapping of transport channels onto physical channels (TDD)," Release 1999, 3GPP TS 25.221, V3.6.0, Mar. 2001.

3rd Generation Partnership Project, Technical Specification Group Radio Access Network, "Multiplexing and channel coding (TDD)," Release 1999, 3GPP TS 25.222, V3.6.0, Mar. 2001.

3rd Generation Partnership Project, Technical Specification Group Radio Access Network, "Spreading and modulation (TDD)," Release 1999, 3GPP TS 25.223, V3.5.0, Mar. 2001.

3rd Generation Partnership Project, Technical Specification Group Radio Access Network, "Physical Layer Procedures (TDD)," Release 1999, 3GPP TS 25.224, V3.6.0, Mar. 2001.

3rd Generation Partnership Project, Technical Specification Group Radio Access Network, "MAC protocol specification," Release 1999, 3GPP TS 25.321, V3.7.0, Mar. 2001.

3rd Generation Partnership Project, Technical Specification Group Radio Access Network, "RLC protocol specification," Release 1999, 3GPP TS 25.322, V3.6.0, Mar. 2001.

3rd Generation Partnership Project, Technical Specification Group Radio Access Network, "Packet Data Convergence Protocol (PDCP) Specification," Release 1999, 3GPP TS 25.323, V3.4.0, Mar. 2001.

3rd Generation Partnership Project, Technical Specification Group Radio Access Network, RRC Protocol Specification, Release 1999, 3GPP TS 25.331, V3.6.0, Mar. 2001.

Chunchang et al, "On the Performance of Eigen Based Beamforming in LTE-Advanced," Sep. 2009, Personal, Indoor and Mobile Radio Communications (PIMRC), 2009 IEEE 20$^{th}$ International Symposium on.

Farrokh Rashid-Farrokhi, "Transmit Beamforming and Power Control for Cellular Wireless Systems," IEEE Journal on Selected Areas in Communications, vol. 16, No. 8, Oct. 1998.

J. H. Chang et al., "Joint Transmitter and Receiver Beamforming for Maximum Capacity in Spatial Division Multiaccess," Proc. 35$^{th}$ Annual Allerton Conf. on Communication, Control and Computing in Spatial Division Multiaccess, 1997.

Notice of Allowance in U.S. Appl. No. 11/880,825 dated Apr. 3, 2012.

Notice of Allowance in U.S. Appl. No. 13/022,615 mailed Apr. 16, 2012.

Notice of Allowance in U.S. Appl. No. 13/022,619 mailed Apr. 27, 2012.

Office Action from U.S. Appl. No. 13/022,615 which was mailed on Nov. 21, 2011.

Office Action from U.S. Appl. No. 13/022,619 which was mailed on Dec. 23, 2011.

Office Action from U.S. Appl. No. 13/022,623 which was mailed on Oct. 6, 2011.

Office Action Summary in U.S. Appl. No. 13/010,629 dated Aug. 14, 2012.

* cited by examiner

APPARATUS FOR GENERATING AT LEAST ONE SIGNAL BASED ON AT LEAST ONE ASPECT OF AT LEAST TWO RECEIVED SIGNALS

CROSS-REFERENCE TO RELATED APPLICATIONS

The present application is a continuation of and claims priority to U.S. patent application Ser. No. 11/880,825, filed Jul. 23, 2007, which is a continuation in part of and claims priority to patent application Ser. No. 09/878,789, filed on Jun. 10, 2001, issued as U.S. Pat. No. 7,248,841 on Jul. 24, 2007, which are incorporated herein by reference in their entirety for all purposes.

FIELD OF THE INVENTION

The present invention relates to multiple-input devices, and more particularly to multiple-input devices capable of being utilized in point-to-multipoint and mesh networks.

BACKGROUND

The field of wireless communication networks has challenged implementers with continuously discovered synergies, both positive and negative. The sea of signaling has long grown from scattered and isolated sparks of Morse code to the modern-day roar of intermingling transmissions. The simplicity of the directional link (Point to Point) was replaced by the broadcast (Point to Multipoint) and is being replaced by the mesh (Multipoint to Multipoint) and even the relaying, multi-hop, interactive mesh; also, the continuous-transmission format is being replaced by short and varying packets. The complexities of variations in real world conditions—constantly changing topography, overlapping wave signals, and unpredictable and intermittent faults or blockages—all challenge the existing methods and systems. Further description of some of these problems can be found in the parent application's text and will not be repeated here. This invention is concerned with the problems described below.

PROBLEMS FORMING THE OPPORTUNITY FOR THE INVENTION

The primary problem solved through the invention is communication of short, intermittent packets, in particular Voice over IP (VoIP) communication signals, over communication networks subject to significant time-and-frequency co-incident ("co-channel") interference from other network users and external emissions. A secondary problem solved through the invention is efficient physical routing of packets over multiple network nodes, e.g., using multihop relay techniques, in order to improve rate, robustness (immunity to interference and information warfare measures), reliability, and availability of communications between Source and Destination nodes in the network. A tertiary problem solved through the invention is means for rapid configuration and scalability of transceiver capabilities in highly dynamic environments where the density and severity of interferers, numbers and capabilities/requirements of communication nodes, and nature of channel propagation may change rapidly and dynamically between communication opportunities and/or over the course of a single communication opportunity.

ADVANTAGES OF THE INVENTION

The invention provides the following capabilities and advantages:

Common, scalable transceiver blocks that can be implemented at individual nodes in the communication network (allowing phased addition of hardware and software without immediately rendering obsolete the previous infrastructure).

Integration into a signal's waveform structure ("overhead structure") of overhead bits associated with point-to-point links in the network, e.g., Transmit and Receive Node Addresses (TNA's and RNA's), and then use of the resulting unified waveform structure both to securely identify nodes attempting to communicate with a receiver, and to develop linear combiner weights that can extract those signals from co-channel interference incident on that receiver (including interference from other nodes attempting to communicate with that receiver). This approach thereby eliminates bits needed for transmission of TNA and RNA in headers attached to data packets transmitted over each link in the network, as well as overhead needed for transmission of pilot tones/sequences, training signals, preambles/midambles, Unique Words, etc., typically used to train receivers in the network; thus reducing the transmission overhead and improving information-transmission efficiency.

Ability to further exploit overhead structure to increase transmit power and data rate, or to allow same-rate communication at reduced power to nodes in the network, thereby regaining link capacity lost by that overhead structure, with the most capacity regained at low receive signal-to-interference-and-noise-ratio (SINR).

Optional integration of overhead bits associated with multipoint routes in the network, e.g., Source and Destination Node Addresses (SNA's and DNA's) into the waveform structure used for adaptation of the communication transceivers ("overhead structure"), further reducing bits needed for transmission of SNA and DNA in headers attached to data packets transmitted in multihop networks, and allowing the use of macrodiverse relay networks in which data is coherently transmitted over multiple geographically separated nodes in a network.

Rapid (single packet) node detection/discovery and join/leave algorithms, allowing individual transceivers to enter or exit the network quickly to exchange traffic, update security codes, etc., and to allow rapid and/or ad hoc configuration of the network as users encounter dynamic changes in multipath, fading, or interference.

Information assurance (IA) measures, e.g., antijamming and antispoofing capability, at the node and network level, including spreading means that defeat denial-of-service measures in which the frequencies and/or time periods containing synchronization and training bits are selectively jammed by an adversary.

Adaptive power management and cyclic feature reduction at node, link, and network levels, in order to minimize transmitted power and/or detectable features of emitters in the network.

Extreme low complexity (<200 kcps DSP software operations, <30 Mcps ASIC or FPGA coreware operations) for communications commensurate with VoIP communication, allowing maintenance of a collaborative networking information commensurate with pedestrian networking applications.

Collaborative communication applications that can be additionally handled by these transceivers include the following:

Distributed Kalman state circulation to enable wide-baseline network geolocation algorithms.

Internode channel measurement and range/timing/carrier offset estimation algorithms used to enable wide-baseline network geolocation algorithms.

Collaborative interference avoidance methods during transmission and reception operations, e.g., allowing wide-area communications in presence of jammers in military communication systems, or incumbent broadcast emitters in commercial communication systems (e.g., 802.22).

Collaborative communication over long-range to out-of-theatre nodes, e.g., reachback nodes in military communication networks, or LEO/MEO/GEO satellites in commercial satellite communication networks.

BRIEF DESCRIPTION OF THE DRAWINGS

The invention is depicted in the Figures below.

OBJECTS

Figure 1:
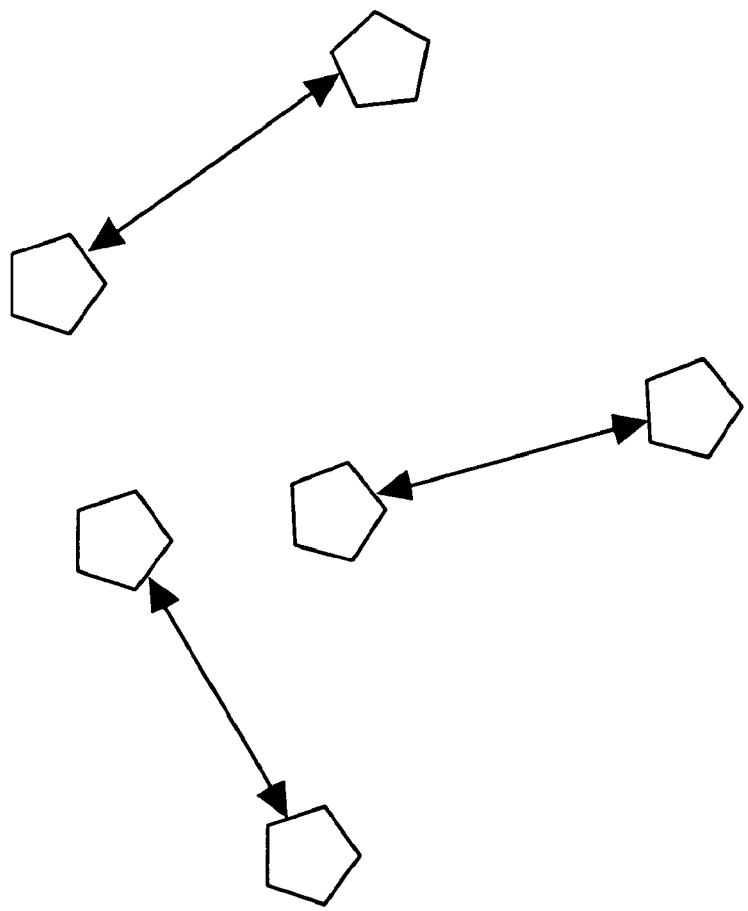
FIG. 1 illustrates a Point-To-Point or PTP network; each pentagon indicates a node, or transmission and reception (a.k.a. transceiver) station, and each arrow indicates a link along which communication flows between nodes.
Figure 2:
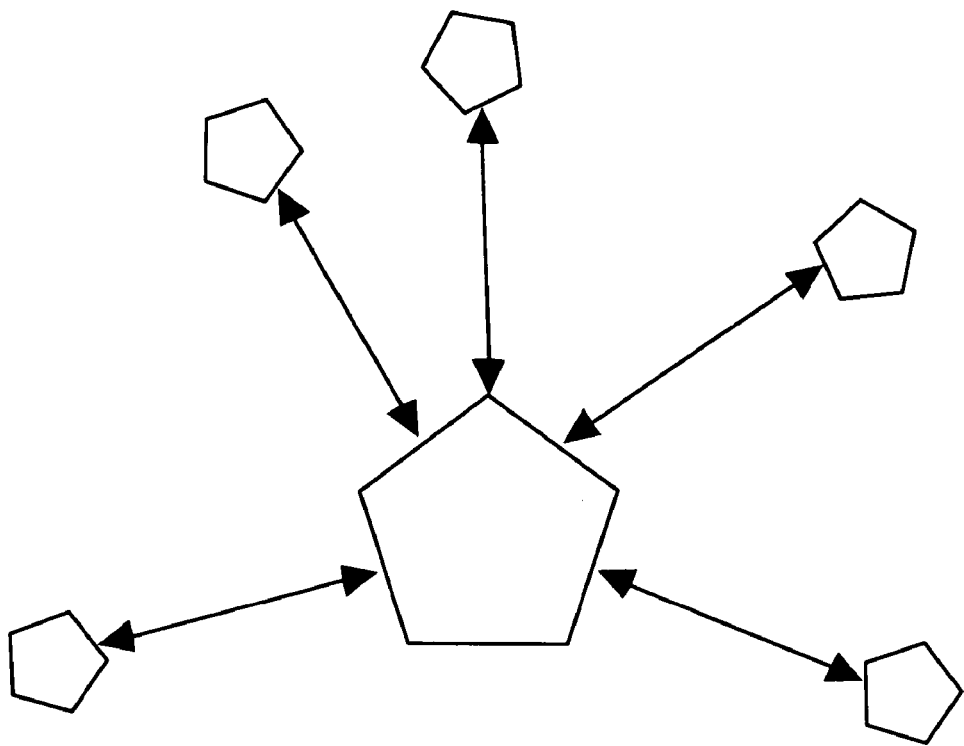
FIG. 2 illustrates a Point-To-Multipoint network. The large pentagon indicates a Base Station (BS) capable of communicating with many individual Subscriber Units (SU), indicated by the small pentagons.
Figure 3A:
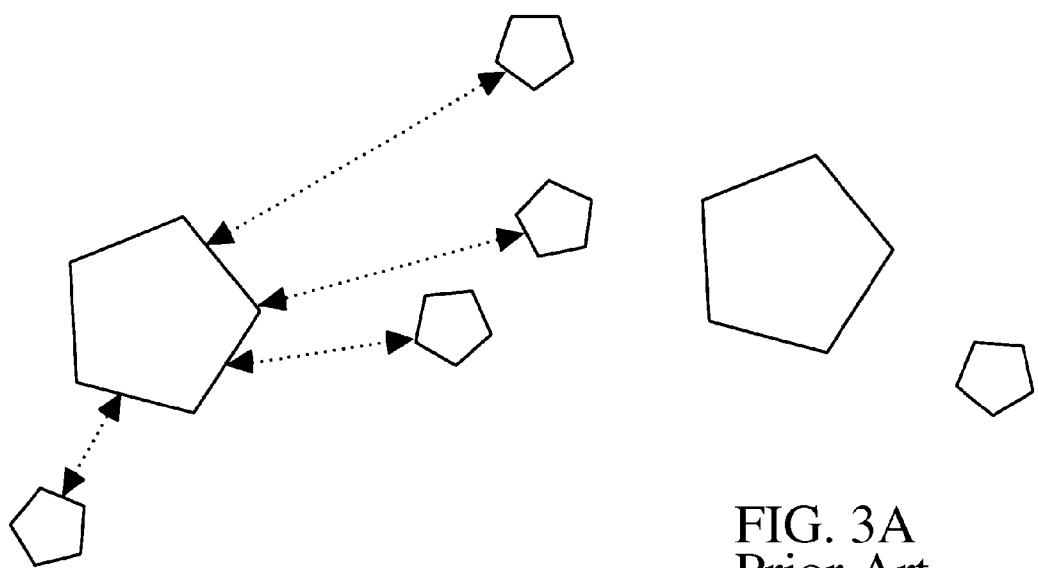
FIG. 3 illustrates a more complex PMP network with multiple BS and SU nodes, and multiple links. The solid lines indicate one diversity channel and the dotted lines a second diversity channel.
Figure 3B:
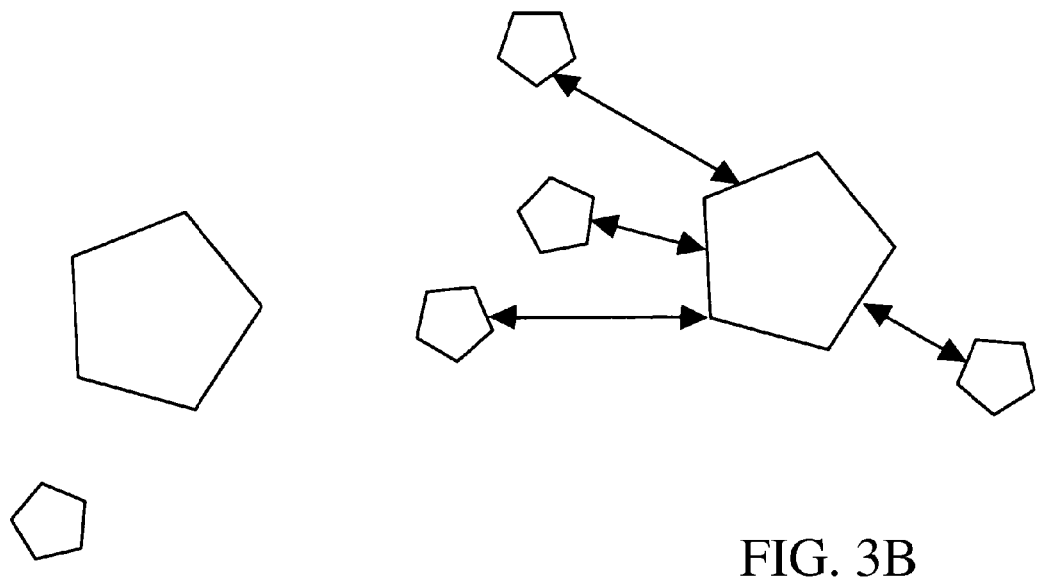

Resolving many of the prior art's weaknesses by enabling true, opportunistic, MIMO networks is one of the principle objects of the invention. Creating a truly adaptive, flexible, multi-protocol wireless electromagnetic communications network is a second of the principle objects of the invention. A third is to simultaneously resolve the interplay between transmission power and network capacity by considering and using the interplay between one local node's transmissions as a signal and other nodes' reception of the same as either a signal (if the receiving node is an intended target) or as environmental noise (if the receiving node is an unintended target).

A secondary objective under this third objective is to provide methods which improve signal quality received by a targeted recipient node while simultaneously reducing interference energy received by other untargeted recipient nodes, so as to enable improved capacity amongst existing nodes, adding more nodes, increasing coverage area, and improving communications quality, or any sub-combination thereof.

Another secondary objective under this third objective is to provide an adaptive method which accounts for multipath interaction amongst the nodes and network, and minimizes unwanted effects while maximizing potential useful effects thereof.

Another secondary object under this is to provide improved load balancing amongst nodes and communication paths or links within the network with a minimum of overall control.

Another secondary object under this is to enable improved access to new nodes to the network.

Another secondary object under this is to enable multiple, competing, yet cooperating sub-networks that are mutually and automatically adaptive and responsive.

A second of the principal objects of the invention is to simultaneously resolve the interplay between local optimization, which demands detailed consideration of the immediate environmental details that affect each link between that node and others over which communications are flowing, and global optimization, which demands a minimum of control information be exchanged across the network and amongst the nodes in lieu of otherwise usable signal capacity.

A secondary object under this is to use the reception of signal information from other nodes, both those targeting the recipient and those not targeting the recipient, to enhance both reception and transmission quality to and from the receiving node while minimizing the explicit and separate feedback signals that must be exchanged amongst the nodes and network.

Another secondary object under this is to provide methods for optimization that can use or be independent of antenna array geometry, array calibration, or explicit feedback control signals from other nodes, whether the same are continuous, regular, or reactive to environmental changes affecting the link between the receiving node and the other nodes.

A third of the principal objects of the invention is to maximize the communications capacity and minimize the power usage both locally and globally across the network for any given set of hardware, software, and protocols.

A secondary object under this is to provide higher content throughput in underloaded networks, thereby providing faster perceived access or usage.

A secondary object under this is to provide higher reliability for any given hardware and software implementation.

A fourth of the principal objects of the invention is to provide a method for network optimization that can be extended to mixed networks, whether such mixing is amongst wireless and fixed links, or amongst electromagnetic spectra, or amongst types of nodes (BSs, dumb terminals, single- or limited-purpose appliances, or human-interactive input/output), and across both access schema and communications protocols with a minimum of particularization.

A fifth of the principal objects of the invention is to provide relatively simple and powerful methods for approximation which enable improvement that rapidly converges to the best solution for any optimization.

A secondary object under this is to provide a computationally efficient mechanization for cross-correlation operations that takes maximal advantage of multiport signals on particular single channels.

A sixth of the principle objects of the invention is to maximize the use of local information and minimize the use of global information that is required for approximation and approach to the best solution for any optimization.

SUMMARY OF THE INVENTION

The multiple-input, multiple-output (MIMO) network approach summarized here can incorporate as lesser, special cases, point-to-point links, point-to-multipoint networks, and disjoint (e.g., cellular) point-to-point links and point-to-multipoint networks. It can also be applied to spatial, temporal, or frequency-based access schemes (SDMA, TDMA, FDMA) employing combinations of spectral, temporal, spatial or polarization diversity, and to fixed, mixed, and mobile communications, as its focus is on the network in context rather than on the signal differentiation methodology, access determinations, or basing structure. One key to this approach is employment of spatially (or more generally diversity) adaptive transmit and receive processing to substantively reduce interference in general multipoint links, thereby optimizing capacity and/or other measures of network quality in multiply connected networks. A second key to this approach is the minimization of secondary consequences of signaling, and a second is using internalized feedback, so that the signaling process itself conveys information crucial to the optimization. Rapid, dynamic, adaptation reactive to the changing environment and communications within and surrounding each node and the entire network is used to promote both local and global efficiency. Unlike Varanesi, the feedback is neither limited to BSs only, nor effectively independent of the continual, real-world, signal and network environmental adaptation.

Figure 13A:
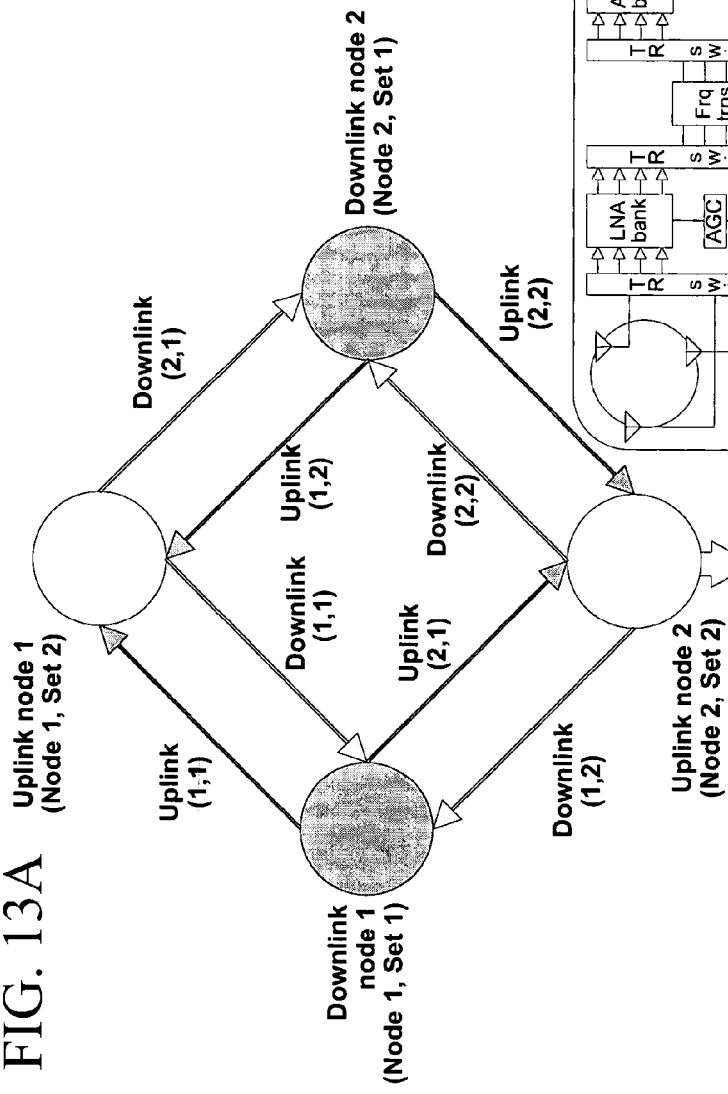
FIG. 13A illustrates a network of MIMO-capable nodes, that is, nodes with multiple antennae, multitone transceivers with DSP capability FIG. 13B, wherein the network has two subsets with preferentially reciprocal uplinks and downlinks and diversity channel capacity between the subsets.
Figure 13B:
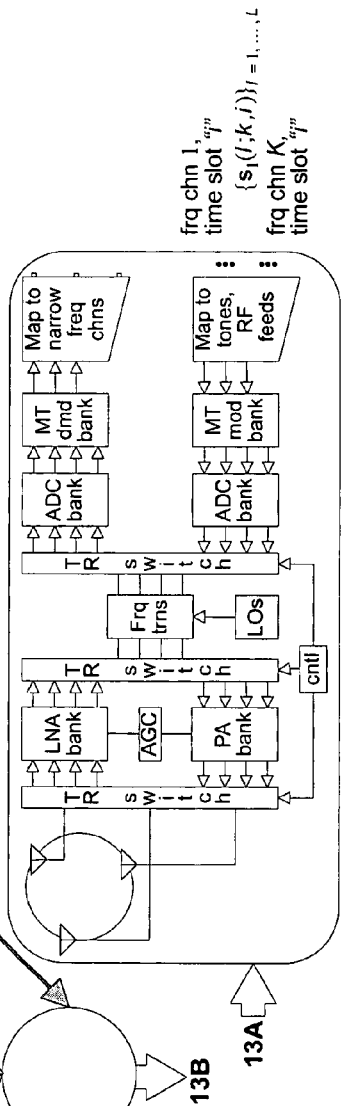
Figure 14:
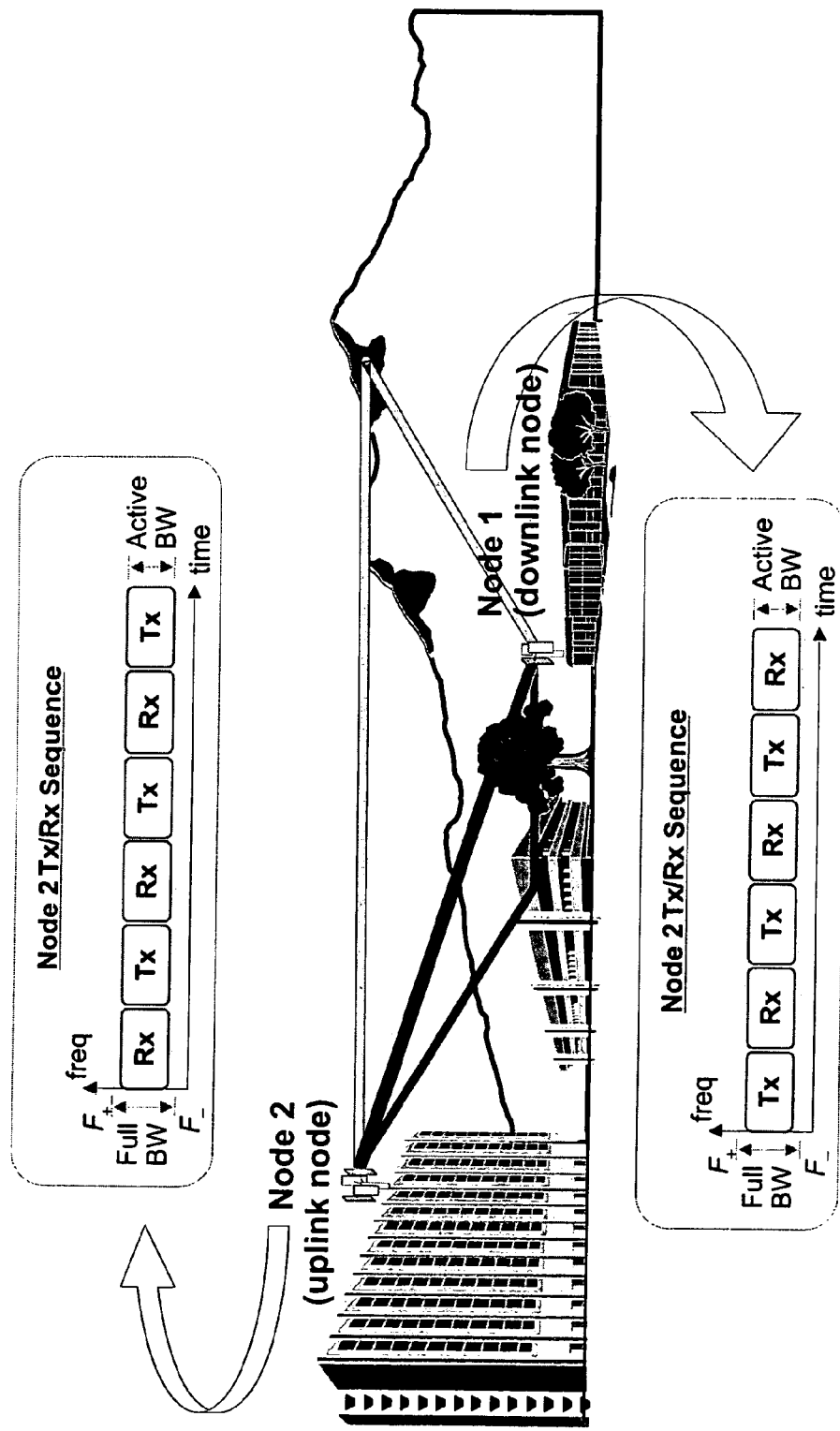
FIG. 14 illustrates MIMO-capable nodes wherein each node transmits and receives signal energy during alternating time slots (or sequences of time slots in TDD-TDMA systems).
Figure 15:
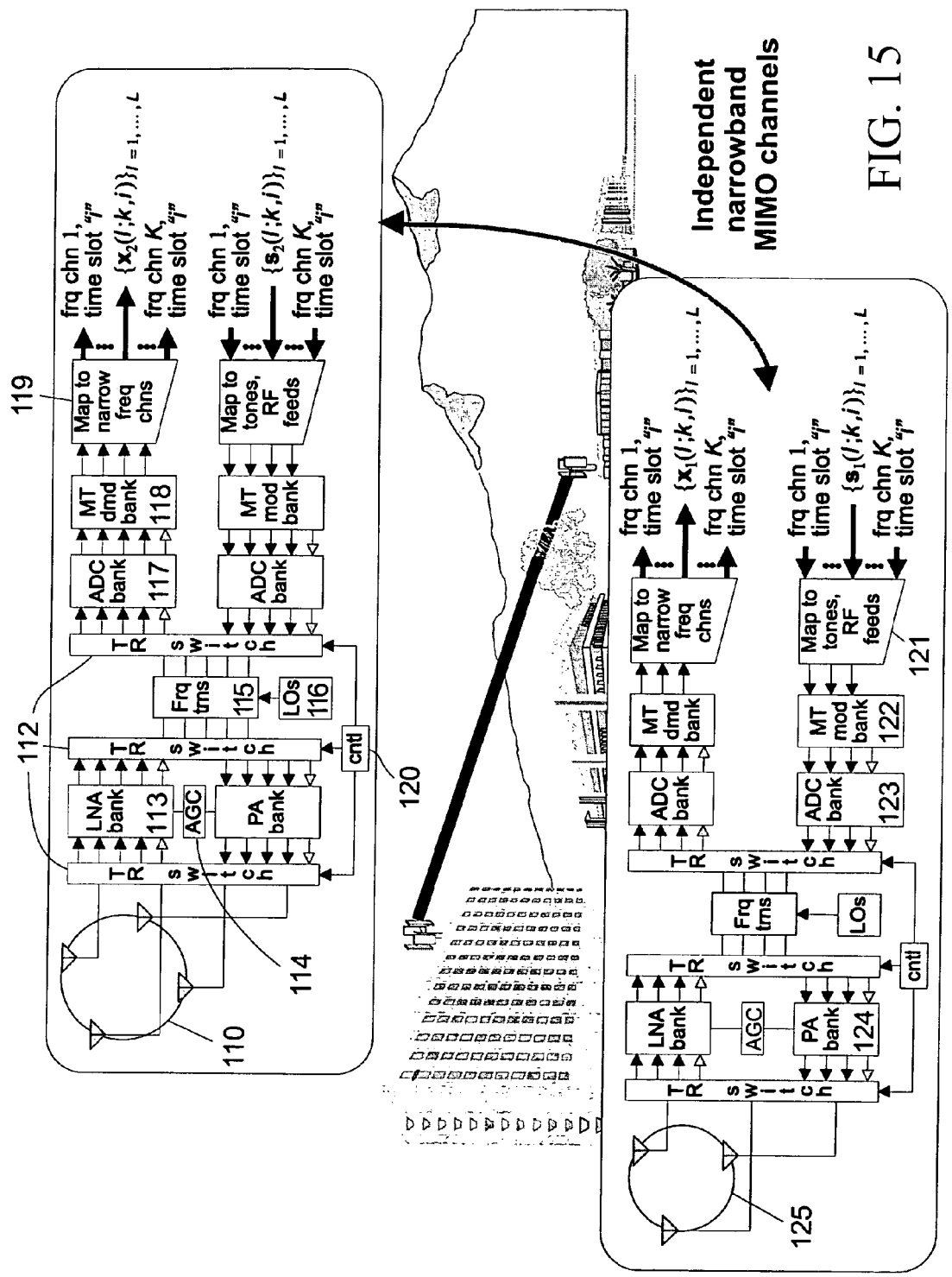
FIG. 15 illustrates more details of the MIMO-capable node, including on the receiving side: receiving spatially and/or polarization diverse antennae in a multiple antennae array (Item 110), a vector OFDM transceiver switch (Item 112), a LNA bank (Item 113), an AGC (Item 114), a Frequency translator (Item 115), a LOs ((Item 116), an ADC bank (Item 117), a MultiTone Demodulator Bank (Item 118), means for mapping received data over each diversity channel, on each frequency channel and receive time slot (Item 119), and a transceiver controller (Item 120); and including on the transmitting side means for mapping transmitted data for each frequency channel and transmit time slot (Item 121), a MultiTone Modulator bank (Item 122), a DAC bank (Item 123), the transceiver switch, a PA bank (Item 124), and transmitting spatially and/or polarization diverse antennae in a multiple antennae array (Item 125) which may be distinct from those used in receiving (Item 110).

Instead of avoiding diversity, or fighting diversity, the present embodiment of the invention exploits and makes use of spectral, temporal, polarization, and spatial diversity available at each node, as well as and route (location based) diversity provided over the network of nodes. The network of nodes uses MIMO-capable nodes, that is, nodes with multiple antennae, multitone transceivers and preferentially reciprocal uplinks and downlinks (FIG. 13A and FIG. 13B). In the preferred embodiment each node transmits and receives signal energy during alternating time slots (or sequences of time slots in TDD-TDMA systems) (FIG. 14); has a spatially and/or polarization diverse multiple-antenna array, a vector OFDM transceiver that downconverts, A/D converts, and frequency channelizes data induced on each antenna (or other diversity channel) during receive time slots, and inverse channelizes, D/A converts, and upconverts data intended for each antenna (or diversity channel) during transmit time slots; linearly combines data received over each diversity channel, on each frequency channel and receive time slot; redundantly distributes data intended for each diversity channel, on each frequency channel and transmit time slots; and computes combiner and distributer weights that exploit the, narrowband, MIMO channels response on each frequency channel and time slot (FIG. 15).

The concept of a 'diversity channel' is introduced to permit a distinction to be made between "channels" that data is redundantly distributed across during receive (or transmit) operations, from "channels" that data is transported over (e.g., frequency channels or time slots). Data is redundantly transported over diversity channels, i.e., the same data is transported on each diversity channel with weighting determined by the methods described in detail below, while independent data is generally transported over the second flavor of channel. Effectively exploiting available diversity dimensions, the present embodiment of the invention can maximize its ability to attain Rank 2 capacities, since multiple redundant transmissions can be made over the plurality resources, whether that plurality comes from different frequencies, multipaths, time slots, spatially separable antennae, or polarizing antennae. This is distinct from prior art approaches which required multiple redundant transmissions over a plurality of frequencies to attain Rank 2 capacities. Because the signal flow between nodes is not limited to a particular dimension of substantive differentiation the preferred embodiment of the network can at every point in time, and for every node in the network, exploit any and all diversity opportunities practicable and attainable for the network's communication channels.

Figure 16:
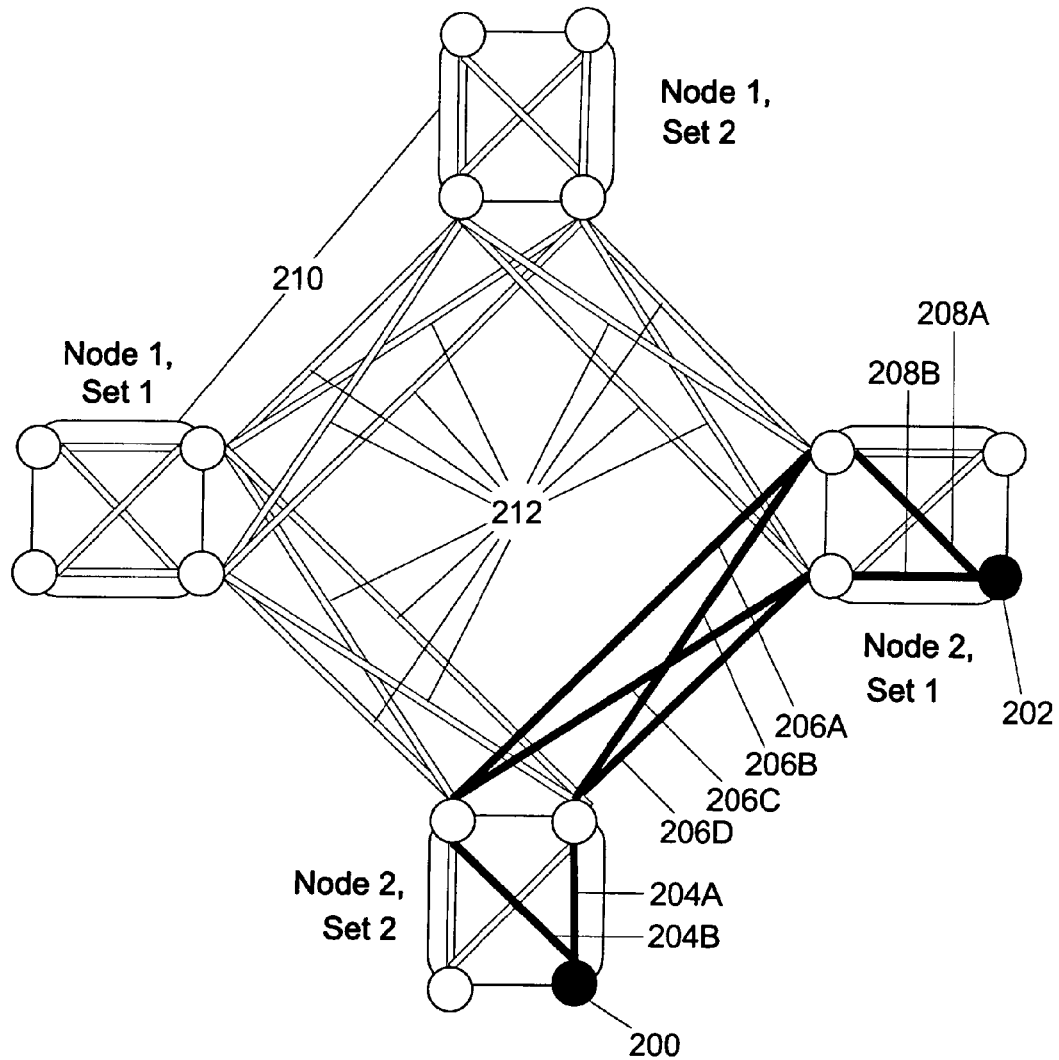
FIG. 16 illustrates a MIMO-capable network of the preferred embodiment, wherein an originating transceiver Node 2 in an uplink transmit set (Item 200) distributes a signal through multiple antennae (Items 204A and 204B), which goes over the channel matrix of diversity channels available (Items 206A,B,C, and D) to a uplink receive set node, which receives the signals over its multiple antennae and combines them (Items 208A and B) to the desired recipient (Item 202); leaving all other transmissions and channel diversity available (Item 212) for other network communications.

The signal flow between the multiplicity of nodes in the network comprises a multiplicity of information channels, emanating from and being received by a set of antennae at each node (FIG. 16). The physical channel flow in a network with M(n) diversity channels (e.g., M(n) antennae per node, at each node n in the network) means that for each transmitting node's pair of antennae, as many as M distinguishable receptions are feasible at each receiving node it can communicate with (FIG. 15, M=4, for a PTP link example).

Figure 17:
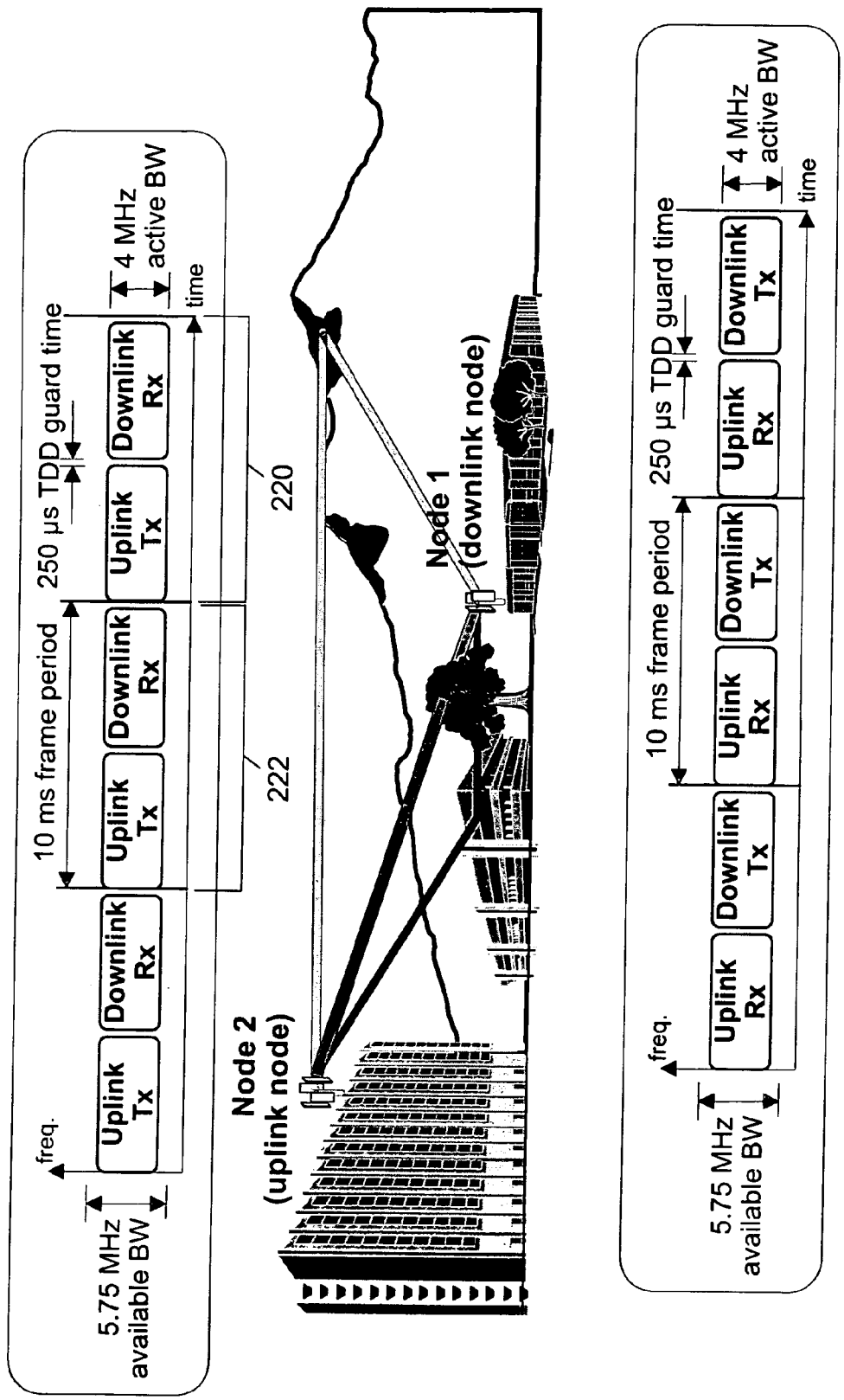
FIG. 17 illustrates a PTP MIMO node layout employing TDD, but one using a guard-time prefix (Item 220) and a 10 ms content frame period (Item 222), where the uplink Tx for Node 2 is at the time for the Uplink Rx for Node 1.

The preferred embodiment performs complex digital signal manipulation that includes a linear combining and linear distribution of the transmit and receive weights, the generation of piloting signals containing origination and destination node information, as well as interference-avoiding pseudorandom delay timing (FIG. 17), and both symbol and multitone encoding, to gain the benefit of substantive orthogonality at the physical level without requiring actual substantive orthogonality at the physical level.

Figure 18:
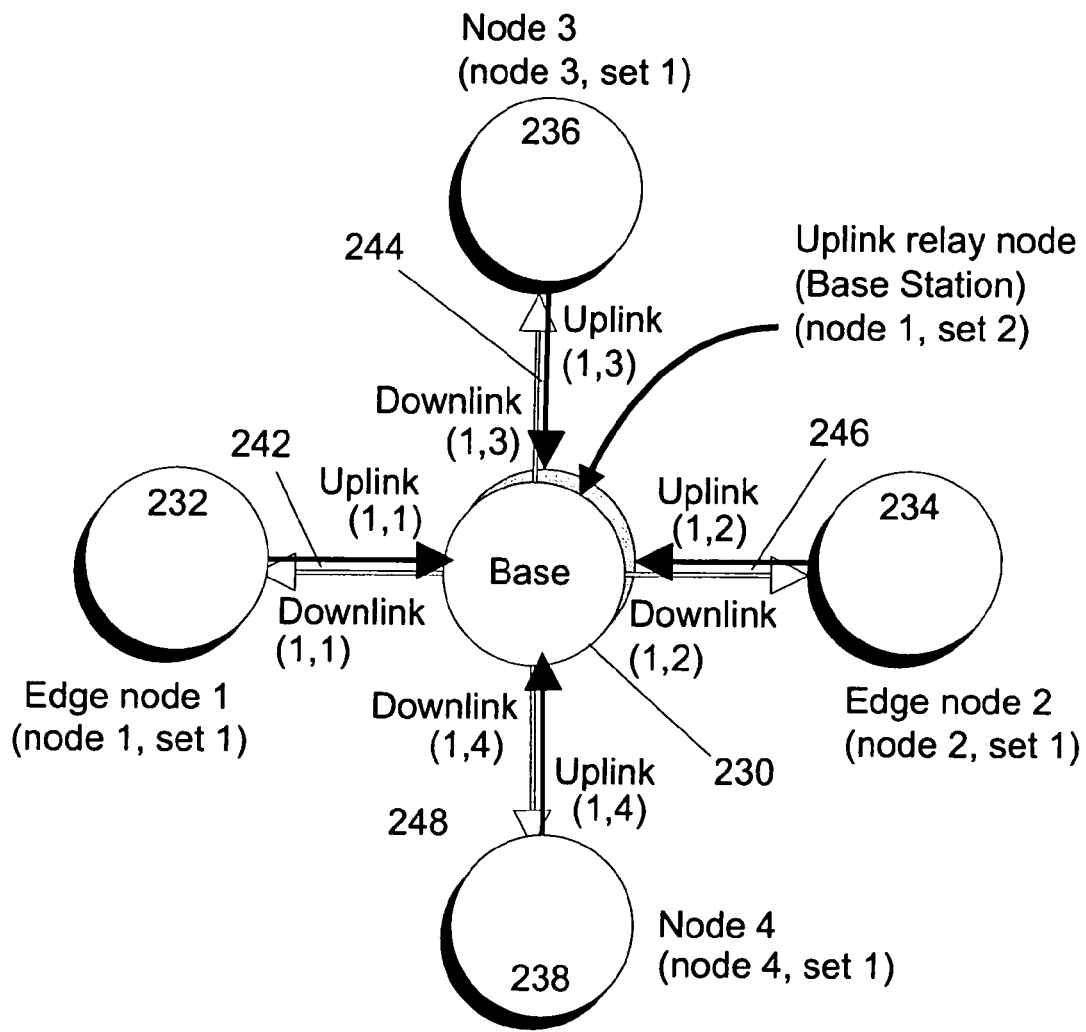
FIG. 18 illustrates a MIMO network in a star topology, where the uplink relay node (Node 1, Set 2) talks to 4 edge nodes (Nodes 1-4, set 1) with distinct channels for uplinks and downlinks.

The network is designed such that a subset of its nodes are MIMO-capable nodes, and that each such node can simultaneously communicate with up to as many nodes in its field of view as it has antennae. The network is further designed such that it comprises two or more proper subsets, each proper subset containing members who cannot communicate directly with other members of the same proper subset. So if the network contained only two proper subsets, First and Second, the members of First could transmit only to, and receive only from, the members of Second, and the members of Second could transmit only to, and receive only from, the members of First. Independent information is then transmitted from every member of First and is independently processed by each member of Second. (See FIG. 18, exemplifying one such topology, a 'Star' topology; and FIG. 19, exemplifying another such topology.)

A non-MIMO-capable node may belong to any subset containing at least one MIMO-capable node that has at least one antenna available to that non-MIMO-capable node that has the non-MIMO-capable node in its field of view.

Diversity channels, rather than antennae, limits the number of non-set members a MIMO-capable node may communicate with simultaneously, that is, the number with which it may hold time/frequency coincident communications. Also, this limiting number is a function of number of users attempting to communicate over the same diversity channels—users on different time-frequency channels do not affect this limit. Thus a node with 128 time frequency channels (8 TDMA time slots×16 FDMA frequency channels) and a 4 antennas (4 diversity channels per time-frequency channel) can support up to 4×128=512 links, to as many users. If the internode channel response to a given user has rank 1 (e.g., if antennas are on same polarization and multipath is absent), then only a single link can be established to that user on each time-frequency channel, e.g., 128 separate links (one on each time-frequency channel) in the example given above. Higher internode channel rank allows more channels to be established; for example if nodes are polarization diverse, then the internode channel response has rank 2 and 256 channels (2 per time-frequency channel) can be established. The MIMO channel response equation determines power on each channel—depending on needs of network and pathloss to user, some or most of channels nominally available may be turned off to optimize the overall network capacity.

A significant element is that the diversity channel distribution need not be equal; one recipient node may have half the channels, if the traffic density requires it, while the transmitting node may divide its remaining channels evenly amongst the remaining nodes. Therefore the more users that have rank 2 or better capacity, the greater the available channels for those who have only capacity 1. This supports incremental optimization as improvement for the network is not dependent upon global replacement of every lesser-capacity node, but results from any local replacement.

The preferred embodiment details the means for handling the two alternative cases where the interference is, or is not, spatially white in both link directions, the means for handling interference that is temporally white over the signal passband. Preferentially, each link in the network possesses reciprocal symmetry, such that:

$$H_{12}(k;n_1,n_2) = H^T_{21}(k;n_2,n_1) \qquad \text{EQ. 1}$$

Where $H_{12}(k;n_1,n_2)$ is the $M_1(n_2) \times M_2(n_1)$ MIMO transfer function for the data downlinked from node 1 to node 2 over channel k, less possible observed timing and carrier offset between uplink and downlink paths, and, $H_{21}(k;n_2,n_1)$ is the $M_2(n_2) \times M_1(n_1)$ MIMO transfer function for the data uplink from node 2 to node 1 over channel k, and where $(\ )^T$ denotes the matrix transpose operation.

In the preferred embodiment, this is effected by using the TDD protocol, and by sharing antennas during transmit and receive operations and performing appropriate transceiver calibration and compensation to remove substantive differences between transmit and receive system responses (this can include path gain-and-phase differences after the transmit/receive switch, but does not in general require compensation of [small] unequal observed timing and carrier offset between uplink and downlink paths). However, simplex, random-access packet, and other alternative methods are also disclosed and incorporated herein.

The network is further designed such that at each MIMO-capable node n with M(n) antennae, no more than M(n) other actively transmitting nodes are in node n's field of view, enabling node n to effect a substantively null-steering solution as part of its transmissions, such that each node belonging to a downlink receive set can steer independent nulls to every uplink receive node in its field of view during transmit and receive operations, and such that each node belonging to an uplink receive set can steer independent nulls to every downlink receive node in its field of view during transmit and receive operations.

The preferred embodiment also has means for incorporation of pilot data during transmission operations, and means for computationally efficient exploitation of that pilot data during subsequent reception operations. This is to enable transmitting nodes to unambiguously direct information to intended recipient nodes in the network; to enable receiving nodes to unambiguously identify information intended for them to receive; to enable nodes to rapidly develop substantively null-steering receive weights that maximize the signal-to-interference-and-noise ratio (SINR) attainable by the link, to enable nodes to reject interference intended for other nodes in the network, to enable nodes to remove effects of observed timing offset in the link, and to enable the nodes and network to develop quality statistics for use in subsequent decoding, error detection, and transmit power management operations.

Figure 19:
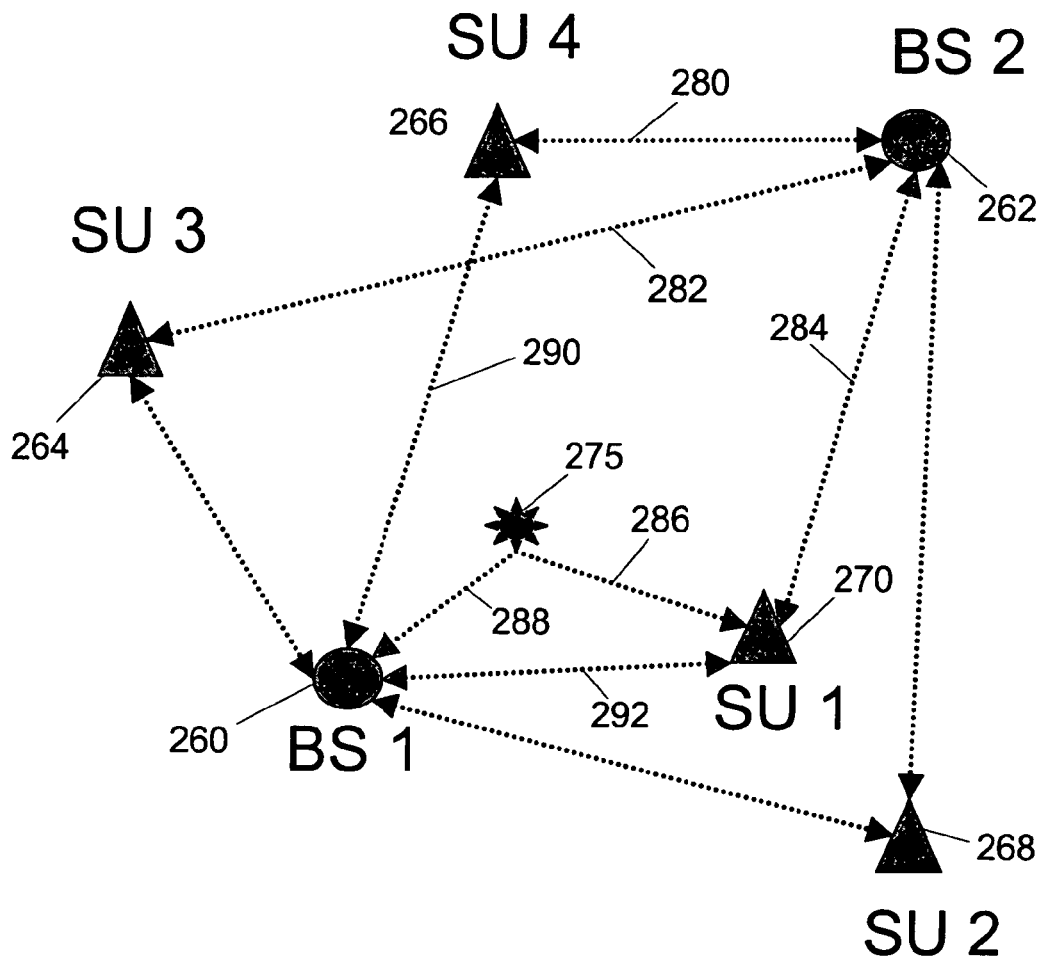
FIG. 19 illustrates a complex network topology with multiple BSs (Items 260, 262), SUs (Items 264, 266, 268, and 270), and a potentially interfering non-network node (Item 275), with transmissions amongst the network (280, 282, 284, 290, 292) competing with transmissions from outside the network which are perceived as interference at BS1 (Item 260) and SU1 (Item 270).
Figure 20:
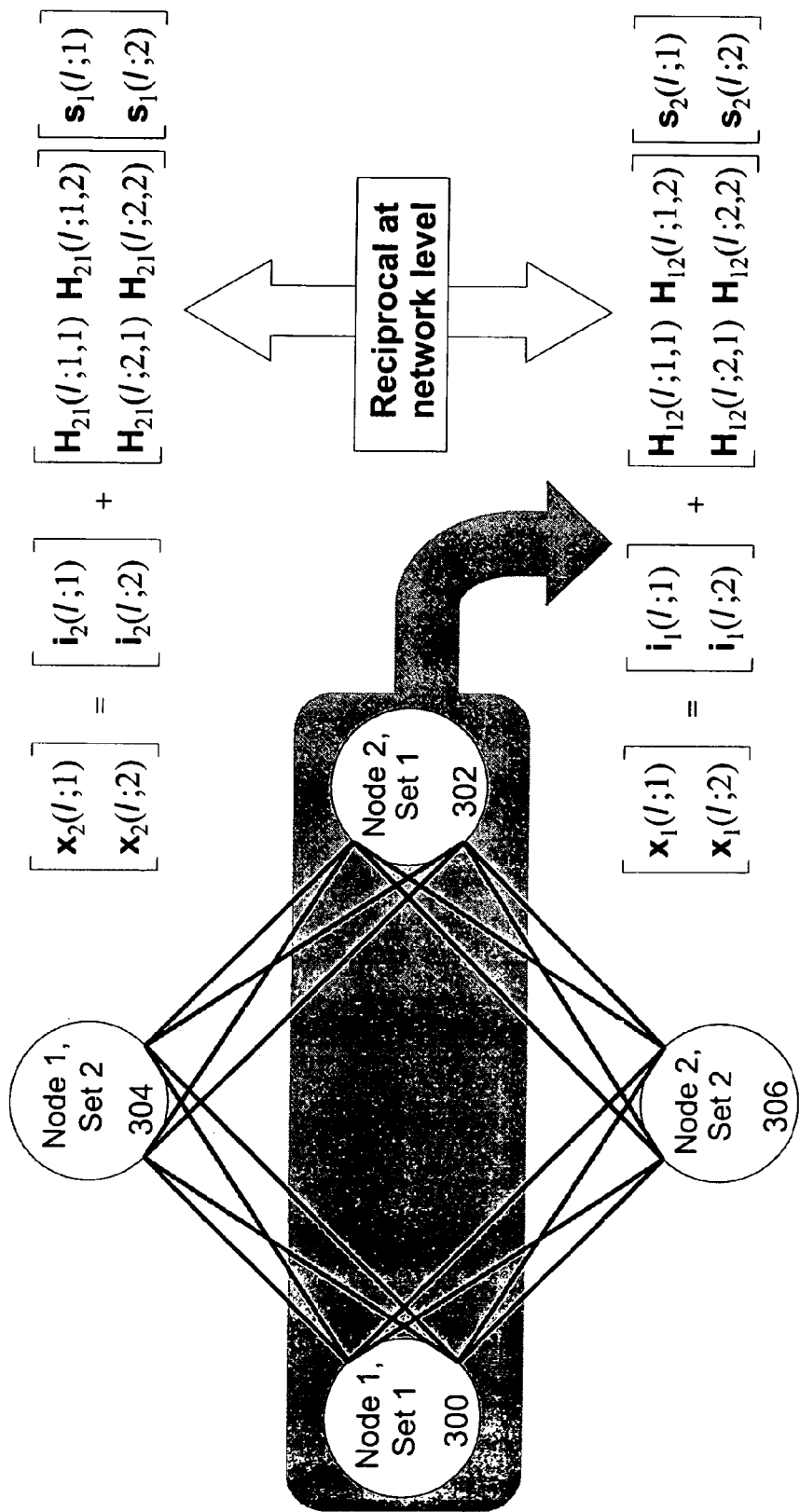
FIG. 20 illustrates a MIMO network in a ring configuration with reciprocity at the network level.

The preferred embodiment prefers a network designed to create and support a condition of network reciprocity, where the uplink and downlink criteria are reciprocal at the network level. (FIG. 19). The present form of the invention further exploits the reciprocity to attain both local and global optimization, of both capacity and power, through locally enabled global optimization of the network (LEGO).

LEGO is enabled by exploiting substantive reciprocity of the internode channel responses, together with appropriate normalization of transmit power measures, to design uplink and downlink network quality metrics $D_{21}(W_2,G_1)$ and $D_{12}(W_1,G_2)$ that satisfy network reciprocity property:

$$D_{12}(W,G)=D_{21}(G^*,W^*) \qquad \text{EQ. 2}$$

where $(W_2,G_1)$ and $(W_1,G_2)$ represent the receive and transmit weights employed by all nodes in the network during uplink and downlink operations, respectively. If equation 1 holds, then equal network quality can be achieved in each link direction by setting $G_1=W_1^*$ and $G_2=W_2^*$, such that each node use the receive combiner weights as transmit distribution weights during subsequent transmission operations, i.e., the network is preferentially designed and constrained such that each link is substantially reciprocal, such that the ad hoc network capacity measure can be made equal in both link directions by setting at both ends of the link:

$$g_2(k,q) \propto w_2^*(k,q) \text{ and } g_1(k,q) \propto w_1^*(k,q)$$

where $\{g_2(k,q), w_1(k,q)\}$ are the linear transmit and receive weights to transmit data $d_2(k,q)$ from node $n_2(q)$ to node $n_1(q)$ over channel k in the downlink, and where $\{g_1(k,q),w_2(k,q)\}$ are the linear transmit and receive weights used to transmit data $d_1(k,q)$ from node $n_1(q)$ back to node $n_2(q)$ over equivalent channel k in the uplink; thereby allowing Eq. 1 to be satisfied for such links.

The invention further iteratively optimizes network quality (as defined by $D_{12}$ and $D_{21}$) over multiple frames, by first adapting combiner weights to locally optimize link (and therefore network) performance during receive operations, and then using Eq. 1A and the reciprocity property (Eq. 1) to further optimize network quality in the reverse direction over subsequent transmit operations.

The invention further improves on this approach by using Eq. 1 to scale each transmit vector, based on a partial linearization of the network quality metrics, to either minimize the total transmit power in the entire network subject to a network quality constraint, preferentially capacity, or maximize network quality, preferentially capacity, subject to a total transmit power constraint. This constraint is defined and managed as a control parameter that is updated by the network. The total transmit power at a given node is then reported as an output to the network.

By using target criteria such as (1) for a cellular network, a max-min capacity criterion subject to a power constraint, or (2) for a wireless LAN, a max-sum capacity that is subject to a power constraint, and using simple comparative operations in feedback for the network to optimize towards those criteria, this invention enables flexibility and stability for any given hardware and software combination that underlies a wireless electromagnetic communications network and improves, for the entire network and at each particular node thereof, the communication capacity and power requirements. Furthermore, the present form of the invention does not ignore but rather directly addresses and resolves both the overhead vs. content and the power vs. capacity conundrums which otherwise limit present-day state of the art approaches to optimization. It does this using the experienced environment as part of the direct feedback, rather than requiring additional control information or signaling that reduces content capacity.

Figure 7A:
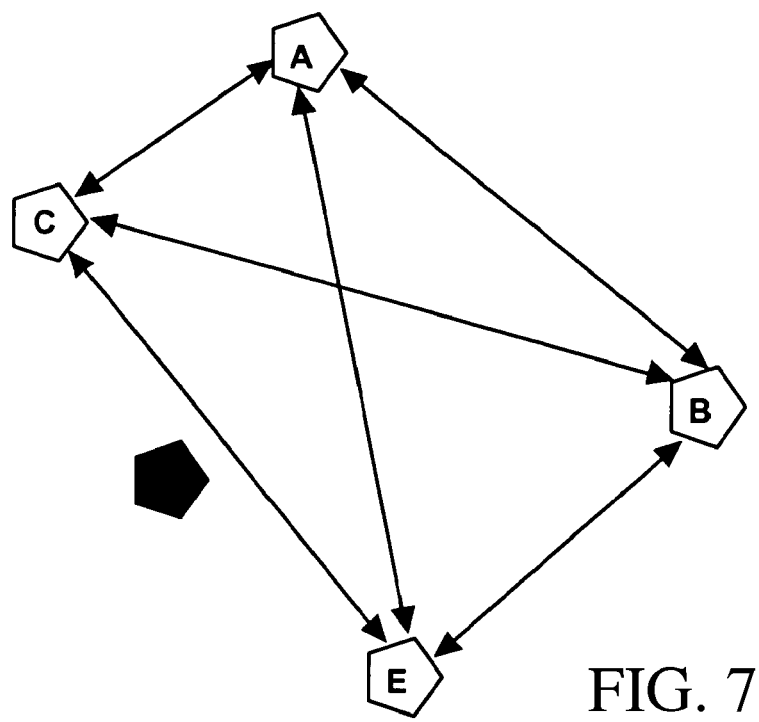
FIGS. 7A and 7B illustrate a capacity problem that may arise with a prior art PMP network when a new node attempts to enter and existing nodes are not capable of dynamically adapting diversity channels to form the new subsets. Although nodes C and E can readily talk with D, by substituting their direct link to each other for intervening links with D, nodes D, A, and B, being limited to 3 existing channels, cannot adapt to connect with each other by dropping either E or C depending on traffic needs.
Figure 7B:
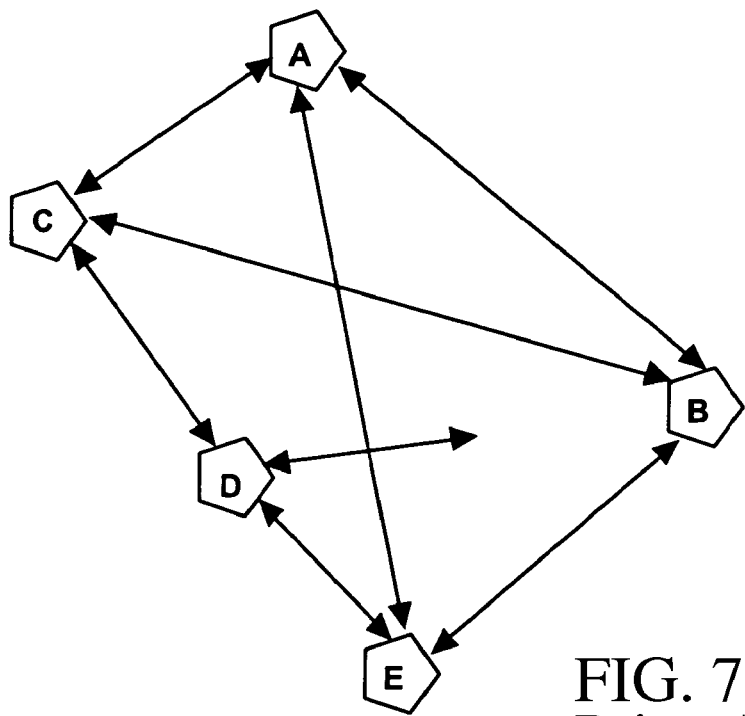
Figure 8:
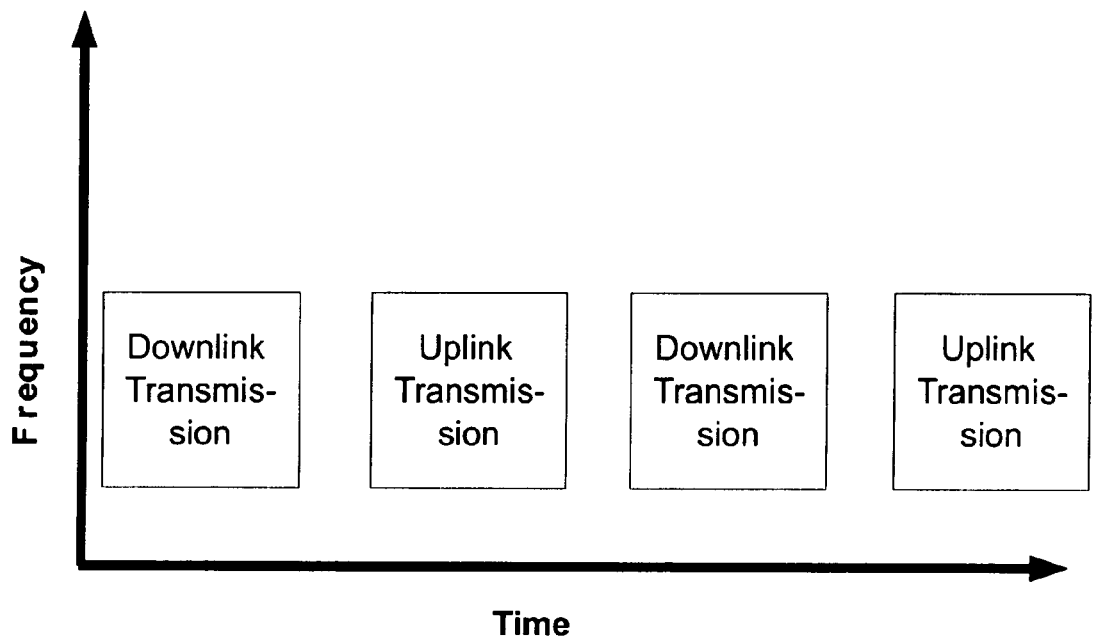
FIG. 8 illustrates a Time-Division Duplex communications protocol, whereby alternating uplink and downlink, or transmission and reception, slices of network activity take place at a node.
Figure 9:
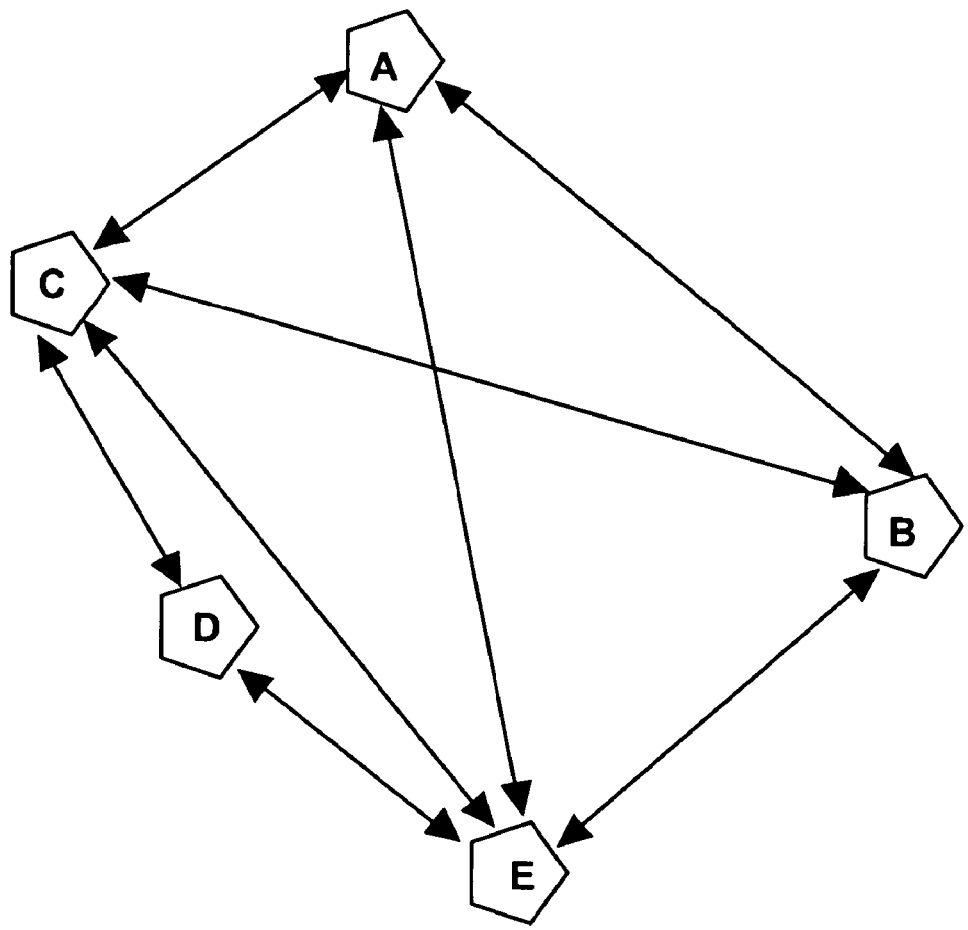
FIG. 9 illustrates an asymmetric network where nodes C and D have greater capacity than nodes A and B, which in turn have greater capacity than node D, but where the network cannot dynamically allocate this capacity to meet signal density needs to differing subsets of nodes.
Figure 10:
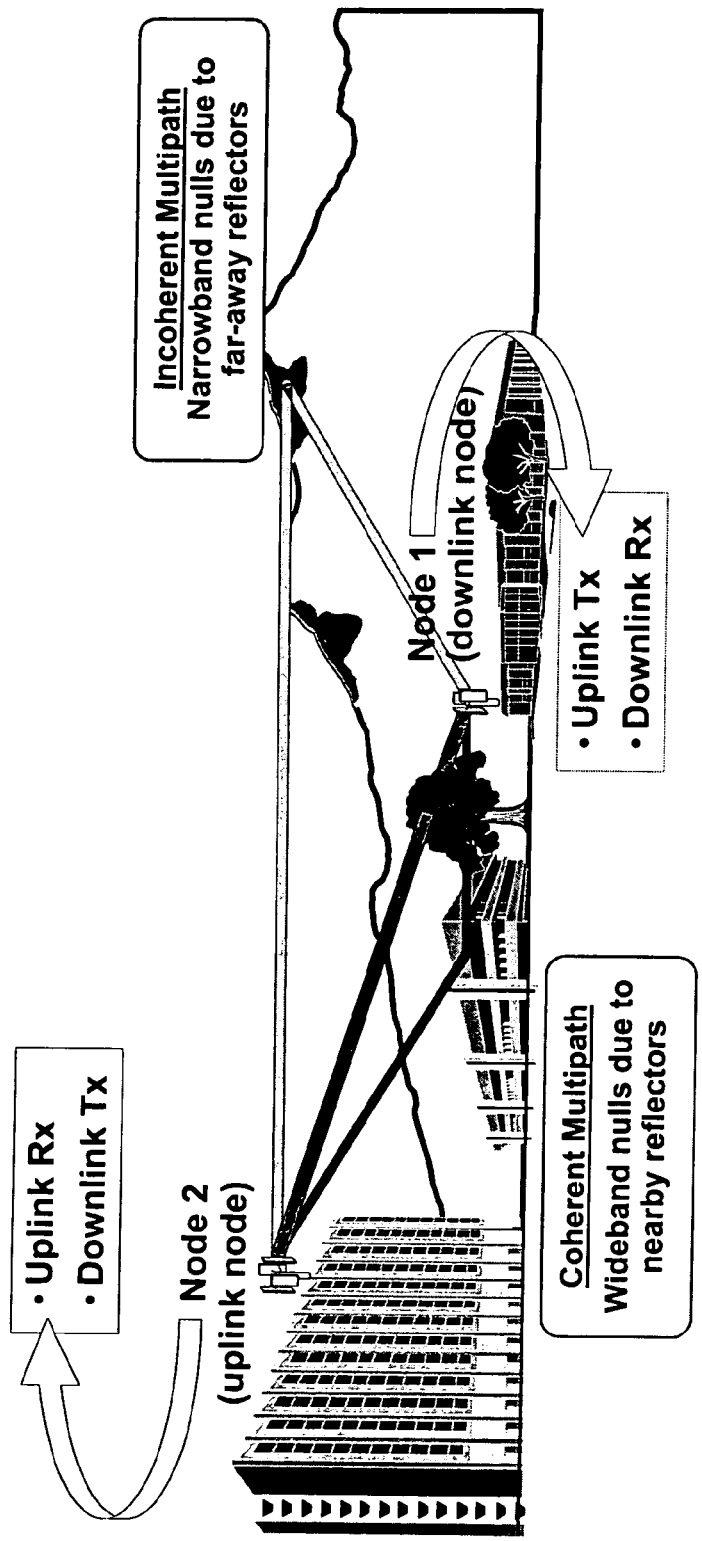
FIG. 10 illustrates a multipath network, where transmissions between node 1 and node 2 are both direct and reflected off environmental features both near and far.
Figure 11:
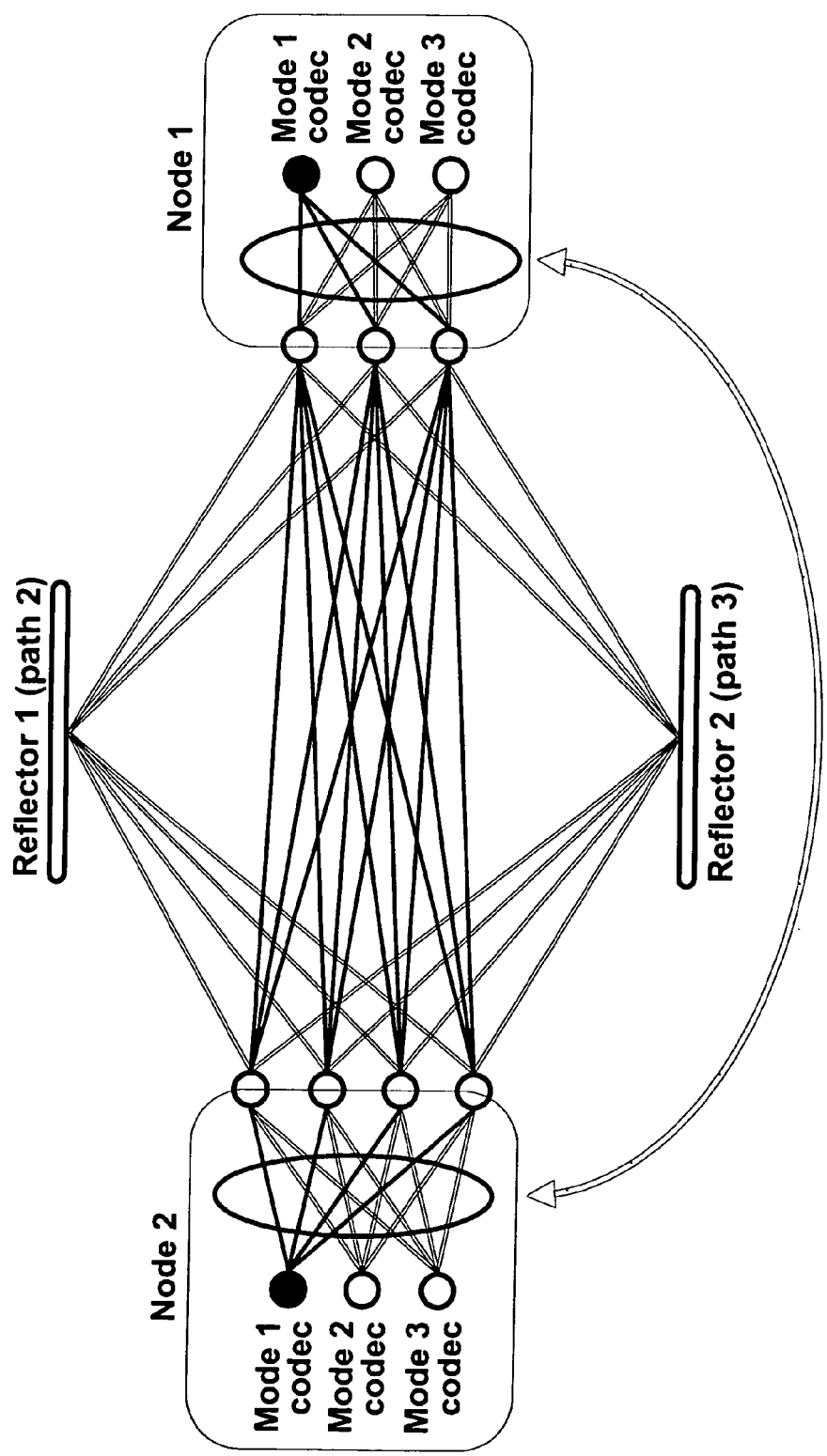
FIG. 11 illustrates a data flow diagram in a PTP MIMO link, where signal flows from one CODEC in node 2 through all of node 2's antennae, thence into all of node 1's antennae, and finally into one CODEC of node 1. Existing multipath potential of either or both reflectors, and dynamic allocation of less or more of the possible diversity modes, is ignored.
Figure 12:
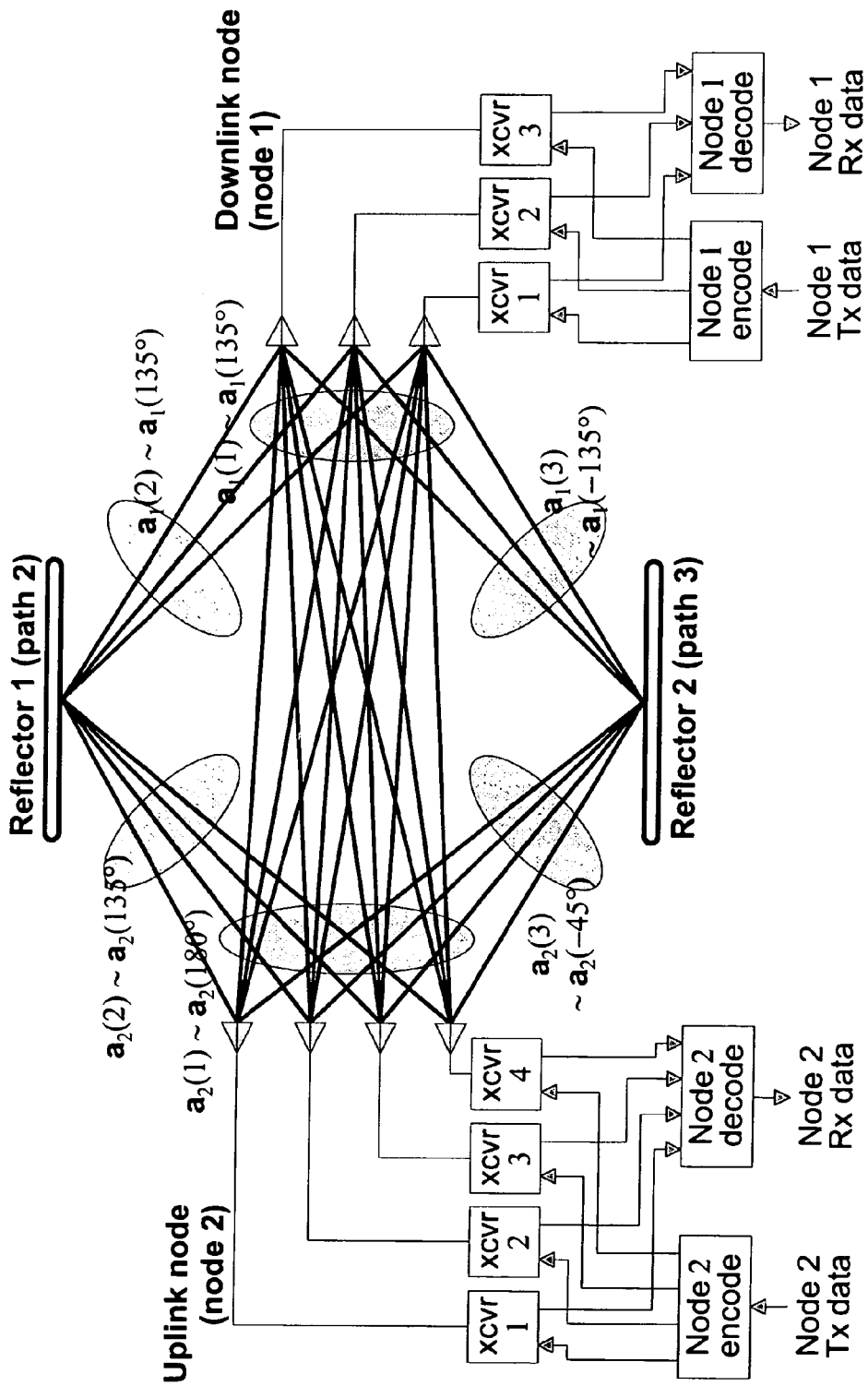
FIG. 12 illustrates a physical PTP multipath, consisting of one direct and two reflective links, using all of node 1's antennae and transceivers, and all of node 2's antennae and receivers.

When combined with the substantively null-steering approach described here, which helps to minimize the generated noise from all other signals sent from a node, the network power requirement for clear communication drops as the links effectively decouple; that is, the 'other' channels, since they are being null-steered, do not form part of the background noise against which the intended signal's power must be boosted to be accurately received by the intended recipient. (See FIG. 7.)

The LEGO power optimization and null-steering then feed back (reciprocally) into the requirements for the network and network's hardware at each node, inasmuch as the minimization of unused and unintentional interaction (or interference) reduces the precision and power necessary for frequency and other differentiation means at the node's transceiver, and reduces the number of antennae in each array by increasing the effective bandwidth within each multipath channel, by reducing the amount of bandwidth, frequency, time, or channel, or all of the above, that must be devoted to error avoidance or correction. That in turn simplifies the codec and other element designs for each node and lowers the cost of the transceiver front-ends.

The preferred embodiment of the invention employs a network of fully-adaptive PHY-IA MIMO Network Capable Transceivers, in which each transceiver implementing an upper PHY that performs transmit and receive TRANSEC, node signaling/detection protocol, transmit/receive beamforming, and receive-side node discovery and adaptation algorithms, and a lower PHY that can meet the needs of intermittent, burst packet communications such as VoIP.

Communication between source and destination nodes, defined by unique two-hex port addresses comprising the source and destination node addresses (SNA's and DNA's) for the packet transmission, is accomplished by routing traffic packets over at least one and possibly several routes or collections of sequential links between the source and destination node. Means for partitioning traffic data into individual data packets at the source node, and collecting data packets into traffic packets at the destination node, are accomplished in this invention using existing network routing protocols. For each combination of a transmitting node, a receiving node, and a communication channel (diversity link), the unique link address and identifying transmit node address and receive node address for the respective nodes are used as part of the messaging context.

Combining packet-specific, structural and origin/destination network information into a unified overhead allows implementation of orthogonal transformations of that overhead, through the use of specific power-of-two integer number of lower PHY (LPHY) symbols (which are preferably an OFDM waveform or PAM signal); and using a unique and identifying link address for each node-to-node link currently instantiated, which incorporates source, destination, and channel rank information, enables informational efficiency for short transmissions where otherwise structural and routing information might overweigh content, e.g. in each packet. Working within bounds (time intervals, frequency ranges, or transmission strengths) that guard against intrasystemic interference, the use of MIMO transformations and reciprocity-based pilot or signal weighting calculations for the correct weighting of signals transmitted and received, enables the individual packets and messages to adapt, in a bottom-up, flexible, and responsive fashion to the real-world dynamics of a continuously varying EM flux. Using adaptively-derived diversity weighting, the method and system can rapidly take advantage of reciprocity between each node pairings' transmit and receive channels to distinguish the desired signal from the general noise and potential interference. Upon RF reception at any node, downconversion and ADC operations on the diversity channels passes the incoming signal(s) through a set of inverting transformations that, for the desired incoming signal(s), strip off known structural elements and continuously updates the combiner weights to reflect the dynamically varying environmental and signal context, thereby continuously matching necessitated signal and waveform transformations to the environmental and signal effects and sources. By successive iterations of the transmit and receive adaptation algorithm each node can have its transceiver adapt its multiport combiner and distribution weights to the eigenmodes (left and right eigenvectors) of their MIMO internode channel response, so that the resultant fully adaptive link can approach the Shannon capacity of the MIMO communication channel, regardless of the rank or distribution of the eigenvalues of that channel.

In addition, the fully adaptive system provides an automatic power control mechanism (LEGO Algorithm) that can be used to maximize capacity (high throughput applications) or minimize transmit power (LPD applications), depending on the requirements of the system at any point during a mission.

The resultant network is able to pass data with high spectral efficiency relative to non-MIMO networks, or to meet specified packet transmission rates at much lower power levels relative to non-MIMO networks, due to its ability to pass data over multiple time-and-frequency coincident links and routes, and to exploit the much lower pathloss between intermediate nodes in the network. Moreover, the network is able to provide this performance in the complete lack of any opportunistic multipath (although that multipath can be exploited if it is available).

DETAILED DESCRIPTION OF THE DRAWINGS

Glossary And Definitions

ACK Acknowledgement
ADC Analog-to-Digital Conversion
ADSL Asynchronous Digital Subscriber Line
AGC Automatic Gain Control
BS Base Station
BER Bit Error Rate
BW Bandwidth
CBR Committed Bit-Rate service
CDMA Code Division Multiple Access
CE&FC RWA Computationally Efficient And Fast-Converging Receive Weight Algorithm
CMRS Cellular Mobile Radio Systems
CODEC Encoder-decoder, particularly when used for channel coding
CPU Central Processing Unit
CR Channel Reciprocity
DAC Digital-to-Analog Conversion
DEMOD Demodulator
DMT Digital MultiTone,
DSL Digital Signal Loss
DMX De-multiplexer
DOF Degrees of Freedom
DSP Digital Signal Processing
EDB Error-Detection Block
EEPROM Electronically Erasable, Programmable Read Only Memory
FDD Frequency Division Duplex
FDMA Frequency Division Multiple Access
FFT Fast Fourier Transform(s)
FPGA Freely Programmable Gate Array
GPS Global Positioning Satellites
GSM Global System for Mobile Communications
LEGO Locally Enabled Global Optimization
LMS Least Mean-Square
LNA Low Noise Amplifier
LS Least-Squares (An alternative form can be 'matrix inversion')
MAC Media Access Control
MGSO Modified Gram-Schmidt Orthogonalization (most popular means for taking QRD)
MOD Modulator
MIMO Multiple-Input, Multiple-Output
MMSE Minimum Mean-Square Error
MSE Mean-Square Error
MT Multitone
MUX Multiplex, Multiplexer
NACK Negative acknowledgement & request for retransmission
NAK Negative Acknowledgement
OFDM Orthogonal Frequency Division Multiplexing
PAL Programmable Array Logic
PDA Personal Data Assistant
PHS Personal Handiphone System
PHY Physical layer
PMP Point-to-Multipoint (An alternative form can be 'broadcast')
PSTN Public Switched Telephone Network
PSK Phase-Shift Key
$\pi/4$ QPSK (pi/4)—Quadrature Phase Shift Key
$\pi/4$ DQPSK (pi/4)—Digital Quadrature Phase Shift Key
PTP Point-to-Point
QAM Quadrature Amplitude Modulation
QoS Quality of Service
QRD Matric {Q,R} decomposition (see, MGSO)
RF Radio Frequency
RTS Request To Send, recipient ready for traffic
SDMA Spatial Division Multiple Access
SINR Signal to Noise Ration (An alternative form can be S/N)
SOVA Soft-Optimized, Viterbi Algorithm
SU Subscriber Unit
TCM Trellis-Coded-Modulation
TCP/IP Transmission Control Protocol/Internet Protocol
TDMA Time Division Multiple Access
TDD Time Division Duplex
T/R Transmit/Receive (also Tx/Rx)
UBR Uncommitted Bit-Rate (services)
ZE-UBR Zero-error, Uncommitted Bit-Rate (services)

Groundwork: the Network as a Dynamic Connected Set

A network is generally viewed as the combination of a set of nodes (where transmissions originate and are received) and the connections between those nodes through which the information is flowing. FIGS. 1A, 1B, and 1C are graphical representation of a simple network of five nodes (A through E) and a varying number of channels, indicated by the lines drawn between pairs of nodes. In FIGS. 1A and 1C, all five nodes are active and able to communicate with all or most of their neighbors. In FIG. 1B, node D is inactive and unable to communicate. The two-step channel, from C to D and from D to E, in FIG. 1A is replaced by a one-step channel from C to E in FIG. 1B, and co-exists with the two-step channel in FIG. 1C. A connection between any two nodes without any intervening nodes is also known as a 'link'.

Because each node may both transmit (send) and receive, and because the connections amongst the set of nodes may change over time, the network is best thought of as a dynamic structure, i.e. one that is constantly shifting yet which still occupies the same general 'space' in the communications world. While traditional broadcast networks, or PTP or PMP networks generally tried to 'fix' at least the originating node, a MIMO network begins with the presumption that the communications are dynamically allocated amongst the nodes and throughout the network. In the present embodiment of the invention, diversity in spatial, spectral, temporal, or polarization attributes of the potential channels are not seen as variations that must be controlled or limited, but as opportunities for enhancing performance.

LIMITATIONS OF EXISTING ART

The approaches currently described in the field, especially in Raleigh and Cioffi, G. Raleigh, J. Cioffi, "Spatio-Temporal Coding for Wireless Communications," in *Proc. 1996 Global Telecommunications Conf.*, November 1996, pp 1809-1814), and in Foschini and Gans (G. Foschini, M. Gans, "On Limits of Wireless Communication in a Fading Environment When Using Multiple Antennas", *Wireless Personal Comm.*, March 1998, Vol. 6, No1. 3, pp. 311-355), require additional hardware at each node comprising one end of a channel per diversity path to exploit that diversity path. This creates a geometric growth in the hardware complexity for each particular node, and a linear growth in cost for each diverse path exploited by a given network, that rapidly renders any network attempting to exploit such diversity uneconomic. Moreover, such an approach 'muddies its own stream' in that it reduces the capacity increase by the power increase needed to power the more complex transceiver. Exploitation of this multipath approach requires both high power (to permit data transport over the relatively weaker additional diversity path) and complex codecs (to permit data transports at high rates on the dominant path by filtering out the diversity path transmissions). To the extent that the nodes differ in their antennae mix, this approach complicates the administration and management of the network by constraining the potential path exploitation to previously-known or approved channels where the required equipment for each diverse path is known to exist.

Spatially distributed networks overcome this particular limitation by exploiting the inherent diversity between inter-node channel responses in the network. This diversity exists regardless of any multipath present on any individual path in the network, i.e. it does not require high levels of opportunistic multipath to be exploitable by the system. Moreover, such spatial diversity can be designed into the network by careful choice of topologies for the nodes during the deployment process, in order to provide linear growth in capacity as transceivers are added to the network. As a side benefit, the network can spatially excise transmissions from compromised nodes and emitters, allowing secure, high quality service in environments with external interference.

A downside to such an approach is its obvious weakness to unexpected growth, dynamic changes in topology (from mobile, transitory, or transient nodes), or dramatic changes in relative channel densities. Unlike the present form of the invention, such an approach does not handle well unplanned-for competition, environmental changes, or readily exploit opportunities arising from surprisingly (i.e. unplanned for) good network performance.

MIMO Networks: Shapes and Spaces

The complex MIMO environment and multiple dimensions of differentiation (spatial, frequency, time, code), the physical geography of any network (ring, star, mesh), the physical geographies of the surrounding terrain (creating the multipaths) and the other wireless signals from outside the network, and the internal network environment (of traffic patterns and node differences) create a diversity explosion.

To create and manage optimal network capacity, the preferred embodiment creates a network topology that enforces a constraint where each node with $M(n)$ antennae has $\leq M(n)$ other nodes in its view with whom it communicates at any particular interval of time. This may take the form of a ring (see FIG. 16), star (FIG. 18), mesh (FIGS. 39, 40), or combination thereof, depending on the individual nodes' hardware and geographic specifics. Moreover, this may dictate the placement of nodes, geographically or in uplink or downlink transmission subsets. This enables the creation of reciprocal subspaces for each sub-set of the network and therefore for the network as an entirety. However, the approach in the preferred embodiment can manage with other network shapes and spaces, just as it can manage with the hardware or protocol or software constraints inherent in particular nodes.

While the preferred embodiment works with reciprocal subspaces, wherein the network maintains reciprocity according to Eq. 1 between nodes over all links joining them, some parameters may be allowed to vary and create asymmetric spaces. For example, in a carrier offset case, the channel responses are actually invariant but for the complex scalar sinusoid which creates the frequency offset; physically, this is a non-reciprocal link but logically it remains (assuming signal content density on both sides is kept equal) a substantively reciprocal link. Other adaptation means are permissible as long as the network design rule of Eq. 1 is kept as a high priority.

One major difference in the present embodiment of the invention from prior art is that by making the control and feedback aspects part of the signal encoding process, and thereby eliminating or at least reducing the need for a separate channel(s) for control and feedback, the network content overhead is reduced and an additional range within the signal dimension is available for signal content. The LEGO reduction to single, or small, bit sized power management signals can be similarly echoed for other network management, depending on the target objective the network elects.

Furthermore, because the MIMO and LEGO approach described herein is usable in any network topology, and with existing protocols and schema (PSK/QAM; FDD; CDMA, including modulation-on-symbol, or synchronous, CDMA; TDMA; SDMA, etc.) the network can adapt to a diverse environment of users rather than requiring all to have the identical hardware, software, and standards.

The diversity of transmission and reception at all nodes in the network, rather than just at a subset of hub nodes or BSs, means that every node can use in its local environment any redundancy in transmission or reception of data over multiple channels, whether they be spatial, polarization, spectral, temporal, or any combination thereof. The maximum use can be made of all available (i.e. unused by others) signaling lacunae, with the nodes adaptively adjusting to the traffic and external environmental conditions according to the objectives set by the network.

Furthermore, the present embodiment of the invention does not require a preliminary calibration of the transceiver array, the communications channel, or geographic site as do many approaches used in the prior art. The continuous feedback and rapid convergence of the approach allow for flexibility and adaptivity that will permit correction of miscalibrated data, when the miscalibration represents a no-longer valid model of the environment for the receiving node.

Additionally, the MIMO network of the present embodiment is adaptive to channel response changes due to network point failures. This includes: the ability to survive element failure at individual nodes (i.e. one antenna, or transceiver, fails) without loss of communication to that node (though it may incur possible loss of capacity); the ability to survive failure of links without loss of communication to that node (e.g., by routing data through other paths); the ability to survive failure of node (all links terminating at that node) without unduly affecting connectivity or capacity of network; and the ability to achieve network reliability that is higher than reliability of any node in that network. The network will automatically adjust itself to optimal performance in event of any of these failures; potentially by rerouting active links based on available SINR experienced at that link.

Application Areas and Advantages: MIMO

The incorporation of the control and feedback signal as part of the process rather than as discrete, separate, and particular parts of the signal, can decrease the complexity of apparatus by removing the need for a separate channel for network control. It also can decrease the complexity of the processing by removing the need for particular dedication of a time aspect of the reception, or by removing the need for additional detection and interpretation of control signal from other content through either software or hardware. Moreover, such incorporation also integrates the entire aspect of power management and control into the signaling process rather than artificially and needlessly separating it from the network dynamics. This integration allows both capacity and power control to cooperatively handle packet acknowledgment, signal synchronization, and transmit/receive functionality at each node, and to optimize their conjoined functionality to the needs of the environment, the user, or the node rather than being constrained to disparate, pre-set and non-dynamic dictates by network administration that are only responsive to the real world environment to the extent that the system designers' assumptions accurately modeled the real-world and unknowable complexities.

Because the control and feedback signaling is incorporated into the process, the present form of the invention does not impose overhead constraints or capacity demands upon the network to nearly the same degree as the prior art does. For a given infrastructure and environment, therefore, the present form of the invention provides increased capacity and performance through dynamic, and self-moderating signal processing algorithms, with a minimal overhead.

Additionally, because the method does not require a strict hierarchical division between Base Station and Subscriber Unit nodes, but rather adapts to the diversity of reception and transmission at each particular node depending on its then-current environmental context, the method allows for rapid and responsive deployment of mixed hardware units being conditioned by factors external to the network, such as user choice or economic limitations.

Unlike prior art, the present form of the invention will work with each of CDMA, FDD, TDMA, SDMA, and PSK/QAM implementations, and with any combination thereof. Because the present form of the invention will work with diverse environments, where the diversity may come from within the network (rather than from sources external to it), this protects users and companies' investments in prior infrastructure and avoids creating either a 'captive service market' subject to crippling and sudden innovation, or creating a network which will suffer when a Christiansen-style disruptive technology advance arrives. Moreover, diversity reception, which is the redundant transmission and reception of data over multiple channels (whether the diversity comes in spatial, polarization, spectral, or temporal form, or any combination thereof), permits successful operation in environmental conditions which would otherwise block any particular channel or perfect subset of channels. This means that the present form of the invention will continue to operate in dirty, bursty, or difficult conditions, whether the impact of the negative force is on the nodes or the external environment.

As such, there are a number of potential implementations which immediately become feasible for a dynamically adaptive network, in the military and security fields. These include military and civilian applications where individual unit or node failure can be anticipated and therefore must not bring down the network, and where environmental conditions can become disruptive for particular nodes or links. These would also include support and exploration applications where the external environment (including node location) and network internal environment (traffic, connectivity) may change over time, as the component nodes move and change capabilities and capacities.

Among the effects which enhance the ready establishment and dynamic use of security advantages through the present form of the invention are the three-layer pilot signal (network mask plus originator mask plus recipient mask) detailed below (See FIG. 21). This allows users to communicate both on an unsecured overall network and a separately secure sub-network, on discrete (possibly encrypted) subnets through a subnet mask. This also allows network establishment and alteration of any subnet through designation and adaptation of shared subnet masks, wherein layers of encryption become algorithmically establishable. The present form of the invention also allows the fast detection, acquisition, interference excision, and reception of originators attempting to talk with the recipient, prioritizing the same according to their match to any set of subnet masks (highly secured signals presumably taking priority over less secured or open signals). Alternative uses of origination masks or recipient masks allow dual-natured communication priorities and the ability to suppress unintended recipients via the imposition of either origination or recipient masks, the secure transmission through interim nodes not provided with either mask, and the ability to determine and remove group delay as a fundamental part of the FLS algorithm.

Unlike the prior art, the present form of the invention will also allow for optional specialization (e.g. in transmission, reception, flow-through channelization) at any particular node in a dynamic fashion, thereby allowing the network as a whole to adapt to transient environmental fluctuations without concomitant alteration in on-the-ground hardware or in-the-system software alterations. Such ready adaptivity increases the total cost-effectiveness, as well as the dynamic stability for the entire network.

Unlike prior art, the present form of the invention supports diversity reception and transmission at all nodes in the network. This creates a level of flexibility, adaptivity to environmental or network changes, and dynamic stability which increases the ready scalability over multiple distinct approaches simultaneously or serially accepted by the network. Since the core reciprocity and protocols can be used by distinctly different hardware and signals, the present form of the invention permits local accretive growth rather than demanding top-down, network-wide initial standardization, thereby decreasing the capital and planning cost for implementing or changing a network.

Another advantage of the present form of the invention is that it permits shared antenna usage amongst multiple nodes, thereby decreasing the number of antenna necessary for any given node to attain a particular capacity, and thereby decreasing for the network as a whole the cost and complexity required for that same level of capacity. Furthermore, it also permits any set of nodes to use a diversity of channels without requiring an increase in the antenna or internal complexity (in both hardware and software) at every node in said set of nodes.

A further advantage of the present form of the invention is the ability to adaptively select and use ad-hoc, single-frequency networks on all or part of the network, under conditions when network traffic is 'bursty', that is, when there are significant disparities between the high and low content volumes of traffic being communicated amongst that part of the network.

A particularly significant advantage of the present form of the invention is that using the reciprocity equation equalizes the processing or duty cycle for message transmission and reception across both directions of a link, thereby lowering the processing imbalance which otherwise might be created between transmission and reception modes. This in turn reduces the average complexity which must be built into each particular node by decreasing the maximal capacity it must be created to handle for an overall network minimal capacity average.

Another advantage of the present form of the invention is that, unlike much of the prior art, the present form of the invention will work in uncalibrated areas where the environmental context is either previously unknown or altered from previous conditions. This allows for rapid, uniphase adoption and expansion in any given area without requiring prior to the adoption the precise calculation of all environmental effects upon transmissions and receptions within said area at all planned or possible node locations. This further allows the adoption and use for transient, or mobile, nodes in areas without requiring all possible combinations of channel responses amongst said nodes first being calibrated and then said channel responses matched to current conditions, or constrained to pre-set limitations.

Another advantage of the present form of the invention is that it provides rapid correction for miscalibrated data, thereby reducing the cost of inaccurate measurement, human or other measurement error, or incorrect calibration calculations. This in turn reduces the overhead and planning required for adaptation for any given network to a particular environment, either initially or as the environment changes over time, as the channel responses in the real world can be readily adapted to.

A concomitant advantage of the present form of the invention is the rapid and dynamic adaptation to channel response changes when a network failure, at any particular node or sub-set of nodes, occurs. This greatly increases the stability and durability of any network incorporating the present form of the invention without the level of cost, complexity, or duplication required by the present state of the art. Amongst the advantages conveyed are the ability for the network to survive partial failure at any particular node without being forced to drop or lose that node (i.e. maintaining maximal attainable capacity between that node and all others to which is can communicate), the ability to survive the total lose of any particular node, by sharing the signal traffic amongst alternative channels. The present form of the invention also permits the rerouting of active links around 'lost' or 'damaged' nodes without human intervention by adherence to the new reciprocity measurements. And the increase in network stability to exceed not just the reliability of each particular node, but the average reliability of all nodes for, while any subset of nodes still remains operable, the maximal network capacity for that set can be maintained. This is unlike the present state of the art, where if 50% of the nodes of a network fail then the average network communication drops to zero, as all the channels lose one half of their pairs. Furthermore, the present form of the invention enables the network to automatically adjust itself and its optimal performance in the event of any partial failure without requiring human intervention, thereby decreasing the cost and increasing the responsiveness of the network. Even more important is the fact that, upon incremental re-instatement or restoration of particular node or channel function, network optimization continually advances without manual re-establishment.

Another advantage of the present form of the invention is that it minimizes the complexity, and increases the accuracy, of the signal weight update operation at each particular node and for the network as a whole.

Another advantage of the present form of the invention is that it provides a computationally efficient mechanization of cross-correlation operations for both nodes and channels across and within the network. As the number of signals simultaneously processed on a single time-frequency channel grows, the marginal complexity increase caused by addition of those signals drops, for fast adaptation methods such as autocorrelation approaches, e.g. inverse-based or least-squares). This is because the Digital Signal Processing (DSP) cycles needed for high-complexity operations in fast techniques, such as matrix computations, QR decompositions, or data whitening operations common to DSP processing, can be amortized over the larger number of signals. The higher overhead of hardware and software complexity needed to handle signal complexity thereby is lowered on a per-signal basis the greater the complexity actually used by the system. For certain techniques such as pilot-based or least-squares signal weighting, the fast techniques become less complex than the current conventional approaches such as Least-Mean-Squares or stochastic gradient, wherein the overhead remains indifferent to the increasing complexity of the signals being processed. When the number of signals that must be processed is equal to one-half the number of combiner weights used at an adaptive receiver, for example, then the crossover in overhead complexity vs. speed occurs between least squares and least mean squares.

Because the present form of the invention is dynamically adaptive, it can use any subordinate portion (in time, channels, or network subset) of the process wherein a 'reciprocal subspace' exists to implement its full value. Even though the parameters of the signal processing may vary between the uplink (transmission) and downlink (reception) phases between any two nodes on any given channel or link, to the extent that they overlap such a reciprocal subspace can be effectuated and used. For example, a reciprocal subspace can be created where there is a carrier offset, where the channel responses are distinguished solely by a scalar complex sinusoid (e.g. a frequency offset), between the two nodes, regardless of which is, at any particular moment, transmitting or receiving.

Since the present form of the invention with its non-orthogonal multitone capability allows the addition of mobile, transient, or temporary nodes to any network, it creates a system that can manage and provision any combination of fixed, portable, low mobility, and high mobility nodes and links. The capacity constraints being node and channel specific rather than network delimited also permits the heterogeneous combination of differing capacities, thereby allowing peripheral distinctiveness, creating the potential for a system with a hierarchy of nodes including high-function, base-function, and limited-function or even single-function (e.g. appliance) nodes.

The present form of the invention permits the ability to achieve nearly linear increases in capability, even superlinear increases (in dirty environments) for increases in infrastructure, namely the RF transceiver capacities within the network. This is a significant advance over the prior state of the art for PTP networks which achieve sublinear capacity growth with network infrastructure growth.

In non-fully loaded networks using the present form of the invention, the MIMO connectivity can provide sharply higher data rates to individual channels or nodes where the additional information flow, to the maximal capacity of the particular nodes, is routed through nodes which have intended reception or transmission capacity available. This is a 'water balancing' approach to traffic maximization available only when multiple rather than single path capabilities are established through a network, or any network structure that instantiates fixed bottlenecks (e.g. 'star' or 'hub' topologies, BS PMP networks, or fixed-channel PTP networks).

Additionally, the reciprocity approach enables an automatic and dynamic load sharing amongst the channels and nodes which minimizes bottlenecks or, in the military or security environment, desirable targets of opportunity for 'hot centers' of traffic. Commercially this is more valuable by reducing the power and complexity requirements of what in PTP and PMP networks are BSs to attain a given network capacity and power efficiency.

The preferred embodiment of the present form of the invention includes a number of interacting and synergistic elements, both in hardware and in operational software. The preferred embodiment, as a network, will incorporate particular functional elements at individual nodes, as well as overall systemic features which may not be shared by or incorporated in the hardware of each particular node (i.e. there may exist specialization amongst the nodes). As stated in the summary, each node preferentially has an antennae array; multiple, multitone, transceivers (one per antenna); and constrains itself to reciprocal uplinks and downlinks (FIGS. 13 A and 13B). The antennae array is spatially and/or polarization diverse and transmits and receives signal energy during alternating time slots (or sequences of time slots in TDD-TDMA systems). Each transceiver is a vector OFDM transceiver, with digital signal processing elements, that downconverts, A/D converts, and frequency channelizes data induced on each antenna (or other diversity channel) during receive time slots, and inverse channelizes, D/A converts, and upconverts data intended for each antenna (or diversity channel) during transmit time slots; linearly combines data received over each diversity channel, on each frequency channel and receive time slot; redundantly distributes data intended for each diversity channel, on each frequency channel and transmit time slots; and computes combiner and distributer weights that exploit the, narrowband, MIMO channels response on each frequency channel and time slot (FIG. 15). Although the preferred embodiment of the invention allows individual nodes to vary greatly in their capacities, a set of nodes preferentially will incorporate the hardware capabilities detailed in the following paragraphs.

Figure 22:
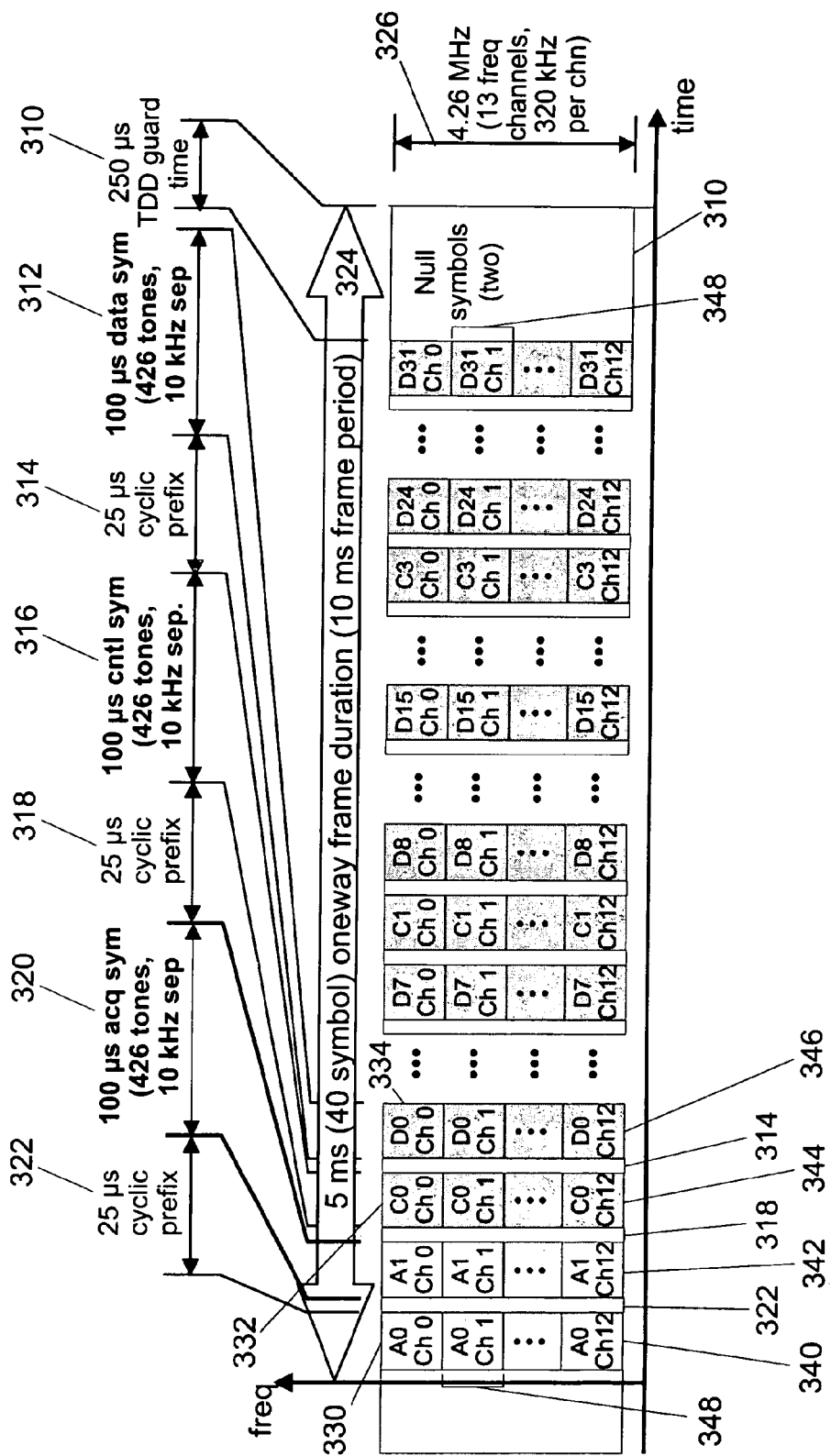
FIG. 22 illustrates a time-frequency mapping pattern of an acquisition channel (Item 340, 342), control channel (Item 344), 32 Data channels (Item 346, not shown for D1 through D31), with cyclic prefixes (Items 322, 318, 314) and a guard time (Item 310) with 100 μs acquisition symbols (Item 320), control symbols (Item 316), and then 32 data symbols (Item 312, again not shown for D1-D31).
Figure 23:
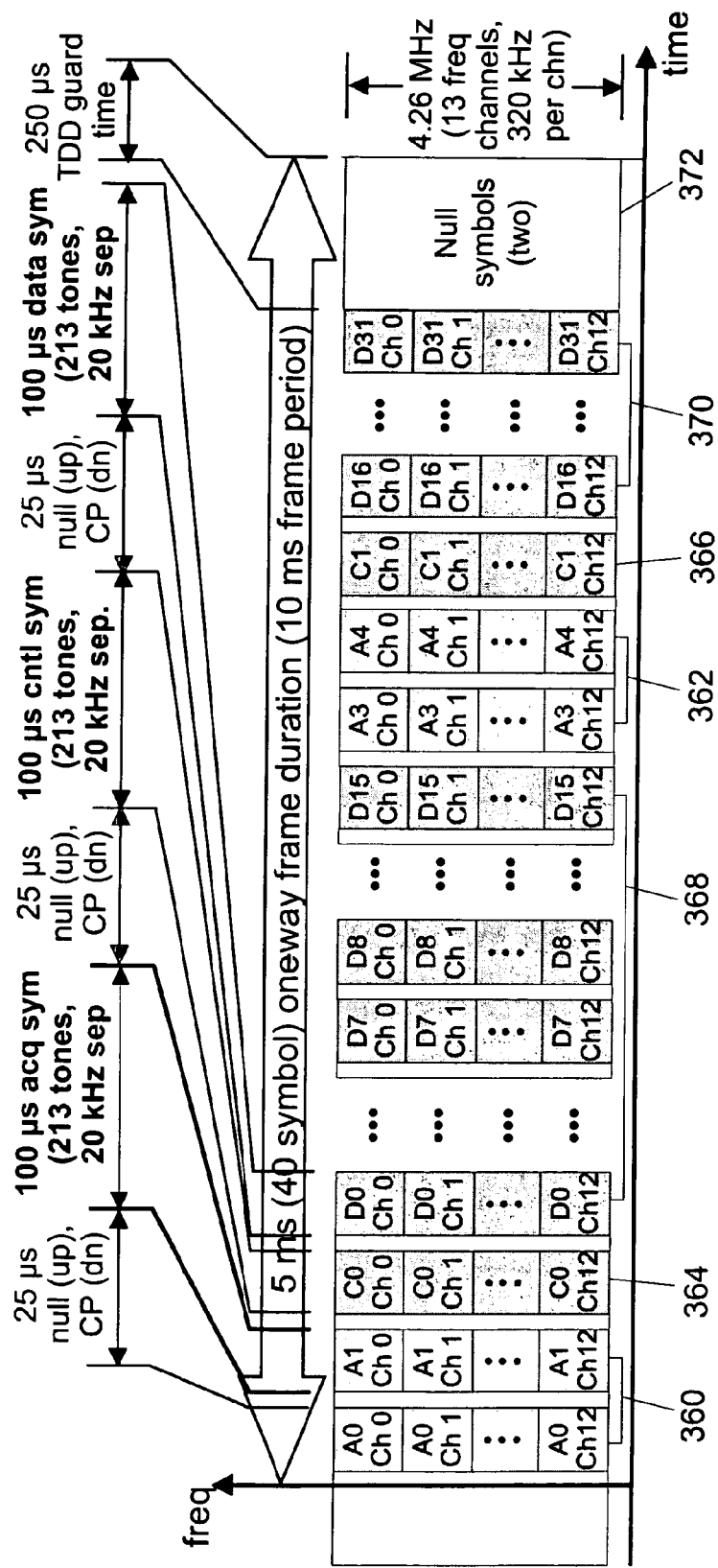
FIG. 23 illustrates an alternative time-frequency mapping pattern for high-mobility situations, where the acquisition, control, and data elements are repeated (Items 362, 366, and 370), but the number of data-bearing channels is halved to allow the duplication within the same bandwidth and time.

The first preference is that the transmission element be a multi-tone front end, using OFDM with cyclic prefixes at fixed terminals (generally, BS) (FIG. 22, Items 314, 318, 322), and generalized multitone with guard-time gaps (FIG. 22, Item 310) at mobile terminals (generally, SU). To minimize aperture blur, the system uses tone grouping into narrowband frequency channels (FIG. 22, Item 348). The OFDM can be readily implemented in hardware using Fixed-Fourier Transform enabling chips; it also simplified the equalization procedure, eliminated decision feedback, and provides a synergistic blend with adaptive arrays. An alternative uses frequency-channelized PSK/QAM with modulation-on-symbol CDMA (that is, synchronous CDMA).

Figure 24:
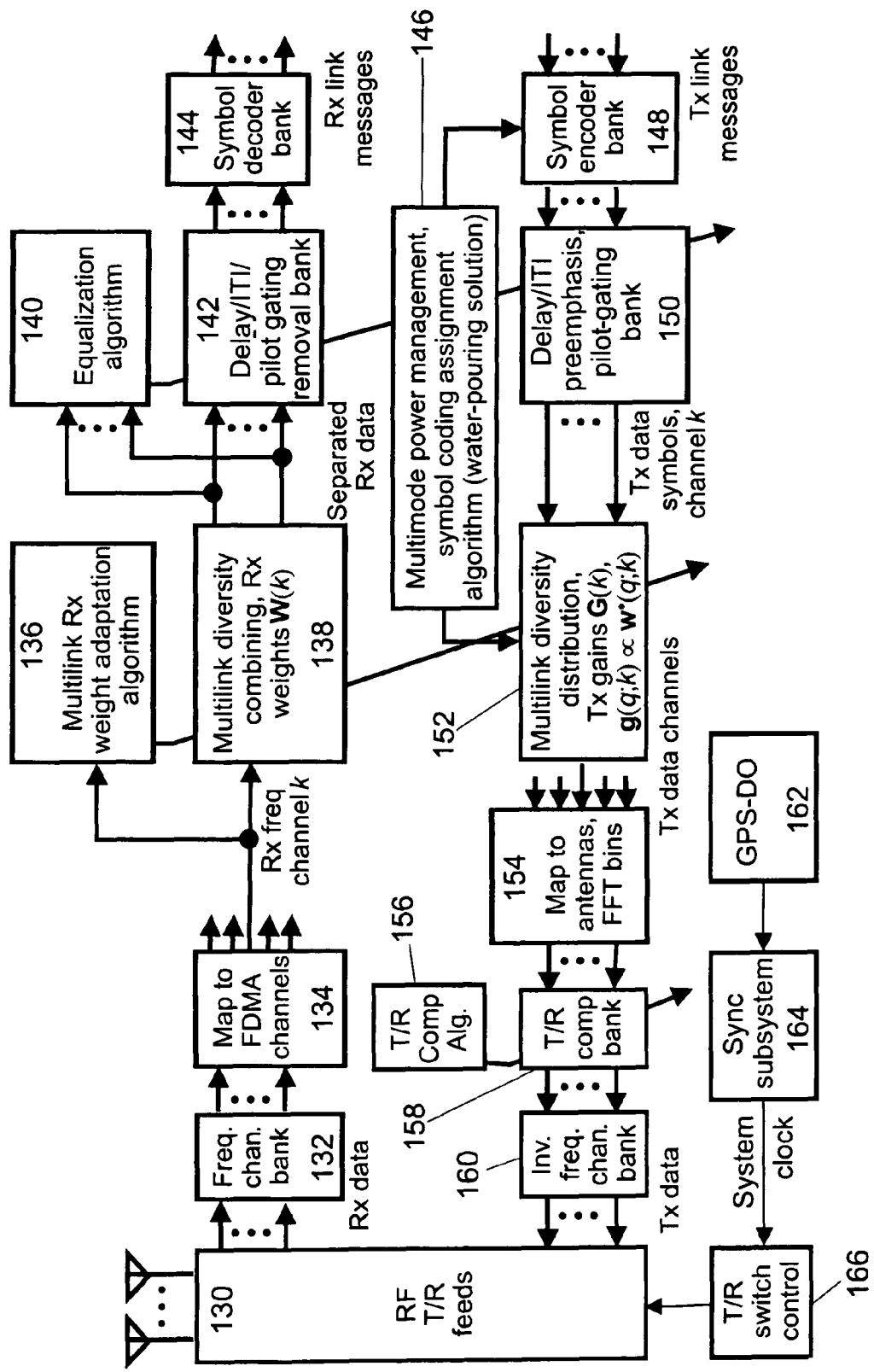
FIG. 24 illustrates one embodiment of the MIMO transceiver, with the RF feeds (Item 130), the Frequency channel bank (Item 132), the mapping element (Item 134), the Multilink Rx weight adaptation algorithm (Item 136), the Multilink diversity Rx weights combining element (Item 138), the equalization algorithm (Item 140) and Delay/ITI/pilot gating removal bank (Item 142), symbol decoder bank (Item 144), multimode power management, symbol coding assignment algorithm element (Item 146), the synchronization elements (Items 162, 164), and T/R comp. Algorithm (Item 156) and element (Item 158), and multilink diversity distribution of Tx Gains element (Item 152).

Each node of the network incorporates a MIMO transceiver. FIG. 24 displays a functional representation of such, and the hardware and processing is detailed over the next several paragraphs.

Each MIMO transceiver possesses an antennae array where the antennae are spatially separated and the antennae array itself is preferentially circularly symmetric (FIG. 15, Item 110). This provides 1-to-M modes (RF feeds) for the signals to be transmitted or received over, maximizes the separability of transmission links, enables a scalable DSP backend, and renders the MIMO transceiver fault-tolerant to LNA failures.

Figure 25:
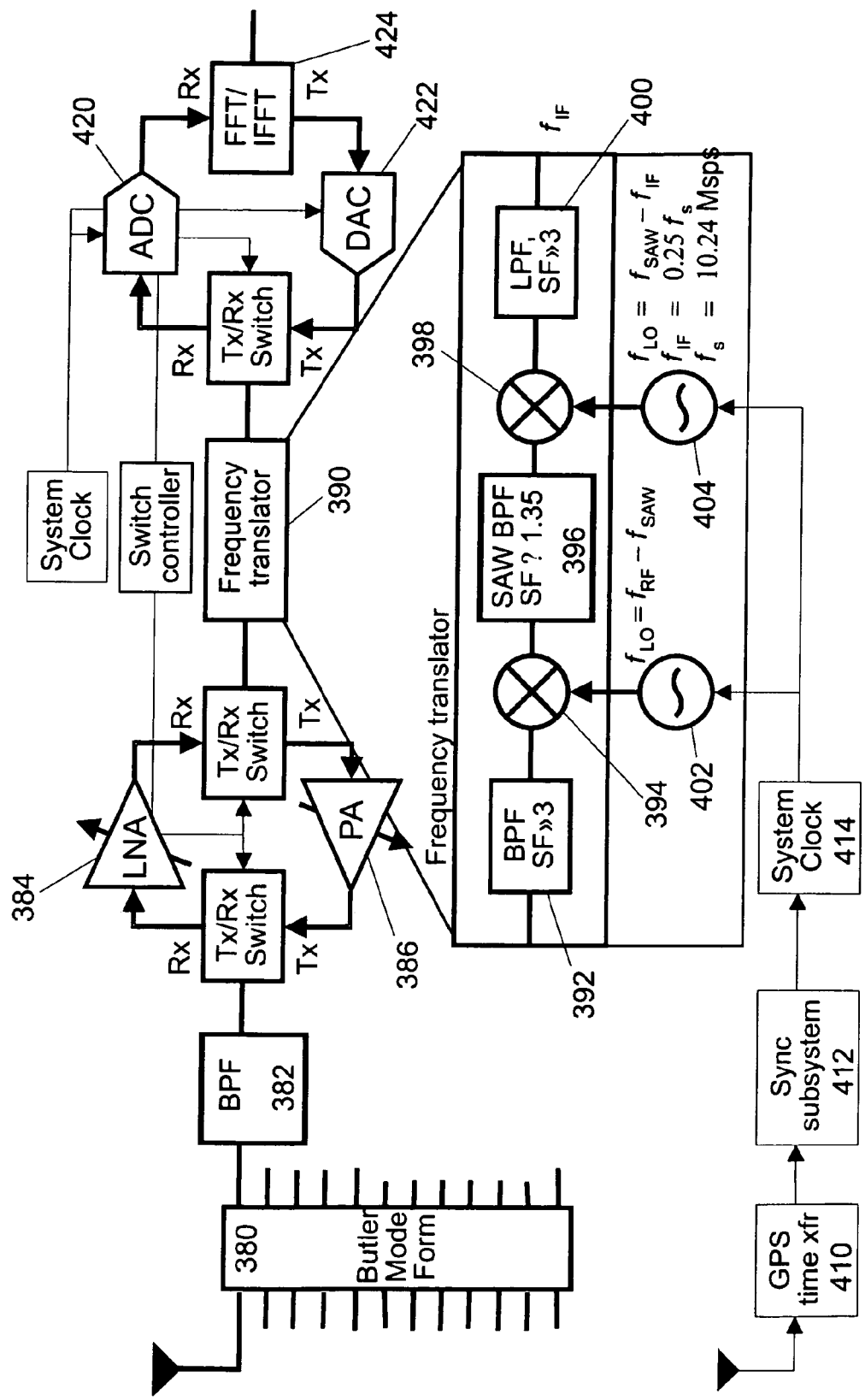
FIG. 25 illustrates in more detail the frequency translator, detailing the Band Pass Filters, element wise multiplier, sinusoids, SAW BPF, and LPF elements.

In an alternative embodiment the transceiver sends the transmission signal through Butler Mode Forming circuitry (FIG. 25, Item 380), which includes in a further embodiment a Band Pass Filter (FIG. 25. Item 382) where the transmission is reciprocally formed with the shared Receiver feeds, and the number of modes out equals the numbers of antennae, established as an ordered set with decreasing energy. The Butler Mode Forming circuitry also provides the spatial signal separation adaptation, preferentially with a FFT-LS algorithm that integrates the link separation operation with the pilot/data sorting, link detection, multilink combination, and equalizer weight calculation operations. This Butler Mode Forming approach means that the transmission forming is readily reciprocal with the receiver feeds (also shared), makes the transmission fault tolerant for PA (Phase-Amplitude) failures, and enables a readily scalable DSP front end; it also enables the transceiver to ratchet the number of antennae used for a particular transmission or reception up or down.

Having passed through the Butler Mode Forming circuitry, the transmission is then sent through the transmission switch (FIG. 15, Item 112), with the uplink frequencies being processed by the LNA bank (FIG. 15, Item 113), moderated by an AGC (FIG. 15, Item 114), and the downlink frequencies being processed by a PA bank (FIG. 15, Item 124). The LNA bank also instantiates the low noise characteristics for the outgoing signal and communicates the characteristics to the PA bank to properly manage the power amplification of the incoming signals to moderate the transmission overlap.

Further transmission switch processing then hands off the transmission to the frequency translator (FIG. 15, Item 115), which is itself governed in part by the Los circuit (FIG. 15, Item 116). The transmission switch is controlled throughout is controlled by a controller (FIG. 15, Item 120) such that basebank link distribution of the outgoing signals takes place such that energy is distributed over the multiple RF feeds on each channel, steering up to $K_{feed}$ beams and nulls independently on each FDMA channel in order to enhance node and network capacity and coverage. This control further greatly reduces the link fade margin and that node's PA requirements.

From the transmission switch the transmission goes to an ADC bank (FIG. 15, Item 117), while a received signal will come from a DAC bank (FIG. 15, Item 123), the complexity of the analog/digital/analog conversion determining the circuit mix within the banks.

Then from the ADC bank the transmission flows through a Multitone Demodulator Bank (FIG. 15, Item 118), which splits it into 1 through K FDMA channels, where K is the number of feeds. The now separated tones (1 through M for each channel) in aggregate forms the entire baseband for the transmission, which combines spatial, polarization, either, or both, feeds across the FDMA channels or even combines up to K FDMA channels as transmission data density requires. This combination enables steering a greater number of beams and nulls than the RF feeds, up to the number of feeds times the number of FDMA channels. It also separates up to $K_{feed}$ links per FDMA channel, improves overall transmission link error and/or retransmission rates, improves overall network capacity and coverage, and reduces the link fade margins, reduces the PA cost, and reduces battery consumption at the other ends of the link.

From the Multitone Demodulator Bank the Rx data is passed to circuitry for mapping the received broadband multitone signal into separated, narrowband frequency channels and time slots (FIG. 15, Item 119).

An outgoing transmission signal experiences the reverse of the above process; having been mapped to tones and RF feeds (FIG. 15, Item 121), it passes into a Multitone Modulator bank (FIG. 15, Item 122), an DAC bank (FIG. 15 Item 123), the transceiver switch, the Frequency Translator, the transceiver switch, the PA bank element (FIG. 15, Item 124), the transceiver switch, and thence in the preferred embodiment through the Butler Mode Form and on to the RF T/R feeds (FIG. 24, Item 130) and to the antennae array and the particular transmission antennae therein (FIG. 15, Item 125)

The transmission switch throughout is controlled such that baseband link distribution of the outgoing signals takes place such that energy is distributed over the multiple RF feeds on each channel, steering up to $K_{feed}$ beams and nulls independently on each FDMA channel in order to enhance node and network capacity and coverage. This control further greatly reduces the link fade margin and that node's PA requirements.

The particular Multitone MOD and DEMOD elements (FIG. 15, Item 118 and 119) in a node vary according to whether it will be handling Fixed, Portable, Low-Mobility, and/or High-Mobility Nodes. Generally, a signal passing into the MT DEMOD may be passed through a comb filter, where a 128-bit sample is run through a 2:1 comb; then passed through an FFT element, preferably with a 1,024 real-IF function; and then mapped to the data using 426 active receive 'bins'. Each bin covers a bandwidth of 5.75 MHz with an inner 4.26 MHz passband, so each of the 426 bins has 10 MHz. The middle frequency, bin 256, will be at 2.56 MHz, leaving a buffer of 745 kHz on either side of the content envelope. Within the transmission, when it passes through the MT MOD, presuming each link is 100 μs, 12.5 μs at each end of the transmission is added as a cyclic prefix buffer and cyclic suffix buffer, to allow for timing error. (FIG. 22, Items 314, 3181, 322.) In an alternative embodiment, presuming that only a cyclic prefix is needed, the system can either double the size of the prefix (FIG. 22, Item 310) or add the suffix to the signal time. The reverse processing as appropriate (i.e. stripping off the cyclic prefix and suffix buffers) is not shown but is well known to the art.

Figure 26:
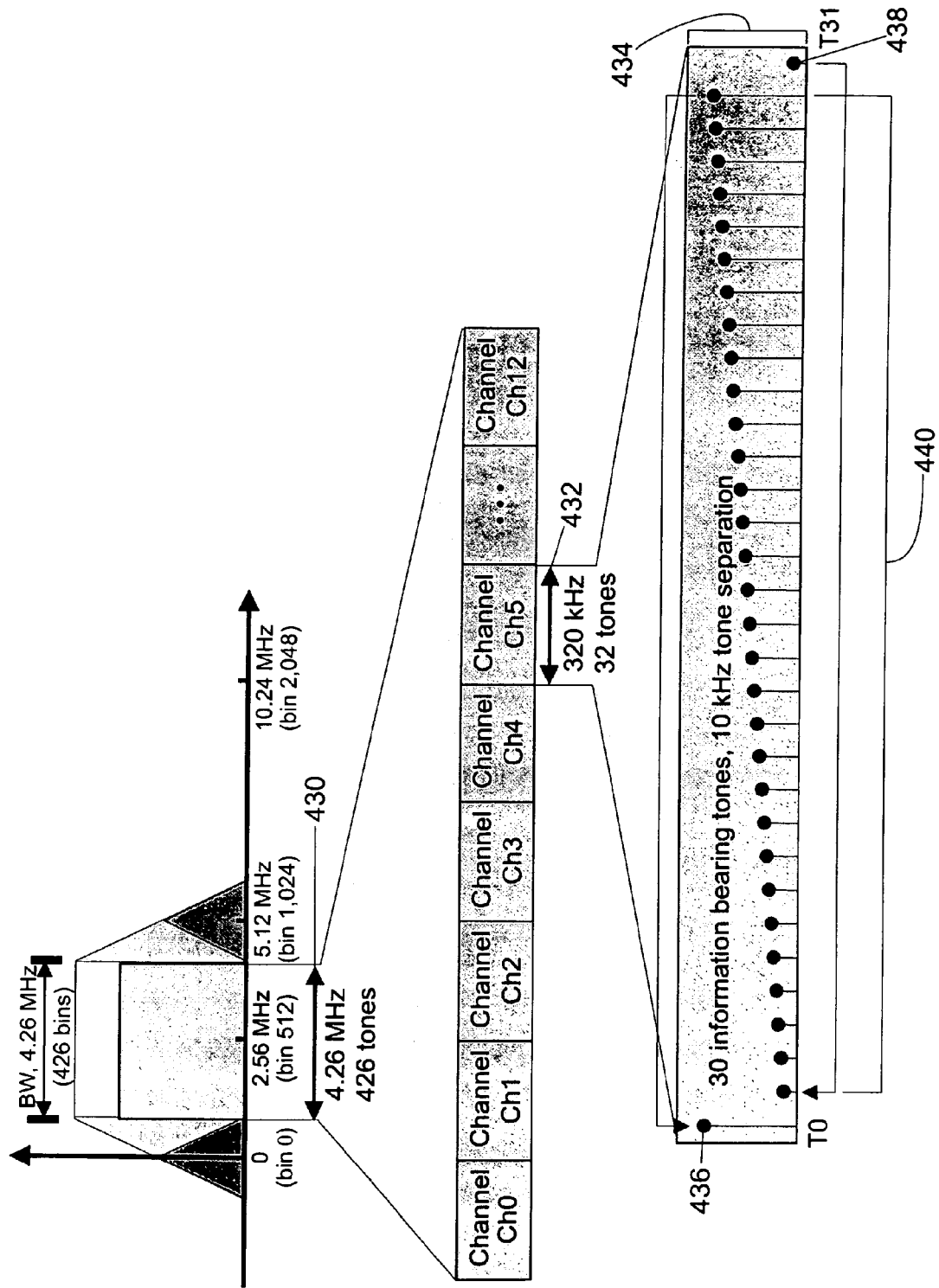
FIGS. 26 and 27 illustrate tone-mapping to frequency bins approaches for low and high mobility situations, respectively.
Figure 27:
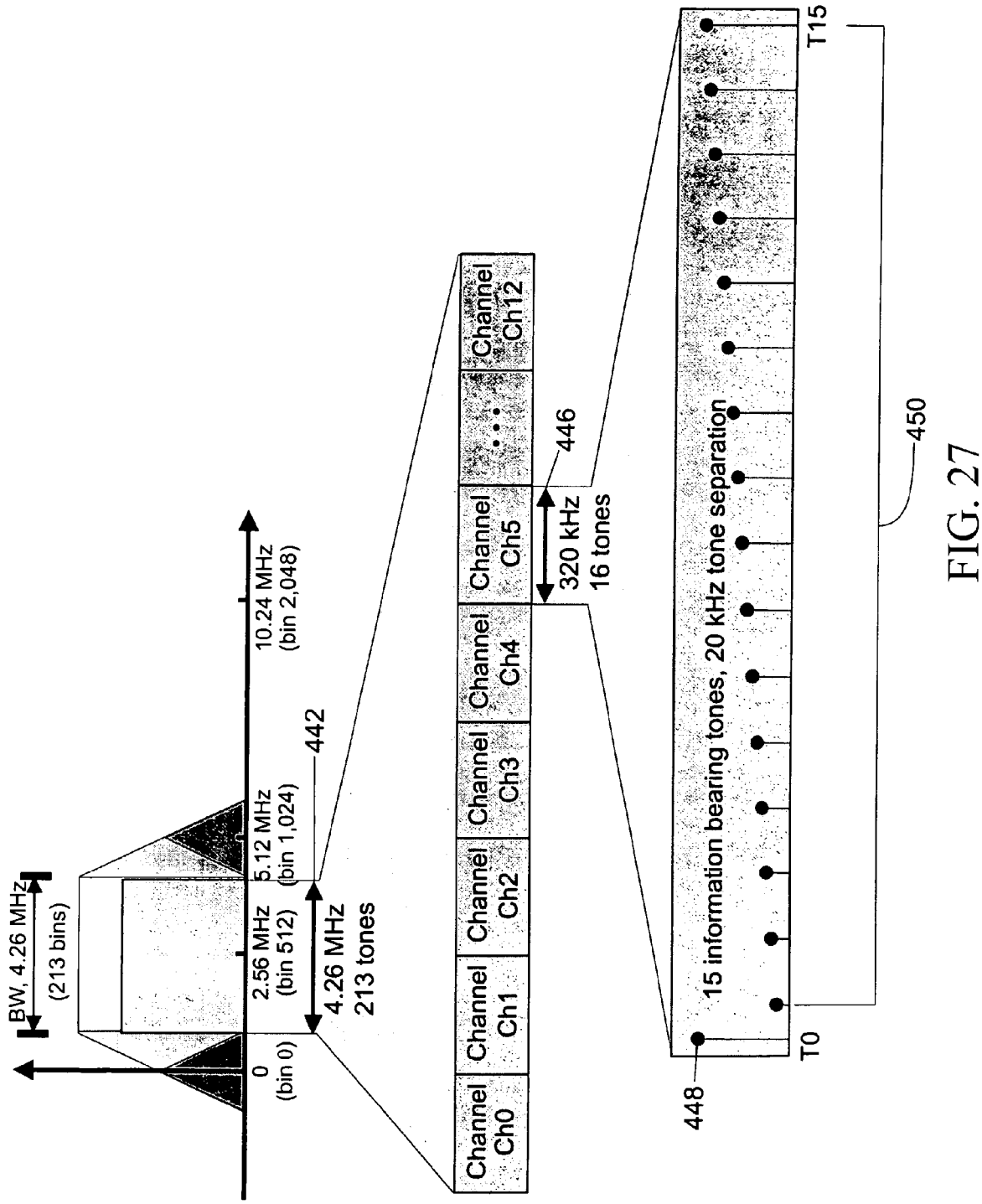

The 426 bins form 13 channels and 426 tones, (FIG. 26, Item 430), with each Channel forming 320 kHz and 32 tons (FIG. 26, Item 432), being further organized with an upper and lower guard tone (FIG. 26, Items 438 and 436, respectively) and 30 information bearing tones (FIG. 26, Item 440). An alternative embodiment for a high-mobility environment halves the numbers of tones and doubles the MHz, so there are only 213 bins (and tones) for 4.26 MHz (FIG. 27, Item 442), and each channel only carries 16 tones (FIG. 27, Item 446), with 1 being an guard tone (FIG. 27, Item 448) and fifteen being information-carrying tones (FIG. 27, Item 450).

For non-fixed embodiments, the timing modifications may be varied. The signal being processed is handed first to a MUX where an element-multiply with a Tx or Rx (for transmit or receive, respectively) window is performed. The guard time is retained to serve as dead time between signals, effectively punctuating them. The high-mobility embodiment halves the number of bins, doubling the average bin size, and uses duplication to increase QoS within the multitone. (FIG. 26.)

The next stage through the MIMO transceiver is the incorporation (on the transmission side) or interpretation (on the reception side) of the QAM/PSK symbols, prior to the signal's passing through the MIMO transceiver exits (if being transmitted) or enters (if being received) through a Link codec. Each FDMA channel will separate through the codec into 1 through M links, and each Link codec will incorporate tone equalization and ITI remove as necessary. The Link codec also includes SOVA bit recovery, error coding and error detection, and package fragment retransmission methodologies.

An optional alternative embodiment would at this point further include tone/slot interleaving (for the reception) or deleaving (for the transmission). A further optional alternative embodiment would replace the TCM codec and SOVA decoder with a Turbo codec.

Another optional alternative will incorporate dual-polarization. (See FIG. 25.) Fundamentally, this halves the modes and complexity of the transmissions and receptions, while doubling the capacity for any particular link/PA power constraint. In this alternative embodiment, the antennae array provides 1-to-(M/2) modes (RF feeds) for downconversion and demodularization. The Butler Mode Forming splits the modes into positive and negative polarities, where the negative polarization has the opposite, and normally orthogonal, polarization to the positive path. Preferentially the Butler Mode Forming works with circular polarizations. This alternative embodiment enables scalable DSP transmission and reception paths and renders the entirety fault tolerant to LNA/PA failures. At the last stage (for transmission; the first stage, for reception) the signal passes through a dual-polarized Link codec. That links the nodes over the dual polarizations, doubles the capacity under any particular link/PA power constraint, greatly reduces the codec complexity (and thus cost), and the link/PA power requirement for any particular link rate constant.

The Transceiver DSP backend for the preferred embodiment is detailed in FIG. 15. The Butler Mode Forming element with its RF transmission and reception leads, is controlled by the T/R switch control, which in turn is subject to the system clock and synchronization subsystem. An transmission signal (which can be continuous, periodic, triggered, human-determined, reactive, context-sensitive, data quality or quantity sensitive) that forms a Tx link message passes through a symbol encoder bank and into the circuitry where Delay/ITI/pilot gating are imposed, said circuitry being linked to its reciprocal for received signals. The transmission data symbols, over k channels, now pass through the multilink diversity distribution circuitry, where for each channel k transmission gains G(k) are adapted to the proper weighting, as determined by the multilink, LEGO gain adaptation element (with both algorithms and circuitry). From the multilink diversity distribution the transmission next is mapped over diversity modes and FFT bins, then handed to the transmission/reception compensation bank. Here, according to the perceived environment of transmissions and reception and the particular Transmission/Reception compensation algorithm used, the transmission is passed to the inverse frequency channel bank and, finally, into the Butler Mode Forming element. This Transceiver DSP backend also passes the information about the transmission signal from the compensation bank element to the synchronization subsystem.

Figure 32:
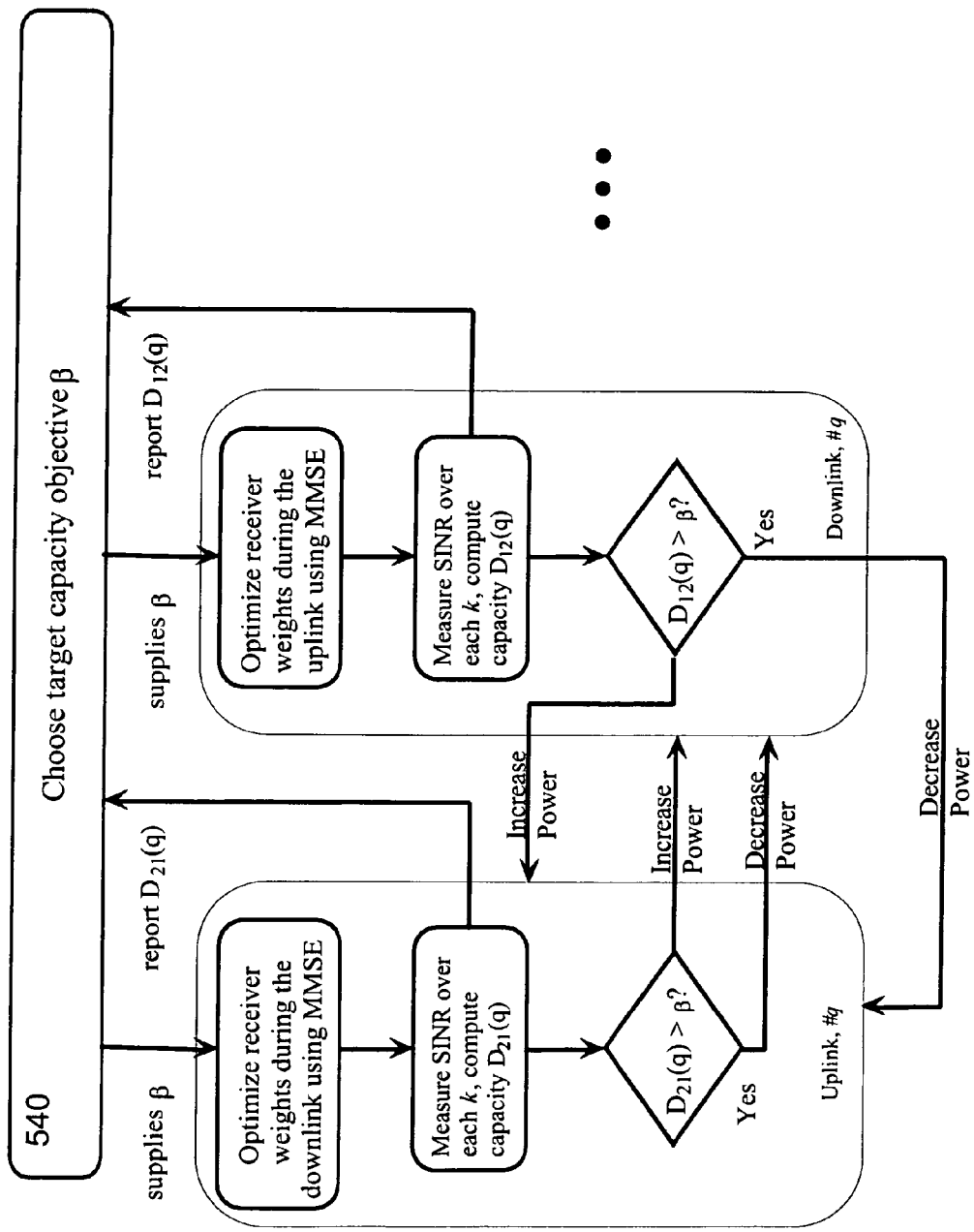
FIG. 32 illustrates the LEGO optimization function for a target capacity objective β.

The LEGO gain adaptation element at each node enables the network to optimally balance the power use against capacity for each channel, link, and node, and hence for the network as a whole. FIG. 32 discloses the fundamental form of the algorithm used.

A capacity objective β for a particular node 2 receiving from another node 1 is set as the target to be achieved by node 2. Node 2 solves the constrained local optimization problem:

$$\min_{\pi_1(q)} \sum_q \pi_1(q) = 1^T \pi_1 \text{ such that} \qquad \text{EQ. 3}$$

$$\sum_{q \in Q(m)} \log(1 + \gamma(q)) \geq \beta(m), \qquad \text{EQ. 4}$$

where $\pi_1(q)$ is the SU (user 1 node) transmit power for link number q,
$\gamma(q)$ is the signal to interference noise ratio (SINR) seen at the output of the beamformer,
$1\square$ is a vector of all 1s,
and $\square$
$\pi_1$ is a vector whose $q^{th}$ element is $p_1(q)$.

The aggregate set Q(m) contains a set of links that are grouped together for the purpose of measuring capacity flows through those links.

An example of this would be if SU had connections to multiple BSs, and we were primarily concerned with the total information flow into and out of a given node. In this case all of the links that connected to that node would be in the same aggregate set. Also in this description, we have adopted the convention that each transmit path from a transmitter to a receiver for a given narrow-band frequency channel is given a separate link number, even if the BS and SU are the same. Thus multiple transmit modes, that say exploit multipath or polarization diversity, are each given different link numbers, even though the source and destination nodes might be identical. Moreover, if a BS/SU pair transmit over multiple frequency channels, then each channel is given a separate link number. (This simplifies notation considerably.)

An example of this is shown in FIG. 19. The BSs are represented by circles and the SUs by triangles. Each arrow represents a communication link. The BSs and SUs can be dynamically combined into proper subsets of transmit uplink and receive uplink. The choice of aggregate sets can be arbitrary, provided no link is in multiple aggregate sets. However in a preferred embodiment, the aggregate sets are links that share a common node and hence common, readily available channel parameters.

The downlink objective function can be written as:

$$\min \Sigma_q \pi_2(q) = 1^T \pi_2 \qquad \text{EQ. 5}$$

such that $$\Sigma_{q \in Q(m)} \log(1 + \gamma(q)) \geq \beta(m) \qquad \text{EQ. 6}$$

The required feasibility condition, that $\Sigma_{q \in Q(m)} \pi_1(q) \leq R_1(m)$ is reported to the network, and in the preferred embodiment, reported to a network controller, so that β(m) can be modified as needed to stay within the constraints.

In an alternative embodiment, the capacity constraints β(m) are determined in advance for each aggregate set, based on known QoS requirements for given nodes or group of nodes. The objective function then seeks to minimize the total power in the network as suggested by EQ. 4.

By defining the noise normalized power transfer matrix by:

$$P_{rt}(q,j) = |w_r^H(q) H_{rt}(q,j) g_t(j)|^2 \qquad \text{EQ. 7}$$

where $w_r(q)$ is a receiver weight vector for link q, and, $g_t(j)$ is the transmit weight vector for link j.

By unit normalizing the receive and transmit weights with respect to the background interference autocorrelation matrix, the local model can state:

$$w_r^H(q) R_{i_r, i_r}(q) w_r(q) = 1, \text{ and } g_t^T(q) R_{i_r, i_r}(q) g_t^*(q) = 1 \qquad \text{EQ 52}$$

enabling the nodal model to express the SINR equation as:

$$\gamma(q) = \frac{P_{rt}(q,q) \pi_t(q)}{1 + \sum_{j \neq q} P_{rt}(q,j) \pi_t(j)} \qquad \text{EQ. 8}$$

Accordingly, a matrix condition can be defined on the range of possible output SINRs; and from this, $\pi_t$ has a feasible, that is non-negative solution, if and only if:

$$\rho(\delta(\gamma)(P_{rt} - \delta(P_{rt}))) < 1 \qquad \text{EQ. 9}$$

where ρ(M) is the spectral radius of a matrix M,
the non-negative power transfer matrix $P_{rt}$ has qj'th element given in EQ. 7,
δ(γ) is a diagonal matrix whose q'th element is γ(q)
and
$\delta(P_{rt})$ is a diagonal matrix with the same diagonal as $P_{rt}$.

The weight normalization in EQ. 52, and the assumption of reciprocal channel matrices leads to the reciprocity equation (EQ. 1), and the fact that the uplink and downlink objective functions in EQ. 3 and EQ. 4 are identical for the same target SINRs.

Various means for solving the optimization in EQ. 3 exist; the preferred embodiment uses a very simple approximation for γ(q), as very weak constraints to the transmit powers are all that are needed to yield objective functions which satisfy the reciprocity equation (EQ. 2).

Another approach can take advantage of the case where all the aggregate sets contains a single link, and we have non-negligible environmental noise or interference. For smaller networks, all the channel transfer gains in the matrices $P_{12}$ and $P_{21}$ are estimated and the transmit powers are computed as Perron vectors from:

$$D_{21} = \log\left(1 + \frac{1}{p(p_{21}) - 1}\right) \qquad \text{EQ. 10}$$
$$= \log\left(1 + \frac{1}{p(p_{12}^T) - 1}\right)$$
$$= D_{12}$$

In this case a simple power constraint is imposed upon the transmit powers, so that they remain feasible. The optimization is alternating directions, first the weights are optimized, then the powers are obtained from the Perron vectors, and the process is repeated.

Another embodiment assumes effectively that the denominator in Eq. 8 remains approximately constant even after changes to the power levels in other nodes in the network (hence the local optimization approach), because the beamformer weights in the network (transmit and receive) in the MIMO approach will attempt to cancel the co-channel interference in the network, making it insensitive to power level changes of the interferers. The denominator in Eq. 8 represents the post beamforming interference seen by the receiver associated with link q for the forward link (downlink) if r=1, and the reverse link if r=2.

With this approximation, and a rewriting of Eq. 8 (for the uplink) to:

$$\gamma(q) \approx \frac{P_{21}(q, q)\pi_1(q)}{i_2(q)} \quad \text{EQ. 11}$$

where $$i_2(q) = 1 + \sum_{j \neq q} P_{21}(q, j)\pi_1(j) \quad \text{EQ 12}$$

is the post beamforming interference energy, and is assumed constant for the adjustment interval for current transmit power values, the node can solve EQ. 3 in closed form using classic water filling arguments based on Lagrange multipliers. A similar equation is established for the downlink.

An alternative embodiment of Eq. 11 is to measure, provide, and use actual information for additional, available, or important terms in the denominator of Eq. 8 and to incorporate them into Eq. 12, and then rather than closed form use successive applications thereof to the modified problem using local data.

Another alternative embodiment is to solve, at each node, the constrained optimization problem:

$$\max_m \sum_{q \in Q(m)} \log(1 + \gamma(q)), \text{ such that} \quad \text{EQ. 13}$$

$$\sum_{q \in Q(m)} \pi_1(q) \leq R_1(m), \gamma(q) \geq 0 \quad \text{EQ. 14}$$

using the approximation in Eq. 11, which is a water-filling solution similar to that described above for Eq. 3. This solution requires a high-level network optimizer to control the power constraints, $R_1(q)$, to drive the network to a max-min solution.

The preferred embodiment, however, solves the local problem by attempting to minimize the total power as a function of the target output SINR. The output SINR will be the ratio of square of the channel transfer gain times the transmit power, divided by the interference power seen at the output of the beamformer, where:

$$\gamma(q) = |h^2(q)|\pi_1(q)/i_2(q) \quad \text{EQ. 15}$$

$$\gamma(q) = |h^2(q)|\pi_2(q)/i_1(q) \quad \text{EQ. 16}$$

where $|h(q)|^2$ is the square of the channel transfer gain, $\pi_1(q)$ is the transmit power for link q during the reverse link or uplink transmission, $\pi_2(q)$ is the transmit power for link q during forward link or downlink transmission, $i_1(q)$ is the interference power seen at the output of the beamformer used by the SU associated with link q, and, $i_2(q)$ is the interference power seen at the output of the beamformer used by the BD associated with link q.

This makes the output SINR a function of all the transmit powers at all the other SUs in the network. Additionally, by normalizing the beamforming weights with respect to the background interference, it is possible to maintain the reciprocity equation even in the presence of arbitrary interference and noise, due to non-cooperative signal sources, such as jammers or co-channel communication devices. Maximizing the SINR yields optimal receiver weights that can remove the effect of jammers and co-channel interferers. The reciprocity equation insures that the optimal transmit weights puts substantive nulls in the direction of these same co-channel interferers. For military applications, this implies that the network reduces it's probability of detection and interception, and for co-channel communication systems, it reduces it's transmitted interference, and is effectively a 'good neighbor' permitting system deployment in otherwise unacceptable environments. Commercially, this allows a network employing the present embodiment of this invention to cope with competitive, impinging, wireless network nodes and transmissions.

It can be shown that there is a 1-1 mapping between all the transmit powers and all of the output SINRs, i.e. there exists a vector valued function $F_1$ such that $F_1(\gamma) = \pi_1$.

The function has an inverse so that $F_1^{-1}(\pi_1) = \gamma$. A key result that is exploited by this embodiment is the fact that if the channels are reciprocal, then the objective functions, and the constraint set imposed by (1) is identical as a function of $\beta$ for both the uplink and downlink objective functions. Mathematically this means these objective functions can be stated in general terms as:

$$f(\gamma) = 1^T F_1(\gamma) = 1^T F_2(\gamma) \quad \text{EQ. 17}$$

where $\pi_2 = F_2(\gamma)$ is the mapping between the SINRs and the BS transmit powers.

In the preferred embodiment, each node uses the above as it defines and generates its local model as follows:

Given an initial $\gamma_0$ generate the model, $$L(\gamma, g, \beta) = g^T \gamma \quad \text{EQ. 20}$$

$$\Sigma_{q \in Q(m)} \log(1 + \gamma(q)) \geq \beta(m) \quad \text{EQ. 21}$$

$$g = \nabla_\gamma f(\gamma_0) \quad \text{EQ. 22}$$

where L ($\gamma, g, \beta$) is a linearized model of the objective function, $g^T \gamma \square$ is an inner product between the gradient of the objective function and a set of target SINRs, $\Sigma_{q \in Q(m)} \log(1+\gamma(q)) \geq \beta(m) \square$ is the capacity constraint for aggregate set m, and, $g = \nabla_{65} f(\gamma_0)$ is the gradient of the objective function (the total transmit power) as a function of the target SINRs.

The new $\gamma_\alpha$ is updated from $$\gamma_* = \arg\min_\gamma L(\gamma, g, \beta) \quad \text{EQ. 23}$$

$$\gamma_\alpha = \gamma_0 + \alpha(\gamma_* - \gamma_0) \quad \text{EQ. 24}$$

The constant $\alpha$ is chosen between 0 and 1 and dampens the update step of the algorithm. This determines a target SINR that the algorithm adapts to. The update for the transmit power for link q becomes, $$\pi_2(q) = \gamma_\alpha i_1(q)/h(q)^2 \quad \text{EQ. 25}$$

$$\pi_1(q) = \gamma_\alpha i_2(q)//h(q)^2 \quad \text{EQ. 26}$$

Where $i_1(q)$ and $i_2(q)$ are the post beamforming interference power seen at the SU and the BS respectively for link q.

The present embodiment of this invention uses advantageously the fact that the $q^{th}$ element of the gradient of the objective function can be written as the product of the interference powers divided by the square of the transfer gain:

$$\{\nabla_\gamma f(\gamma_0)\}_q = i_1(q)i_2(q)//h(q)|^2 \quad \text{EQ. 27}$$

The transmit power update relationship in Eq. 25 and Eq. 26 can be applied repeatedly for a fixed feasible $\gamma_\alpha$ and the convergence of $\pi_1 \to F_1(\gamma_\alpha)$, is guaranteed. In fact some assert this convergence will be guaranteed if we optimize the receive weights at each iteration. (See Visotsky, E; Madhow, U, "Optimum Beamforming Using Transmit Antenna Arrays", Vehicular Technology Conference, 1999 IEEE 4$^{th}$, Volume 1, pp 851-856, though he only considered the effects in a Rank 1 channel, that is a single narrowband rather than a MIMO channel.) A similar statement holds for $\pi_2 \rightarrow F_2(\gamma_\alpha)$. In an alternative embodiment where the proper relationship is unknown, or dynamically changing, then a suitably long block of N samples is used to establish the relationship, where N is either 4 times the number of antennae or 128, whichever is larger, with the result being used to update the receive weights at each end of the link, optimize the local model in Eq. 23 and Eq. 24, and then apply Eq. 25 and Eq. 26.

The algorithm used in the preferred embodiment enables the network, and local nodes thereof, to attain several important results. First, for each aggregate set m, the optimization of the local model(s) at each node(s) completely decouples the network optimization problem to an independent (set) of local problem(s) that is solved among the aggregate set links. Accordingly, within a given aggregate set, we inherit the network objective function model:

$$L_m(\gamma, g, \beta) \equiv \Sigma_{q \in Q(m)} g_q \gamma(q) \qquad \text{EQ. 28}$$

$$\Sigma_{q \in Q(m)} \log(1+\gamma(q)) \geq \beta(m) \qquad \text{EQ. 29}$$

$$g_q = i_1(q) i_2(q) / |h(q)|^2 \qquad \text{EQ. 30}$$

where $L_m (\gamma, g, \beta)$ is the sum of the separable, linearized, objective functions corresponding to the aggregate set number m, where each localized objective function depends only on variables that pertain to the given aggregate set, $g_q \gamma(q)$ is the product of the q'th element of the gradient vector with the SINR for link q, $g_q$ is the q'th element of the gradient vector, and, $|h(q)|^2$ is the square of the channel transfer gain from the transmit beamformer, through the channel to the output beamformer (not including the transmit power).

Second, this approach eliminates matrix channel estimation as a necessary step, as solving the local problem only requires that an estimate of the post beamforming interference power, a single real number for each link, be transmitted to the other end of the link, or in another embodiment to the node assigned to computing the transmit powers for a given aggregate set. For each link, a single real number, the transmit power, is then propagated back to the transmitter. This is true even for networks with large rank MIMO channel matrices.

Third, the optimization problem, which is stated in general terms in Eq. 17, when you plug in a formula for $\pi$ as a function of $\gamma$ into the objective function, i.e. $1^T F_r(\gamma)$ for the SINR to power mapping $F_r(\gamma)$, is reduced from a complex and potentially unsolvable problem to one that has a simple closed form solution, and thus can use a well known water filling problem seen in classical information theory (see T. Cover, T. Joy, *Elements of Information Theory*, Wiley; 1991); Matthew Bromberg and Brian Agee, "The LEGO approach for achieving max-min capacity in reciprocal multipoint networks," in *Proceedings of the Thirty Fourth Asilomar Conf. Signals, Systems, and Computers*, October 2000.

Fourth, even when starting from non-feasible starting points, the algorithm rapidly converges; in the preferred embodiment, where all parameters are updated after every receive block, it converges to a fixed point within the vicinity of the optimal solution; and in an alternative embodiment, where the $\gamma_\alpha$ vector is held fixed until $\pi_1 \rightarrow F_1(\gamma_\alpha)$ and $\pi_2 \rightarrow F_2(\gamma_\alpha)$ before updating the weights and updating $\gamma_\alpha$ again.

Figure 34:
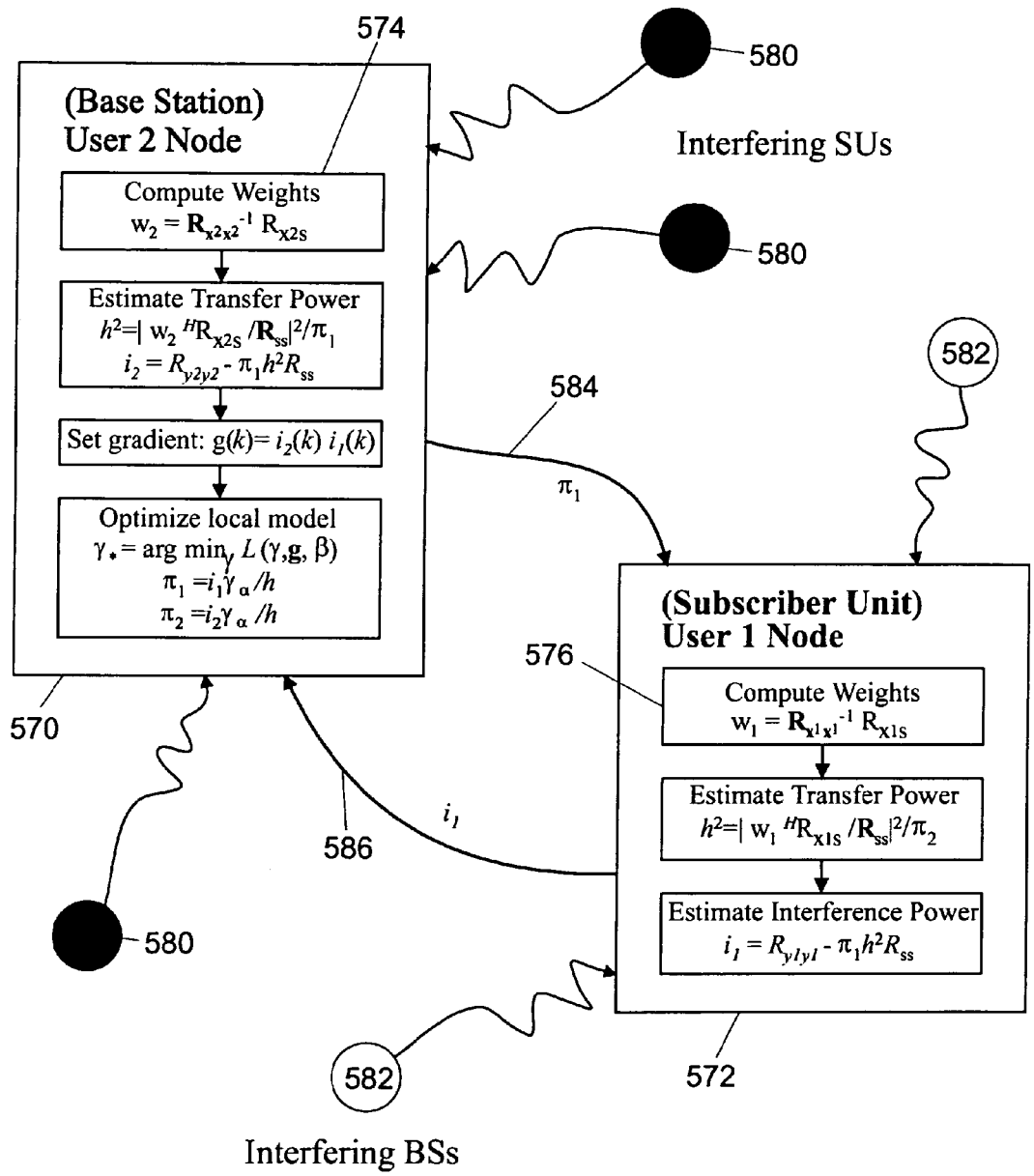
FIG. 34 illustrates two nodes using dynamic, feedback driven information from transmissions and receptions to perform a particular LEGO optimization, involving observed interference power from non-subset or non-network BSs (528) or SUs (580).

A figure illustrating the computational tasks at the BS and the SU for a given link q is shown in FIG. 34. It is assumed that the BS is assigned the task of computing the transmit gains for this particular example. The figure shows that only two numbers are transferred from the BS to the SU and from the SU to the BS. The basic computational tasks at each node are also shown.

In the preferred embodiment, only one side of the link need perform the power management computations. One of the principle advantages and strengths of the present embodiment of the invention is that it replaces half of the prior art's explicit, dual computations with an implicit computation that is performed by the physical transmission of data, which generates the real-world interference (and thus interference values) used by the power control algorithm.

The estimation of the transfer gains and the post beamforming interference power is done efficiently in the preferred embodiment with simple least squares estimation techniques.

The problem of estimating the transfer gains and the post beamforming interference power (in the preferred embodiment, by using a least squares algorithm) is equivalent to solving for the transfer gain h as follows:

$$y(n) = hgs(n) + \epsilon(n) \qquad \text{EQ. 31}$$

where y(n) is the output of the beamformer at the time sample, $h \approx w^H_r(q) H_{21}(q,q) g_r(q)$, whose square modulus is $P_{rr}(q,q)$, $w_r(q)$ is the receive weight vector for link q, $g_t(q)$ is transmit weight vector for link q, g is the square root of the transmit power $\pi_t(q)$, s(n) is the transmitted complex symbol at time sample n, and $\epsilon(n)$ represents all of the remaining co-channel interference and noise. (Indexing is dropped to avoid clutter.) Then $\gamma(n)$ is defined as the output after applying the unit normalized despread weights to the received data. This is simply the usual beamformer output divided by the norm of the despread weights with respect to the noise covariance matrix; and for many applications, this will be a scaled multiple of the identity matrix.

Using a block of N samples of data, h is then estimated as:

$$h = \frac{\sum_{n=1}^{N} (n) \gamma(n)}{\sum_{n=1}^{N} |s(n)|^2 g} \qquad \text{EQ. 32}$$

where h is the channel transfer gain,

S*(n) is the conjugate of s(n), y(n) is the output of the beamformer at the time sample n, and, s(n) is the transmitted complex symbol at time sample n.

From this an estimation of the residual interference power, $R_\epsilon$, which is identified with $i_1(q)$ in Eq. 11 by:

$$R_\epsilon = \langle |\epsilon(n)|^2 \rangle = \frac{1}{N} \sum_{n=1}^{N} (|y(n)|^2 - |ghs(n)|^2). \qquad \text{EQ. 33}$$

where gh is the product of the transmit gain and the post-beamforming channel gain.

The knowledge of the transmitted data symbols s(n) in the preferred embodiment comes from using remodulated symbols at the output of the codec. Alternative embodiments use the output of a property restoral algorithm used in a blind beamforming algorithm such as constant modulus or constellation restoral, or by using a training sequence explicitly transmitted to train beamforming weights and asset the power management algorithms, or other means known to the art. This information, and the knowledge of the data transmit power values $\pi_1(q)$ will be at the receiver and can be transmitted to the transmitter as part of a data link layer message; and if the processing occurs over fairly large blocks of data the transfer consumes only a small portion of the available bandwidth. Means for handling the case when a transmit mode is shut off, so that one of the $\pi_1(q)=0$, include removing the index (q) from the optimization procedure and making no channel measurements.

Figure 33:
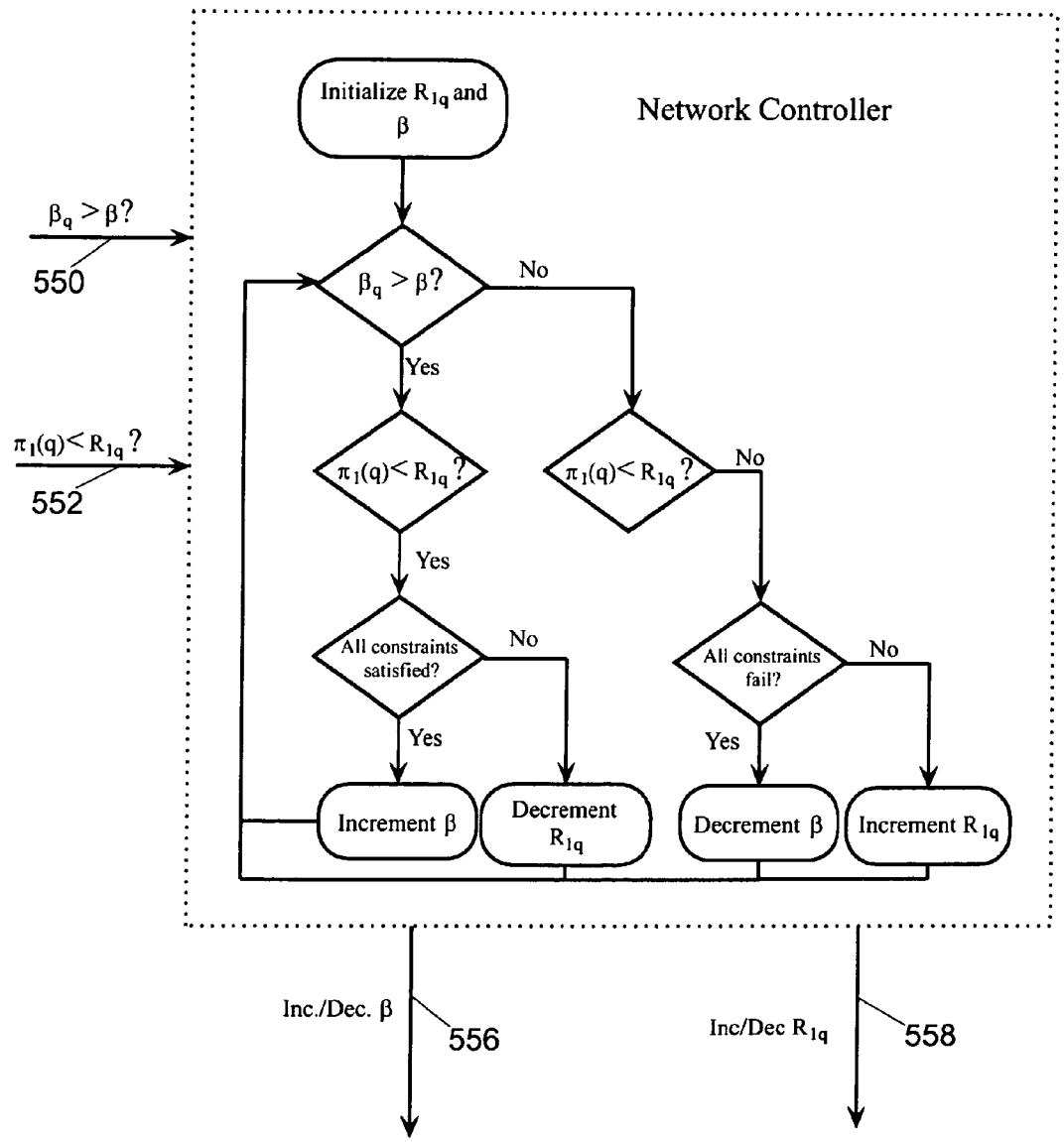
FIG. 33 illustrates the network LEGO optimization function for a network controller, using constraint $R_{1q}$ and target objective β, to determine for the network or node which should be incremented or decremented.

In the preferred embodiment, a link level optimizer and decision algorithm (See FIGS. 32A and 32B) is incorporated in each node; its inputs include the target and the bounds for that node, and its outputs include the new transmit powers and indications to the network as to how the node is satisfying the constraints. FIG. 33 indicates a decision algorithm used by the link level optimizer.

In an alternative embodiment, the solution to Eq. 3 is implemented by using a variety of Lagrange multiplier techniques. In other alternative embodiments, the solution to Eq. 3 is implemented by using a variety of penalty function techniques. All of these embody techniques known to the art for solving the local problem. One such alternative takes the derivative of $\gamma_{(q)}$ with respect to $\pi_1$ and uses the Kronecker-Delta function and the weighted background noise; in separate alternative embodiments, the noise term can be neglected or normalized to one. An approximation uses the receive weights, particularly when null-steering efforts are being made, and as the optimal solution will have weights that approach the singular vectors of the interference-whitened MIMO channel response. In the situation where the links of a given aggregate set Q(m) are all connected to a single node in the network, all information pertaining to the subchannels and propagation modes of the MIMO channel associated with that node are available, hence the norm squared transfer gain $P_{21}(q,q)$ is available for all $q \in Q(m)$ from the processing used to obtain the MMSE receive beamforming weights.

In the preferred embodiment, adaptation of the power is done in a series of measured and quantized descent steps and ascent steps, to minimize the amount of control bits that need to be supported by the network. However, in an alternative embodiment, a node may use more bits of control information to signal for and quantize large steps.

Various alternative methods can be used to develop the local model for each node. The preferred embodiment's use of measured data (e.g. function values or gradients) to develop the local model valid in vicinity of the current parameter values, is only one approach; it can, however, be readily optimized within the node and network. The usual model of choice in prior art has been the quadratic model, but this was inadequate as elements of the functions are monotic. One alternative embodiment is to use a log-linear fractional model:

$$\beta_q \approx \log\left(\frac{a\pi_1(q) + a_0}{b\pi_1(q) + b_0}\right) = \hat{\beta}_q(\pi_1(q)) \quad \text{EQ. 34}$$

where $\beta_q$ is the achievable bit capacity as a function of the transmit gains $\pi_1(q)$; and to characterize the inequality $$\hat{\beta}_q(\pi_1(q)) \geq \beta \quad \text{EQ. 35}$$

with a linear half-subspace, and then solving the approximation problem with a simple low dimensional linear program.

Another alternative embodiment develops the local mode by matching function values and gradients between the current model and the actual function. And another develops the model as a solution to the least squares fit, evaluated over several points.

Because of the isolating effect of the transmit and receive weights the fact that the transmit weights for the other nodes in the network may change mitigates the effect on the local model for each node. Yet another alternative broadens the objective function to include the effect of other links in the network, viewing them as responding to some extent to the transmit values of the current link q. A finer embodiment reduces the cross-coupling effect by allowing only a subset of links to update at any one particular time, wherein the subset members are chosen as those which are more likely to be isolated from one another.

In the preferred embodiment, and as shown in the figures, Node 2 optimizes the receiver weights during the uplink (when sending) using a MMSE function; then measures the SINR over all paths k for a particular channel q, and informs the sending node 1 both of the measured capacity for channel q, that is, ($D_{12}(q)$) and, if the measured capacity experienced for that channel is too high, to lower the power, or, if the measured capacity for that channel is too low, to increase the power, with the power increase or decrease being done by small, discrete increments. Node 2 then sets, for that channel, the transmit weights to the receive weights and repeats this sub-process for the downlink case. By successive, rapid iteration node 2 rapidly informs node 1 of the precise transmission power needed at node 1 to communicate over channel q with node 2.

This process is performed for every channel q which is active at node 2, until either the target capacity is attained, or the capacity cannot be improved further. It is also repeated at every node in the network, so node 1 will be telling node 2 whether node 2 must increase or decrease the power for node 2's transmissions to node 1 over channel q.

In an alternative embodiment, the network contains one or more network controllers, each of whom govern a subset of the network. The network controller initiates, monitors, and changes the target objective (in the preferred alternative embodiment, capacity) for the set of nodes it governs and communicates the current objective to those nodes and the rest of the network as necessary. (See FIG. 33.) Different sub-networks can use different capacity objectives depending on each network's localized environment (both external and internal, i.e. traffic density).

The network controller, once it has initialized the reciprocal set and objective continually monitors the network of nodes it governs, continually compares if the desired capacity has been reached, and for each node n, perform a fitting function. (See Figure LE2) If a node n is compliant with the power constraints and capacity bound, then $R_1(n)$ should be reduced by a small amount; but if node n has both power constraints and capacity violations than $R_1(n)$ should be incremented for that node. These increments and decrements are preferably quantized to fixed small numbers. In an alternative embodiment of the invention the scalar and history of the increments and decrements are recorded to feed into experientially modified approximations, effectively embodying a real-world adaptation learning for each node.

One important consequence of this approach is that compliance with any network constraint or objective can be conveyed with a single bit, and increment or decrement with two bits, thereby reducing the control overhead to a minimum.

From the Butler Mode Forming element received signals are first passed through the frequency channel bank, then mapped to the FDMA channels. The received data on channel k will be passed through both the Multilink Receive weight adaptation algorithm and the Multilink diversity combining, Receive weights W(k) element, which in turn both feed into the Multilink LEGO gain adaptation algorithm and thus feedback into the multilink diversity distribution element for outgoing transmissions. The Multilink Receive weight adaptation algorithm passes the adapted data from channel k over to the Multilink Diversity combining, Receive Weights W(k) element passes on the signal to both the circuits for the Equalization algorithm and the Delay/ITI/pilot-gating removal bank, that strips out the channel-coordinating information and passes the now combined signal to the symbol decoder bank to be turned into the information which had been sent out from the originating transceiver, the inverse process, generally, from the symbol encoding at the transmission end.

Figure 21:
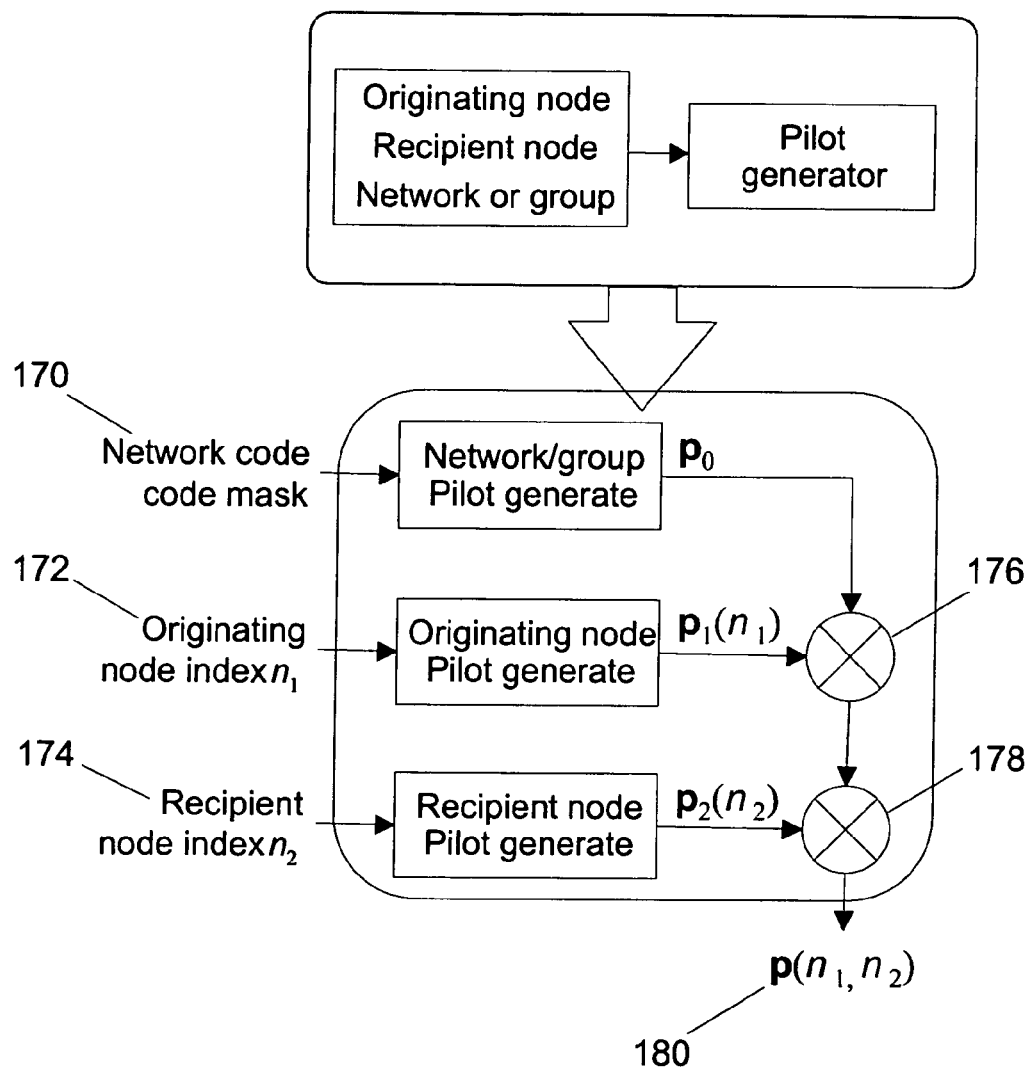
FIG. 21 illustrates the means for generating the pilot tone mask with network code mask pseudodelay (Item 170), originating node index mask element (Item 172), and Recipient node index mask element (Item 174) being combined by two element-wise MUX units (Items 176, 178), to create the final pilot tone signal (Item 180).

These Signal Encoding Operations are graphically displayed in FIG. 21. (Because the decoding is both the inverse and well enough known, given a particular encoding, to be within the state of the art for any practitioner in the field, there is not a for the inverse, Symbol Decoding Operations.) A given signal, such as an IP datagram, is formed into a fragment and passed along to a MUX element. (Any signal which can be equated to or converted into an IP datagram, for example an ATM, would either be converted prior to this point or handled similarly.) The desired MAC header data, which in one alternative embodiment is optionally time-stamped, is also fed into the same MUX element where the two combine. This combined signal now passes through a CRC generator as well as feeding into a second MUX that combines the CRC output with it. Next, the signal passes into an encryption element that also performs trellis encoding. (In an alternative embodiment one or both of these operations are eliminated, which reduces the transceiver's hardware and software complexity but decreases the network's security and reliability.) (For more information on the alternative use of Trellis coded modulation, see, Boulle, et al., "An Overview of Trellis Coded Modulation Research in COST 231", IEEE PIMRC '94, pp. 105-109.) The now-encoded signal is next passed to the element where it is mapped to the individual tones and the MT symbols, and where buffer tones and time and frequency interleaving is done. A second, optional, delay preemphasis signal element, and a third signal element from a pilot generator, taking input from the originating node, recipient node, group, or network, or any combination or sub-combination thereof, now are combined with the signal from the mapping element in a MUX. This MUX may use the first two slots for a pilot without modulation by the information tones, using the remaining slots for the pilot modulated by the information tones to further harden the pilot/signal combination. An alternative embodiment would at this point further pass the transmission signal through an ITI pre-distortion element; otherwise, the now-encoded, piloted, and mapped transmission signal is ready.

Figure 28:
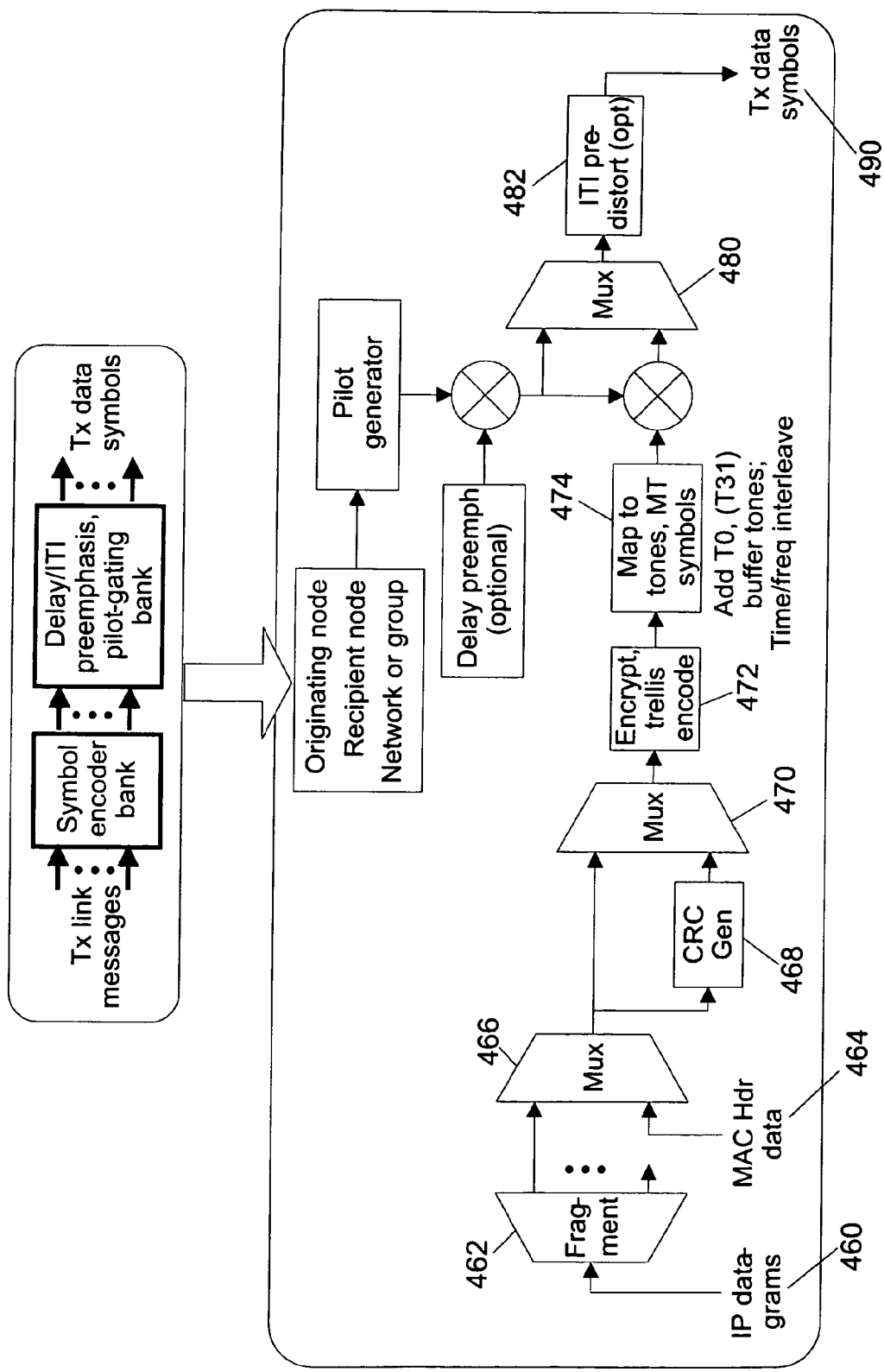
FIG. 28 illustrates in more detail the implementation of the Delay/ITI preemphasis, pilot-gating bank, tying the details of FIG. 21 into the mapping element (Item 474), the Trellis encryption and encoding element (Item 472), the pilot signal and information signal MUX (Item 480), leading to the final Tx data symbols signals (Item 490).
Figure 29:
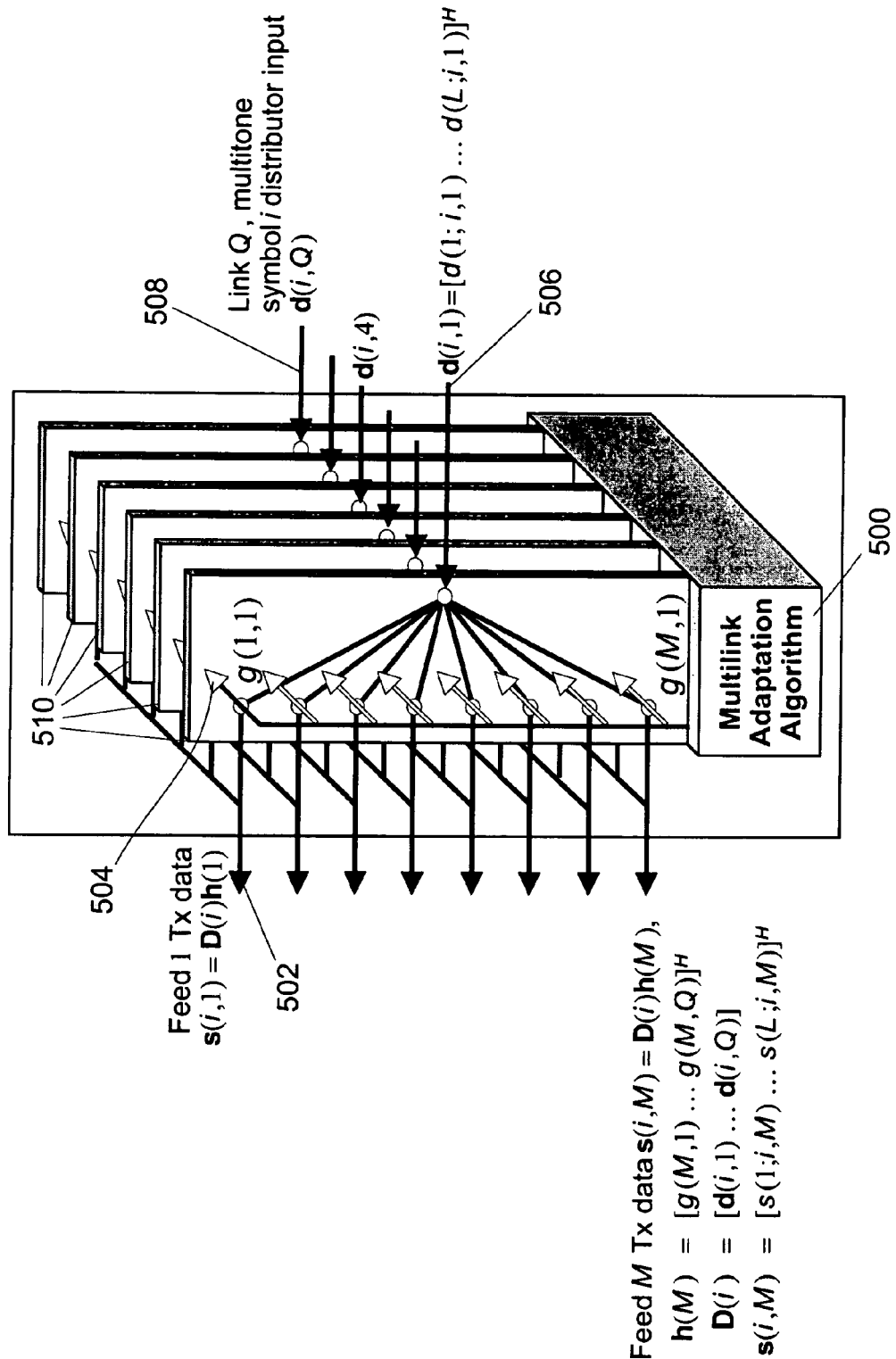
FIGS. 29 and 30 illustrate the antennae feeds (502, 512) across diversity modes and multilinks through the Multilink Adaptation Algorithm element (500) to and from the Link and multitone symbol distributor/combiner inputs and outputs (506, 508; and 516, 518 respectively).

Pilot tone generation, summarily disclosed on FIG. 21, is further detailed in FIG. 28. Information concerning one or more of the originating node, recipient node, and network or group channel organization flow into a pilot signal generator, and the resulting pilot signal is further modified by a network code mask. This multilayer mask then is used to form a signal with a pseudorandom sequence that is shared by all nodes in the same network or group, though the sequence may vary over channels and MT symbols to allow further coordination amongst them at the receiving end. Passing on the signal is modified in an element-wise multiplication (typically a matrix operation, embedded in hardware) by a signal that indexes on the originating node, which in an optional variation includes a nodal pseudodelay, unique to that node in the network or group, which overlay again may vary over channels and frames to improve security. The originating node index overlay is a complex, exponential phase ramping. The combined signal now mixes with a recipient node index, another pseudorandom sequence that is unique to the recipient node, modifying the whole in a second element-wise multiplication. Thus the final pilot tone reflects the content signal, modified to uniquely identify both the originating node and its context, and the receiving node and its context, effecting a signal composition that allows the network to pilot the communication through the network from origin to destination regardless of the intervening channels it takes.

Figure 30:
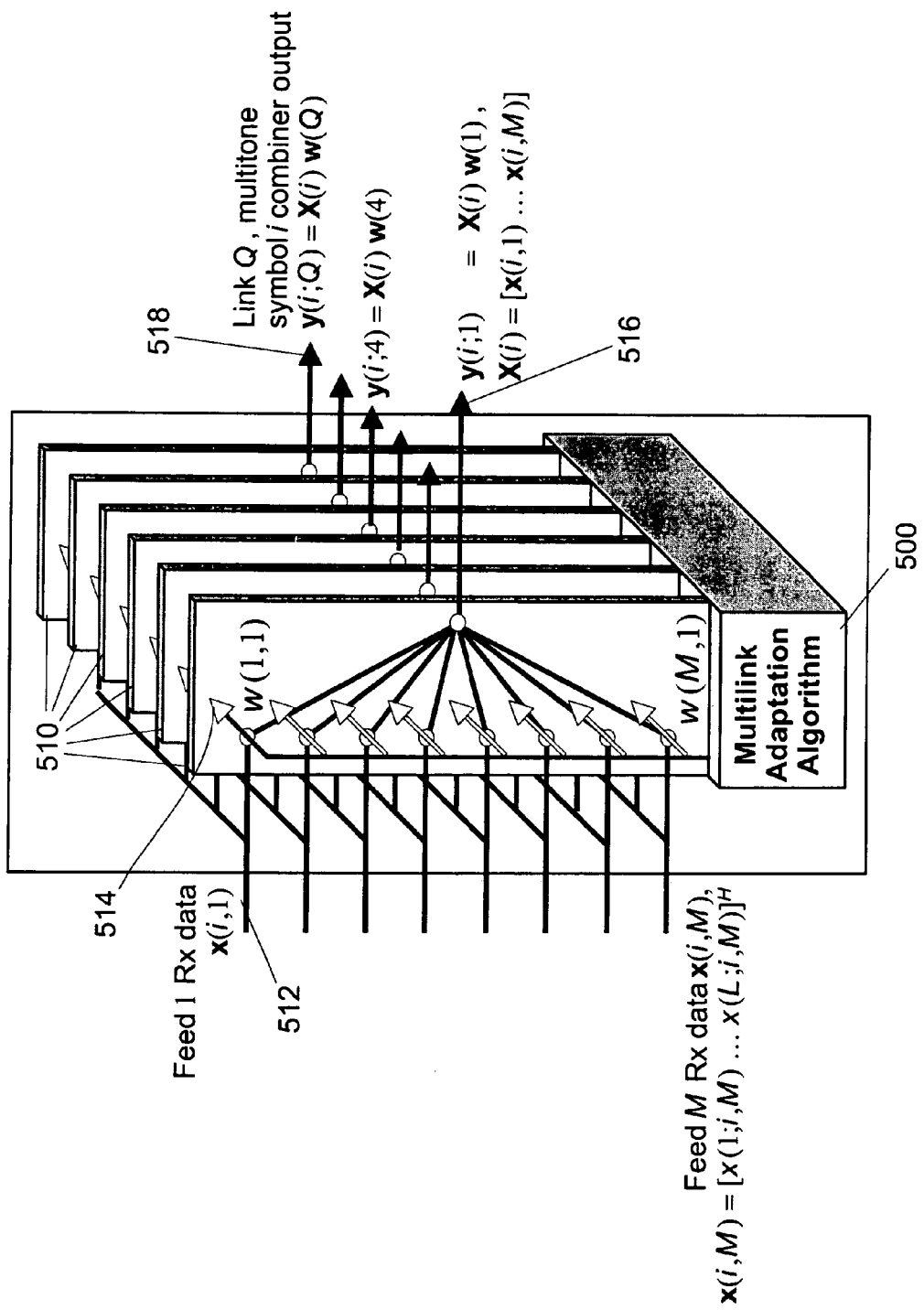
Figure 31:
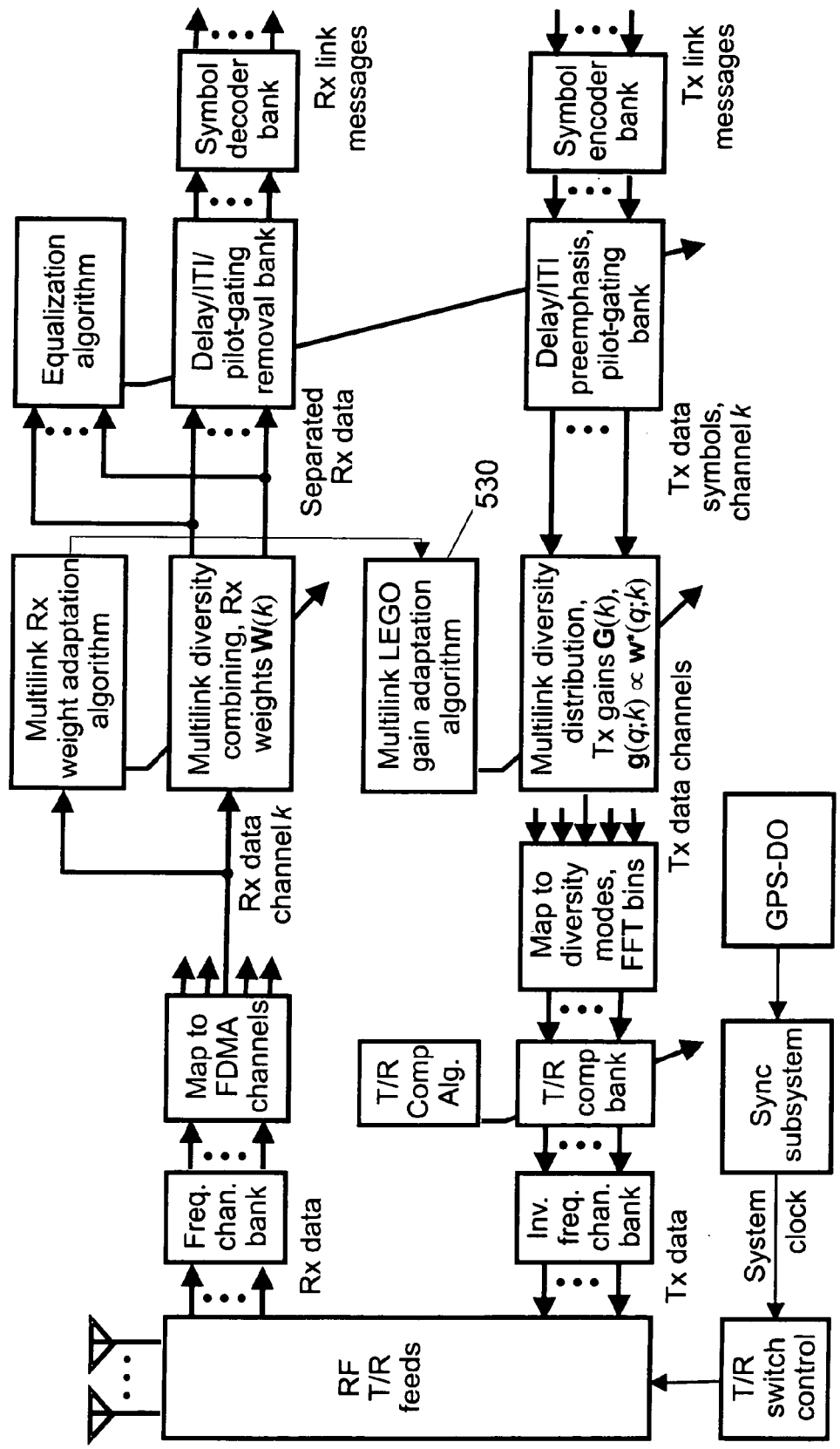
FIG. 31 illustrates the incorporation of the preferred embodiment of the Multilink LEGO gain adaptation algorithm and element (Item 530) into the diversity combining and distribution elements of the MIMO transceiver hardware.

When a communication is transmitted, it will be received; and the MIMO reception is, like the transmission, adaptive. See FIG. 30, detailing the logical processing involved. Received data passes through both a Multilink weight adaptation algorithm and (to which that part is combined) a Multilink diversity combining of the Reception weights. This reweighted transmission now passes through the equalization algorithm and (to which that is combined) a Delay/ITI/pilot-gating removal bank stage. These sort out the properly weighted tones, perform the recombinations, and undo the pilot-gating distortion to effectively reassemble at the reception end the symbol pattern of the original signal. That now passes through a symbol decoder bank to recover the message from the symbolic representation and the whole now is joined with the other received and linked messages for final reassembly. The functional and firmware processing (fixed logic hardware, limited purpose firmware, or combined software, processors and circuitry). The received symbol $X(i,1)$, comprising a matrix combination of L Link and M multitone elements, is first modified by the pilot tone generator that sends the recipient node, network, and group modifications for an element-wise reverse multiplication, to strip off that component of the signal and identify if the received symbol is from any originating source trying to send to this particular recipient. If the recipient pilot signal matches, then the signal passed on to a circuit that separates the pilot signal elements from the data signal elements. The pilot signal elements are passed through a link detection circuit that preferentially uses a FFT-LS algorithm to produce link quality statistics for that particular received transmission, identifies the weighting elements that were contained in the pilot signal and passes those over to the multilink combination circuit, and sends the pilot weights over to the circuit for equalizing weight calculations. The data signal, combined with the pilot weighting elements, now is combined with the equalizer calculated factors to strip off all pilot information from the traffic data. Next, the re-refined traffic data passes through a link demodulator to produce the original channel-by-channel link streams of data. In an alternative embodiment, the first channel, which has been reserved for decryption, decoding, and error detection signaling, not passes through the ITI correction circuitry and thence to the instantiated decryption, decoding, or retransmission circuitry as indicated by the data elements of the first channel signal; meanwhile, the remaining data channel elements are available, having been refined from the combined received elements.

A MIMO transceiver contains and uses simultaneously a multiple of single RF feeds. A signal passes between the Butler Mode Forming element and a Band Pass Filter, or preselection, element, and then between the Band Pass Filter element and the Transceiver switch. If the signal is being transmitted, it goes through a Low Noise Amplifier element and then back into the Transceiver switch; if the signal is being received, it goes through a Phase Amplifier and back into the Transceiver switch. The signal passes between the Transceiver switch and the Frequency translator, and then back into the Transceiver switch.

In the Frequency translator (FIG. 25), the signal passes through a second Band Pass Filter with a Surface Acoustic Wave (SAW) Frequency greater than three, then between that second Band Pass Filter and a first mixer, where it will be mixed (or unmixed, depending on direction) with (or by) another waveform which has come from the timing element(s), which may be any of the system clock, synchronization subsystem, and GPS time transfer, or their combination. The combined timing and content signal passes between the first mixer and a SAW element where it is combined (or separated) with a saw frequency of less than or equal to 1.35 times that of the signal. The SAW-modified signal passes between the SAW element and a second mixer, where the saw-modified signal is mixed (or unmixed, depending on direction) by the waveform which also has come from the timing element(s) mentioned above. The signal passes between the second mixer and the LPF element with a SAW Frequency greater than three; the next transition is between the frequency translator and the Transceiver switch. Depending on the direction of the signal, it passes between the Transceiver switch and the ADC element or the DAC element (the ADC and DAC together are 'the converter elements') and the Transceiver switch, and between the ADC element and the FFT/IFFT element or between the FFT/IFFT element and the DAC element. Both the DAC and ADC elements are linked to and governed by the system clock, while the signal's passage through the Transceiver switch and the other elements (LNA or PA, Frequency Translator, and between the Transceiver switch and the converter elements, is governed by the Switch Controller element. This approach is used because the Frequency Translator can be implemented as a single piece of hardware which lowers the cost of the overall unit and lessens the signal correction necessary.

Different multitone formats are used at different transceivers, thereby enabling ready distinction by and amongst the receivers of the transmitter frequency tone set. For fixed transceivers (BS or fixed SU), rectangular windows with cyclic prefixes and/or buffers are used; for mobile transceivers, non-rectangular windows and guard times are used. This provides the network with a capacity fall-back as the network environment and traffic dynamics vary. In the preferred embodiment the guard times are matched to the cyclic prefixes and buffers, the multitone QAM symbols are matched at all windows, and the different windows and capacity are used in different modes.

The multitone (multifrequency) transmission that occurs between every pair of nodes when they form a communications link exploits the multipath phenomena to achieve high QoS results. Each node, when it is acting as a receiver, optimizes the receive weights, using the MMSE technique. This goes directly against Varanesi's assessment that "de-correlative and even linear MMSE strategies are ill-advised for such channels because they either do not exist, and even if they do, they are plagued by large noise-enhancement factors".

An alternative embodiment uses the Max SINR technique, and any combination of these and other industry-standard receiver optimization algorithms are feasible alternative implementations. Then the transmit weights for that node in its reply are optimized by making them proportional to the receive weights. Finally, the transmit gains (gain multipliers that multiply the transmit weights) are optimized according to a max-min capacity criterion for that node, such as the max-min sum of link capacities for that transceiver node at that particular time. An alternative embodiment includes as part of the network one or more network controllers that assist in tuning the local nodes' maximum capacity criterion to network constraints, e.g. by enforcing a balancing that reflects an intermediate nodes' current capacity which is lower than the local, originating node's current capacity.

The MIMO network model for the aggregate data transmitted between $N_1$ "Set 1 nodes" $\{n_1(1), \ldots, n_1(N_1)\}$, □ receiving data over downlink time slots and transmitting data over uplink time slots, and $N_2$ "Set 2 nodes" $\{n_2(1), \ldots, n_2(N_2)\}$ receiving data over uplink time slots and transmitting data over downlink time slots, can be approximated by $$x_2(k,l) \approx i_2(k,l) + H_{21}(k,l)s_1(k,l) \qquad \text{EQ. 36}$$

(uplink network channel model)

$$x_1(k,l) \approx i_1(k,l) + H_{12}(k,l)s_2(k,l) \qquad \text{EQ. 37}$$

(downlink network channel model)
within frequency-time channel (k,l) (e.g., tone k within OFDM symbol l) transmitted and received at uplink frequency $f_{21}(k)$ and time $t_{21}(l)$ and downlink frequency $f_{12}(k)$ and time $t_{12}(l)$, where $s_1(k,l) = [s^T_1(k, l; n_1(1)) \ldots s^T_1(k, l; n_1(N_1))]^T$ represents the network signal vector transmitted from nodes $\{n_1(p)\}$ within uplink channel (k,l);

$s_2(k,l) = [s^T_2(k, l; n_2(1)) \ldots s^T_2(k, l; n_2(N_2))]^T$ represents the network signal vector transmitted from nodes $\{n_2(q)\}$ within downlink channel (k,l);

$x_1(k,l) = [x^T_1(k, l; n_1(1)) \ldots x^T_1(k, l; n_1(N_1))]^T$ represents the network signal vector received at nodes $\{n_1(p)\}$ within downlink channel (k,l);

$x_2(k,l) = [x^T_2(k, l; n_2(1)) \ldots x^T_2(k, l; n_2(N_2))]^T$ represents the network signal vector received at nodes $\{n_2(q)\}$ within uplink channel (k,l);

$i_1(k,l) = [i^T_1(k, l; n_1(1)) \ldots i^T_1(k, l; n_1)(N_1))]^T$ models the network interference vector received at nodes $\{n_1(p)\}$ within downlink channel (k,l);

$i_2(k,l) = [i^T_2(k, l; n_2(1)) \ldots i^T_2(k, l; n_2(N_2))]^T$ models the network interference vector received at nodes $\{n_2(q)\}$ within uplink channel (k,l);

$H_{21}(k,l) = [H_{21}(k, l; n_2(q), n_1(p))]$ models the channel response between transmit nodes $\{n_1(p)\}$ and receive nodes $\{n_2(q)\}$ within uplink channel (k,l); and $H_{12}(k,l) = [H_{12}(k, l; n_1(p), n_2(q))]$ models the channel response between transmit nodes $\{n_2(q)\}$ and receive nodes $\{n_1(p)\}$ within downlink channel (k,l);

and $(\ )^T$ denotes the matrix transpose operation, and where $s_1(k, l; n_1)$ represents the $M_1(n_1) \times 1$ node $n_1$ signal vector transmitted over $M_1(n_1)$ diversity channels (e.g., antenna feeds) within uplink frequency-time channel (k,l);

$s_2(k, l; n_2)$ represents the $M_2(n_2) \times 1$ node $n_2$ signal vector transmitted over $M_2(n_2)$ diversity channels within downlink frequency-time channel (k,l);

$x_1(k, l; n_1)$ represents the node $n_1$ signal vector received over $M_1(n_1)$ diversity channels within downlink frequency-time channel (k,l);

$x_2(k, l; n_2)$ represents the $M_2(n_2) \times 1$ node $n_2$ signal vector received over $M_2(n_2)$ diversity channels within uplink frequency-time channel (k,l);

$i_1(k, l; n_1)$ models the $M_1(n_1) \times 1$ node $n_1$ interference vector received over $M_1(n_1)$ diversity channels within downlink frequency-time channel (k,l);

$i_2(k, l; n_2)$ models the $M_2(n_2) \times 1$ node $n_2$ interference vector received over $M_2(n_2)$ diversity channels within uplink frequency-time channel (k,l);

$H_{21}(k, l; n_2, n_1)$ models the $M_2(n_2) \times M_1(n_1)$ channel response matrix between transmit node $n_1$ and receive node $n_2$ diversity channels, within uplink channel (k,l); and $H_{12}(k, l; n_1, n_2)$ models the $M_1(n_1) \times M_2(n_2)$ channel response matrix between transmit node $n_2$ and receive node $n_1$ diversity channels, within downlink channel (k,l).

In the absence of far-field multipath between individual nodes, $H_{21}(k, l; n_2, n_1)$ and $H_{12}(k, l; n_1, n_2)$ can be further approximated by rank 1 matrices:

$$H_{21}(k,l;n_2,n_1) \approx \lambda_{21}(n_1,n_2) a_2(f_{21}(k), t_{21}(l); n_1, n_2) a_1^T(f_{21}(k), t_{21}(l); n_2, n_1) \times \exp\{-j2\pi(\tau_{21}(n_2,n_1) f_{21}(k) - v_{21}(n_2 n_1) t_{12}(l))\}] \quad \text{EQ. 38}$$

$$H_{12}(k,l;n_1,n_2) \approx \lambda_{12}(n_2,n_1) a_1(f_{12}(k), t_{12}(l); n_2, n_1) a_2^T(f_{12}(k), t_{12}(l); n_1, n_2) \times \exp\{-j2\pi(\tau_{12}(n_1,n_2) f_{12}(k) - v_{12}(n_1 n_2) t_{12}(l))\} \quad \text{EQ. 39}$$

where $\lambda_{21}(n_2, n_1)$ models the observed uplink pathloss and phase shift between transmit node $n_1$ and receive node $n_2$;

$\lambda_{12}(n_1, n_2)$ models the observed downlink pathloss and phase shift between transmit node $n_2$ and receive node $n_1$;

$\tau_{21}(n_2, n_1)$ models the observed uplink timing offset (delay) between transmit node $n_1$ and receive node $n_2$;

$\tau_{12}(n_1, n_2)$ models the observed downlink timing offset between transmit node $n_2$ and receive node $n_1$;

$v_{21}(n_2, n_1)$ models the observed uplink carrier offset between transmit node $n_1$ and receive node $n_2$;

$v_{12}(n_1, n_2)$ models the observed downlink carrier offset between transmit node $n_2$ and receive node $n_1$;

$a_1(f,t;n_2, n_1)$ models the $M_1(n_1) \times 1$ node $n_1$ channel response vector, between node $n_2$ and each diversity channel used at node $n_1$, at frequency f and time t; and $a_2(f,t;n_1, n_2)$ models the $M_2(n_2) \times 1$ node $n_2$ channel response vector, between node $n_1$ and each diversity channel used at node $n_2$, at frequency f and time t.

In many applications, for example, many airborne and satellite communication networks, channel response vector $a_1(f,t;n_2, n_1)$ can be characterized by the observed (possibly time-varying) azimuth and elevation $\{\theta_1(t;n_2, n_1), \phi_1(f,t;n_2, n_1)\}$ of node $n_2$ observed at $n_1$. In other applications, for example, many terrestrial communication systems, $a_1(f,t;n_2, n_1)$ can be characterized as a superposition of direct-path and near-field reflection path channel responses, e.g., due to scatterers in the vicinity of $n_1$, such that each element of $a_1(f,t;n_2, n_1)$ can be modeled as a random process, possibly varying over time and frequency. Similar properties hold for $a_2(f,t;n_1, n_2)$.

In either case, $a_1(f,t;n_2, n_1)$ and $a_2(f,t;n_1, n_2)$ can be substantively frequency invariant over significant breadths of frequency, e.g., bandwidths commensurate with frequency channelization used in 2G and 2.5 G communication systems. Similarly, $a_1(f,t;n_2, n_1)$ and $a_2(f,t;n_1, n_2)$ can be substantively time invariant over significant time durations, e.g., large numbers of OFDM symbols or TDMA time frames. In these cases, the most significant frequency and time variation is induced by the observed timing and carrier offset on each link.

In many networks of practical interest, e.g., TDD networks, the transmit and receive frequencies are identical ($f_{21}(k) = f_{12}(k) = f(k)$) and the transmit and receive time slots are separated by short time intervals ($t_{21}(l) = t_{12}(l) + \Delta_{21} \approx t(l)$), and $H_{21}(k,l)$ and $H_{21}(k,l)$ become substantively reciprocal, such that the subarrays comprising $H_{21}(k,l)$ and $H_{21}(k,l)$ satisfy $H_{21}(k, l; n_2, n_1) \approx \delta_{21}(k, l; n_1, n_2) H^T_{12}(k, l; n_1, n_2)$, where $\delta_{21}(k, l; n_1, n_2)$ is a unit-magnitude, generally nonreciprocal scalar.

If the observed timing offsets, carrier offsets, and phase offsets are also equalized, such that $\lambda_{21}(n_2, n_1) \approx \lambda_{12}(n_1, n_2)$, $\tau_{21}(n_2, n_1) \approx \tau_{12}(n_1, n_2)$, and $v_{21}(n_1, n_2) \approx v_{12}(n_2, n_1)$, for example, by synchronizing each node to an external, universal time and frequency standard such as Global Position System Universal Time Coordinates (GPS UTC), then $\delta_{21}(k, l; n_1, n_2) \approx 1$ can be obtained and the network channel response becomes truly reciprocal, $H_{21}(k,l) \approx H^T_{12}(k,l)$. However, this more stringent level of reciprocity is not required to obtain the primary benefit of the invention.

In order to obtain substantive reciprocity, each node in the network must possess means for compensating local differences between transmit and reception paths. Methods for accomplishing this using probe antennas are described in Agee, et. al. (U.S. patent application Ser. No. 08/804,619, referenced above). A noteworthy advantage of this invention is that substantive reciprocity can be obtained using only local transmit/receive compensation means.

The channel model described above is extendable to applications where the internode channel responses possess substantive multipath, such that $H_{21}(k, l; n_2, n_1)$ and $H_{12}(k, l; n_2, n_1)$ have rank greater than unity. This channel response can also be made substantively reciprocal, such that the primary benefit of the invention can be obtained here.

The preferred embodiment uses a substantively null-steering network wherein each node transmits baseband data (complex symbols provided by a multirate codec) through the multiplicity of reciprocal linear matrix operations prior to transmission into the antenna array during transmit operations, and after reception by the antenna array during receive operations, in a manner that physically separates messages intended for separate recipients. This is accomplished by (1) forming uplink and downlink transmit signals using the matrix formula $$s_1(k,l;n_1) = G_1(k,l;n_1) d_1(k,l;n_1)$$

$$s_2(k,l;n_1) = G_2(k,l;n_2) d_2(k,l;n_2) \quad \text{EQ. 40}$$

where $d_1(k, l; n_1) = [d_1(k, l; n_2(1), n_1) \ldots d_1(k, l; n_2(N_2), n_1)]^T$ represents the vector of complex data symbols transmitted from node $n_1$ and intended for each of nodes $\{n_2(q)\}$, respectively, within uplink channel (k,l);

$d_2(k, l; n_2) = [d_2(k, l; n_1(1), n_2) \ldots d_2(k, l; n_1(N_1), n_2)]^T$ represents the vector of complex data symbols transmitted from node $n_2$ and intended for each of nodes $\{n_1(q)\}$, respectively, within downlink channel (k,l);

$G_1(k, l; n_1) = [g_1(k, l; n_2(1), n_1) \ldots g_1(k, l; n_2(N_2), n_1)]$ represents the complex distribution weights used to redundantly distribute symbol vector $d_1(k, l; n_1)$ onto each diversity channel employed at node $n_1$ within uplink channel (k,l); and $G_2(k, l; n_2) = [g_2(k, l; n_1(1), n_2) \ldots g_2(k, l; n_1(N_1), n_2)]$ represents the complex distribution weights used to redundantly distribute symbol vector $d_2(k, l; n_2)$ onto each diversity channel employed at node $n_2$ within downlink channel (k,l);

(2) reconstructing the data intended for each receive node using the matrix formula $$y_1(k,l;n_1) = W^H_1(k,l;n_1) x_1(k,l;n_1)$$

$$y_2(k,l;n_2) = W^H_2(k,l;n_2) x_2(k,l;n_2) \quad \text{EQ. 41}$$

where $(\,)^H$ denotes the conjugate-transpose (Hermitian transpose) operation, and where $y_1(k, l; n_1) = [y_1(k, l; n_2(1), n_1) \ldots y_1(k, l; n_2(N_2), n_1)]^T$ represents the vector of complex data symbols intended for node $n_1$ and transmitted from each of nodes $\{n_2(q)\}$, respectively, within downlink channel (k,l);

$y_2(k, l; n_2) = [y_2(k, l; n_1(1), n_2) \ldots y_2(k, l; n_1(N_1), n_2)]^T$ represents the vector of complex data symbols intended for node $n_2$ and transmitted from each of nodes $\{n_1(p)\}$, respectively, within uplink channel (k,l);

$W_1(k, l; n_1) = [w_1(k, l; n_2(1), n_1) \ldots w_1(k, l; n_2(N_2), n_1)]$ represents the complex combiner weights used at node $n_1$ to recover symbol symbols $\{d_1(k, l; n_2(q), n_1)\}$ intended for node $n_1$ and transmitted from nodes $\{n_2(q)\}$ within uplink channel (k,l); and $W_2(k, l; n_2) = [w_2(k, l; n_1(1), n_2) \ldots w_2(k, l; n_1(N_1), n_2)]$ represents the complex combiner weights used at node $n_2$ to recover symbol symbols $\{d_2(k, l; n_1(p), n_2)\}$ intended for node $n_2$ and transmitted from nodes $\{n_1(p)\}$ within uplink channel (k,l).

(3) developing combiner weights that $\{w_1(k, l; n_2, n_1)\}$ and $\{W_2(k, l; n_1, n_2)\}$ that substantively null data intended for recipients during the symbol recovery operation, such that for $n_1 \neq n_2$:

$$|w^H_1(k,l;n_2,n_1)a_1(f_{12}(k),t_{12}(l);n_2,n_1)| << |w^H_1(k,l;n_1,n_1) a_1(f_{12}(k),t_{12}(l);n_1,n_1)| \quad \text{EQ. 42}$$

and $$|w^H_2(k,l;n_1,n_2)a_2(f_{21}(k),t_{21}(l);n_1,n_2)| << |w^H_2(k,l;n_2,n_2) a_2(f_{21}(k),t_{21}(l);n_2,n_2)| \quad \text{Eq. 43}$$

(4) developing distribution weights $\{g_1(k, l; n_2, n_1)\}$ and $\{g_2(k, l; n_1, n_2)\}$ that perform equivalent substantive nulling operations during transmit signal formation operations;
(5) scaling distribution weights to optimize network capacity and/or power criteria, as appropriate for the specific node topology and application addressed by the network;
(6) removing residual timing and carrier offset remaining after recovery of the intended network data symbols; and
(7) encoding data onto symbol vectors based on the end-to-end SINR obtainable between each transmit and intended recipient node, and decoding that data after symbol recovery operations, using channel coding and decoding methods develop in prior art.

In the preferred embodiment, OFDM modulation formats is used to instantiate the invention, and substantively similar distribution and combining weights are computed and applied over as broad a range of tones (frequency channels k) and OFDM symbols (time slots l) as is practical. The range of practical use is determined by the frequency selectivity (delay spread) and time selectivity (Doppler spread) of the communications channel, which determines the degree of invariance of the channel response vectors $a_1$ and $a_2$ on (k,l); the dynamics of interference $i_1$ and $i_2$; latency requirements of the communications network; and dimensionality of linear combiners used at each node in the network, which determine the number of frequency-time channels needed to determine reliable substantively null-steering distribution and combining weights.

Figure 35:
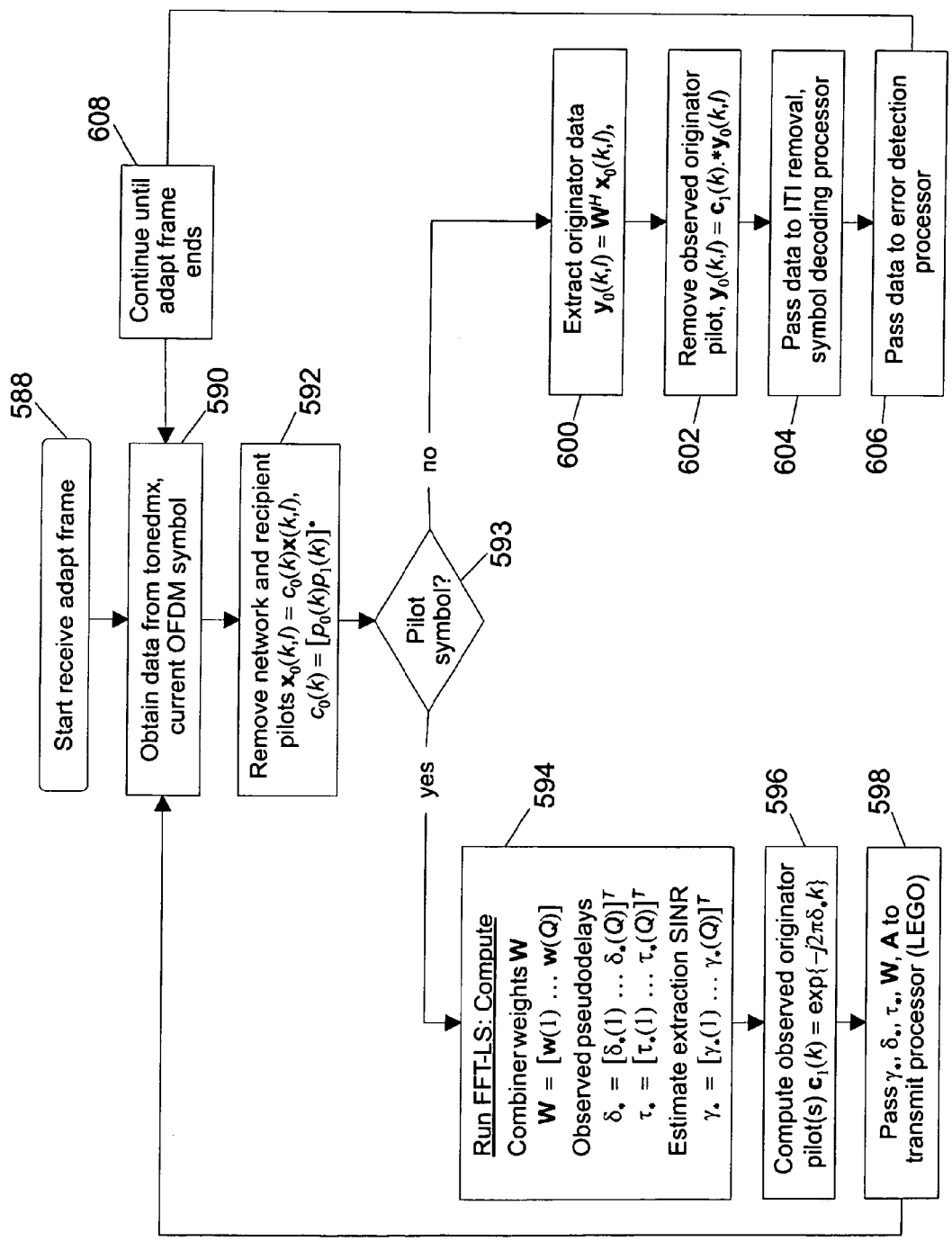
FIGS. 35 and 36 illustrate the FFT-based LS algorithm used in the preferred embodiment that adapt $\{w_1(k,l; n_2, n_1)\}$ and $\{w_2(k,l; n_1, n_2)\}$ to values that minimize the mean-square error (MSE) between the combiner output data and a known segment of transmitted pilot data.
Figure 36:
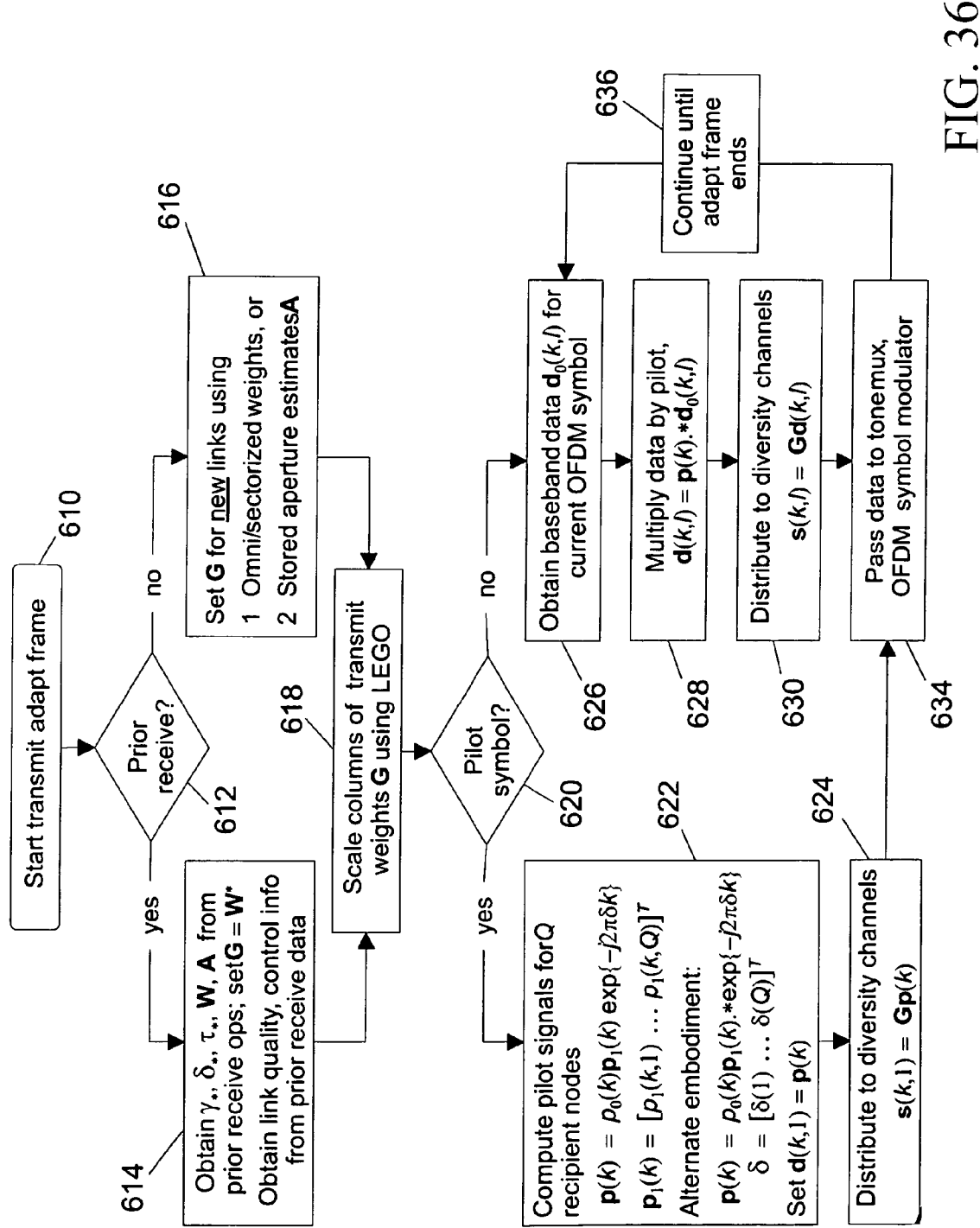

In the preferred embodiment, substantively nulling combiner weights are formed using an FFT-based least-squares algorithms that adapt $\{w_1(k, l; n_2, n_1)\}$ and $\{w_2(k, l; n_1, n_2)\}$ to values that minimize the mean-square error (MSE) between the combiner output data and a known segment of transmitted pilot data. Operations used to implement this technique during receive and transmit operations are shown in FIGS. 35 and 36, respectively. The preferred pilot data is applied to an entire OFDM symbol at the start of an adaptation frame comprising a single OFDM symbol containing pilot data followed by a stream of OFDM symbols containing information data. The pilot data transmitted over the pilot symbol is preferably given by $$p_1(k; n_2, n_1) = d_1(k, 1; n_2, n_1) \quad \text{EQ. 44}$$
$$= p_{01}(k)p_{21}(k; n_2)p_{11}(k; n_1)$$

$$p_2(k; n_1, n_2) = d_2(k, 1; n_1, n_2) \quad \text{EQ. 45}$$
$$= p_{02}(k)p_{12}(k; n_1)p_{22}(k; n_2)$$

where symbol index l is referenced to the start of the adaptation frame, and where $p_{01}(k)$ is a pseudorandom, constant modulus uplink "network" or "subnet" pilot that is known and used at each node in a network or subnet;

$p_{02}(k)$ is a pseudorandom, constant modulus downlink "network" or "subnet" pilot that known and used at each node in the network;

$p_{21}(k; n_2)$ is a pseudorandom, constant modulus uplink "recipient" pilot that is known and used by every node intending to transmit data to node $n_2$ during uplink transmission intervals;

$p_{12}(k; n_1)$ is a pseudorandom, constant modulus downlink "recipient" pilot that is known and used by every node intending to transmit data to node $n_1$ during downlink transmission intervals;

$p_{11}(k; n_1) = \exp\{j2\pi\delta_1(n_1)k\}$ is a sinusoidal uplink "originator" pilot that is used by node $n_1$ during uplink transmission intervals;

$p_{22}(k; n_2) = \exp\{j2\pi\delta_2(n_2)k\}$ is a sinusoidal downlink "originator" pilot that is used by node $n_2$ during downlink transmission intervals;

The "pseudodelays" $\delta_1(n_1)$ and $\delta_2(n_2)$ can be unique to each transmit node (in small networks), or provisioned at the beginning of communication with any given recipient node (in which case each will be a function of $n_1$ and $n_2$). In either case, the minimum spacing between any pseudodelays used to communicate with a given recipient node should be larger than the maximum expected timing offset observed at that recipient node. This spacing should also be an integer multiple of 1/K, where K is the number of tones used in a single FFT-based LS algorithm. If K is not large enough to provide a sufficiency of pseudodelays, additional OFDM symbols can be used for transmission of pilot symbols, either lengthening the effective value of K, or reducing the maximum number of originating nodes transmitting pilot symbols over the same OFDM symbol (for example, the recipient node can direct 4 originators to transmit their pilot symbols over the first OFDM symbol in each adaptation frame, and 4 other originators to transmit their pilot symbols over the next OFDM symbol, allowing the recipient node to construct combiner weights for 8 originators). In the preferred embodiment, K should also be large enough to allow effective combiner weights to be constructed from the pilot symbols alone.

The remaining information-bearing symbols in the adaptation frame are then given by $$d_1(k,l;n_2,n_1) = p_1(k;n_2,n_1)d_{01}(k,l;n_2,n_1) \quad \text{EQ. 46}$$

$$d_2(k,l;n_1,n_2) = p_2(k;n_1,n_2)d_{02}(k,l;n_1,n_2) \quad \text{EQ. 47}$$

where $d_{01}(k, l; n_2, n_1)$ and $d_{02}(k, l; n_1, n_2)$ are the uplink and downlink data symbols provided by prior encoding, encryption, symbol randomization, and channel preemphasis stages.

Preferably, the adaptation frame is tied to the TDD frame, such that the TDD frame comprises an integer number of adaptation frames transmitted in one link direction, followed by an integer number of adaptation frames transmitted in the reverse link direction. However, the OFDM symbols in the adaptation frame may be interleaved to some degree or any degree. The pilot data may also be allowed to pseudorandomly vary between adaptation frames, providing an additional layer of "physical layer" encryption in secure communication networks.

At the recipient node, the pseudorandom pilot components are first removed from the received data by multiplying each tone and symbol by the pseudorandom components of the pilot signals $$x_{01}(k,l;n_1)=c_{02}(k;n_1)x_1(k,l;n_1) \qquad \text{EQ. 53}$$

$$x_{02}(k,l;n_2)=c_{01}(k;n_2)x_2(k,l;n_2) \qquad \text{EQ. 48}$$

where $c_{02}(k;n_1)=[p_{02}(k)p_{12}(k;n_1)]^*$ and $c_{01}(k;n_2)=[p_{01}(k)p_{21}(k;n_2)]^*$ are the derandomizing code sequences.

Figure 38A:
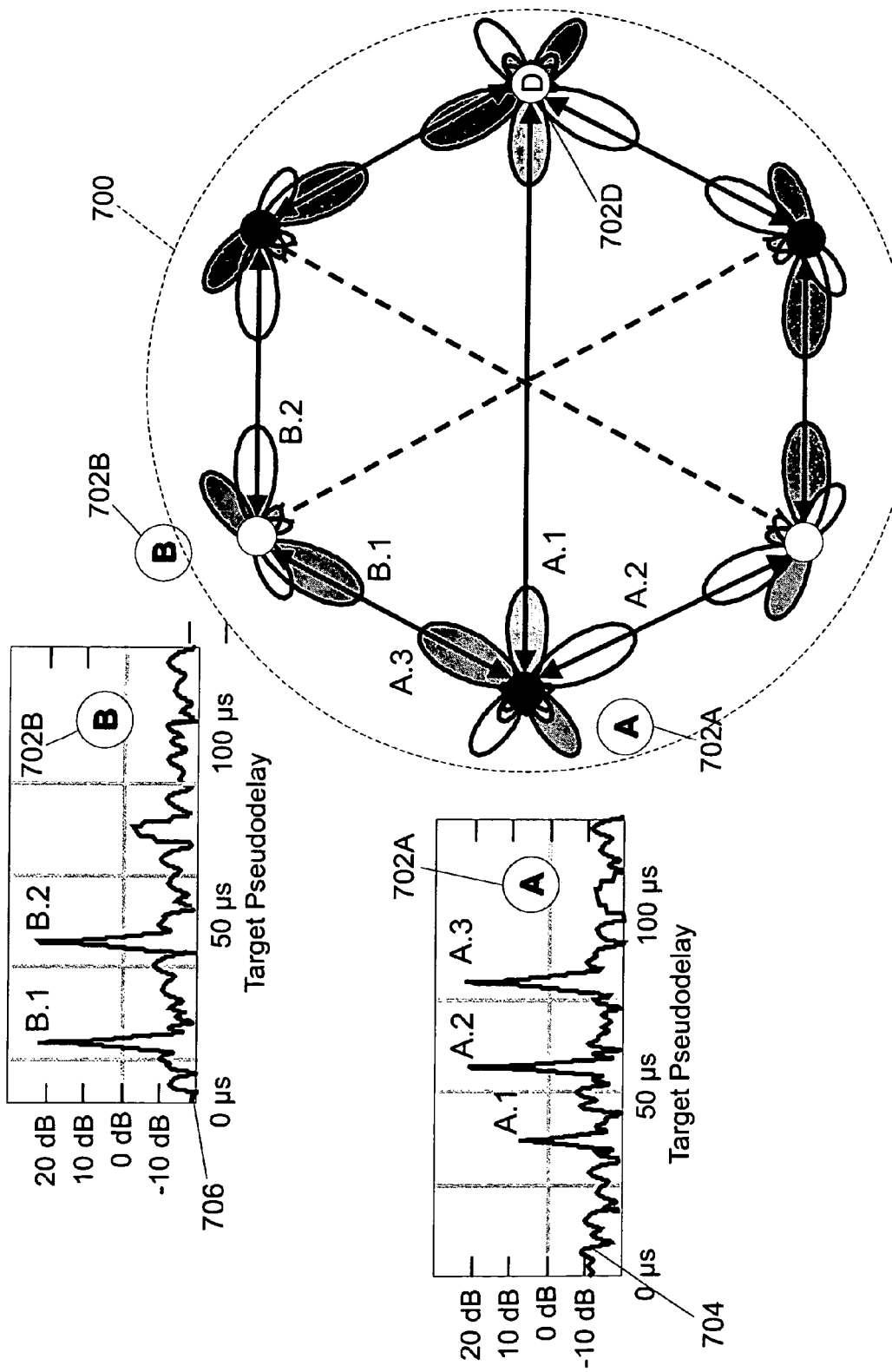
FIGS. 38A and 38B illustrate a MIMO network with null-steering and pilot-tone transmissions, with the overall transmission shown as the Extraction SINR, and the mask-fitted transmissions perceived at 702A and 702B which correctly account through the imposed pilot pseudodelay for the intended transmission peaks.
Figure 38B:
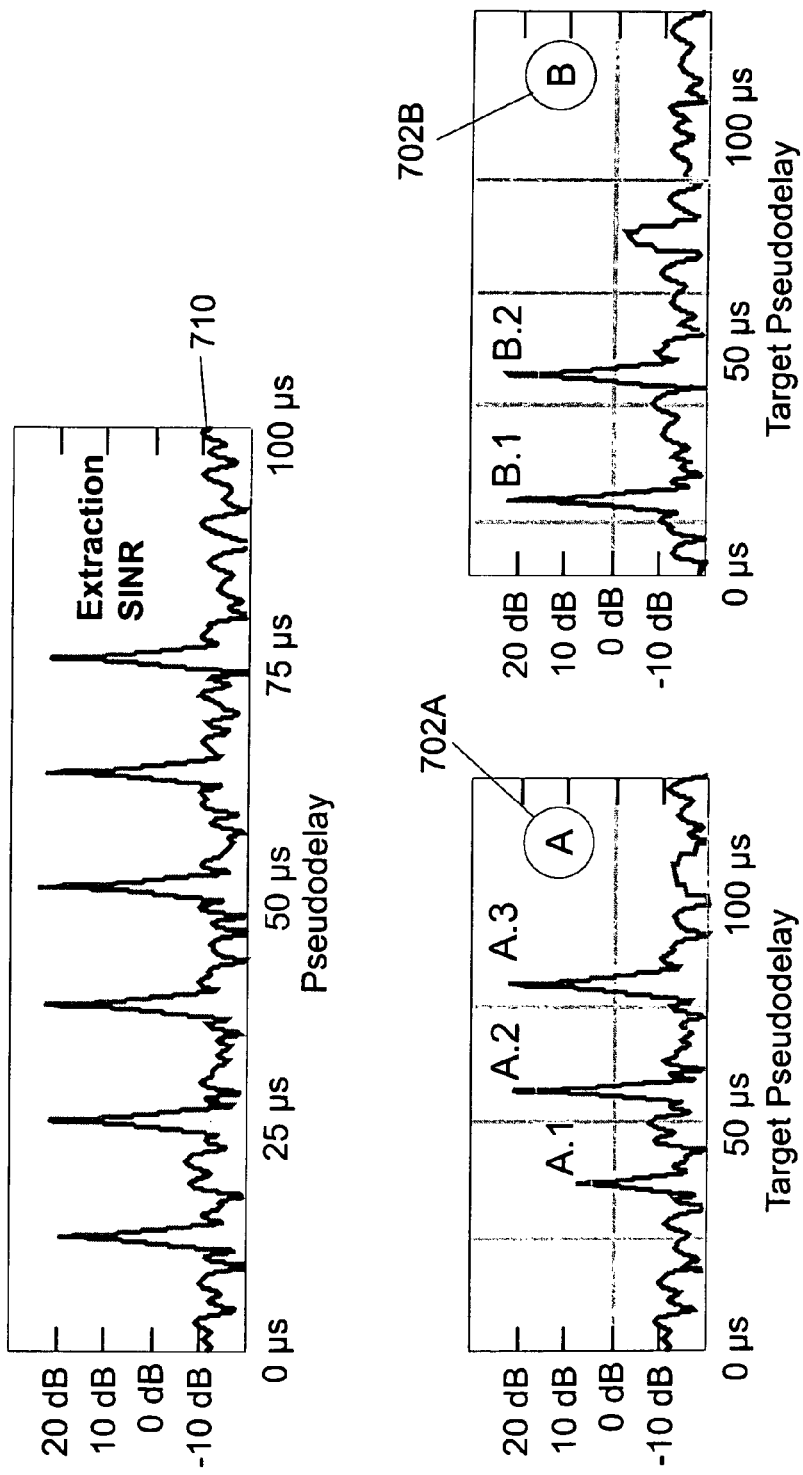

This operation transforms each pilot symbol authorized and intended for the recipient node into a complex sinusoid with a slope proportional to the sum of the pseudodelay used during the pilot generation procedure, and the actual observed timing offset for that link (observed pseudodelay). (See FIGS. 21, 28.) Unauthorized pilot symbols, and symbols intended for other nodes in the network, are not so transformed and continue to appear as random noise at the recipient node (See FIG. 38A, 38B).

Figure 37:
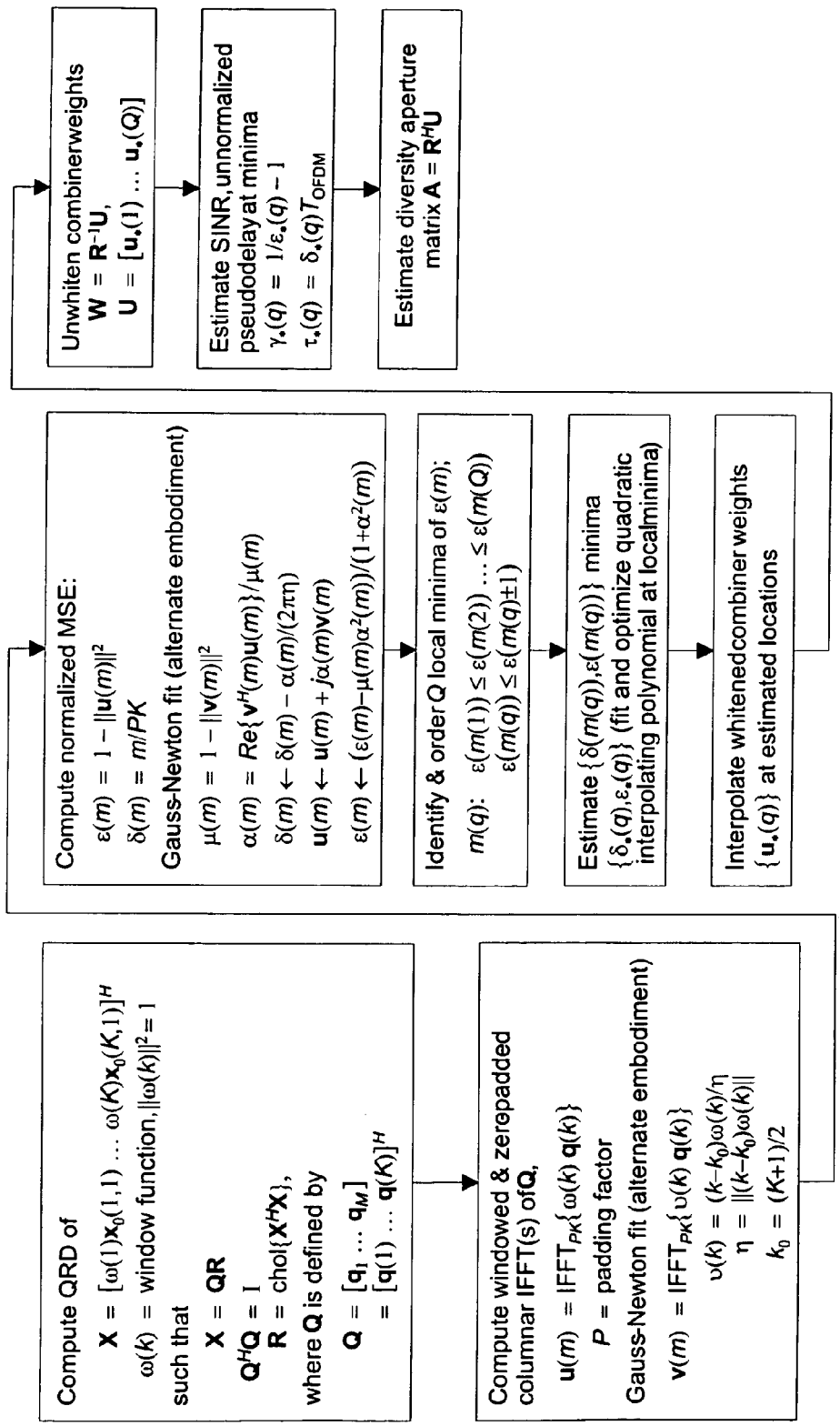
FIG. 37 illustrate the FFT-based LS algorithm used in the preferred embodiment for the normalized MMSE or, in an alternative embodiment, the Gauss-Newton algorithm.

The FFT-based LS algorithm is shown in FIG. 37. The pilot symbol, notionally denoted $X_0(k,1)$ in this Figure (i.e., with reference to uplink/downlink set and node index suppressed), is multiplied by a unit-norm FFT window function, and passed to a QR decomposition algorithm, preferably a block modified-Gram-Schmidt Orthogonalization (MGSO), and used to compute orthogonalized data $\{q(k)\}$ and upper-triangular Cholesky statistics matrix R. Each vector element of $\{q(k)\}$ is then multiplied by the same window function, and passed through a zero-padded inverse Fast Fourier Transform (IFFT) with output length PK, with padding factor P, preferably P=4, to form uninterpolated, spatially whitened processor weights $\{u(m)\}$, where lag index m is proportional to target pseudodelay $\delta(m)=m/PK$. The whitened processor weights are then used to estimate the mean-square-error (MSE) obtaining for a signal received at each target pseudodelay, $\epsilon(m)=1-\|u(m)\|^2$, yielding a detection statistic (pseudodelay indicator function) with a minimum (valley) at IFFT lags commensurate with the observed pseudodelay (alternately, combiner output SINR $\gamma(m)=\epsilon^{-1}(m)-1$ can be measured at each target pseudodelay, yielding a detection statistic (peak) at FFT lags commensurate with that pseudodelay. The pilot symbol, notionally denoted $X_0(k,1)$ in this Figure (i.e., with reference to uplink/downlink set and node index suppressed), is multiplied by a unit-norm FFT window function, and passed to a QR decomposition algorithm, preferably a block modified-Gram-Schmidt Orthogonalization (MGSO), and used to compute orthogonalized data $\{q(k)\}$ and upper-triangular Cholesky statistics matrix R. Each vector element of $\{q(k)\}$ is then multiplied by the same window function, and passed through a zero-padded inverse Fast Fourier Transform (IFFT) with output length PK, with padding factor P, preferably P=4, to form uninterpolated, spatially whitened processor weights $\{u(M)\}$, where lag index m is proportional to target pseudodelay $\delta(m)=m/PK$. The whitened processor weights are then used to estimate the mean-square-error (MSE) obtaining for a signal received at each target pseudodelay, $\epsilon(m)=1-\|u(m)\|^2$, yielding a detection statistic (pseudodelay indicator function) with a minimum (valley) at IFFT lags commensurate with the observed pseudodelay (alternately, combiner output SINR $\gamma(m)=\epsilon^{-1}(m)-1$ can be measured at each target pseudodelay. The IFFT windowing function is dependent on the minimum spacing between pseudodelays, and is designed to minimize interlag interference ("picket fence" effect) between pilot signal features in the pseudodelay indicator function. In the preferred embodiment, and for a node capable of forming four links, a Kaiser-Bessel window with parameter 3 is preferred.

A valley (or peak) finding algorithm is then used to detect each of these valleys (or peaks), estimate the location of the observed pseudodelays to sub-lag accuracy, and determine additional ancillary statistics such as combiner output SINR, input SINR, etc., that are useful to subsequent processing steps (e.g., LEGO). Depending on the system application, either the Q lowest valleys (highest peaks), or all valleys below a designated MSE threshold (peaks above a designated SINR threshold) are selected, and spatially whitened weights U are interpolated from weights near the valleys (peaks). The whitened combiner weights U are then used to calculate both unwhitened combiner weights $W=R^{-1}U$, used in subsequent data recovery operations, and to estimate the received channel aperture matrix $A=R^H U$, to facilitate ancillary signal quality measurements and fast network entry in future adaptation frames. Lastly, the estimated and optimized pseudodelay vector $\delta_*$ is used to generate $C_1(k)=\exp\{-j2\pi\delta_* k\}$ (conjugate of $\{p_{11}(k; n_1)\}$ during uplink receive operations, and $\{p_{22}(k; n_2)\}$ during downlink receive operations), which is then used to remove the residual observed pseudodelay from the information bearing symbols. (See FIG. 38A, Items 702A, 704, 702B, 706, and FIG. 38B, Item 710, for illustration of the overall signal and the signal modified by the correct origination, target, and pilot mask.)

In an alternate embodiment, the pseudodelay estimation is refined using a Gauss-Newton recursion using the approximation $$\exp\{-j2\pi\Delta(k-k_0)/PK\}\approx 1-j2\pi\Delta(k-k_0)/PK$$

This algorithm first estimates $\Delta$, providing an initial sublag estimate of pseudodelay, before estimating the lag position to further accuracy. The resultant algorithm can reduce the padding factor P, and reduces interpolation errors in the receive combination weights. However, it requires estimation of an additional IFFT using a modified FFT window, and is therefore not preferred in applications where DSP complexity is of overriding importance.

The optimized combiner weights are substantively null-steering, in that the combiner weights associated with each originating signal will (notionally, in absence of multipath) form a composite antenna pattern that steers nulls in the direction of all other time-and-frequency coincident signals (signals transmitting on the same time slot and frequency channel) impinging on the array. However, the weights will also (notionally, in absence of multipath) form a beam in the direction of the originating signal, further improving performance of the overall network. In the presence of multipath, a clear gain pattern of this sort may not necessarily form; however, the effect of this processing will be the same, and is typically be improved due the added diversity provided by multipath.

In additional alternate embodiments, the combiner weights can be further refined by exploiting known or added structure of the information bearing symbols using blind property-restoral algorithms. Algorithms of this sort are described in Agee (U.S. Pat. No. 6,118,276) and Agee, et. al., (U.S. patent application Ser. No. 08/804,619, referenced above) as well as other disclosures in the public domain. These alternate embodiments can reduce the size of K, or allow the airlink to be extended into more complex systems where the linear combiner dimensionalities are too large to allow computation of effective weights given the value of K employed in an existing system.

The resultant network has several useful attributes over prior art. It is computationally efficient, especially for nodes receiving data from large numbers of originating nodes, since the complex operations employed in the FFT-LS algorithm can be amortized over multiple links. It is also rapidly convergent, allowing computation of 4-element diversity combiner weights to attain nearly the maximum SINR obtainable by the combiner using 8-to-16 pilot data tones. It automatically detects and reconstructs data from nodes that have been authorized to communicate with the network, or with recipient nodes within the network, and rejects nodes that are not so authorized, allowing the network to adjust and control its topology and information flow at the physical layer, and providing an important level of security by rejecting signals that do not possess appropriate network or recipient pilots. It also provides an additional level of data scrambling to prevent occurrence of correlated interlink symbol streams that can cause severe misadjustment in conventional linear combiner adaptation algorithms.

In reciprocal channels, the linear combiner weights provided during receive operations can be used to simply construct linear distribution weights during subsequent transmit operations, by setting distribution weight $g_1(k, l; n_2, n_1)$ proportional to $w^*_1(k, l, n_2, n_1)$ during uplink transmit operations, and $g_2(k, l; n_1, n_2)$ proportional to $w^*_2(k, l; n_1, n_2)$ during downlink transmit operations. The transmit weights will be substantively nulling in this system, allowing each node to form frequency and time coincident two-way links to every node in its field of view, with which it is authorized (through establishment of link set and transfer of network/recipient node information) to communicate.

Among other advantages, this capability allows nodes to independently adjust transmit power directed to other nodes in the network, for example, to optimize capacity achievable at that node given the total power available to it, or to minimize power emitted into the network by that node given an aggregate power requirement. This capability also allows the node to adjust its contribution to the overall network, for example, to maximize the total aggregate (max-sum) capacity of the network, or to minimize network power subject to a network-level capacity constraint. In addition, this capability can allow the node to provide two-way communication to authorized nodes, or in defined subnets, in the presence of other nodes or subnets that it is not authorized to communicate with, for example, adjacent cells in CMRS networks, and adjacent (even interpenetrating), and virtual private nets. In wireless LAN's and MAN's.

Figure 39:
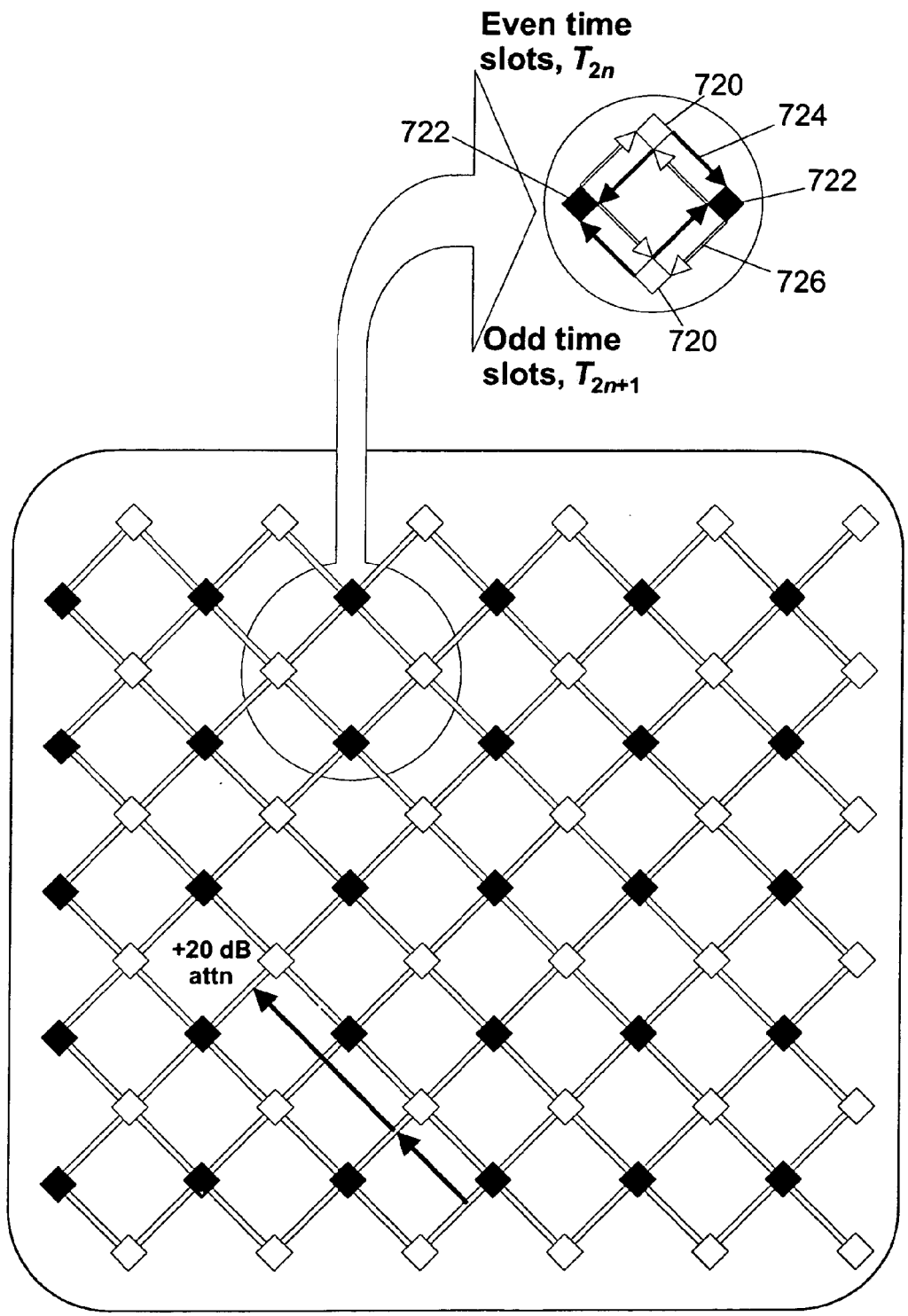
FIGS. 39 and 40 illustrate alternative topological layouts for proper uplink receive and uplink transmit subsets with links and expected attenuation.
Figure 40:
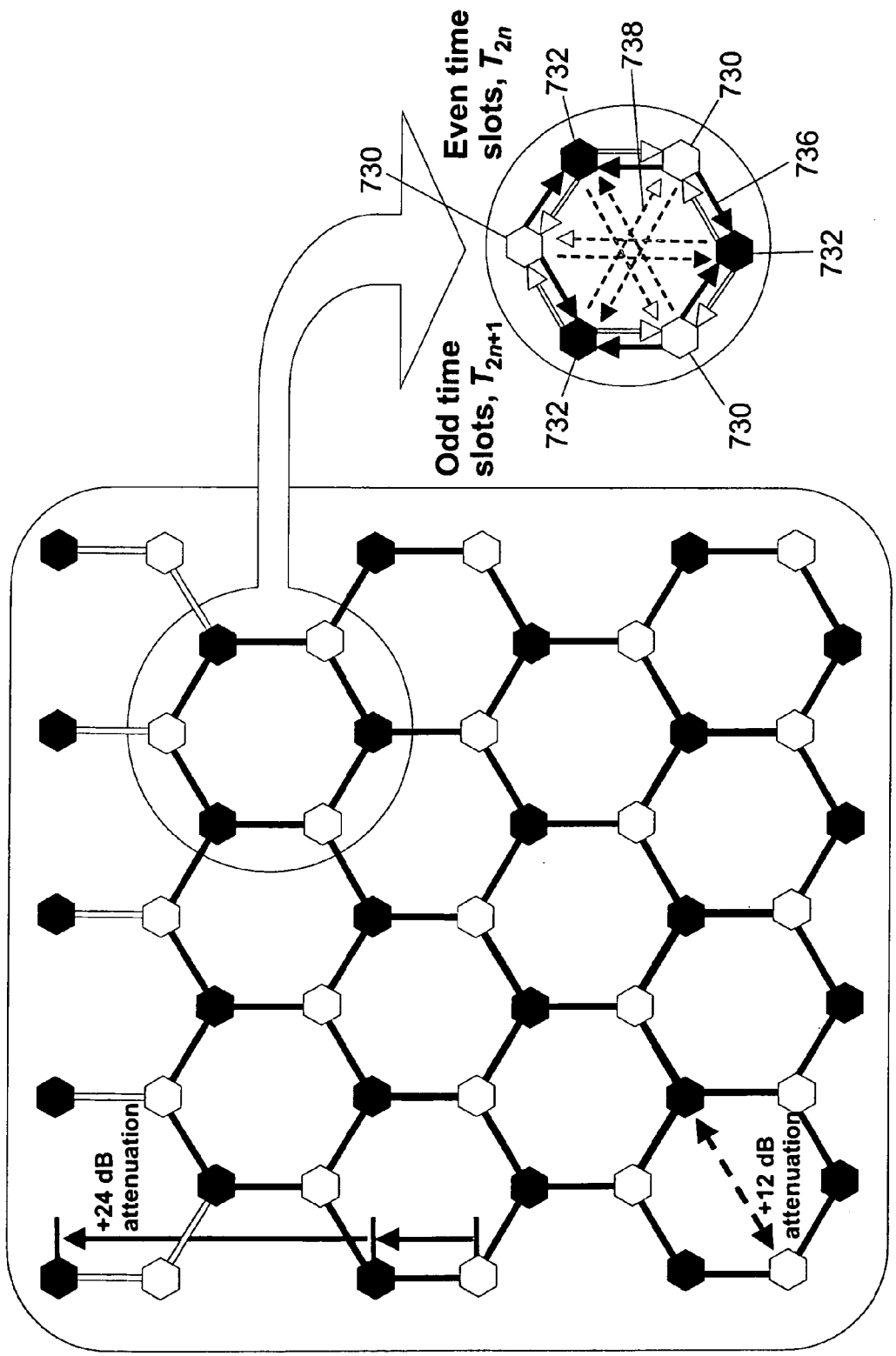

This capability is illustrated in FIGS. 39 and 40, the latter being for a hexagonal network of six nodes arranged in a ring network, with an additional direct connect between nodes A and D. In this example, each node has been provided with a recipient pilot for its adjacent node, e.g., node B has been provided with recipient pilots for nodes A and C, facilitating time-frequency coincident communication with those adjacent nodes. In addition, Node A has been provided with recipient pilots for node D, i.e., node A can communicate with nodes B, D, or F.

The pseudodelay indicator functions (provided as a function of SINR, i.e., with peaks at observed pseudodelays) are shown for each of the nodes. Indicator functions generated at nodes B, C, E, and F have two strong peaks, corresponding to pseudodelays used at their connecting nodes, plus a 10 microsecond time-of-flight delay (assuming all nodes are synchronized to GPS UTC). In addition, nodes A and D have a third peak at their respective delays, plus a 20 microsecond time-of-flight delay. The pseudodelays are minimally separated by 25 microseconds for each of the originating nodes (12.5 microsecond minimal separation between all nodes), which is easily wide enough to allow peaks from different originators to be discerned. In addition, the peak values (near 20 dB SINR for all links except the A-to-D link) are detectable with a 0 dB threshold. As Figure ## shows, the receive and transmit weights form beam and null patterns that allow independent links to be formed between authorized nodes, and that allow unauthorized signals to be screened at the points or reception and transmission.

The aperture estimates A will (also notionally, in absence of multipath) form beams in the direction of the originating node; however; they will ignore all other nodes in the network. For this reason, they cannot be used in general to sustain independent links. However, the aperture estimates can be used to allow rapid reentry into the network, for example, in packet data systems where users may quickly begin and end signal transmissions over brief time periods (e.g., such that the channel response has not changed substantively between transmissions). The aperture estimates can also be combined with combiner/distribution weights to form rapid nulls again under other links or nodes in the network.

The primary application area for the fully adaptive MIMO arrays of the preferred embodiment will be below 10 GHz, where the abilities to achieve non-LOS and to exploit multipath are still possible, and where pathloss, weather effects, and channel dynamics can be handled by adaptive arrays. The preferred embodiment's MIMO network will provide a strong advantage over conventional MIMO links, by not requiring antenna separation of 10 wavelengths to provide effective capacity gain. The present state of the art considers 10 wavelengths to be the rule of thumb for the distance between antennas that provides spatially independent antenna feeds due to disparate multipath at each antenna. This rule has greatest applicability in worst-case mobile environments subject to Rayleigh fading, i.e., where the (typically much stronger) direct path is obscured, and propagation occurs over many equal-power reflection paths.

The MIMO network of the preferred embodiment, however, exploits route diversity due to reception of signals from widely separated nodes, and does not need multipath to provide the capacity gains cited for MIMO links in the present state of the art. This enables the preferred embodiment to employ antennas with much smaller separation, e.g., circular arrays with half-to-full wavelength diameter, to provide effective capacity or QoS gains. The preferred embodiment's exploitation of multipath can further improve performance, by providing additional differences between gain and phase induced at each antenna in the array. In this regards, a smaller aperture is also better, as it reduces frequency selectivity across individual frequency channels. Polarization diversity can also be employed between antennas with arbitrary spacing (e.g., in "zero aperture" arrays), as well as "gain diversity" if the antennas have distinct gain patterns.

The MIMO network of the preferred embodiment has application in the 10-100 GHz region (for example, LMDS bands around 25-35 GHz where mesh networks are of increasing interest), even though these networks are likely to employ nonadaptive directional antennas, or partially adaptive antennas, e.g., arrays in focal plane of directional dish antennas, that direct high gain or "pencil" beams at other ends of the link, rather than fully adaptive beam-and-null steering networks. This is due to small form factor of such antennas, as well as pathloss, atmospheric absorption, and weather effects prevalent above the 10 GHz band.

The next preference is that for each channel that is dynamically established, the uplink and downlink share a common frequency (that is, the transmission and reception are on the same frequency). This enables the establishment and exploitation of channel reciprocity (CR) between pairs of nodes, the sharing of antennae and diversity channels in transmit and receive operations in particular nodes, and other network advantages. The network advantages include the use of ad hoc, single-frequency networks in bursty (data-intensive) networks, such as packet-switched networks, random-access networks, or at the network "edges" (where the SINR level threatens to overcome the network capacity). This also allows the establishment of a two-layer time-division duplex schema in persistent networks or channels (e.g. ones that are circuit-switched, or perform connectionless datagram backhaul functions), where there is an equal duty cycle in both directions. An alternative embodiment will permit asymmetric duty cycles, and yet a third configurable balancing of duty cycles. Additionally, in the multitone case of dual-frequency approach (uplink and downlink using distinct frequencies), the network uses a frequency division duplex (FDD) protocol, preferably in combination with channel-based transmission and reception weights.

The network advantage to the preferred embodiment is that, instead of the network serving as a Procrustean bed to which the communications links must be fitted out of the combination of its environmental SINR, established protocols, and channel approach, each communications link can use the environmental SINR, protocols, and channel approach to dynamically adapt the network's functioning to maximize capacity and minimize power consumption.

The second preference is that the network uses and exploits diversity frequency transmission and reception at all nodes in the network. This particular aspect of the preferred embodiment carries the complexity and hardware cost of requiring that each node incorporate spatially separated and shared receive/transmit antennae, although the separation need only be measured in tens of lambdas of the lowest frequency (longest wavelength) used by that particular node. This pragmatically can create a situation where BS nodes are equipped with larger antennae which are spatially separated by feet or meters, and thus use far lower frequencies for 'backhaul' or BS to BS transmissions; this also carries, however, the advantage that SU nodes lacking such spatial separation will be intrinsically deaf to such frequencies. (Care must be taken to consider harmonics between BS backbone frequencies and SU channel frequencies.)

Optionally, in an enhancement to the preferred embodiment, the network would include and make use of frequency polarization, spectral diversity, or any combination thereof, at any subset (including a proper subset) of the network's nodes to provide further coding and differentiation potential. And in another, further enhancement, the network would employ Butler RF networks to provide common RF front-end and scalable and expandable transceiver DSP backends in peer-to-peer network implementations.

The third preference is that the nodes include a multitone QAM encoder, whereby individual tones would be multiplied by Quadrature-Amplitude-Modulated symbols to further differentiate the signals between nodes, even those using the same frequencies. Alternative QAM approaches would include PSK, $\pi/4$ QPSK, and $\pi/4$-DQPSK symbols to increase the variation potentialities. These symbols would be generated using Trellis-Coded-Modulation (TM) encoding over individual frequency channels and would include several-to-one multitone symbols. One alternative embodiment would use Reed-Solomon codes and direct mapping to symbols; other alternatives would use Turbo encoding, either at the baseband or as part of the TM, or any combination thereof. To aid the Viterbi decoding at the receiver the 'tail-biting' approach would be used at the edge of the symbol blocks. To assist the maximum capacity solution for each frequency channel, the network would use variable information bits per frequency channel rather than a fixed set of information bits per frequency channel, in a method analogous to the Digital MultiTone, Digital Signal Loss (DMT DSL) approach, trading the need for information density encoding as part of the signal overhead for the need for all channels to be constrained to the minimum guaranteed capacity of any environmentally or hardware constrained channel, to avoid pathloss for the most tightly constrained link or channel. However, rather than insist upon this approach, the network would include the capability to shift to a constant bits per frequency channel approach with appropriate LEGO power management, to enable and support the minimum-power solution for the network when either power or capacity constraints determine this is preferable.

The fourth preference is that the network adds pseudorandom modulation to the symbols after encoding. This is to eliminate the need to increase the signaling overhead by runs of correlated symbols, as it aids in the receive adaptation algorithms, provides discrete link encryption, thereby greatly increasing both channel and network security, and enables pilot-gated fast acquisition and timing recovery algorithms. An extension to the pseudorandom modulation is the analysis and elimination of certain detectable features by the network in one alternate embodiment. A distinct extension is the embedding of invariance for exploiting broader modulation, using gated SCORE. And a third extension combines the two extensions just described.

The fifth preference is the addition of an error detection syndrome, or CRC block to transmissions to detect bit errors, which would enable the initiation of a retransmission request at the end of a packet's reception when an error is signaled.

The sixth preference is using a computationally efficient and fast-converging receive weight algorithm (CE&FC RWA) to reduce the computational and hardware overhead for each channel's transmission and node. Variations of such CE&FC RWA that would be used include any one, subcombination, or combination, of the following: Least-Squares Like (LS), which are also known as matrix-inversion; Block-Update implementations (on a per-packet basis) that amortize matrix operations over multiple data snapshots (using tones and/or multitone symbols); and recursive single-snapshot algorithms. Furthermore, the preferred embodiment may use one, more than one, or all of the following for the same purposes: calculation of autocorrelation statistics in voltage domain (e.g. using QRD, MGSO) to minimize the complexity and increase the accuracy of the weight-update operation; multiport adaptation (simultaneous processing of multiple co-channel links) on each frequency channel to amortize autocorrelation operations over multiple users (more at BS than SU nodes); or single-step, single-port adaptations (more at SUs than BSs). Depending on the network constancy and dynamic state, or static constancy, the network may vary between uncalibrated techniques which are not dependent upon knowledge or calculation of channel information (e.g. the emitter location, or the elevation/azimuth separating transmitter and receiver), non-blind and blind weight adaptation techniques such as pilot-based initial weight acquisition signaling, blind and/or pilot-aided decision-direction weighting in persistent links, and blind embedded-invariance techniques such as gated SCORE, in an alternative embodiment. For pilot-aided and gated SCORE techniques the network would preferentially use the computationally efficient mechanization of cross-correlation operations employing fast transform (and in a specific embodiment, FFT) methods. In yet other alternative embodiments the network may use combined channel sounding, channel-based weight estimation, or any combination of the foregoing.

The seventh preference is using post-combining in-channel tone equalization to remove timing and carrier offset. This could include multiplication by constant modulus weights, as the first preference, to remove timing and/or delay offsets; alternatively, it could include low-complexity intertone filtering to remove carrier offset and Doppler errors; and, of course, a combination of both could be employed depending on the environmental and hardware complexity needs, constraints, and costs.

The eighth, and most important preference for the preferred embodiment is that each node of the network be capable of employing and employ retrodirective transmission and reception modulation, wherein the transmit gains are set proportional to the actually experienced reception weights for the frequencies used. For single frequency links, this exploits their potential reciprocity (especially for TDD or ad-hoc networks). When a TDD approach is used each data frame is encapsulated in smaller guard frames, and the entire transmission occupies a smaller portion of the available bandwidth to similarly encapsulate it in the available bandwidth. The signal for a one-way frame duration is further broken down to incorporate a guard time, a data symbol, an encapsulating cyclic prefix, a control symbol, a cyclic prefix separation the control symbol from the acquisition symbol, and a final encapsulating cyclic prefix. The frequency channels that occupy the bandwidth carry bearer data fragments over fractional subfragments. One embodiment for low-mobility, fixed or portable TDD uses a 120B Bearer Data Fragment which is comprised of eight 15B subfragments, 8 differentiating and coordinating multitone symbols, and of 5.75 MHz available only 4.26 MHz bandwidth, said bandwidth being divided into 13 frequency channels, each with 320 kHz, to provide 2 fragments per frame per link, or 6.24 Mbytes each frame, or 4.608 Mbps as one channel (Channel 0) is reserved for fragment resends, thereby providing the equivalent in wireless transmission of 3 land-based T1 lines with, thanks to the reservation and resend provision, a $10^{-4}$ BER. This embodiment further uses for each 15B subfragment a MAC header providing 2B CRC and 13B MAC data, providing 52 MAC channels and at full duplex 10.4 kbps per channel. The acquisition symbols have 30B pilot or synchronization data per 320 kHz frequency channel, 32 to 64 pilot tones per channel, and thereby provide fast acquisition for up to 32 Degrees of Freedom; and if the area is sparsely populated or for other reasons (downtime, occupied by other transmissions) less than 17 Degrees of Freedom were needed, the excess DOF could be reused and reprovisioned to enable dynamic channels and thereby further increase the local flexibility.

The high-mobility TDD link replaces the cyclic prefixes with nulls on the uplink and CP on the downlink, halves the number of tones and doubles the separation of tones (from 426 to 213 tones, from 10 kHz to 20 kHz separation), and provides half the DOF, but doubles the amount of overlap that can be tolerated for the same QOS.

In the preferred embodiment for fixed, portable, and low-mobility links, the tone layout divides the 4.26 MHz into 426 'bins', each of 10 kHz separation; these are then shared such that thirteen channels, each with 32 tones covering 320 kHz, from Channel 0 to Channel 12 are formed, with each channel further carrying of the 32 tones a network-information-bearing tone at the bottom and top of the channel (T0 and T31) that encapsulate the content-carrying tones T1 through T30. Each channel is modulated by a 32-tone pilot to facilitate the acquisition and fine time synchronization. The 10 kHz tone separation controls reasonable levels of time selective Multipath (+/−100 MHz), with a cyclic buffer being added at channel edges. The network can, should environmental or network conditions suggest, 'step down' the overall frequency spread to 160 kHz BW without affecting the fundamental stability of the traffic algorithms or network. (See FIG. 26)

However, for high-mobility TDD links the number of bins, pilot size, and information-bearing tones per channel are halved, while the tone separation is doubled. This will permit high levels of Doppler shift (+/−5 kHz) without sacrificing QoS or content integrity; and again, the network can step down the overall frequency spread and thus the bandwidth per bin can be halved (from 320 kHz to 160 kHz) without affecting the fundamental stability of the traffic algorithms or network. (See FIG. 27)

Preferentially transmit gains are set proportionally to the conjugate of the receive weights for that particular node and channel. An alternative approach uses channel-based retrodirective transmit gains (more for SU than BS); a second alternative uses channel-based directive (beam-pointing) transmit gains (more for BS than SU); a third applies retrodirection to in-channel preemphasis gains; and any combination of these alternative approaches may be employed. For any such single-frequency link the transmitting node breaks periodically (in one particular alternative embodiment every 5 msec) to collect ACKs, NACKs, or RTSs, that is, to monitor the link performance as perceived by the receiving node. This approach, though it provides all the capacity in a particular link to a user as needed, is very compatible with small, stationary networks but less compatible with LEGO network management due to the effects of nonstationary network fields.

The ninth preference is that the network employs Locally-Enabled Network Optimization (LEGO) to manage the transmit power for each node (BS and SU) operating, dynamically. This requires that relatively complex computational operations (e.g. receive weight and transmit gain calculations, multitone, QAM, TCM, and the above-mentioned signal/symbol/weight/frequency calculations) be carried out autonomously at each node in the network, rather than limited to one class of nodes. This further requires that as part of the network overhead simple, network-level control parameters be passed to, or shared by (for certain time intervals, though such may either be hard-set invariances in the hardware, subject to change signal, or network-alterable) all nodes in the network. Additionally, each node would implement its power-management algorithm to minimize transmit power and manage its links, thereby indirectly optimizing performance over the entire network. An alternative embodiment would effect network-level optimization; and a third would combine node-driven local determined optimization with network-level optimization.

Although the preferred embodiment uses an algorithm that presumes that power capacity will vary over the network, and that establishes local maxima by favoring capacity maximization for the power constraint at each particular node in the network (i.e. a goal driven minimization algorithm), various alternative LEGO algorithms could be employed. For example, if power shortfalls or constraints on any part of the network are anticipated, then a capacity maximization subject to that power constraint algorithm could be used. A third alternative, presuming that the network capacity (as opposed to the power) is the guiding constraint, sets the power minimization subject to the capacity attainment to the limit possible over the entire network. And a fourth, which is better, sets the power minimization at each particular node in the network subject to the capacity constraint at that particular node.

The preferred embodiment incorporates into each node a multitone QAM decoder, with a soft-optimized, Viterbi algorithm (SOVA) embodied in the decoder, such that the network can effect changes in the decoder at its nodes by a software or information transmission that re-sets the hardware (EEPROM, FPGA, PAL, or other semiconductor chip) and software at that node for the new decoding scheme. An alternative embodiment with lesser cost and complexity at each node, but lesser flexibility, is to use hard-optimized, Viterbi or Reed-Solomon, decoders at each node in the network. A third alternative is to combine both SOVA and HOVA decoders in the network and establish hierarchies wherein the more flexible stations moderate as needed to communicate with their less flexible but simple contacts.

The preferred embodiment of the present form of the invention also incorporates synchronization means for its communications, which encompass timing estimation, carrier estimation, and synchronization operations as part of the network communication and control methodologies. The preferred synchronization is to a single, universal, and commonly observable timing signal such as that used in GPS operations, and occurs as part of the carrier signal (also known as 'UPS Sync'). An alternative embodiment would use synchronization to a timing, carrier, or mutual offset which would be observed at the transmission or master node during the reception process, wherein the slaved receiver synchronization would introduce a ×2 delay and carrier error at the slaved transmitter, to avoid interference with the master transmission. Another alternative embodiment would use precompensation (in timing, carrier advancement, or both), to equalize any timing or carrier offset observed at both ends of the link (a means to synchronize the slaved node's transmission). Combinations of universal, offset, or precompensation synchronization methods would be yet further alternative embodiments.

Synchronization would be performed by including in the transmission dedicated multitone signals (such forming part of the set of QAM symbols used by the preferred embodiment), or by using dedicated tones in each multitone symbol, or most preferentially, by combinations of dedicated tones and slots to maximize the synchronization possible for the minimal transmission density. Coarse synchronization would be performed prior to the multitone demodulation, using the envelope features of the waveform. Fine synchronization would be performed after multitone demodulation, using dedicated QAM synchronization symbols and tones. For embodiments using universal observed timing through GPS synchronization, or using slaved transmission synchronization, these would be performed using control or MAC channels. An alternative embodiment would bypass the synchronization operation entirely by using GPS-based timing and carrier acquisition methods. A separate alternative embodiment would use blind, data-based synchronization methods, minimizing the use of specific synchronization data.

In the preferred embodiment Transmit/Receive (T/R) compensation means are employed to remove nonreciprocal channels after shared transmit or receive operations. These would be employed intermittently on an 'as-needed' basis through transmission of specialized T/R compensation packets to initiate the compensation processing. An alternative embodiment would use dedicated T/R compensation channels to initiate the compensation processing. And the network would employ loops back of the received signal data to provide the initial transmitter with the T/R channel differences.

The preferred embodiment further includes methods for datagram network instantiations, particularly applicable for conditions such as edge networks (e.g. where the wireless electromagnetic communications network is connecting to the Internet) and entirely interior networks (e.g. the 'backhaul', dedicated, data-heavy, and often fiber-optic networks of other carriers). These enable the transmission of data in discrete datagrams, or fragments of datagrams, over multiple routes, such as neighboring nodes, according to the availability of transmission channel capacities. The recipient nodes would then reconstitute the original data stream from the received and re-ordered datagrams or datagram fragments. The preferred embodiment mechanizes the process by incorporating, or enabling, both TCP/IP and FTP protocols, and further uses fragment-level CRC's, error detection, and retransmission protocols to provide Zero-error, Uncommitted Bit-Rate (ZE-UBR) services. By using reservation protocols such as VoIP RSVP common to the industry, the preferred embodiment can also provide Committed Bit-Rate (CBR) service.

The preferred embodiment also incorporates means for resolving scheduling and capacity problems, preferentially the soft-contention and Demand-Assigned, Multiple-Access (DAMA) scheduling means. These would primarily be employed at network edges, though they also can serve at 'bursty' edge networks or handle 'unconcentrated' data streams. The soft contention means minimize the effects of data collisions and the latency due to retransmissions and/or backoff network effects; the DAMA scheduling is principally employed over longer sessions to maximize the network efficiency.

The topology of the wireless electromagnetic communications network affects the local details of implementation of the preferred embodiment, as different constraints and needs dictate how the best adaptation occurs. For small network embodiments where most, if not all of the nodes are in a common field of view, it is not important whether the network be in a star, ring, bus, or mesh topology. Under these conditions the preferred embodiment matches each transceiver's Degrees of Freedom (DOF) to the nodes in the possible link directions and equalizes them to provide node-equivalent uplink and downlink capacity. An alternative embodiment may also be used, depending on network traffic or user payment/preferences, wherein asymmetric transceiver assignments reflect the desired capacity weighting. After the DOF matching is completed, each node adapts the Receive Weights to form a hard (max-SINR, null-steered) or soft (max SINR) solution for multipath resolution for transmissions to that node. Then explicit interference whitening for in-network nodes, or implicit data whitening for soft nulling of out-of-network interferers are employed for conditions, e.g. as in Part 15 applications. Finally, retrodirective transmit gains (whitened or unwhitened as above) are used during subsequent transmission operations during a channel communication. In an alternative embodiments, the Receive Weights are directive, whitened, channel-based, or a combination thereof.

Figure 4:
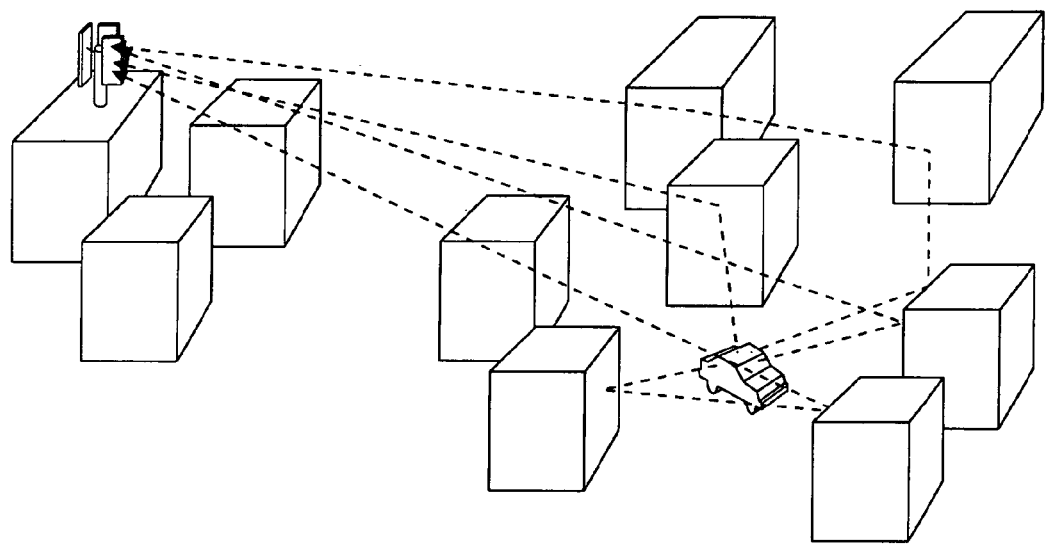
FIG. 4 illustrates a multipath environment, where a single BS with a complex antenna radiates multiple beams to a single SU (the car), wherein the beams also arrive from reflections off the surrounding features.
Figure 5:
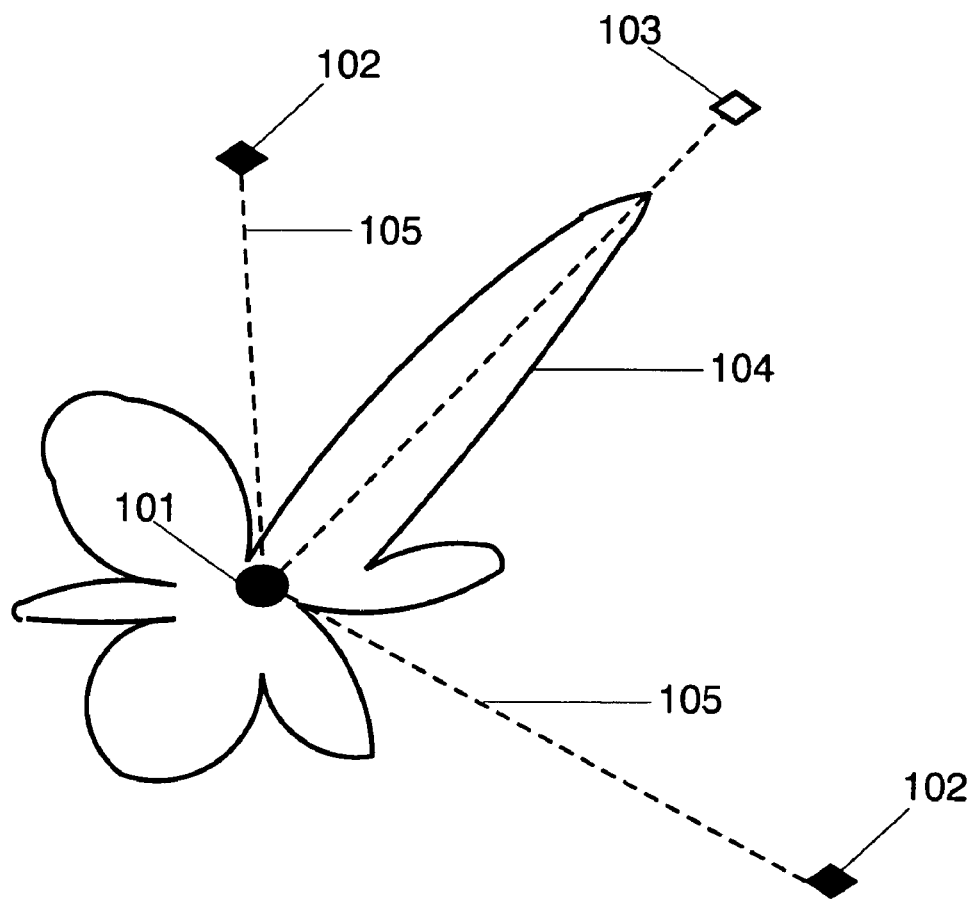
FIG. 5 illustrates a null-steering effort by a single node (Item 101), possessing at least three antennae, which is capable of directing towards two unintended recipients (Item 102) null transmissions (Item 105) and directing a focused beam (Item 104) towards an intended recipient (Item 103).
Figure 6A:
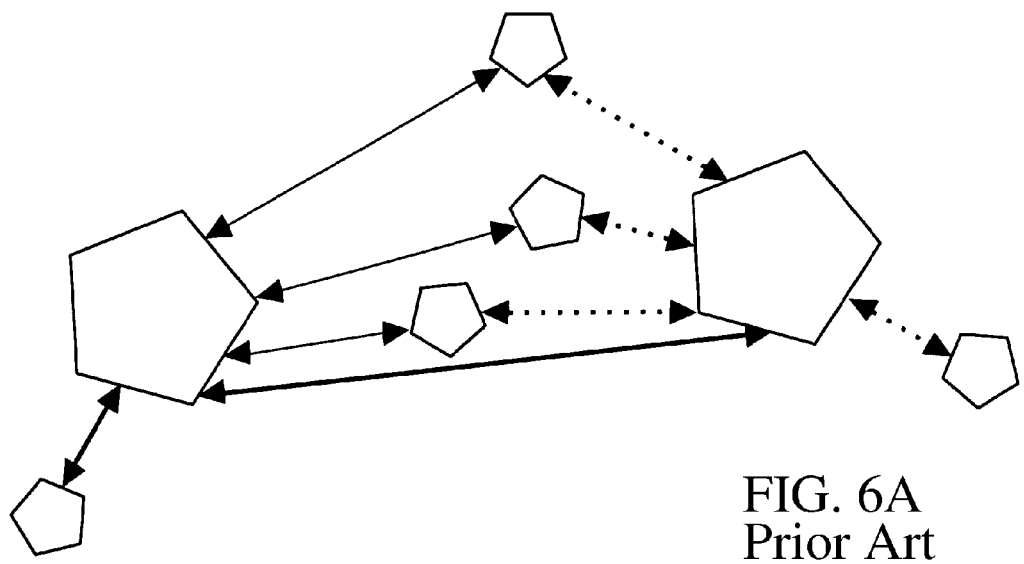
FIG. 6A illustrates a more complex multipoint network, where the BSs communicate with each other and with individual SUs, even if a BS to BS link may risk interfering with communications between the BSs and a particular SU.
Figure 6B:
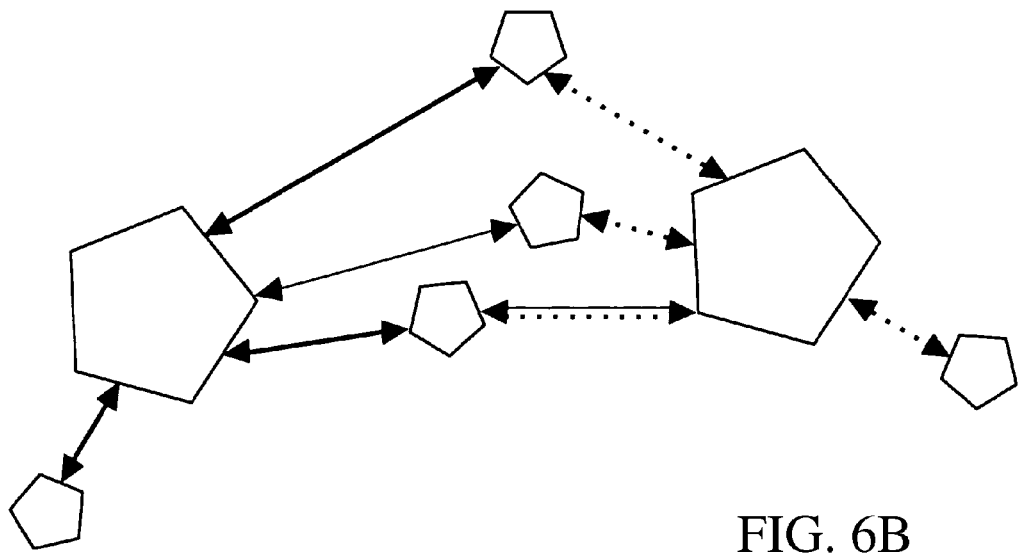
FIG. 6B illustrates a more effective use of the existing diversity of channels, whereby the BS to BS signal passes through a (possible multiplicity of) channel(s) from one BS to the intervening SUs thence to the second BS.

For large network embodiments the fundamental conditions are different and thus a different implementation and adaptation strategy is usually required. These include mesh extensions of star, ring, and bus networks (see FIG. 4); and the principal difference is that most nodes are not in a common field of view. A greater amount of network 'passing over' is required and nodes must more often serve as intermediary rather than terminal transceivers. Under these conditions, for each node the transceiver DOF is matched to those nodes that are observable during the Receive operation, and then performs the symmetric equalization (or alternative, asymmetric equalization) and other operations (and alternatives) as described in the preceding paragraph. Under these conditions the LEGO parameters used for management of the network are disseminated throughout the network.

A third possible topology and concomitant operating conditions occurs when the network is cellular, or has overlapping subordinate or coordinating networks. Under these conditions, which are particularly likely to occur under competition, not all the nodes will be connected to the same wireless electromagnetic communications network. A greater potential for signal interference which is beyond the network's control results and the preferred embodiment adapts to this constraint. Furthermore, there may be some minimal transmissions of control, network health, or network OAMP data through a disparate infrastructure (wired or wireless), or even a high-rate connection through a wired infrastructure in an alternative embodiment.

When these conditions occur and networks are in view of each other, they can experience signal or physical overlapping; in many situations, such as urban areas, there may be heavy interpenetration. In principle there will be physical separation of the disparate networks' nodes, at least as to their geographic identity (two mobile phones generally do not share the exact, same physical location and continue to work when so crushed together); in practice, however, all the networks' nodes share the same physical layer of the electromagnetic spectrum and the real world geography and hardware. What ensures the continued separation of the networks is and enforced separation at the non-physical, information and communication layer. Alternative embodiments may allow low-rate communication, or means for limited, or even allowable full inter-network communication, depending on the differing networks' contract agreement as to communications and provisioning sharing.

Under these conditions the nodes in the preferred embodiment direct nulls (hard or soft) at all observed Transmission nodes in other networks, to minimize the interference from and with the other network's signals. This same approach may be used, in an alternative embodiment, to enforce a 'lock out' of unauthorized nodes in a secure network. The nulls are further enabled using network-wide scrambling, gating, or encryption means as described elsewhere, to differentiate the two networks' internal signals.

An alternative embodiment incorporates one or more broadcast modes from network master controllers, that would enforce common timing standards and provide broadcast, i.e. network common information, without requiring two-way bandwidth for such effort.

Advantages: LEGO

Among the advantages of the preferred embodiment's solution of the local optimizations to obtain global optimization are the following: (1) the working target capacity objective for any given set of nodes may be rapidly reached by iterating from an initial approximation to an acceptably-constrained solution with many fewer iterations overall; (2) the power levels that solve the local target capacity objective minimize the transmitted energy at the local node, thereby minimizing the co-channel interference to other uses in the network; and (3) the quantities needed for the local solution only require local information to solve, thereby reducing substantially the ratio between 'control' and 'content' information, thus further enhancing the overall capacity of the network.

Additional advantages of the preferred embodiment's LEGO approach are (1) that it can be solved at each node using a very simple but powerful approximation technique that converges rapidly to the correct solution; (2) the power levels, at each respective node, that solve Eq. 3 actually minimize the transmitted energy at each respective node, hence (3) minimizing co-channel interference to other users (nodes) in the network while achieving the targeted capacity rates; and (4) most of the quantities required for the optimization only require local information.

Further advantages of the preferred embodiment include the lack of any need for estimating any channel matrices, and substantial lessening of detailed and fine calculation and recalculation of both (1) the initial SINR ratios and (2) the effect on each node of changing the power usage of any other node in the network. This latter has a secondary effect of reducing the amount of 'control' information that needs to be sent across the network, and reduces the amount of work or complexity that has to be managed by the network controller.

LEGO Effect on the MIMO Network

By solving the optimization at the local level for each node of the network, the problem of network optimization becomes a hierarchical one, where the overall problem is reduced to a series of subproblems. The preferred embodiment's implementation as described above, is then generalized to handle both the power constrained unconstrained (negligible noise) objective functions.

For the channel capacity value $D_{21}$, the network performs the optimization $$D_{21} = \max \beta \text{ such that} \qquad \text{EQ. 49}$$

$$\beta \leq \sum_{q \in U(m)} \sum_{k} \log(1 + \gamma(k, q)),$$

$$\gamma(k, q) \geq 0,$$

$$\sum_{m} R_1(m) \leq R,$$

$$\pi_1(k, q) \geq 0$$

$$\sum_{q \in U(m)} \sum_{k} \pi_1(k, q) \leq R_1(m)$$

where U(m) is a collection of links in a given aggregate set m, k is a transmission mode index, reflecting the fact that a single link may transmit over multiple diversity channels, $\pi_1(k,q)$ is the transmit power for mode k and link q, $\gamma(k,q)$ is the post beamforming signal to interference noise ration, and $R_1(m)$ is the total allowed transmit power for aggregate set m; by solving first the reverse link power control problem; then treating the forward link problem in an identical fashion, substituting the subscripts 2 for 1. The solution for the link-level optimization as described above is then implemented at each node, and the network solution derived therefrom.

The means used to solve $D_{21}$ optimization are chosen to minimize the amount of auxiliary channel information, or network control information that displaces network content. For most of the max-min objective functions described herein, a necessary condition of optimality is that all of the links over each link index q achieve the same capacity. We can therefore require the constraint in Eq. 49 to be an equality For this embodiment, the objective function that is solved at each aggregate set m, becomes:

$$\min_{\pi_r(q)} \sum_{q \in Q(m)} \pi_r(q), \text{ such that} \qquad \text{EQ. 50}$$

$$\beta = \sum_{q \in Q(m)} \log(1 + \gamma(q))$$

The preferred embodiment linearizes this objective function as a function of γ(q) and optimizes it using the formulation in EQ 28, EQ 29 and EQ 30.

For each aggregate set m, the network now attempts to achieve the given capacity objective, β, by (1) optimizing the receive beamformers, using simple MMSE processing, to simultaneously optimize the SINR; (2) based on the individual measured SINR for each q index, attempt to incrementally increase or lower its capacity as needed to match the current target; and (3) step the power by a quantized small step in the appropriate direction. When all aggregate sets have achieved the current target capacity, then the network can either increase the target capacity β, or add additional users (opportunistically or by signal) to exploit the now-known excess capacity. The network controller of the preferred embodiment is computationally extremely simple and requires a very small feedback channel, or portion of the control channel otherwise unused, to accomplish its tasks.

As the network evolves each independent channel is assigned a variable rate codec optimized for the currently achieved SINR for that link, whereby a code and associated rate are chosen to achieve the desired bit error using any of the Trellis Codes, interleavers, and/or Reed-Solomon codes known to the literature.

Good network performance includes, generally, a measure of uniform minimum performance level for all links assigned the same quality of service (QoS). The preferred embodiment uses Max-Min capacity criterion as disclosed above to attain this, as it is generalizable to a wide variety of network configurations. Minimizing the total power subject to arbitrary capacity constraints β(m), as in EQ 3 and EQ 4 is also an embodiment of interest and is easily accommodated by the current invention. The addition of reciprocity as a feature of the preferred embodiment allows us to state the decoupled objective function:

$$D_{rt} = \max_{\pi_1(k,q)} \min_m D_{rt}(m) \text{ where} \qquad \text{EQ. 51}$$

$$D_{rt}(m) \equiv \sum_{q \in U(m)} \sum_k \log(1 + \gamma(k, q))$$

as the largest possible mutual information that can be obtained, as the one to be used to obtain network optimality.

The reciprocity equation, Eq. 2, establishes that the network's uplink capacity will equal its downlink capacity provided that the receive weights are used to transmit and the transmit weights to receive. Implementing the network optimization in this fashion provides the following benefits: (1) transmit weights can be obtained from receive weights; (2) transmit and receive weights require only local information at each node, thereby eliminating the 'network God' and 'common knowledge' problems; and (3) local optimization done using this optimizes the entire network, both making it stable and converging. The reciprocity equation is used particularly to tell each node how to choose its transmit weights optimally.

An improvement over blindly substituting transmit and receive weights, however, is in using the proper form of the objective function that satisfies the reciprocity equation, for that determines how to optimally adjust and select the gain over multiple outputs and multiple inputs. The choice of the objective function specified above dictates the algorithmic procedure that is also specified above to optimize the network.

Figure 41:
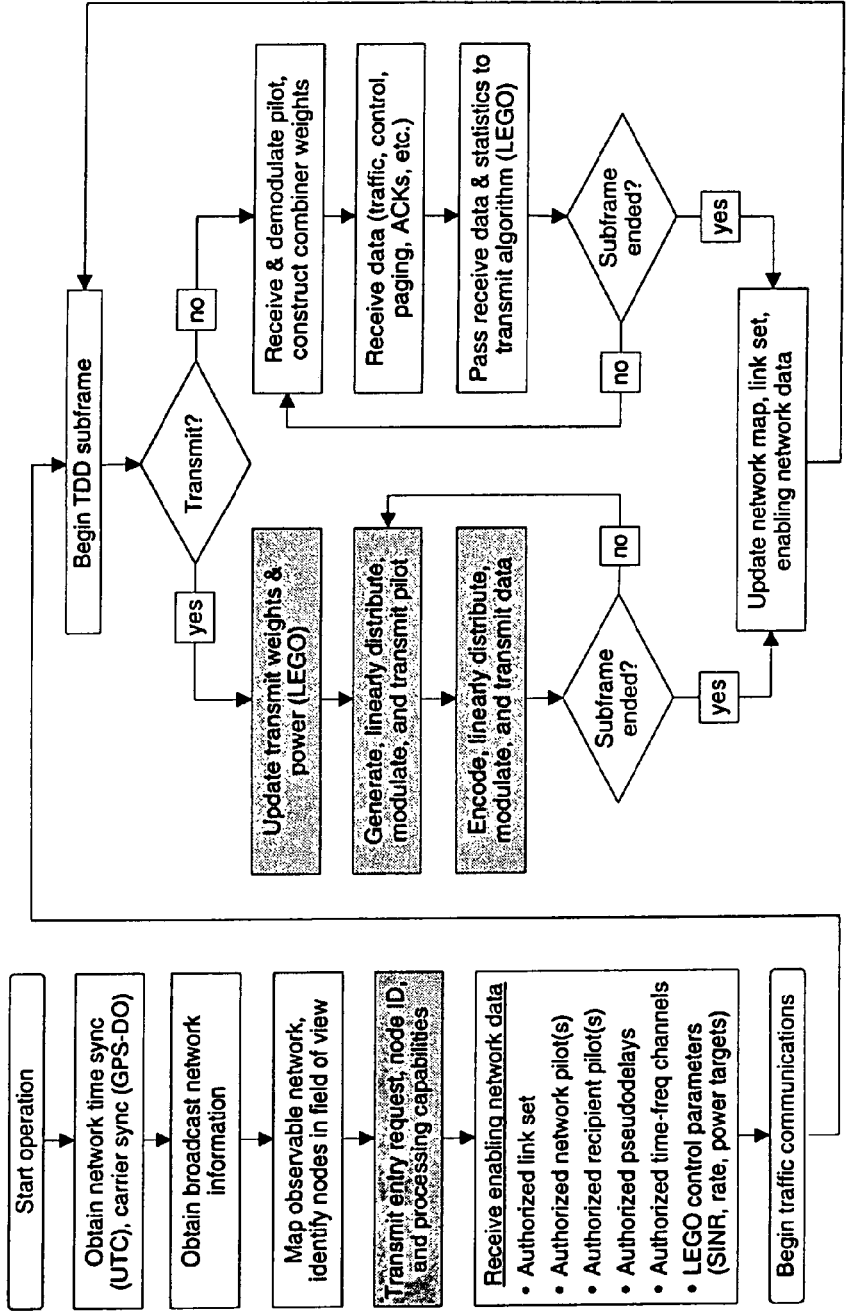
FIG. 41 illustrates, for a TDD MIMO network as in the preferred embodiment, an algorithm for any node entering the network.

Alternative embodiments of the network controller include having it set the entire network target capacity objective (β), using the network controller to add a node, drop a node, or change the target capacity objective for the nodes it governs or the network. FIG. 41 illustrates one feasible algorithm whereby a new node (or a node which had earlier dropped out of the network) enters the network. Further embodiments include using a network control element that may, either in addition to or in replacement for altering β, add, drop, or change channels between nodes, frequencies, coding, security, or protocols, polarizations, or traffic density allocations usable by a particular node or channel. In yet another embodiment the network control element selects and manages differing constraints, not being limited just to power and capacity, but also QoS, the amount of frequency spread between channels, the multipath density allocated to any particular pairing of nodes, or to any particular user, or any combination and subcombination of all of the above.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of wireless electromagnetic communications networks, systems and MIMO networks and systems therefore, and which may be used instead of or in addition to features already described herein. The algorithms and equations herein are not limiting but instructive of the embodiment of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

Figure 42:
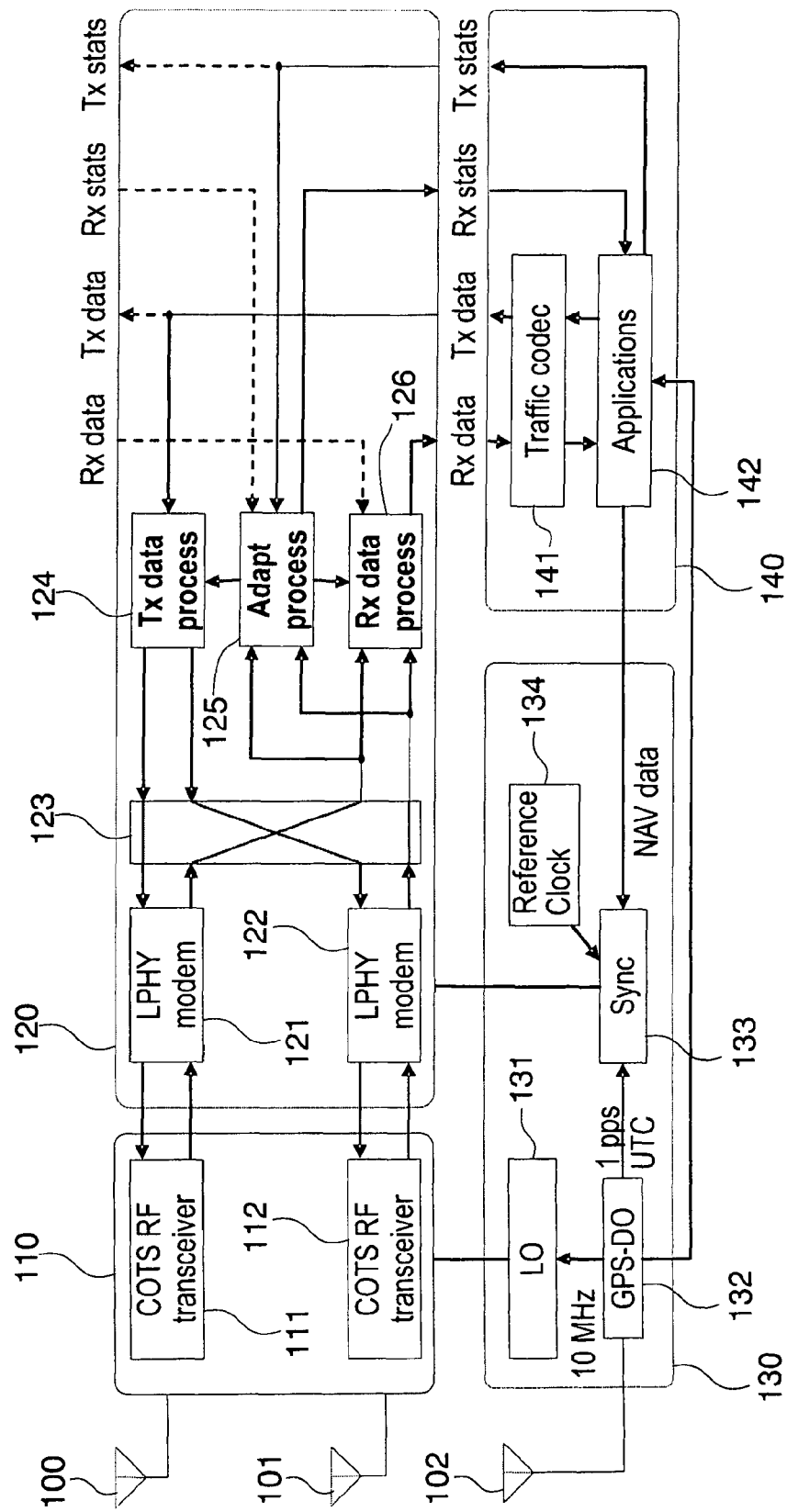
FIG. 42 shows MIMO-capable hardware transceiver means for, and the processing steps performed, in the baseline two-channel transceiver used in the invention.

FIG. 42 depicts the baseline transceiver employed in the primary embodiment. The radio consists of a pair of antennas and RF transceivers (frequency up/down converters and PA's); a digital ASIC, FPGA, or software radio component to implement lower-PHY (LPHY) symbol modulation/demodulation operations, linear combining of LPHY modem output signals during receive operations and corresponding linear weighting and distribution of LPHY model input signals during transmit operations; an LO employing a GPS disciplined oscillator (GPS-DO); and a software computer to implement optional higher-layer codec and collaborative radio applications. Typical commercially available GPS-DO's can provide <100 ns relative node-to-node timing error (well within the 800 ns delay error budget provided by the lower PHY modulation format) and <1 Hz carrier offset error (separate from Doppler shift between nodes), stable to within 300 ns over periods of >1 hour in event of GPS outage, e.g., due to foliage or man-made obstructions. In TDD network instantiations, this can allow fast (1.25 ms) node entry to the network without the need for detailed and distributed timing synchronization mechanisms. In absence of GPS-DO's collaborative means can be implemented to allow the radios to synchronize to a common shared time reference by monitoring broadcast signals transmitted from adjacent transceivers, or to synchronize to GPS time and frequency standards if just one of the transceivers in the network possesses a GPS-DO, allowing the transceivers to be implemented at greatly reduced cost. The baseline transceiver can to employ two degrees of freedom during receive and subsequent transmit operations, to set up independent ports to up to two other transceivers in the network during transmit or receive operations, or to null one external interferer during receive operations. Antennas in the network can be polarization diverse (transmitting and receiving on linearly independent, preferably orthogonal polarizations), spatially diverse (deployed at spatially separated locations), or combinations of polarization and spatially diverse. It is also possible to have a single channel transceiver capable of communicating with the network, or any number of ad-hoc combinations of transceivers of varying capabilities, likewise.

Figure 43:
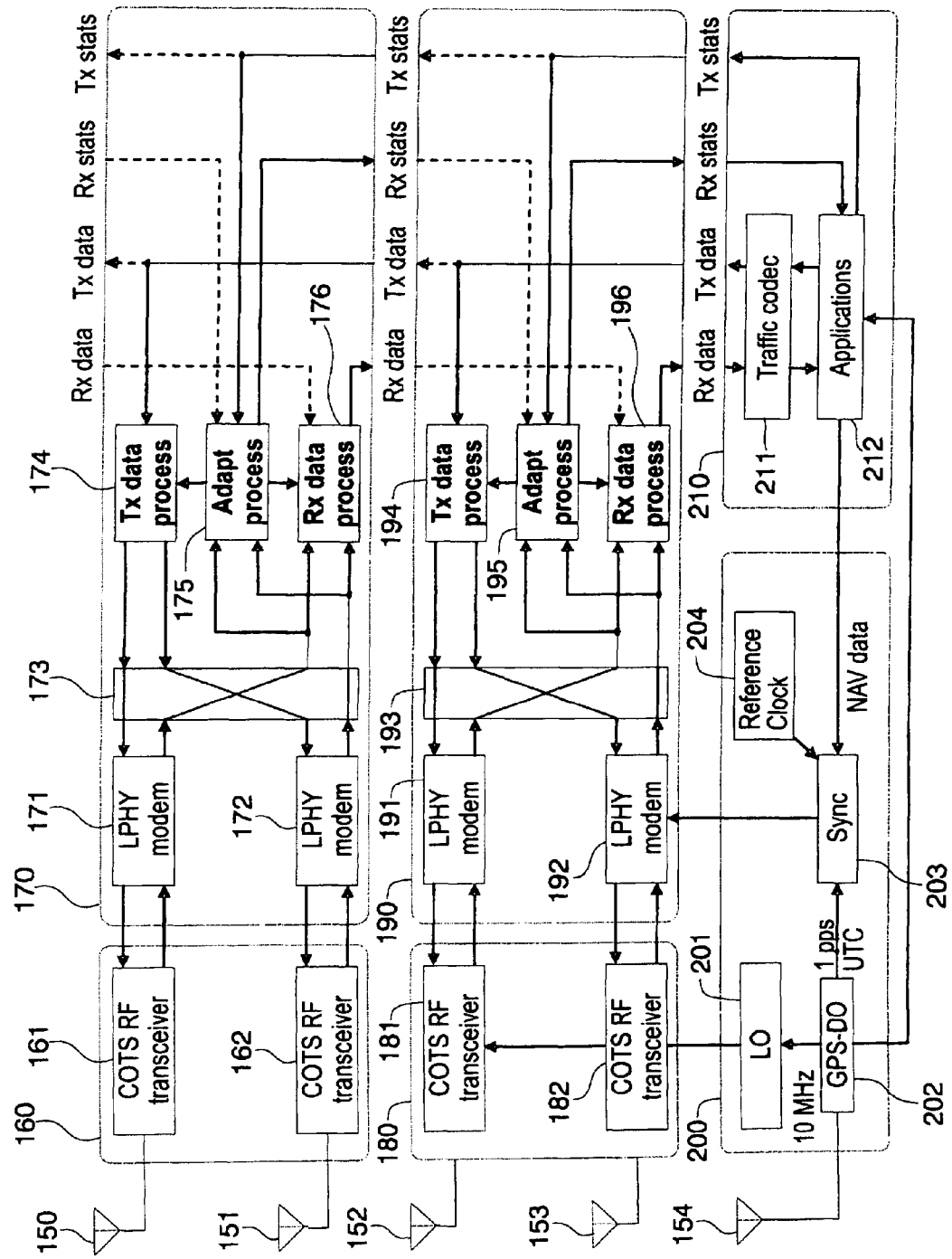
FIG. 43 shows enhanced MIMO-capable hardware means for, and the processing steps in combining, baseline two-channel transceivers to provide additional degrees of freedom (receive combining and transmit distribution) in larger networks.

FIG. 43 depicts means for extending the baseline transceiver to larger numbers of antenna channels. The baseline transceiver and adaptation algorithm include provisions for routing of transmit and receive data and a modified Gram-Schmidt orthogonalization (MGSO) statistics between boards, in order to allow the radio to be scaled up to as many as 8 antennas by combining 2, 3, or 4 Transceiver boards together. A transceiver employing L baseline transceivers can employ up to 2 L degrees of freedom during receive and subsequent transmit operations, to establish independent channels to up to 2 L separate transceivers in a network, or to excise up to 2 L-1 external interference during receive operations.

Figure 44:
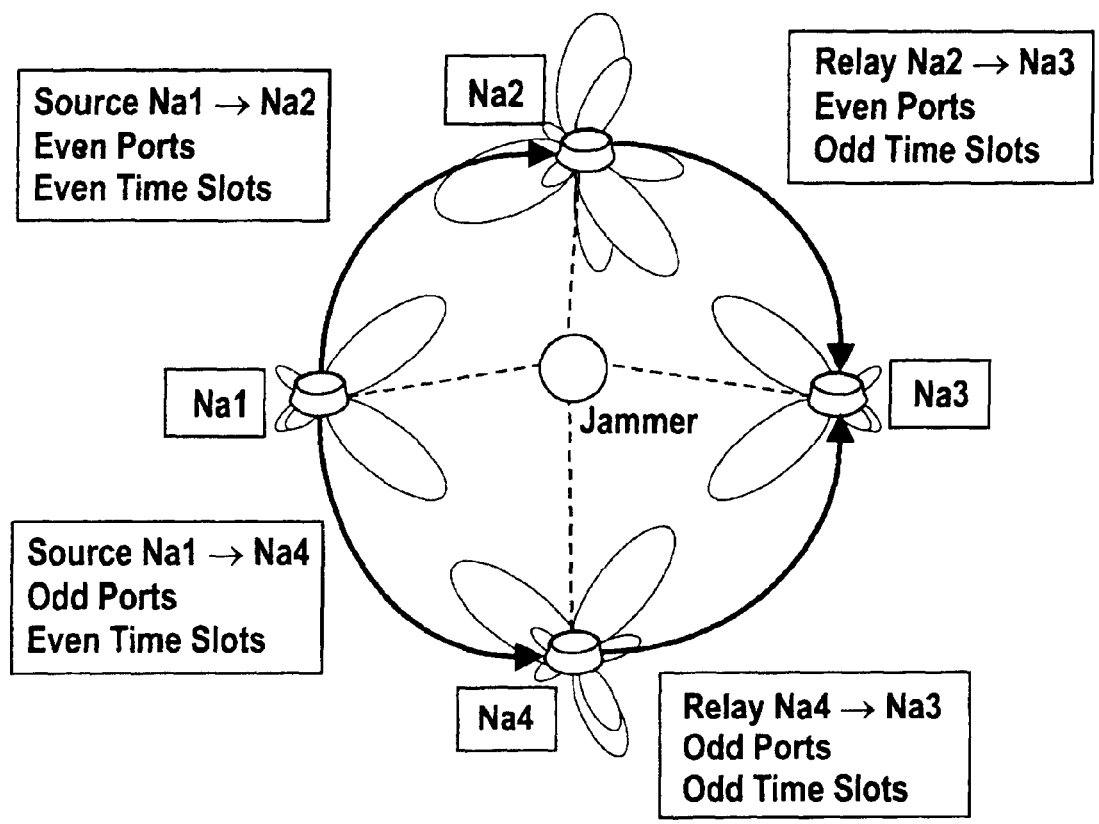
FIG. 44 shows an exemplary MIMO networking routing scenario in which four transceivers with four spatial degrees of freedom are used to route data around a four-node network in the presence of a strong jammer.

FIG. 44 depicts an exemplary MIMO networking routing scenario in which four transceivers with four spatial degrees of freedom are used to route data around a four-node network in the presence of a strong jammer. Each transceiver employs two of its four available degrees of freedom to establish connections with its neighboring transceivers. The remaining degrees of freedom are then used to excise the jammer in the center of the network, and to increase signal-to-noise ratio (SNR) in the direction of its neighboring transceivers. In a time-division duplex (TDD) communication network, these connections can be used to simultaneously route data in clockwise and counter-clockwise directions to form a counter rotating ring network. In lightly loaded networks, this can double the capacity available to any node in the network; moreover, this can greatly increase availability of the network to each node, by providing a redundant path for transmission of data between network ports.

Figure 45:
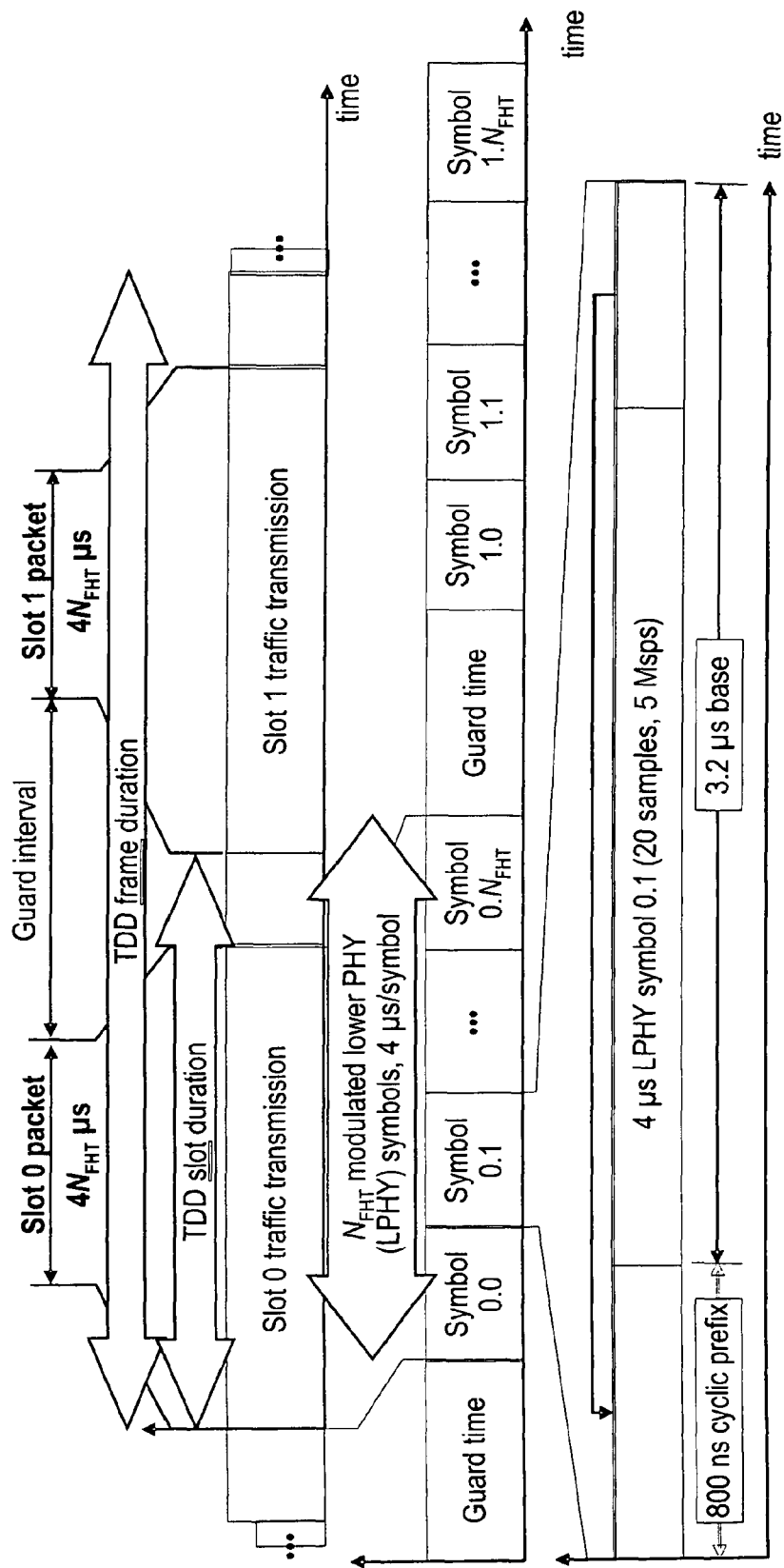
FIG. 45 shows the baseline symbol and timing structure for each transmission, when transceivers are operated in a symmetric time-division duplex (TDD) multinode network.

FIG. 45 depicts the baseline symbol and timing structure allowing transceivers to connect with each other in a symmetric time-division duplex (TDD) multinode network. Packets are transmitted to and from uplink receive nodes and downlink receive nodes during alternating time slots, with an appropriate guard time, e.g., for switching between transmit and receive modes, transmission of signaling/control and network maintenance/provision packets, computation of receiver CRC's and decoding algorithms, and operation of higher-layer data routing procedures. Within each slot, an integer number of lower PHY (LPHY) symbols is transmitted. The number of symbols is chosen to have a value that allows implementation of efficient orthogonal transformations over the symbol time index. In the primary embodiment, this number is set equal to a power-of-two, e.g., 256 symbols, in order to use of fast Hadamard transform (FHT) operations; however, other embodiments can employ different numbers of symbols, e.g., allowing implementation of mixed-radix fast Fourier transforms (FFT's) or other linear orthogonal operations. Each LPHY symbol is assumed to possess a base symbol and a cyclic prefix that is discarded during the LPHY symbol demodulation operation, allowing the transceivers to be insensitive to delay and multipath with maximum substantive value that is less than the cyclic prefix. In the preferred embodiment, the cyclic prefix and base symbol is set to 800 ns and 3.2 μs, commensurate with the 802.11 OFDM traffic PHY, and may include additional synchronization and signaling symbols (external to symbols carrying traffic information) in order to maximize commonality with 802.11 hardware, and/or promote eventual coexistence and/or integration of the invention into 802.11 networks. In the preferred embodiment, the LPHY symbol is also either an OFDM waveform comprising multiple subcarriers (modulated OFDM tones) or a PAM signal equivalent to a single carrier of an OFDM waveform, e.g., for low-rate applications. However, the invention is compatible with many different LPHY modulation formats besides OFDM or PAM, including spread spectrum modulation formats that spread the signal over wide bandwidth, and LPI/LPD modulation formats that reduce or eliminate cyclic features of the waveform.

Figure 46:
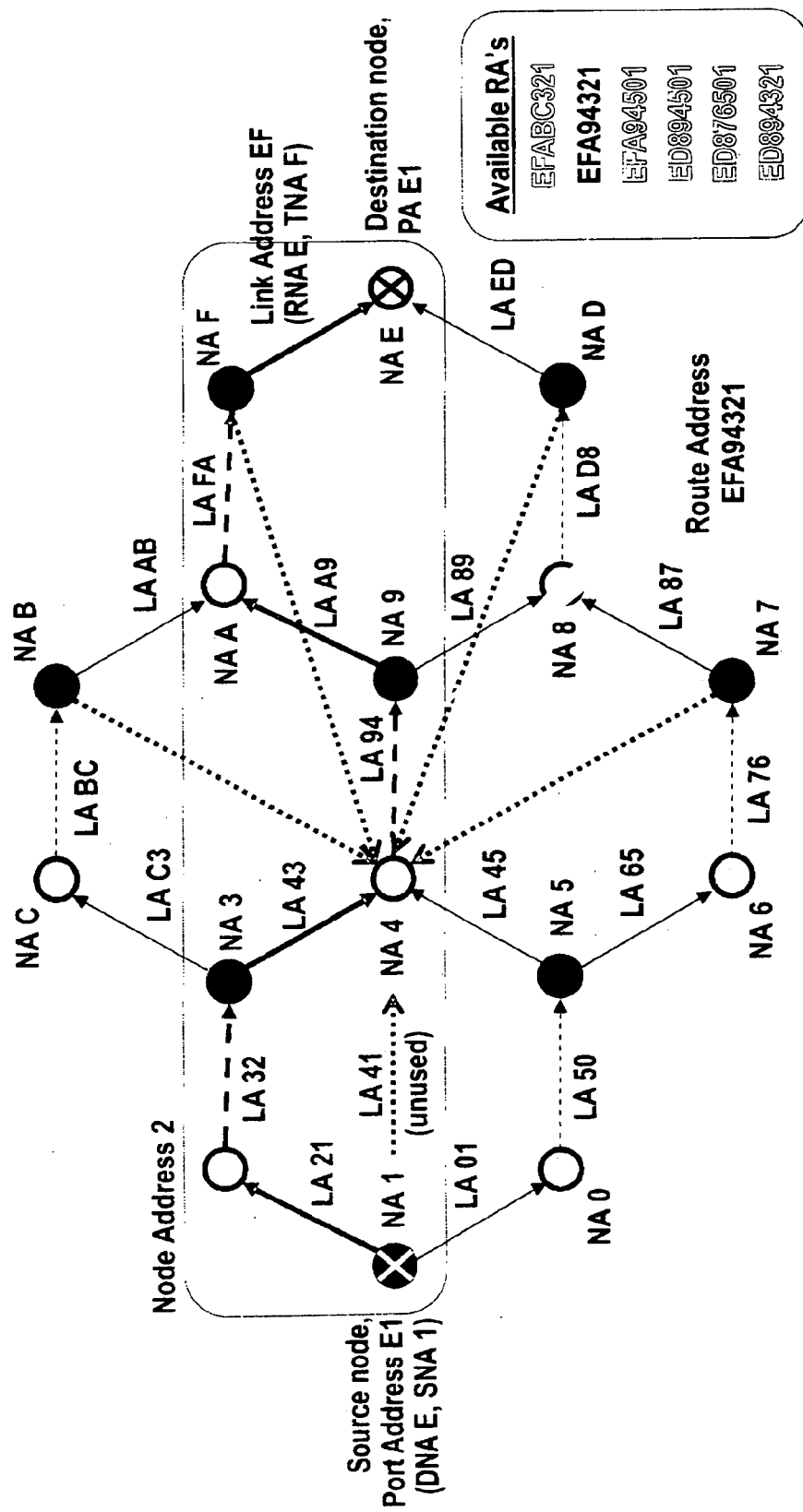
FIG. 46 shows an exemplary deployment and instantiation of the invention in a communication over a TDD mesh network topology

FIG. 46 depicts exemplary means for deploying the preferred embodiment in a TDD mesh network topology, in order to transmit data between a widely separated source and destination node. In this embodiment, the network nodes are first separated into uplink transmit nodes (downlink receive nodes), depicted with light interiors in FIG. 46, which transmit data over even time slots and receive data over odd time slots, and uplink receive nodes (downlink transmit nodes), depicted with dark interiors in FIG. 46, which receive data over even time slots and transmit data over odd time slots. Each transceiver is assumed to possess sufficient spatial channels to allow it to communicate simultaneously with at least two of its nearest neighbors over each time interval, i.e., to form two links between its nearest neighbors in the network, suppress any network or external interference impinging on the nodes, and close each individual link under channel propagation conditions observed by that node. At high spectral efficiency, e.g., in applications where the nodes must transmit data at high rate, each node (and especially internal nodes) may require as many as eight antennas, or four baseline transceivers, to support MIMO networking communication. Conversely, in applications where the nodes must transmit data at modest rates, e.g., VoIP communications, each transceiver could operate with as few as two diversity channels, or a single baseline transceiver, to support needs of the network.

Each link is given a unique link address (LA), defined by the transmit node address (TNA) and receive node address (RNA), i.e., the node address (NA) of the nodes originating and terminating that link, and the channel rank of that particular link if a true multirank MIMO link exists and is exploited by those nodes. In the sixteen-node network shown in FIG. 46, each LA is defined as a two-hex address comprising the (RNA,TNA) for that link, with a third hex number (equal to zero in every LA shown in the Figure) reserved to capture the mode index (0=dominant rank) of that link. In FIG. 46, uplinks instantiated over odd time-slots and passing data from uplink transmit nodes to downlink receive nodes are depicted as solid arrows, and downlinks instantiated over even time slots and passing data from downlink transmit nodes to downlink receive nodes are depicted as dashed arrows. In this Figure, packets can be transported across the entire network in 7 time slots (3.5 TDD frames).

Figure 47:
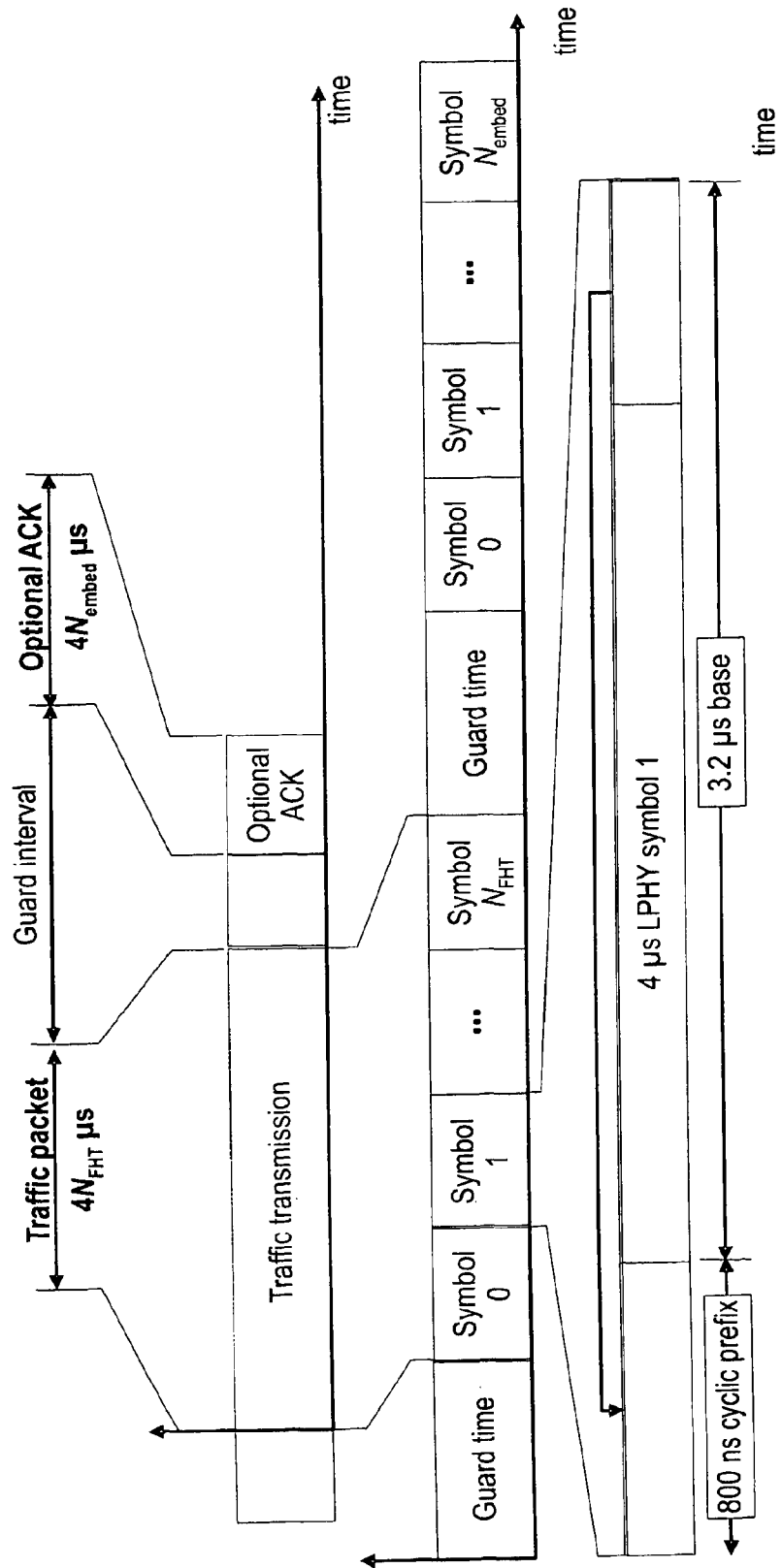
FIG. 47 shows the baseline symbol and timing structure for each transmission, when transceivers are operated in a ad-hoc multinode network.

FIG. 47 describes the baseline symbol and timing structure for the invention, when transceivers are operated in an ad-hoc multinode network. In the preferred ad hoc embodiment, traffic data is transmitted over a preset numbers of LPHY symbols, e.g., determined at the beginning of data communications, which is larger than a minimum number of signals $N_{embed}$ determined by the overhead structure set aside to implement receive adaptation algorithms at each transceiver, and which is a convenient number, e.g., power-of-two, allowing implementation of efficient data transformations in subsequent processing steps. However, the preferred ad hoc embodiment employs an overhead structure that allows implementation of alternate methods that do not require exact knowledge of the full packet length to implement receive adaptation algorithms, and that can allow transmission of packets of different length to different nodes in the network.

For certain levels of quality-of-service, the traffic packet may be followed by an acknowledgment packet sent from the receive node(s) back to the transmit node, comprising $N_{embed}$ LPHY symbols. As in the TDD instantiation, the traffic and acknowledgement packets are separated by a guard time interval; however, the time interval between traffic and acknowledgement packets may be very short, e.g., on the order of the Short Interframe Space (SIFS) in 802.11 communications.

Figure 48:
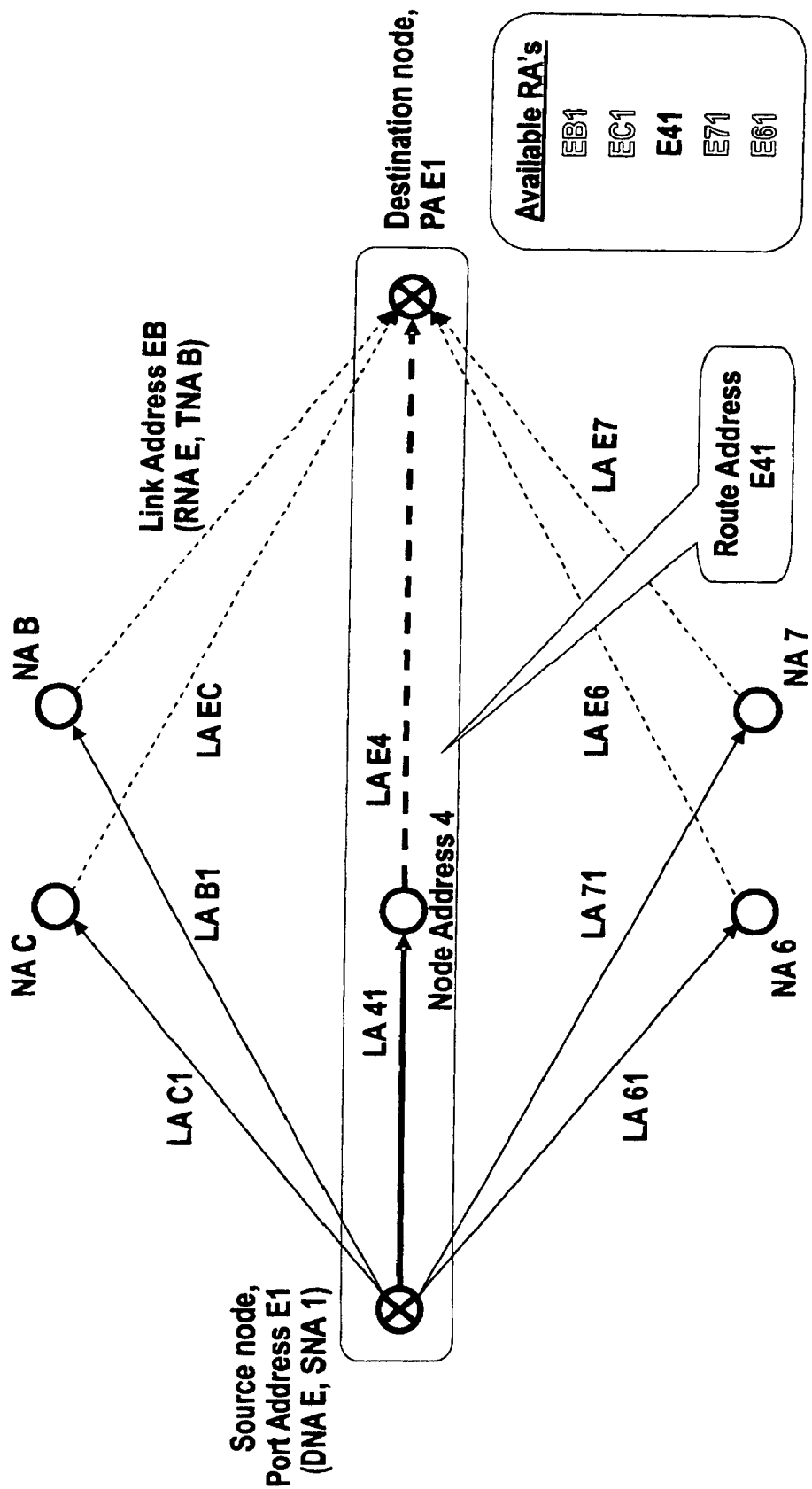
FIG. 48 shows an exemplary deployment and instantiation of the invention in a communication over an ad hoc mesh network topology.

FIG. 48 depicts exemplary means for deploying the invention in an ad hoc mesh network topology. In this network, any node can communicate with any other node in its field of view, allowing the source node to simultaneously transmit packets to any available node in the network. In FIG. 48, for example, the source node transmits packets to five separate intermediate (relay) receive nodes over a first traffic time slot, and directs those nodes to transmit packets directly to the destination node over a subsequent traffic time slot. In the preferred ad hoc embodiment, each of the relay nodes receive independent data, e.g., one of five subsets of data, from the source nodes, similar to the approach employed in the TDD embodiment. However, the invention supports an additional macrodiverse mode in which the source node transmits identical traffic data to each intermediate node. In this case, the intermediate nodes will form a macrodiverse transmitter that can exploit the full network transfer function between the source node and intermediate nodes during the first traffic time slot, and the full network transfer function between the relay nodes and the destination node over the second traffic time slot.

Figure 49:
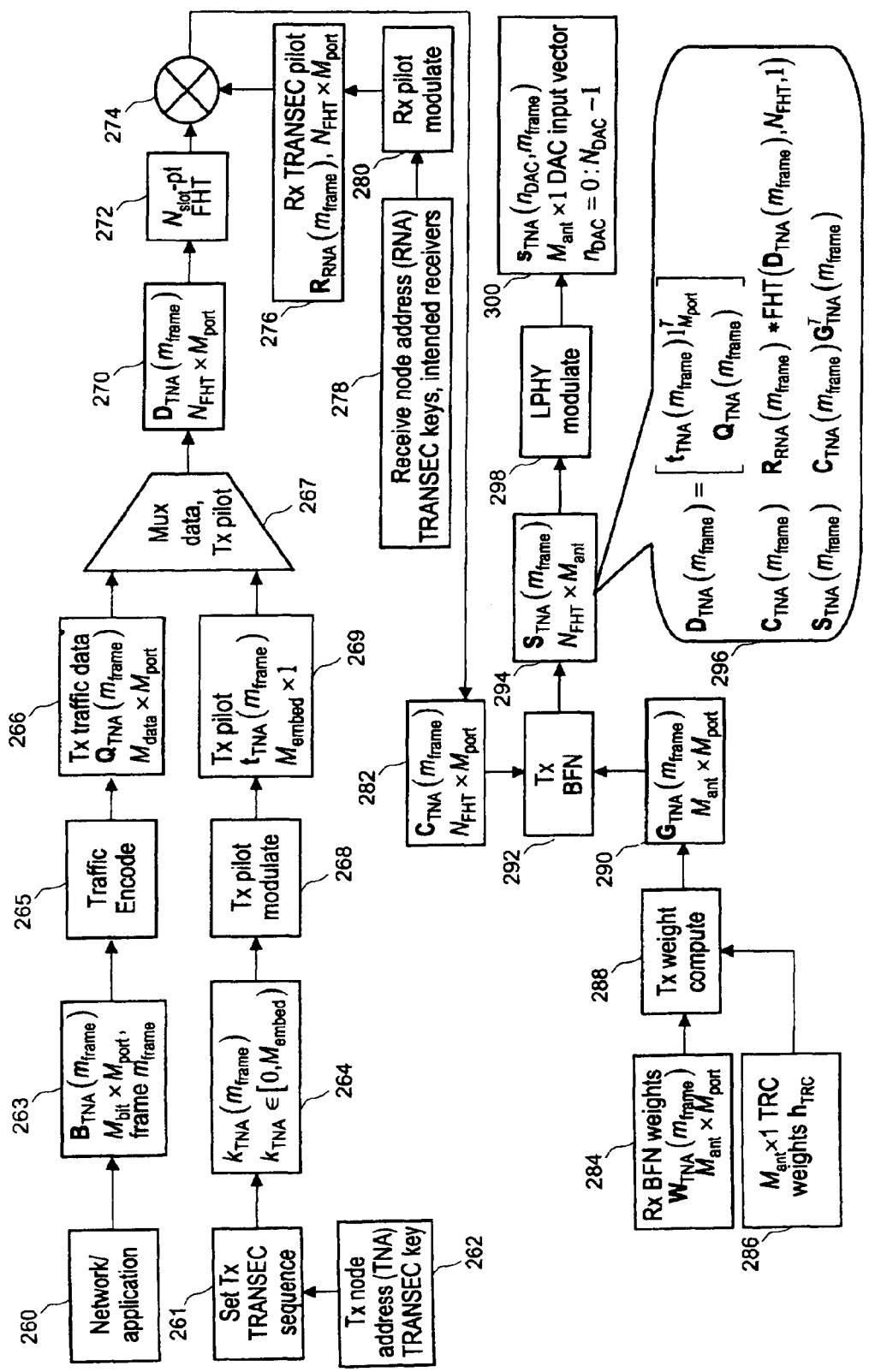
FIG. 49 shows multiport PHY transmit operations and processing performed at transceivers using the invention.

FIG. 49 describes multiport PHY transmit operations performed at transceivers using the invention; and these are described in detail below. In order to minimize complexity of the Figure, operations are shown for a single-carrier LPHY modulation format, e.g., a PAM format employing a cyclic prefix as shown in FIG. 45 and FIG. 47, or for a single subcarrier of an OFDM LPHY. In the latter case, all operations are replicated across subcarriers, with possible exception of subcarriers that may be reserved for synchronization purposes or for compatibility with existing wireless air interfaces, e.g., 802.11ag, and additional variations that may be introduced to increase security of the network.

On the traffic path, data bits intended for each of $M_{port}$ receive node are first encoded into $N_{data}$ complex traffic data symbols, e.g., complex QPSK or QAM symbols, using conventional encoder technology. These symbols are then multiplexed onto the upper $N_{data}$ input bins of an efficient orthogonal transform operator such as a fast Hadamard transform (FHT), such that at least $N_{embed}$ bins of the transformation are not modulated by data during the subsequent transform operation. On the overhead or "pilot" path, at least one of $N_{embed}$ bins is modulated. This bin location is chosen based on the node address of the transmit node, and a network-wide (e.g., time-of-day based) Transmission Security (TRANSEC) operation known to each node in the network, e.g., by modulo-$N_{embed}$ adding the TNA to a common TRANSEC word, such that each node is modulating a unique bin during any given traffic or acknowledgement time slot. Each port of modulated traffic and pilot symbols are then passed through the fast orthogonal transformation, yielding $N_{FHT}$ transformed output symbols. Each port of transformed output symbols are then multiplied by a second, pseudorandom constant modulus TRANSEC receive code based on the node address of the receive node that the transmit node is attempting to communicate with over that port and time slot, and other information known only to the network users. The resultant symbols are then multiplied by the $M_{port} \times M_{ant}$ transmit diversity weights employed at the transmitter, where $M_{ant}$ is the number of antennas employed at the transmitter. If those weights are determined adaptively, e.g., using knowledge of reciprocity of the communication channel, this data is further multiplied by a set of transmit-receive compensation weights that enforce reciprocity between the transmit and receive channels at the node. These symbols are then passed through the LPHY symbol modulator (in combination with symbols corresponding to other subcarriers if the transceiver employs an OFDM LPHY), and onto the subsequent DAC, upconversion, power amplification, and RF transmission operations.

Figure 50:
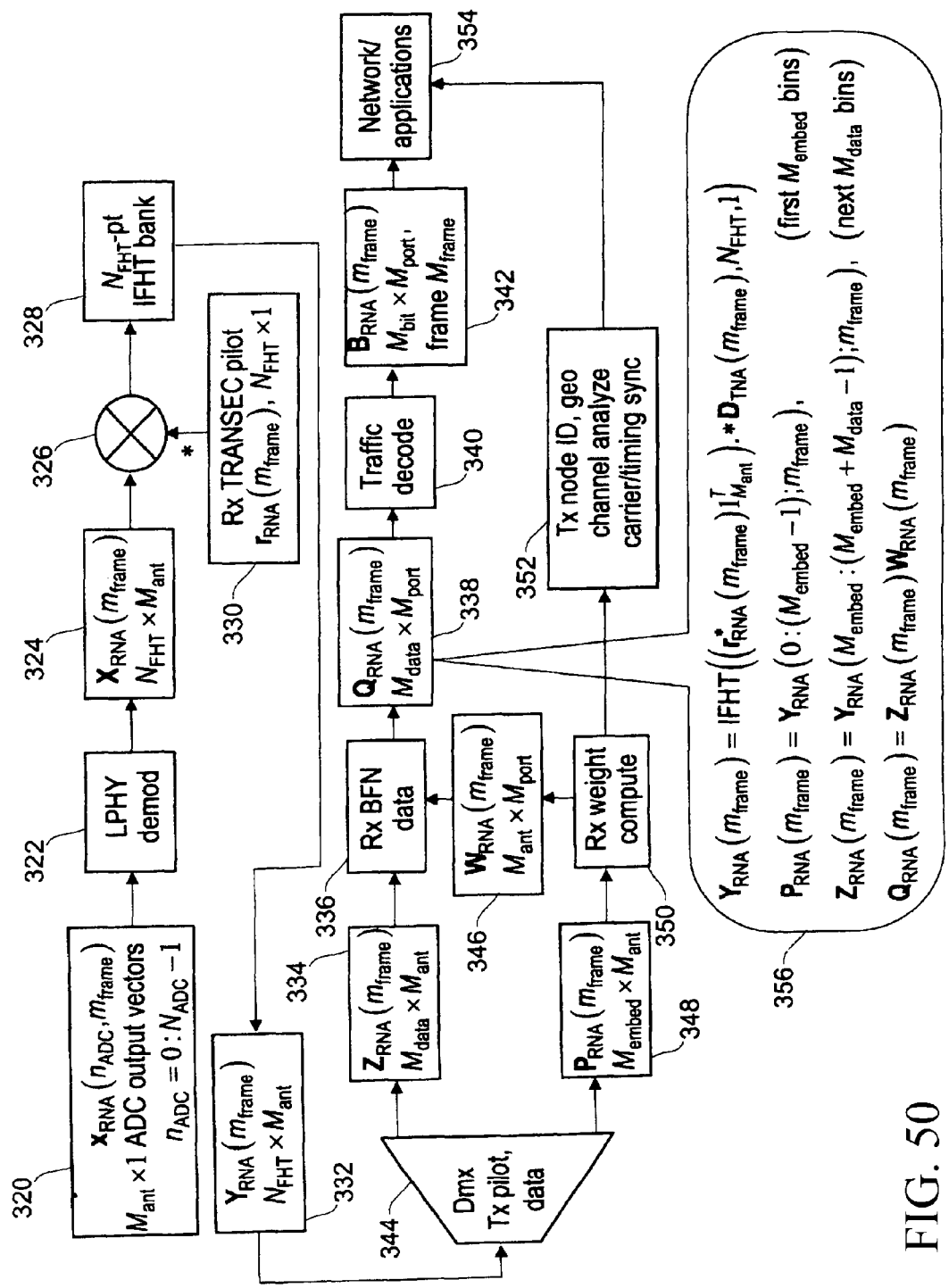
FIG. 50 shows multiport PHY receive operations and processing performed at transceivers using the invention.

FIG. 50 describes multiport PHY receive operations performed at transceivers using the invention; and these are described in detail below. In order to minimize complexity of the Figure, operations are shown for a single-carrier LPHY modulation format, e.g., a PAM format employing a cyclic prefix as shown in FIG. 45 and FIG. 47, or for a single subcarrier of an OFDM LPHY. In the latter case, all operations are replicated across subcarriers, with possible exception of subcarriers that may be reserved for synchronization purposes or for compatibility with existing wireless air interfaces, e.g., 802.11ag, and additional variations that may be introduced to increase security of the network.

After RF reception, downconversion, and ADC operations on $M_{ant}$ spatial or polarization diverse antennas, data received at each antenna is passed through an LPHY demodulator that converts that data to $N_{FHT} \times M_{ant}$ complex matrix representation ($M_{ant}$ columns of $N_{FHT} \times 1$ complex data), on each subcarrier if the transceiver is employing an OFDM LPHY. Each $N_{FHT} \times 1$ complex data vector is then multiplied by the conjugate of the TRANSEC receive code for that node, which removes that TRANSEC receive code added at the transmitter for that port (and only for ports that were intended to pass data to that receive node). This data is then passed through the inverse of the orthogonal transformation employed at the transmitter, e.g., an inverse FHT, and separated into the lower $N_{embed}$ output bins (an $N_{embed} \times M_{ant}$ complex pilot data matrix) corresponding to the pilot signal(s) employed at each transmit node attempting to communicate with that receive node, and $N_{data}$ output bins (an $N_{data} \times M_{ant}$ complex traffic data matrix) corresponding to the traffic data transmitted to the receive node, as well as interference generated by other nodes in the network or external emitters.

On the pilot path, the $N_{embed} \times M_{ant}$ complex pilot data matrix is then passed to an adaptation algorithm that detects bins modulated by the transmitters attempting to communicate with the receiver; identifies those transmitters based on the detected bins and the TRANSEC transmit code algorithm employed in the network, determines quality of the received pilot symbols and (by extension) traffic data, and develops combining weights that can extract the traffic data from the $N_{data} \times M_{ant}$ complex traffic data matrix at the maximum signal-to-interference-and-noise ratio (max-SINR) achievable by the transceiver. On the training path, these combiner weights are then applied to the traffic data matrix, and the extracted data is then passed to a traffic decoder that decodes the traffic data back into bits and performs additional operations employed by the communication link, e.g., bit-level data decryption and error detection operations.

In the preferred TDD and ad hoc embodiments, each transmitter uses an orthogonal transformation of the same length during its transmit operation, generating packets of the same time duration as well. However, in some alternate embodiments different transmitters may transmit signals with different numbers of traffic data symbols. In this case, if an appropriate orthogonal transformation is employed at the transmitters, e.g., a radix-2 FHT, and the pilot symbols are restricted to an appropriate subset of input bins in that transformation, e.g., the first $N_{embed}=2^p$ bins of an FHT, then the first $N_{embed}$ symbols (or a multiple of the first $N_{embed}$ symbols) can be used in the receive adaptation algorithm. This can allow the invention to be used in fully adhoc networks where nodes can transmit packets of arbitrary length. However, receive combiner weights obtained through this process may exhibit misadjustment relative to optimal weights for the traffic data, as the pilot symbols may not experience the full processing gain of the FHT.

Figure 51:
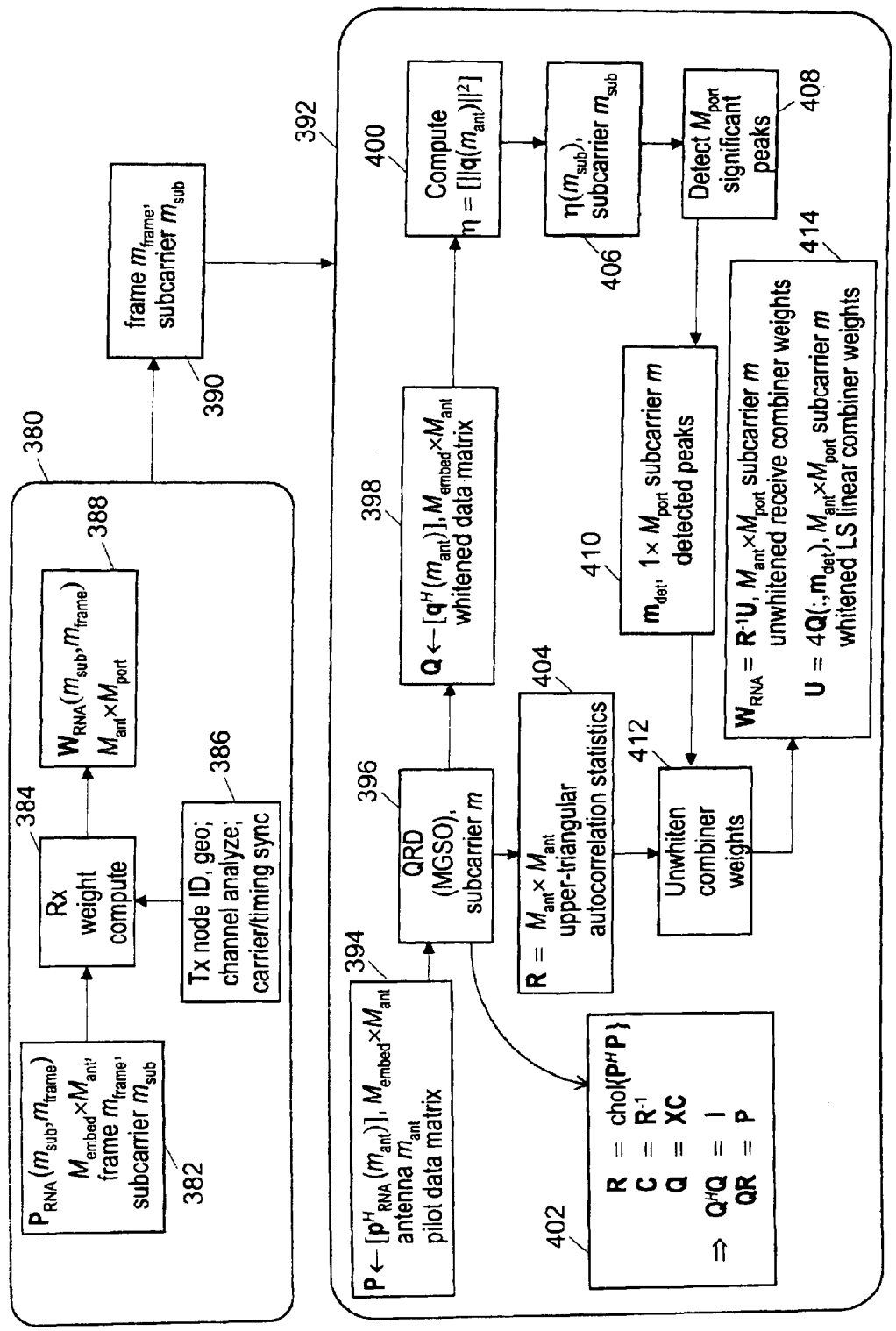
FIG. 51 shows multiport PHY receive adaptation operations and processing performed in the primary embodiment of the invention.

FIG. 51 describes multiport PHY receive adaptation operations performed in the primary embodiment of the invention; and these are described in detail below. On each subcarrier, the $N_{embed} \times M_{ant}$ complex pilot data matrix is first passed to a whitening operation such as a modified Gram-Schmidt orthogonalization (MGSO) or other QR decomposition (QRD) that separates the pilot data X into an $N_{embed} \times M_{ant}$ whitened data set satisfying $Q^H Q = I$, and an $M_{ant} \times M_{ant}$ statistic vector R that captures the autocorrelation of X, e.g., the Cholesky decomposition of $X^H X$. The Q matrix is then analyzed (across multiple subcarriers for OFDM LPHY's) to detect all of the modulated pilot data bins. This information is used to unambiguously determine the TNA of each node attempting to communicate with the receiver. Once this determination has been made, the link SINR, whitened linear combiner weights, and subsequent unwhitened combiner weights are computed for each transmitted signal (and subcarrier for OFDM LPHY's).

Figure 52:
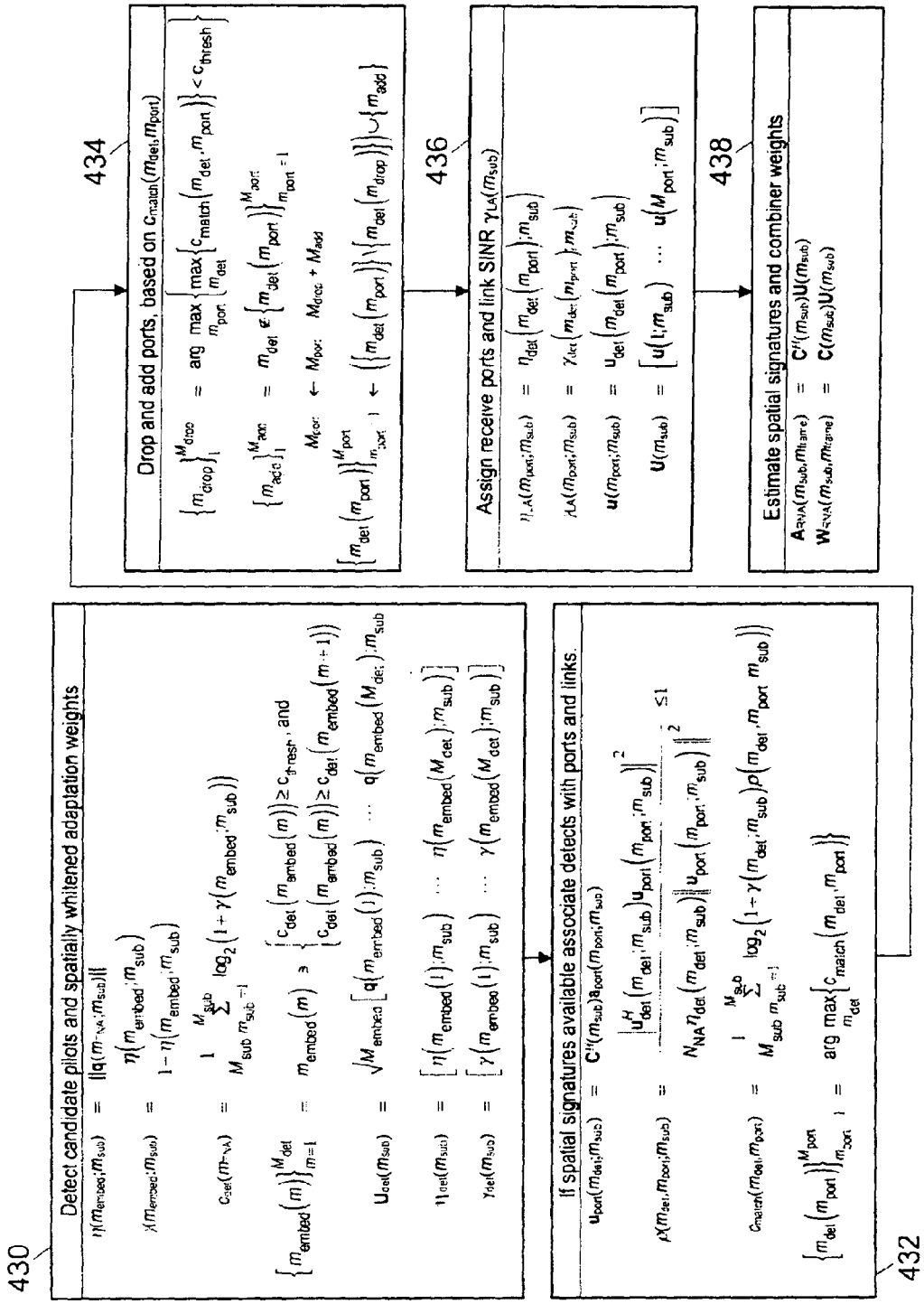
FIG. 52 shows receive packet detection, address association, and link SINR estimation processing performed in the preferred embodiment of the invention.

FIG. 52 describes receive packet detection, address association, and link SINR estimation performed in the primary embodiment of the invention; and these are described in detail below. The adaptation algorithms are uncalibrated, i.e., they do not exploit knowledge of the shaping, polarization, or physical placement of antennas used by the transceiver, and can be used to instantiate arbitrary network topologies, including point-to-point links, star networks, ring networks, or full mesh networks. When deployed in point-to-point links, successive iterations of the transmit and receive adaptation algorithm causes each transceiver to adapt its multiport combiner and distribution weights to the eigenmodes (left and right eigenvectors) of their MIMO internode channel response, typically in 2-to-4 TDD frames (5-10 ms). The resultant fully adaptive link can approach the Shannon capacity of the MIMO communication channel, regardless of the rank or distribution of the eigenvalues of that channel.

Figure 53:
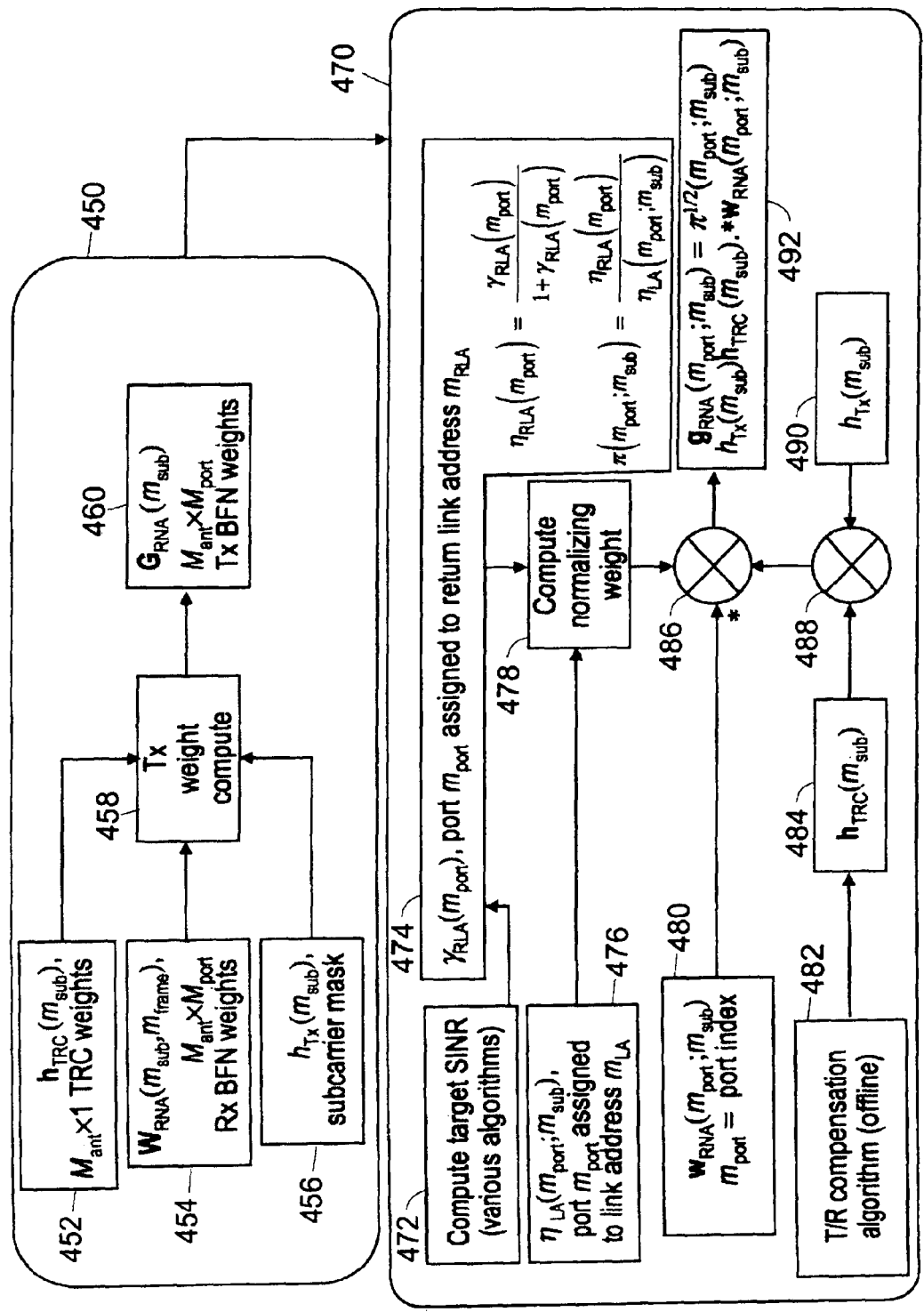
FIG. 53 describes transmit adaptation algorithms operations and processing performed in the preferred embodiment of the invention.

FIG. 53 describes transmit adaptation algorithms performed in the primary embodiment of the invention. The baseline system employs network-wide collaborative link optimization rules referred to in [2] as locally enabled global optimization (LEGO), which optimize network-wide measures of network quality using retrodirective transmit weight adaptation and local (link layer) power management instructions. The approach exploits the ability to form nulls during transmit operations to intelligently manage interference presented to other nodes transmitting or communicating in the same frequency channel. This includes other nodes operating on the same network, and nodes operating on disconnected networks, without the need for higher-layer cross-communication between interference nodes or networks.

Also described below is also describe an alternate embodiment in which the adaptive receive combining weights are adapted to completely separate intended links with maximum signal-to-interference ratio rather than SIR, i.e., to direct "hard nulls" at each transmitter attempting to communicate with the node during the receive time slot so that interlink interference is completely removed during the receive operation, and to direct corresponding hard nulls back at the intended links during subsequent transmission opportunities. Although this algorithm does introduce some misadjustment (particularly during receive operations), it can improve the stability of the LEGO transmit adaptation algorithms in highly dynamic communication networks.

The resultant fully-adaptive system provides a much more versatile solution than competing multilayer receive-adaptive techniques such as BLAST and STP, which only approaches the Shannon capacity in full-rank (i.e., high multipath) channels. In particular, the fully-adaptive system can use its diversity degrees of freedom (DoF's) to provide substantive transmit gain in low-rank channels found in airborne and rural conditions. The fully-adaptive system can also use these DoF's to excise interference impinging on either end of the link due to other nodes operating in the same frequency band, hostile jamming of the link. In addition, the fully adaptive system provides an automatic power control mechanism (LEGO Algorithm) that can be used to maximize capacity (high throughput applications) or minimize transmit power (LPD applications), depending on the requirements of the system at any point during a mission. These attributes greatly increase the flexibility, range of operation, and application of the approach.

Moreover, the weight adaptation procedure is decoupled from operations used to encode data onto each transmitter port (channel eigenmode) and decode data taken from the corresponding receive port at the other side of the link, without expensive multilayer decoding, encoding, and cancellation procedures employed in receive-adaptive methods. This greatly reduces the complexity and reaction time of the transceiver, by allowing the transmit/receive weights to quickly adjust to highly dynamic environments encountered in military use scenarios.

The fully adaptive point-to-point link seamlessly extends to collaborative multimode networks. In particular, each transceiver employs the same multiport linear processor structure to form simultaneous links to multiple neighbors in multinode networks. The resultant MIMO networking strategy (first disclosed in [1]) exploits the additional inherent route diversity of star, ring, or mesh networks, to provide the benefits of MIMO processing in a network setting.

The MIMO network illustrated in FIG. 44 displays a minimalist-model, four-node, network that is operating in the presence of a jammer. In this figure, nodes employ the multiport linear receive and transmit operations discussed above, to establish multiple simultaneous links with their neighbors. In the presence of point-to-point link diversity (high-rank MIMO channel response between communicators), e.g., polarization or multipath diversity, nodes may establish multiple connections between their neighbors. In the absence of such link diversity, or if desired by the network, the nodes may alternately establish simultaneous connections with their neighbors. These connections can be used to directly source data to these neighbors, or transmit data through these neighbors to more distant destination nodes. In the example shown in FIG. 46, this strategy doubles the amount of data transportable to or from any node in the network—even if no link diversity exists on any of the internode channels (rank-1 internode channel response). More generally, this strategy allows the capacity of each node to grow linearly with the number of antennas at that node, even in nondiverse communication scenarios such as airborne systems, desert combat scenarios, and ship-to-ship/shore naval communication networks, while maintaining the ability to provide superlinear throughput increases at low power levels. Moreover, this strategy allows unused DoFs to be used for other purposes, including excision of strong jamming likely to be encountered in battlefield conditions.

The symbol and timing structure for the baseline Phase 1 Lower-PHY (LPHY) is illustrated in FIG. 45. In order to simplify the Phase I lower PHY and requisite RF transceiver hardware, the method and system can employ a linear PAM LPHY with a 250 kHz symbol rate (4 μs lower PHY symbol period). In FIG. 45, the PAM symbol shape is assumed to be a 4 μs rectangle comprising a 3.2 .mu·s base pulse, used during demodulation operations, and an 800 ns cyclic prefix that is discarded during demodulation operations. The resulting LPHY modem can be consequently be modeled as a single subcarrier of an 802.11g-like OFDM symbol, allowing the radio to be easily scaled to much wider bandwidths in later program phases. In addition, many other linear-PAM LPHY's are also consistent, including spread spectrum modulation formats that spread the signal over wide bandwidth, and LPI/LPD modulation formats that reduce or eliminate cyclic features of the waveform. The nominal ADC and DAC rates for the transceivers can be 5 Msps, well within the capability of low SWaP/cost systems.

The multiport PHY transmit/receive operations are illustrated in FIG. 47. At the transmitter, a frame of data intended for each transmit port is encoded to QAM using forward error correcting (FEC) encoding, organized into blocks of 240 QAM symbols, multiplexed with a transmit pilot that is unique to each node or transmit node address (TNA) in the network, and spread over the frame and PHY subcarriers using a fast Hadamard transform (FHT). The transmit pilot is designed to allow implementation of computationally efficient adaptive detection and reception algorithms at the intended receiver(s) in the network, without the need for prior knowledge of that pilot at the receiver. Sixteen Hadamard bins (software provisionable at each node based on the number of antennas employed by that node) set aside for pilot transmission add only 6.25% (16/256) overhead to the communications network, allowing effective node detection, receive adaptation, and node data extraction in one TDD slot (1.25 ms), with as many as eight antennas per transceiver. However, the number of pilot bins can be easily modified in software, or even provisioned on a dynamic basis, e.g., to improve the performance of receive adaptation algorithms when more complex transceivers enter the network, or to increase link throughput as those radios leave the environment.

After the FHT, the combined information and transmit pilot are modulated by a pseudorandom receive TRANSEC pilot, unique to the intended receiver or receive node address (RNA) in the network. If needed, the TRANSEC pilot is also frequency compensated to remove Doppler shift anticipated at the intended receiver, allowing the link to operate effectively velocities much higher than those anticipated in the Phase I demo. The TRANSEC output data is then passed through a linear distribution network (transmit beamformer) that can place beams in the direction of up to $M_{ANT}$ targeted receive nodes for a transceiver with $M_{ANT}$ transmit antennas. Alternately, the transmit beamformer can place up to $20\log_{10}(M_{ANT})$ energy in the direction of a single targeted receive node, allowing effective data transfer at a much lower power and consequent intercept footprint.

At the receiver, the processor strips off the receive TRANSEC pilot, simultaneously scrambling signals from any unauthorized user, and revealing the unique transmit pilots from each authorized user attempting to contact the receiver during that receive frame. The resultant data is passed to a computationally efficient, Modified Graham-Schmidt Orthogonalization (MGOS) based joint detection and signal extraction processor, which simultaneously detects each authorized pilot in the environment, and develops multiport receive combiner weights that excise interference in the communication channel (including self-interference from other authorized users). These weights are dewhitened and applied to the information-bearing signal after the inverse FHT (IFHT), and used to adapt retrodirective distribution weights used during subsequent transmit operations. The combined receive TRANSEC and IFHT spreading operations guarantees that the receive algorithm will apply equal interference rejection to the pilot and data symbols, for any interferer impinging on a node during its receive time slot.

The baseline system employs network-wide collaborative link optimization rules referred to as locally enabled global optimization (LEGO), which optimize network-wide measures of network quality using retrodirective transmit weight adaptation and local (link layer) power management instructions. The approach exploits the ability to form nulls during transmit operations to intelligently manage interference presented to other nodes transmitting or communicating in the same frequency channel. This includes other nodes operating on the same network, and nodes operating on disconnected networks, without the need for higher-layer cross-communication between interference nodes or networks. This capability, originally developed for optimization of point-to-multipoint cellular networks in wireless local-loop (AT&T Wireless Project Angel) and wireless metropolitan area networks (IEEE 802.16), cannot be employed in systems that do not perform transmit adaptation. This method and system can extend the LEGO approach to game theoretic methods that may perform this network optimization over a wider range of applications, networks, and optimization criteria.

The complexity of the method and system are shown in FIGS. 49-53. System complexity can be divided into two components: an FPGA coreware component, comprising regular operations that are easily implemented using field-programmable gate arrays or ASIC's, and a DSP software component. FPGA coreware operations can include the lower PHY modem, transmit and receive beamforming (linear distribution and combining operations), transmit/receive TRANSEC operations, and FHT/IFHT operations. The DSP software operations can include the MGSO operation, node discovery, and weight dewhitening operation. In both such cases, complexity is calculated in DSP clock cycles per second, for a hypothetical DSP hardware element that can compute a simultaneous real add and a real multiply in 4/3 clock cycle (1 clock cycle with 33% derating for memory transfer operations). Complexity is further divided by the number of transceiver ports (simultaneous transmit and receive channels), to provide a measure of the DSP cost of each link used accessed by the transceiver.

The overall complexity of the DSP component of transceiver operations (adaptive algorithm) is less than 200 kcps for the phase 1 system, or well within the capabilities of a low-cost DSP components. Similarly, the overall complexity of the FPGA component of transceiver operations is less than 30 Mcps, which easily fits on the commercially available FPGA and in fact can be implemented using moderate cost DSP components.

Assuming low power rate-1 BPSK QAM encoding on each link, the resultant system can provide a PHY throughput (data rate into the MAC layer) of 96 kbps (192 kbps full duplex), or establish 12 simultaneous 48 kbps full-duplex data links (576 kbps network transfer rate) between each node-pair in a four-node ring network, using a single two-channel transceiver at each node in that network and a simple 250 ksps PAM lower PHY. Assuming an active bandwidth of 250 kHz, this corresponds to a spectral network efficiency of over 2 bps/Hz. This efficiency and bandwidth scales linearly with the number bits/symbol employed in the QAM encoding operation. Because the ring network establishes a counterrotating ring that can transfer data over two simultaneous routes, the reliability of the collaborative network increases dramatically—by over 2 nines if each node in the network as a two nines reliability!

DETAILED EMBODIMENT DESCRIPTION

Parameter Definitions, Equations and Glossary
Network Parameters:

| Network parameters: | Defaut | Index # |
|---|---|---|
| $M_{NA}$ = Number of node addresses (active nodes) in the network | Variable | (1.1.01) |
| $M_{LA}$ = Number of link addresses (active links) in the network | Variable | (1.1.02) |
| $M_{PA}$ = Number of network-layer port addresses in the network | $M_{NA}(M_{NA} - 1)$ | (1.1.03) |
| $M_{RA}$ = Number of network-layer route addresses in the network | Variable | (1.1.04) |

| Network addresses: | Range | |
|---|---|---|
| $m_{NA}$ = Node address (NA) | $1: M_{NA}$ | (1.1.05) |
| $m_{TNA}$ = Transmit Node address (TNA) | $1: M_{NA}$ | (1.1.06) |
| $m_{RNA}$ = Receive Node address (RNA) | $1: M_{NA}$ | (1.1.07) |
| $m_{SNA}$ = Source Node address (SNA) | $1: M_{NA}$ | (1.1.08) |
| $m_{DNA}$ = Destination Node address (DNA) | $1: M_{NA}$ | (1.1.09) |
| $m_{LA}$ = Link address (LA) | $1: M_{LA}$ | (1.1.10) |
| $m_{RLA}$ = Return link address (RLA) | $1: M_{LA}$ | (1.1.11) |
| $m_{PA}$ = Network-layer port address (PA) | $1: M_{PA}$ | (1.1.12) |
| $m_{RA}$ = Network-layer route address (PA) | $1: M_{PA}$ | (1.1.13) |

Network Mappings:

$\mu_{NA}(m_{LA})=[m_{TNA}m_{RNA}]$ connected by link $m_{LA}$. Alternate notation $\mu_{TNA}(m_{LA})$, $\mu_{RNA}(m_{LA})$ can also be used to refer to individual elements of $\mu_{NA}$. (1.1.14)

$\mu_{TDD}(m_{LA})$=TDD wubframe used by link $m_{LA}(\mu_{TNA}(m_{LA})$ transmits over TDD subframe $\mu_{TDD}(m_{LA}))$ (1.1.15)

$\mu_{LA}(m_{TNA},m_{RNA})$=Address of link connecting TNA $m_{TNA}$ to RNA $m_{RNA}$ (0 if no LA)
$\mu_{NA}(m_{LA})=[m_{TNA}m_{RNA}]\Rightarrow \mu_{LA}(m_{RNA}m_{TNA})=m_{LA}$ (1.1.16)

$\mu_{RLA}(m_{LA})$=Return link address (RLA) for link
$m_{LA}:\mu_{NA}(m_{LA})=[m_{TNA}m_{RNA}]\Rightarrow \mu_{NA}(\mu_{RLA}(m_{LA}))=[m_{RNA}m_{TNA}]$ (1.1.17)

$k_{TNA}(m_{frame})$=Adapt bin used by TNA $m_{TNA}$ (same for all links emanating from $m_{TNA}$) over frame $m_{frame}$. Same for all links emanating from $m_{TNA}$. (1.1.18)

Datalink Parameters:

| Address-independent datalink parameters: | Default | |
|---|---|---|
| $N_{codec}$ = Maximum data encoding rate (can be noninteger) | 8 | (1.2.01) |
| $N_{FHT}$ = Hadamard bins per frame | 256 | (1.2.02) |
| $N_{embed}$ = Hadamard bins reserved for adaptation ($\leq N_{FHT}$) | 16 | (1.2.04) |
| $M_{embed}$ = Modulated bins per port ($\leq N_{embed}/N_{port}$) | 16 | (1.2.05) |
| $N_{data}$ = Hadamard bins reserved for data ($\leq N_{FHT} - N_{embed}$) | 240 | (1.2.03) |
| $M_{data}$ = Hadamard bins modulated by data ($\leq N_{data}$) | 240 | (1.2.03a) |
| $N_{sub}$ = Subcarriers per OFDM symbol | 64 | (1.2.06) |
| $M_{sub}$ = Modulated subcarriers per OFDM symbol | 52 | (1.2.07) |
| $M_{QAM}$ = QAM data symbols per physical data frame | 12,480 | (1.2.08) |
| $N_{OFDM}$ = OFDM symbols per physical data frame | 312 | (1.2.09) |
| $M_{OFDM}$ = Modulated OFDM symbols per PPDU | 256 | (1.2.10) |
| $N_{TDD}$ = Data frames (TDD subframes) per TDD frame | 2 | (1.2.11) |
| $T_{FFT}(\mu s)$ = Duration of OFDM FFT in microseconds (µs) | 3.2 µs | (1.2.12) |
| $T_{symbol}(\mu s)$ = Duration of OFDM symbol in µs | 4 µs | (1.2.13) |
| $T_{prefix}(\mu s)$ = Duration of OFDM cyclic prefix (guard interval) in µs | 0.8 µs | (1.2.14) |
| $T_{PPDU}(\mu s)$ = Duration of data PPDU in µs | 1,024 µs | (1.2.15) |
| $T_{frame}(\mu s)$ = Duration of data frame in µs | 1,250 µs | (1.2.16) |
| $T_{TxRx}(\mu s)$ = Duration of TxRx turnaround time in µs | 2 µs | (1.2.17) |
| $T_{IFS}(\mu s)$ = Duration of interframe space (guard time interval) in µs, inclusive of $T_{TxRx}$ | 226 µs | (1.2.18) |
| $T_{TDD}(\mu s)$ = Duration of OFDM cyclic prefix (guard interval) µs | 2,500 µs | (1.2.19) |
| $f_{sub}(MHz)$ = Subcarriers spacing in MHz (OFDM LPHY) | 0.3125 MHz | (1.2.20) |
| $W_{active}(MHz)$ = Active bandwith of signal in MHz | 16.25 MHz | (1.2.21) |

| Node-address dependent datalink parameters: | Default | |
|---|---|---|
| $N_{ant}$ = Antennas available at node | Variable | (1.2.22) |
| $M_{ant}$ = Antennas used at node ($\leq N_{ant}$) | Variable | (1.2.23) |
| $N_{port}$ = Physical ports supportable at node ($\leq N_{ant}$) | Variable | (1.2.24) |
| $M_{port}$ = Physical ports used at node ($\leq N_{port}$) | Variable | (1.2.25) |

| Link-address dependent datalink parameters: | Default | |
|---|---|---|
| $M_{codec}$ = Codec rate employed on link ($0 \Rightarrow$ no data transported) | Variable | (1.2.26) |
| $M_{bit}$ = Bits/frame Tx"d over the link ($M_{bit} * M_{codec}$), $0 \Rightarrow$ none | Variable | (1.2.27) |

| Node-address independent datalink indices: | Range | |
|---|---|---|
| $n_{FHT}$ = Physical FHT input bin index | 1: $N_{FHT}$ | (1.2.28) |
| $m_{FHT}$ = Logical FHT input bin index | 1: $M_{FHT}$ | (1.2.29) |
| $m_{data}$ = Logical data bin index | 1: $M_{data}$ | (1.2.30) |
| $m_{embed}$ = Logical adaptation bin index | 1: $M_{embed}$ | (1.2.31) |
| $n_{sub}$ = Physical subcarrier index | 1: $N_{sub}$ | (1.2.32) |
| $m_{sub}$ = Logical subcarrier index | 1: $M_{sub}$ | (1.2.33) |
| $m_{QAM}$ = Logical QAM data index | 1: $M_{QAM}$ | (1.2.34) |
| $n_{OFDM}$ = Physical OFDM symbol index | 1: $N_{OFDM}$ | (1.2.35) |
| $m_{OFDM}$ = Logical OFDM symbol index | 1: $M_{OFDM}$ | (1.2.36) |
| $n_{TDD}$ = TDD subframe index (TDD instantiations) | 1: $N_{TDD}$ | (1.2.37) |
| $n_{frame}$ = Data frame index (ignores TDD framing) | — | (1.2.38) |

| Node-address dependent datalink indices: | Range | |
|---|---|---|
| $n_{ant}$ = Physical antenna index | 1: $N_{ant}$ | (1.2.39) |
| $m_{ant}$ = Logical antenna index | 1: $M_{ant}$ | (1.2.40) |
| $n_{port}$ = Physical port index | 1: $N_{port}$ | (1.2.41) |
| $m_{port}$ = Logical port index | 1: $M_{port}$ | (1.2.42) |
| $m_{frame}$ = Logical frame index, shared by consecutive node receive and transmit frames | $\geq 0$ | (1.2.43) |

| Link-address dependent datalink indices: | Range | |
|---|---|---|
| $m_{bit}$ = Logical data bit (codes input) index | 1: $M_{bit}$ | (1.2.44) |

Datalink Mappings:

$v_{embed}(m_{embed})$=Physical Hadamard bin modulated by logical transmit pilot bin $m_{embed}$ (1.2.45)

$v_{data}(m_{data})$=Physical Hadamard bin modulated by logical data bin $m_{data}$ (1.2.46)

$v_{sub}(m_{sub})$=Physical subcarrier modulated by logical subcarrier $m_{sub}$ (1.2.47)

$f_{sub}(m_{sub})$=Physical baseband link frequency of logical subcarrier $m_{sub}$ (1.2.48)

$v_{frame}(m_{frame}, m_{TDD})$=Physical frame carrying PPDU with frame index $m_{frame}$, TDD subframe index $m_{frame}$. (1.2.49)

$\mu_{port}(m_{LA})$=Logical transmit or receive port (as appropriate) providing data for link address $m_{LA}$. By convention, the same logical port is used on the return path, $m_{port}(m_{LA})=v_{port}(m_{RLA}), m_{RLA}=\mu_{RLA}(m_{LA})$. (1.2.50)

$\mu_{LA}(m_{port})$=LA serviced by port $m_{port}$. Inverse of $\mu_{port}(m_{LA})$. (1.2.51)

Data and Parameter Arrays:

| Transmit data arrays: | | Dimensions | |
|---|---|---|---|
| $B_{TNA}(m_{frame}) =$ | Transmitted bits transmitted, frame $m_{frame}$, $B_{TNA}(m_{frame}) = [b_{TNA}(1; m_{frame}) \ldots b_{TNA}(M_{port}, m_{frame})]$, $b_{TNA}(m_{port}, m_{frame})$ = bits Tx'd from node $m_{TNA}$ over port $m_{port}$ $m_{port} = \mu_{port}(m_{LA})$, where $\mu_{TNA}(m_{LA}) = m_{TNA}$ | $M_{bit} \times M_{port}$ | (1.3.1) |
| $Q_{TNA}(m_{sub}, m_{frame}) =$ | QAM data transmitted, subcarrier $m_{sub}$, frame $m_{frame}$, $Q_{TNA}(m_{sub}, m_{frame}) = \begin{bmatrix} q_{TNA}^H(1; m_{sub}, m_{frame}) \\ \vdots \\ q_{TNA}^H(M_{data}; m_{sub}, m_{frame}) \end{bmatrix}$ $q_{TNA}(m_{data}; m_{sub}, m_{frame})$ = QAM data Tx'd on data bin $m_{data}$ | $M_{data} \times M_{port}$ | (1.3.2) |
| $D_{TNA}(m_{sub}, m_{frame}) =$ | FHT input data, subcarrier $m_{sub}$, frame $m_{frame}$, $D_{TNA}(m_{sub}, m_{frame}) = \begin{bmatrix} d_{TNA}^H(1; m_{sub}, m_{frame}) \\ \vdots \\ d_{TNA}^H(M_{FHT}; m_{sub}, m_{frame}) \end{bmatrix}$ | $M_{OFDM} \times M_{port}$ | (1.3.3) |
| $C_{TNA}(m_{sub}, m_{frame}) =$ | TRANSEC-scrambled FHT output data, subcarrier $m_{sub}$, frame $m_{frame}$, $C_{TNA}(m_{sub}, m_{frame}) = \begin{bmatrix} c_{TNA}^H(1; m_{sub}, m_{frame}) \\ \vdots \\ c_{TNA}^H(M_{OFDM}; m_{sub}, m_{frame}) \end{bmatrix}$ | $M_{OFDM} \times M_{port}$ | (1.3.4) |

-continued

| Transmit data arrays: | | Dimensions | |
|---|---|---|---|

$S_{TNA}(m_{sub}, m_{frame}) =$ OFDM modulator input data, subcarrier $m_{sub}$, frame $m_{frame}$. $\quad M_{OFDM} \times M_{ant}$ (1.3.5)

$$S_{TNA}(m_{sub}, m_{frame}) = \begin{bmatrix} s_{TNA}^H(1; m_{sub}, m_{frame}) \\ \vdots \\ s_{TNA}^H(M_{OFDM}; m_{sub}, m_{frame}) \end{bmatrix}$$

| Transmit parameter arrays: | | Dimensions | |
|---|---|---|---|

$R_{RNA}(m_{sub}, m_{frame}) =$ RNA TRANSEC code, subcarrier $m_{sub}$, frame $m_{frame}$; $\quad M_{OFDM} \times M_{port}$ (1.3.6)
row $m_{port}$ = receive code for node $m_{RNA}$ =
$\mu_{RNA}(\mu_{LA}(m_{port}))$
$r_{RNA}(m_{port}; m_{sub}, m_{frame}) =$
$r(m_{sub}, m_{frame}; \mu_{RNA}(\mu_{LA}(m_{port})))$,
$G_{TNA}(m_{sub}, m_{frame}) =$ TNA distribution weights, subcarrier $m_{sub}$, frame $\quad M_{ant} \times M_{port}$ (1.3.7)
$m_{frame}$.
$\gamma_{RLA}(m_{frame}) =$ Target return-link SINR's, frame $m_{frame}$. $\quad 1 \times M_{port}$ (1.3.8)
$h_{Tx}(m_{sub}) =$ Transmit subcarrier mask (OFDM LPHY), $\quad M_{ant} \times 1$ (1.3.9)

$$h_{TX}(m_{sub}) = \left( \frac{\pi f_{sub}(m_{sub}) T_{DAC}}{\sin(\pi f_{sub}(m_{sub}) T_{DAC})} \right) h_{TRC}(m_{sub})$$

where $T_{DAC} = 1/f_{DAC}$ is the (node-specific) DAC output
sample period.
$h_{TRC}(m_{sub}) =$ Transmit-receive compensation weights, equalizes $\quad M_{ant} \times 1$ (1.3.10)
path differences between the RF switch and the DAC
(transmit path) and ADC (receive path) at each node in
the network. Computed during scheduled
Transmit/receive compensation events.

| Receive data arrays: | | Dimensions | |
|---|---|---|---|

$X_{RNA}(m_{sub}, m_{frame}) =$ OFDM demod output data, subcarrier $m_{sub}$, frame $\quad M_{OFDM} \times M_{ant}$ (1.3.11)
$m_{frame}$.
$Y_{RNA}(m_{sub}, m_{frame}) =$ TRANSEC-descrambled FHT output data, subcarrier $\quad M_{FHT} \times M_{ant}$ (1.3.12)
$m_{sub}$, frame $m_{frame}$.

$$Y_{RNA}(m_{sub}, m_{frame}) = \begin{bmatrix} y_{RNA}^H(1; m_{sub}, m_{frame}) \\ \vdots \\ y_{RNA}^H(M_{OFDM}; m_{sub}, m_{frame}) \end{bmatrix}$$

$P_{RNA}(m_{sub}, m_{frame}) =$ Deembeded pilot data, subcarrier $m_{sub}$, frame $m_{frame}$. $\quad M_{embed} \times M_{ant}$ (1.3.13)

$$P_{RNA}(m_{sub}, m_{frame}) = \begin{bmatrix} P_{RNA}^H(1; m_{sub}, m_{frame}) \\ \vdots \\ P_{RNA}^H(M_{embed}; m_{sub}, m_{frame}) \end{bmatrix}$$

$Z_{RNA}(m_{sub}, m_{frame}) =$ Deembeded QAM data, subcarrier $m_{sub}$, frame $m_{frame}$. $\quad M_{data} \times M_{ant}$ (1.3.14)
$Q_{RNA}(m_{sub}, m_{frame}) =$ Demodulated QAM data subcarrier $m_{sub}$, frame $m_{frame}$. $\quad M_{data} \times M_{port}$ (1.3.15)
$B_{RNA}(m_{frame}) =$ Decoded bits, frame $m_{frame}$ $\quad M_{bit} \times M_{port}$ (1.3.16)

| Receive parameter arrays: | | Dimensions | |
|---|---|---|---|

$r_{RNA}(m_{sub}, m_{frame}) =$ NA TRANSEC code, subcarrier $m_{sub}$, frame $m_{frame}$. $\quad M_{OFDM} \times 1$ (1.3.17)
Used at node $m_{RNA}$ during receive operations, and at
nodes attempting to communicate with node $m_{RNA}$
during their transmit operations.
$W_{RNA}(m_{sub}, m_{frame}) =$ Rx combiner weights, subcarrier $m_{sub}$, frame $m_{frame}$. $\quad M_{ant} \times M_{port}$ (1.3.18)
$A_{Rx}(m_{sub}, m_{frame}) =$ Rx spatial signature estimates, subcarrier $m_{sub}$, frame $\quad M_{ant} \times M_{port}$ (1.3.19)

-continued

| Receive parameter arrays: | Dimensions | |
|---|---|---|
| $m_{frame}$. | | |
| $\gamma_{LA}(m_{sub}, m_{frame})$ = Estimated link SINR's, subcarrier $m_{sub}$, frame $m_{frame}$. | $1 \times M_{port}$ | (1.3.20) |

| Conceptual parameter arrays (not generated, but referred to in operations): | Dimensions | |
|---|---|---|
| $t_{TNA}(m_{frame})$ = [Sparse] NA transmit pilot, subcarrier $m_{sub}$, frame $m_{frame}$. | $M_{embed} \times 1$ | (1.3.21) |
| $t_{TNA}(m_{frame}) = \sqrt{M_{embed}} e(k_{TNA}(m_{frame}))$ | | |
| $C_{FHT}$ = Unitary Walsh transformation matrix | $M_{FHT} \times M_{FHT}$ | (1.3.22) |
| $S_{data}$ = Shift matrix, maps logical data bins to FHT input bins | $M_{FHT} \times M_{data}$ | (1.3.23) |
| $S_{pilot}$ = Shift matrix, maps logical pilot bins to FHT input bins | $M_{FHT} \times M_{pilot}$ | (1.3.24) |
| $S_{FHT}$ = Shift matrix, maps logical bins to physical FHT input bins, | $M_{FHT} \times M_{FHT}$ | (1.3.25) |
| $S_{FHT} = [S_{pilot}\ S_{data}]$ | | |

Upper-PHY Signal Processing Operations:

Transmit Operations

Starting with the transmit bits $B_{TNA}(m_{frame})$ to be transmitted over logical subcarrier $m_{sub}$ and logical frame $m_{frame}$, perform the following operations.

Step TP1: Separately encode each row of transmitted bits $B_{TNA}(m_{frame})$ into QAM symbols, and map to subcarriers to form QAM transmit data $Q_{TNA}(m_{sub}, m_{frame})$. The bit-to-QAM encoder is not specified here. However, the default encoder will be operations cited in the 802.11a standards specification.

Step TP2: Embed the transmit pilot, and map pilot & data to FHT input bins $$D_{TNA}(m_{sub}, m_{frame}) = S_{FHT} \begin{bmatrix} t_{TNA}(m_{frame}) 1^T_{M_{port}} \\ Q_{TNA}(m_{sub}, m_{frame}) \end{bmatrix} \quad (2.1.1)$$

$$= S_{pilot}(t_{TNA}(m_{frame}) 1^T_{M_{port}}) + \quad (2.1.2)$$

$$S_{data} Q_{Tx}(m_{sub}, m_{frame})$$

Step TP3: Embed receive pilot for RNA's communicating with the node.

$$C_{TNA}(m_{sub}, m_{frame}) = R_{RNA}(m_{sub}, m_{frame}) \cdot *(C_{FHT} D_{TNA}(m_{sub}, m_{frame})) \quad (2.1.3)$$

Step TP4: Distribute the embedded data over the output antennas.

$$S_{TNA}(m_{sub}, m_{frame}) = (1_{M_{OFDM}} h_{Tx}^T(m_{sub})) \cdot *(c_{TNA}(m_{sub}, m_{frame}) G_{TNA}^T(m_{sub}, m_{frame})) \quad (2.1.4)$$

where ".*" denotes the element-wise multiply operation, and $1_M$ is the Mx1 all-ones vector.

Two algorithms are specified here to adapt transmit distribution weights $$\{G_{TNA}(m_{sub}, m_{frame})\},$$

A retrodirective max-SINR approach that sets $\{G_{TNA}(m_{sub}, m_{frame})\}$ proportional to the receive weights that maximize signal-to-interference-and-noise ratio (SINR) on the return path, and A retrodirective max-SIR approach that sets $\{G_{TNA}(m_{sub}, m_{frame})\}$ proportional to the receive weights that maximize signal-to-interference ratio (SIR), i.e., that provide hard transmit nulls, on the return path.

The max-SIR approach is recommended for initialization of new links; the max-SINR approach is recommended for steady state operation and tracking. The max-SINR transmit weight adaptation algorithm is described in Section 3.2. The max-SIR transmit weight adaptation algorithm is described in Section 4.2.

Receive Processing Operations

Starting with the multiantenna data $X_{RNA}(m_{sub}, m_{frame})$ received and OFDM-demodulated over logical subcarrier $M_{sub}$ and logical frame $m_{frame}$, perform the following operations.

Step RP1: Remove the receive pilot, and inverse-FHT descrambled data $$Y_{RNA}(m_{sub}, m_{frame}) = C_{FHT}^H((r_{RNA}*(m_{sub}, m_{frame}) 1_{M_{ant}} (m_{RNA})^T) \cdot * X_{RNA}(m_{sub}, m_{frame})) \quad (2.2.1)$$

Step RP2: Separate pilot & data components $$P_{RNA}(m_{sub}, m_{frame}) = S_{pilot}^T Y_{RNA}(m_{sub}, m_{frame}) \quad (2.2.2)$$

$$X_{RNA}(m_{sub}, m_{frame}) = S_{data}^T Y_{RNA}(m_{sub}, m_{frame}) \quad (2.2.3)$$

Steps RA, Detect transmit pilots and estimate their SINR's $\gamma_{LA}(m_{sub}, m_{frame})$ (Sections 3.1, 4.1).

TA:

Compute combiner weights $\{W_{RNA}(m_{sub}, m_{frame})\}$ (Sections 3.1, 4.1).

Compute distribution weights $\{G_{TNA}(m_{sub}, m_{frame})\}$ to be used on the return path (Sections 3.2, 4.2).

Step RP3: Recover the QAM link data:

$$Q_{RNA}(m_{sub}, m_{frame}) = Z_{RNA}(m_{sub}, m_{frame}) W_{RNA}(m_{sub}, m_{frame}) \quad (2.2.4)$$

Two algorithms are specified here to adapt receive combiner weights $\{W_{RNA}(m_{sub}, m_{frame})\}$, A retrodirective max-SINR approach that adapts $\{W_{RNA}(m_{sub}, m_{frame})\}$ to maximize signal-to-interference-and-noise ratio (SINR) of the received pilot data, and A retrodirective max-SIR approach that adapts $\{W_{RNA}(m_{sub}, m_{frame})\}$ to maximize signal-to-interference ratio (SIR) of the received pilot data, i.e., that provide hard receive nulls to separate the signals of interest to the node.

The max-SIR approach is recommended for initialization of new links; the max-SINR approach is recommended for steady state operation and tracking. The max-SINR transmit weight adaptation algorithm is described in Section 3.2. The max-SIR transmit weight adaptation algorithm is described in Section 4.2.

Max-SINR Adaptation Algorithm

Adaptive Receive Algorithm

Starting with the multiantenna received and deembedded pilot data (referred to as $P_{RNA}(m_{sub})$ or $P_{RNA}$ as appropriate to simplify arguments) received and OFDM-demodulated over logical subcarrier $m_{sub}$ and logical frame $m_{frame}$, perform the following operations Step RA1: Compute QRD of $P_{RNA}(m_{sub}, m_{frame})$ $$\{Q(m_{sub}), R(m_{sub})\} = QRD\{P_{RNA}(m_{sub}, m_{frame})\}, \text{ such that} \quad (3.1.1)$$

$$R(m_{sub})\} = chol\{P_{RNA}^H(m_{sub}, m_{frame})P_{RNA}(m_{sub}, m_{frame})\} \quad (3.1.2)$$

$$= chol\{P_{RNA}^H P_{RNA}(m_{sub}, m_{frame})\} \quad (3.1.3)$$

$$C(m_{sub}) = R^{-1}(m_{sub}) \quad (3.1.4)$$

$$Q(m_{sub}) = P_{RNA}(m_{sub}, m_{frame})C(m_{sub}), \quad (Q^H(m_{sub})Q(m_{sub}) = I_{M_{ant}}) \quad (3.1.5)$$

$$= \begin{bmatrix} q^H(1; m_{sub}) \\ \vdots \\ q^H(M_{embed}; m_{sub}) \end{bmatrix} \quad (3.1.6)$$

Step RA2: Detect candidate TNA transmit pilots and spatially whitened adaptation weights $$\eta(m_{embed}; m_{sub}) = \|q(m_{embed}; m_{sub})\|^2 \quad (3.1.7)$$

$$\gamma(m_{embed}; m_{sub}) = \frac{\eta(m_{embed}; m_{sub})}{1 - \eta(m_{embed}; m_{sub})} \quad (3.1.8)$$

$$c_{det}(m_{embed}) = \frac{1}{M_{sub}} \sum_{m_{sub}=1}^{M_{sub}} \log_2(1 + \gamma(m_{embed}; m_{sub})) \quad (3.1.9)$$

$$\{m_{embed}(m)\}_{m=1}^{M_{det}} = m_{embed}(m) \text{ satisfying} \quad (3.1.10)$$

$$\begin{cases} c_{det}(m_{embed}(m)) \geq c_{thresh}, \text{ and} \\ c_{det}(m_{embed}(m)) \geq c_{det}(m_{embed}(m+1)) \end{cases}$$

$$U_{det}(m_{sub}) = \quad (3.1.11)$$
$$\sqrt{M_{embed}} [q(m_{embed}(1); m_{sub}) \ldots q(m_{embed}(m_{det}); m_{sub})]$$

$$\eta_{det}(m_{sub}) = [\eta(m_{embed}(1); m_{sub}) \ldots \eta(m_{embed}(m_{det}); m_{sub})] \quad (3.1.12)$$

$$\gamma_{det}(m_{sub}) = [\gamma(m_{embed}(1); m_{sub}) \ldots \gamma(m_{embed}(m_{det}); m_{sub})] \quad (3.1.13)$$

Step RA3: If spatial signature estimates $A_{port}(m_{sub})$ are available, where $A_{port}(m_{sub})$ is the import column of $A_{RNA}(m_{sub})$ (see Step RA6), associate detected transmit pilots with receive ports and link addresses.

$$U_{port}(m_{det}; m_{sub}) = C^H(m_{sub})a_{port}(m_{port}; m_{sub}) \quad (3.1.14)$$

$$\rho(m_{det}, m_{port}; m_{sub}) = \quad (3.1.15)$$
$$\frac{|u_{det}^H(m_{det}; m_{sub})u_{port}(m_{port}; m_{sub})|^2}{M_{embed} \eta_{det}(m_{det}; m_{sub})\|u_{port}(m_{port}; m_{sub})\|^2} \leq 1$$

-continued $$c_{match}(m_{det}, m_{port}) = \quad (3.1.16)$$
$$\frac{1}{M_{sub}} \sum_{m_{sub}=1}^{M_{sub}} \log_2(1 + \gamma(m_{det}; m_{sub})\rho(m_{det}, m_{port}; m_{sub}))$$

$$\{m_{det}(m_{port})\}_{m_{port}=1}^{M_{port}} = \underset{m_{det}}{\operatorname{argmax}}\{c_{match}(m_{det}; m_{port})\} \quad (3.1.17)$$

Step RA4: Drop and add ports, based on the port matching statistic $c_{match}(m_{det}, m_{port})$.

$$\{m_{drop}\}_1^{M_{drop}} = \underset{m_{port}}{\operatorname{argmax}}\{\underset{m_{det}}{\max}\{c_{match}(m_{det}; m_{port})\} < c_{thresh}\} \quad (3.1.18)$$

$$\{m_{add}\}_1^{M_{add}} = m_{det} \notin \{m_{det}(m_{port})\}_{m_{port}=1}^{M_{port}} \quad (3.1.19)$$

$$M_{port} \leftarrow M_{port} - M_{drop} + M_{add} \quad (3.1.20)$$

$$\{m_{det}(m_{port})\}_{m_{port}=1}^{M_{port}} \leftarrow (\{m_{det}(m_{port})\} \setminus \{m_{det}(m_{drop})\}) \cup \{m_{add}\} \quad (3.1.21)$$

Step RA5: Assign receive ports and link statistics $\eta_{LA}(m_{sub})$ and $\gamma_{LA}(m_{sub})$.

$$\eta_{LA}(m_{port}; m_{sub}) = \eta_{det}(m_{det}(m_{port}); m_{sub}) \quad (3.1.22)$$

$$\gamma_{LA}(m_{port}; m_{sub}) = \gamma_{det}(m_{det}(m_{port}); m_{sub}) \quad (3.1.23)$$

$$u(m_{port}; m_{sub}) = u_{det}(m_{det}(m_{port}); m_{sub}) \quad (3.1.24)$$

$$U(m_{sub}) = [u(1; m_{sub}) \ldots u(M_{port}; m_{sub})] \quad (3.1.25)$$

Step RA6: Estimate spatial steering matrices $\{A_{RNA}(m_{sub}, m_{frame})\}$.

$$A_{RNA}(m_{sub}, m_{frame}) = C^H(m_{sub})U(m_{sub}) \quad (3.1.26)$$

Step RA7: Compute combiner weights $\{W_{RNA}(m_{sub}, m_{frame})\}$.

$$W_{RNA}(m_{sub}, m_{frame}) = C(m_{sub})U(m_{sub}) \quad (3.1.27)$$

Adaptive Transmit Algorithm

Starting with the receive weights $W_{RNA}(m_{sub}, m_{frame})$ given in (3.1.27) and target SINR's $\gamma_{RLA}$ for the return link, perform the following operations.

Step TA1: Scale whitened transmit weights, $$\eta_{RLA}(m_{port}) = \frac{\gamma_{RLA}(m_{RLA})}{1 + \gamma_{RLA}(m_{RLA})}, \quad m_{port} = \mu_{port}(m_{RLA}) = \mu_{port}(m_{RLA}) \quad (3.2.1)$$

$$\pi_{RLA}(m_{port}; m_{sub}) \leftarrow \frac{\eta_{RLA}(m_{port})}{\eta_{LA}(m_{port}; m_{sub})}, \quad (3.2.2)$$

$(\eta_{LA}(m_{port}; m_{sub})$ given in (3.1.22))

Step TA2: Compute distribution weights $\{G_{TNA}(m_{sub}, m_{frame})\}$.

$$G_{TNA}(m_{sub}, m_{frame}) = [\sqrt{\pi(1, m_{sub})}w_{RNA}(1, m_{sub}) \ldots \sqrt{\pi(M_{port}, m_{sub})}w_{RNA}(M_{port}, m_{sub})] \quad (3.2.3)$$

The target SINR's can also be derived from rate targets based on performance of the codec's used in the system, or from capacity targets $\{C_{RLA}(m_{RLA})\}$ or spectral efficiency targets $\{c_{RLA}(m_{RLA})\}$, via the formula $$c_{RLA}(m_{RLA}) = 1.63C_{RLA}(m_{RLA})/W_{active} \quad (3.2.4)$$

$$\gamma_{RLA}(m_{RLA}) = \lambda_{gap}(2^{C_{RLA}(m_{RLA})} - 1)c_{RLA}(m_{RLA}) \quad (3.2.5)$$

Where 1.63=1/0.6144 is the inverse efficiency of the airlink, which includes overhead for transmit pilots (0.9375 efficiency), the OFDM cyclic prefix (0.80 efficiency) and TDD framing (0.8192 efficiency), and where $\lambda_{gap}$ is the SNR coding gap of the QAM codec. Target SINR, rate, or capacity can be set at either end of the link, i.e., as a transmitter design goal or as a control parameter passed from the link or network. In the first two cases, this adaptation is referred to here as locally enabled network optimization (LEGO).

Note that steps (3.2.1)-(3.2.3) adjust output power to meet a link SINR (or link rate or capacity) criterion. That is, the system will attempt to adjust transmit power at each node to meet this criterion. Also note that steps (3.2.1)-(3.2.3) require no information from other links in the network, including links originating from the same node. While this can be a highly desirable attribute in many applications, it has some drawbacks in practice. In particular, if the target SINR's are set too high, the resultant network can fail to converge and drive its transmitters into saturation. This event can be detected by computing the conducted power into each antenna, $$P_{RLA}(m_{ant}) = M_{sub} \sum_{m_{port}=1}^{M_{port}} |g(m_{ant}, m_{port})|^2 \qquad (3.2.6)$$

and monitoring $P_{RLA}(m_{ant})$ to ensure compliance with conducted power requirements.

In addition, the convergence time of the LEGO algorithm can be slow, especially during initial acquisition of multiple links. This performance can be improved by employing a max-SIR algorithm that forms hard nulls during the initial link acquisition period. This algorithm is easily implemented as an extension of the max-SINR algorithm described above.

Max-SIR Adaptation Algorithm
Adaptive Receive Algorithm

Starting with the multiantenna received and deembedded pilot data $X_{Px}(m_{sub}, m_{frame})$ (referred to as $X_{Px}(m_{sub})$ or $X_{Px}$ as appropriate to simplify arguments) received and OFDM-demodulated over logical subcarrier $m_{sub}$ and logical frame $m_{frame}$, perform the following operations.

Step RA1: Compute QRD of $P_{RNA}(m_{sub}, m_{frame})$, using (3.1.1)-(3.1.6).
Step RA2: Detect candidate TNA transmit pilots and spatially-whitened max-SINR adaptation weights using (3.1.7)-(3.1.13).
Step RA3: If spatial signature estimates $A_{RNA}(m_{sub})$ are available (see Step RA7), associate detected transmit pilots with receive ports and link addresses, using (3.1.14)-(3.1.17).
Step RA4: Drop and add ports using (3.1.18)-(3.1.21).
Step RA5: Assign max-SINR whitened transmit/receive weights and link statistics using (3.1.22)-(3.1.25).
Step RA6: Estimate spatial steering matrices $\{A_{RNA}(m_{sub}, m_{frame})\}$ using 3.1.26.
Step RA7: Compute combiner weights $\{W_{RNA}(m_{sub}, m_{frame})\}$, using (3.1.27).
Step RA7.1: Compute null-steering receive weights and SINR's $$C_\perp(m_{sub}) = (U^H(m_{sub})U(m_{sub}))^{-1} \qquad (4.1.1)$$

$$\eta_{LA}(m_{posrt}, m_{sub}) \leftarrow 1/\text{diag}\{C_\perp(m_{sub})\} \qquad (4.1.2)$$

(replaces $\eta_{LA}(m_{posrt}, m_{sub})$ provided by (3.1.22))

-continued $$\gamma_{LA}(m_{posrt}, m_{sub}) \leftarrow \frac{\eta_{LA}(m_{port}; m_{sub})}{1 - \eta_{LA}(m_{port}; m_{sub})} \qquad (4.1.3)$$

(replaces $\gamma_{LA}(m_{port}, m_{sub})$ provided by (3.1.22))

$$W_{RNA}(m_{sub}, m_{frame}) \leftarrow W_{RNA}(m_{sub}, m_{sub})C_\perp(m_{sub}) \qquad (4.1.4)$$

Adaptive Transmit Algorithm

Starting with the transmit weights $W_{RNA}(m_{sub}, m_{frame})$ given in (4.1.4) and target SINR's $\gamma_{RLA}$ for the return link, perform the following operations.

Step TA1: Compute $\eta_{RLA}(m_{port})$ using (3.2.1).
Step Compute power scaling $\pi(m_{port}; m_{sub})$ using TA1.1:

$$\pi(m_{port}; m_{sub}) = \eta_{RLA}(m_{port})\eta_{LA}(m_{port}; m_{sub}), (\eta_{LA}(m_{port}; m_{sub}) \text{ given in (3.1.22))} \qquad (4.2.1)$$

Step TA2: Compute combiner weights $\{G_{RNA}(m_{sub}, m_{frame})\}$ using 3.2.3

The target SINR's can also be derived from rate targets based on performance of the codec's used in the system, or from capacity targets $\{C_{RLA}(m_{RLA})\}$ or spectral efficiency targets $\{c_{RLA}(m_{RLA})\}$, using (3.2.4)-(3.2.5), and conducted power can be monitored using (3.2.6). In addition, the SINR and SIR estimates given by (3.1.23 and (4.1.3) can be used to detect "overloaded network" conditions where the max-SIR solution is misadjusting significantly from the max-SINR result.

While this invention has been described with reference to one or more illustrative embodiments, this description is not to be construed in a limiting sense. Various modifications and combinations of the illustrative embodiments, differing order of the sub-steps (including parallel and partial processing for one or more operations thereof), as well as other embodiments of the invention will be apparent to those skilled in the art upon referencing this disclosure. It is therefore intended this disclosure encompass any combination of the specifics described here and such modifications or embodiments. Furthermore, the scope of this invention includes any combination of the subordinate parts from the different embodiments disclosed in this specification, and is not limited to the specifics of the preferred embodiment or any of the alternative embodiments mentioned above. Individual configurations and embodiments of this invention may contain all, or less than all, of those disclosed in the specification according to the needs and desires of that user. The claims stated herein should further be read as including those elements which are not necessary to the invention yet are in the prior art, particularly that referenced and incorporated herein thereby, and are necessary to the overall function of that particular claim, and should be read as including, to the maximum extent permissible by law, known functional equivalents to the specification's disclosure, even though those functional equivalents are not exhaustively detailed herein or individually claimed below due to the legal preferences for limiting the number of claims and the law's intent to negate any requirement for combinatorial explosion for overly-detailed description and claiming of known and foreseeable alternatives.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of adaptive and transitional MIMO systems, both hardware and associated software therefore, and which may be used instead of or in addition to features already described herein. The examples herein are not limiting but instructive of the embodiment of the invention, and variations which are readily derived through programming or embedded hardware transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived there from.

What is claimed is:

1. An apparatus, comprising:
an antennae array of M antennae, where M is greater than or equal to two;
at least one multiple-input and multiple-output capable transceiver in communication with the antennae array of M antennae; and
processing circuitry, the processing circuitry in communication with the multiple-input and multiple-output capable transceiver, the processing circuitry capable of causing the apparatus to:
receive a particular signal from at least one of a plurality of multiple input-capable nodes, where first information is received that is associated with the at least one multiple input-capable node and is capable of being used for weight determination;
identify second information;
apply at least one weight to transmit data based on the first information;
add a cyclic prefix to the transmit data; and
generate third information based on the second information and the particular signal;
wherein the apparatus is configured such that the at least one multiple-input-and-multiple-output/orthogonal frequency division multiplexing-capable transceiver is capable of transmitting at least one downlink signal including at least a portion of the transmit data to the at least one multiple input-capable node;
wherein the apparatus is further configured such that the at least one multiple-input-and-multiple-output/orthogonal frequency division multiplexing-capable transceiver is capable of transmitting the at least one downlink signal such that the at least portion of the transmit data is redundantly transmitted utilizing a plurality of different diversity channels that differ in at least one of a spatial respect or a polarization respect;
wherein the apparatus is further configured such that the third information is transmitted to the at least one multiple input-capable node such that a power level with which the at least one multiple input-capable node transmits is capable of being set based on the third information;
wherein the apparatus is further configured so as to allow dynamic routing utilizing another route different from a previous route;
wherein the apparatus is further configured such that the dynamic routing includes allowing routing as a function of an interference associated with at least one link.

2. A multiple-input-and-multiple-output/orthogonal frequency division multiplexing-capable base node, comprising:
circuitry for:
linking with a plurality of multiple input-capable nodes including a first multiple input-capable node and a second multiple input-capable node, by:
linking to the first multiple input-capable node utilizing a first diversity channel, and
linking to the second multiple input-capable node utilizing a second diversity channel that differs from the first diversity channel in at least one aspect including a spatial aspect or a polarization aspect;
identifying information including first information that is capable of being used for coding determination, second information that is capable of being used for base node weight determination, and third information that is specific to at least one of the plurality of multiple input-capable nodes;
modulating downlink data utilizing a coding that is determined based on the first information;
applying to the downlink data at least one base node weight that is determined based on the second information;
adding a cyclic prefix to the downlink data;
multiplexing the downlink data with another signal;
generating power-related information based on the third information;
transmitting at least one downlink signal including at least a portion of the downlink data and at least a portion of the another signal to the at least one multiple input-capable node;
communicating the power-related information to the at least one multiple input-capable node such that a power level with which the at least one multiple input-capable node transmits is capable of being set based on the power-related information; and
dynamically routing utilizing another route different from a previous route associated with the at least one downlink signal, the dynamic routing including routing as a function of an interference.

3. The base node of claim 2, wherein the base node is operable such that internalized feedback is utilized so that a signaling process conveys optimization information.

4. The base node of claim 2, wherein the base node is operable such that receiver weight-related information is received from at least one of the plurality of multiple input-capable nodes in a form of a pilot signal that is multiplexed with received uplink data; and at least one receiver weight is determined based on the receiver weight-related information.

5. The base node of claim 2, wherein the base node is operable such that reciprocity is utilized for local optimization.

6. The base node of claim 2, wherein the base node is operable such that uplink and downlink resources are allocated based on traffic conditions.

7. The base node of claim 2, wherein the base node is operable to optimize a network capacity as a function of a signal-to-interference-and-noise-ratio (SINR).

8. The base node of claim 2, wherein the base node is operable to optimize a network capacity as a function of a signal-to-interference-and-noise-ratio (SINR) and a link capacity.

9. The base node of claim 2, wherein the base node is operable to determine at least one receiver weight based on a minimum mean square error (MMSE) function.

10. The base node of claim 2, wherein the base node is operable to receive CRC information in association with uplink data and perform an error correction in association with the uplink data utilizing the CRC information.

11. The base node of claim 2, wherein the base node is operable to reduce timing offsets.

12. The base node of claim 2, wherein the base node is operable to perform a synchronization operation in connection with the at least one multiple input-capable node to reduce at least one timing offset associated with communication therebetween.

13. The base node of claim 2, wherein the base node is operable to perform quadrature amplitude modulation.

14. The base node of claim 2, wherein the base node is operable to perform quadrature amplitude modulation in connection with the another signal.

15. The base node of claim 2, wherein the base node is operable to direct a beam at the first multiple input-capable node in a manner that avoids interference in association with the second multiple input-capable node.

16. The base node of claim 2, wherein the base node is operable in a network that coordinates with the base node and at least one other base node, in order to direct a beam at the first multiple input-capable node in a manner that avoids interference in association with the second multiple input-capable node.

17. The base node of claim 2, wherein the base node is operable to direct a null at an interferer to reduce interference therefrom.

18. The base node of claim 2, wherein the base node is operable to direct a null at an interferer to reduce interference therefrom, where the null is directed based on feedback received from the at least one multiple input-capable node.

19. The base node of claim 2, and further comprising a Turbo codec for Turbo encoding in association with interleaving.

20. The base node of claim 2, and further comprising circuitry for Turbo encoding in association with interleaved data.

21. The base node of claim 2, and further comprising a Turbo codec for Turbo encoding in association with tone/slot interleaving.

22. The base node of claim 2, wherein:
the circuitry includes at least one component of at least one processor;
the at least one base node weight includes at least one transmit weight;
the base node is operable for global optimization;
the base node is operable for providing an opportunistic and multi-protocol network;
the base node is operable for enabling multiple, competing, cooperating sub-networks that are mutually and automatically adaptive and responsive;
the base node is operable for resolving an interplay between a local optimization and the global optimization;
the base node is operable for using a reception of signal information from other nodes both targeting the base node and not targeting the base node, to enhance both reception and transmission quality while minimizing feedback signals that are exchanged;
the base node is operable for providing network optimization that is capable of being extended to mixed networks;
the base node is operable for providing convergent methods for approximation;
the base node is operable for providing a computationally efficient mechanization for cross-correlation operations that take advantage of multiport signals on particular single channels;
the base node is operable for maximizing a use of local information and minimizing a use of global information;
the base node is operable for allowing specialization in a dynamic fashion;
the base node is operable for supporting diversity reception and transmission;
the base node is operable for permitting shared antenna usage amongst multiple nodes;
the base node is operable for adaptively selecting and using ad-hoc, single-frequency networks;
the base node is operable for equalizing a processing or duty cycle for message transmission and reception across both directions of a predetermined link;
the base node is operable for working in uncalibrated areas;
the base node is operable for adoption and use for transient nodes in areas, without requiring all possible combinations of channel responses;
the base node is operable for providing rapid correction for miscalibrated data;
the base node is operable for rapid and dynamic adaptation to channel response changes;
the base node is operable for providing a computationally efficient mechanization of cross-correlation operations for nodes and channels;
the base node is operable for reaching a working target capacity objective by iterating from an initial approximation to an acceptably-constrained solution;
the base node is operable such that power levels that solve a local target capacity objective minimize a transmitted energy;
the base node is operable such that quantities needed for a local solution only require local information to solve;
the base node is operable such that a power function minimizes transmitted energy at each respective node, hence minimizing co-channel interference while achieving targeted capacity rates;
the base node is operable for avoiding a need for estimating any channel matrices, and substantial lessening detailed and fine calculation and recalculation;
the at least one aspect includes the polarization aspect;
the base node is operable such that the modulating, the applying, the adding, the multiplexing, and the generating occur in a predetermined sequential order; and
the base node is operable such that the at least one base node weight is selected at the base node.

23. The base node of claim 2, wherein the base node is operable such that the first information is a function of a signal-to-interference-and-noise-ratio (SINR); the second information includes weight-related information received from the at least one multiple input-capable node; and the power-related information is a function of a power constraint.

24. The base node of claim 2, wherein the base node is operable such that the at least portion of the downlink data is redundantly transmitted to the at least one multiple input-capable node utilizing substantially the same time and frequency resource but a plurality of different diversity channels that differ in at least one of a spatial respect or a polarization respect.

25. The base node of claim 2, wherein the base node is operable such that the first information is a function of a signal-to-interference-and-noise-ratio (SINR); the second information includes weight-related information; the power-related information is a function of a power constraint; the at least portion of the downlink data is redundantly transmitted to the at least one multiple input-capable node utilizing a plurality of different diversity channels that differ in at least one of a spatial respect or a polarization respect; and the linking with the plurality of multiple input-capable nodes is carried out utilizing a space division multiple access protocol.

26. The base node of claim 25, wherein the base node is operable to utilize a Turbo codec for Turbo encoding in association with interleaving; perform quadrature amplitude modulation; determine at least one receiver weight based on a minimum mean square error (MMSE) function; direct a null at an interferer to reduce interference therefrom; direct a beam at the first multiple input-capable node in a manner that avoids interference in association with the second multiple input-capable node; and receive CRC information in association with received data and perform an error correction in association with the received data utilizing the CRC information.

27. The base node of claim 25, wherein the base node is operable so as to dynamically change a particular channel to another channel different from a previous channel associated with the at least one downlink signal transmitted to the at least one multiple input-capable node.

28. The base node of claim 25, wherein the base node is operable to perform at least four of the following: a) utilize a Turbo codec for Turbo encoding in association with interleaving; b) perform quadrature amplitude modulation; c) determine at least one receiver weight based on a minimum mean square error (MMSE) function; d) direct a null at an interferer to reduce interference therefrom, where the null is directed based on feedback received from the at least one multiple input-capable node; e) direct a beam at the first multiple input-capable node in a manner that avoids interference in association with the second multiple input-capable node; and f) receive CRC information in association with received data and perform an error correction in association with the received data utilizing the CRC information.

29. The base node of claim 2, wherein the base node is operable such that the at least portion of the downlink data is redundantly transmitted utilizing a plurality of different spatial diversity channels; and the base node is further configured so as to dynamically change a particular channel to another channel different from a previous channel associated with the at least one downlink signal transmitted to the at least one multiple input-capable node.

30. The base node of claim 2, wherein the base node is operable such that the at least portion of the downlink data is redundantly transmitted utilizing a plurality of different polarization diversity channels; and the base node is further configured so as to dynamically change a particular channel to another channel different from a previous channel associated with the at least one downlink signal transmitted to the at least one multiple input-capable node.

31. The base node of claim 2, wherein the base node is operable to utilize a Turbo codec for Turbo encoding in association with interleaving; perform quadrature amplitude modulation; determine at least one receiver weight based on a minimum mean square error (MMSE) function; direct a null at an interferer to reduce interference therefrom, where the null is directed based on feedback received from the at least one multiple input-capable node; direct a beam at the first multiple input-capable node in a manner that avoids interference in association with the second multiple input-capable node; and receive CRC information in association with received data and perform an error correction in association with the received data utilizing the CRC information.

32. A multiple-input/orthogonal frequency division multiplexing-capable user node, comprising:
circuitry for:
linking with a multiple-input-and-multiple-output-capable node utilizing a particular link;
receiving first information from the multiple-input-and-multiple-output-capable node that is capable of being used for power level setting;
modulating uplink data;
adding a cyclic prefix to the uplink data;
multiplexing the uplink data with at least one pilot signal;
transmitting at least one uplink signal including at least a portion of the uplink data and at least a portion of the pilot signal to the multiple-input-and-multiple-output-capable node, utilizing a power level that is set based on the first information;
communicating, to the multiple-input-and-multiple-output-capable node, second information that is capable of being used by the multiple-input-and-multiple-output-capable node to base at least one base node weight upon;
dynamically changing a transmit channel to another channel different from a previous channel associated with the at least one uplink signal transmitted to the multiple-input-and-multiple-output-capable node; and
dynamically routing utilizing another route different from a previous route, the dynamic routing including routing as a function of an interference associated with the particular link with the multiple-input-and-multiple-output-capable node.

33. The user node of claim 32, wherein the user node is operable such that receiver weight-related information is sent from the user node in connection with the at least one pilot signal, such that the receiver weight-related information is capable of being utilized to determine at least one receiver weight.

34. The user node of claim 32, wherein the user node is operable to determine at least one receiver weight based on a minimum mean square error (MMSE) function.

35. The user node of claim 32, wherein the user node is operable to receive CRC information in association with downlink data and perform an error correction in association with the downlink data utilizing the CRC information.

36. The user node of claim 32, wherein the user node is operable to perform quadrature amplitude modulation.

37. The user node of claim 32, wherein the user node is operable to perform quadrature amplitude modulation in connection with the at least one pilot signal.

38. The user node of claim 32, and further comprising a Turbo codec for Turbo encoding in association with interleaving.

39. The user node of claim 32, and further comprising a Turbo codec for Turbo encoding in association with interleaved data.

40. The user node of claim 32, and further comprising a Turbo codec for Turbo encoding in association with tone/slot interleaving.

41. The user node of claim 32, wherein the at least one pilot signal includes pilot data.

42. The user node of claim 32, wherein the user node is operable such that the dynamic routing is performed in association with a link failure.

43. The user node of claim 32, wherein the user node is operable to perform diversity combining in association with received signals.

44. The user node of claim 32, wherein the user node is operable such that the dynamic routing is performed in association with route diversity adjustment.

45. The user node of claim 32, wherein the user node is operable such that the dynamic routing is performed based on network capacity.

46. A network including the user node of claim 32, and further comprising the multiple-input-and-multiple-output-capable node that is a base node including a multiple-input-and-multiple-output/orthogonal frequency division multiplexing-capable transceiver and circuitry for:
  generating the first information for communication with the user node;
  receiving the second information from the user node;
  applying to downlink data the at least one base node weight that is determined based on the second information;
  adding a cyclic prefix to the downlink data;
  multiplexing the downlink data with another signal;
  transmitting at least one downlink signal including at least a portion of the downlink data and at least a portion of the another signal to the user node; and
  cooperating with the user node to enable the dynamic routing.

47. The network of claim 46, wherein the base node is operable to utilize a Turbo codec for Turbo encoding in association with interleaving; perform quadrature amplitude modulation; determine at least one receiver weight based on a minimum mean square error (MMSE) function; direct a null at an interferer to reduce interference therefrom, where the null is directed based on feedback received from the user node; direct a beam at the user node in a manner that avoids interference in association with another user node; and receive CRC information in association with received data and perform an error correction in association with the received data utilizing the CRC information.

48. The network of claim 46, wherein the base node is operable to downlink to different user nodes via different spatial or polarization diversity channels utilizing a space division multiple access protocol; and adaptively modulate the downlink data utilizing a coding as a function of a signal-to-interference-and-noise-ratio (SINR); and the base node is further configured so as to dynamically change a particular channel to another particular channel different from a previous particular channel associated with the at least one downlink signal transmitted to the at least one user node.

49. The user node of claim 32, wherein the user node is operable to modulate the downlink data utilizing a coding that is selected based on feedback from the base node.

50. The apparatus of claim 1, wherein the apparatus is operable such that the particular signal includes information, and the power level is incrementally set.

51. The apparatus of claim 1, wherein the second information reflects, at least in part, a signal-to-interference-and-noise-ratio (SINR).

52. The apparatus of claim 1, wherein the apparatus is operable to simultaneously link to different multiple input-capable nodes utilizing different spatial or polarization diversity channels; modulate the transmit data utilizing a coding that is adaptively determined based on a signal-to-interference-and-noise-ratio (SINR); and multiplex the transmit data with a pilot signal; and the apparatus is further configured so as to dynamically change a particular channel to another channel different from a previous channel associated with the at least one downlink signal transmitted to the at least one multiple input-capable node.

53. The apparatus of claim 52, wherein the apparatus is operable to utilize a Turbo codec for Turbo encoding in association with interleaving; perform quadrature amplitude modulation; determine at least one receiver weight based on a minimum mean square error (MMSE) function; direct a null at an interferer to reduce interference therefrom, where the null is directed based on feedback received from the at least one multiple input-capable node; direct a beam at the at least one multiple input-capable node in a manner that avoids interference in association with another multiple input-capable node; and receive CRC information in association with received data and perform an error correction in association with the received data utilizing the CRC information.

54. The apparatus of claim 52, wherein the apparatus is operable such that the third information includes power-related information that is a function of a power constraint and is node-specific; and the link to the different multiple input-capable nodes is carried out utilizing a space division multiple access protocol.

* * * * *

UNITED STATES PATENT AND TRADEMARK OFFICE
CERTIFICATE OF CORRECTION

PATENT NO.        : 8,315,326 B2                                          Page 1 of 1
APPLICATION NO.   : 13/022622
DATED             : November 20, 2012
INVENTOR(S)       : Agee et al.

It is certified that error appears in the above-identified patent and that said Letters Patent is hereby corrected as shown below:

On the Title Page, Item [60]
    Delete "Provisional application No. 60/234,831, filed on Sep. 22, 2000", and insert --Provisional application No. 60/243,831, filed on Oct. 27, 2000--

In the Specification
Column 1, Line 15:
    After "for all purposes." insert: --Moreover, U.S. patent application serial no. 09/878,789 claims priority to U.S. provisional patent application serial no. 60/211,462, filed June 13, 2000, and to U.S. provisional patent application serial no. 60/243,831, filed October 27, 2000.--

Signed and Sealed this
Twenty-fifth Day of August, 2015

Michelle K. Lee
*Director of the United States Patent and Trademark Office*